US012697877B2

(12) United States Patent
Peng et al.

(10) Patent No.: US 12,697,877 B2
(45) Date of Patent: Aug. 4, 2026

(54) AUDIO STREAM PROCESSING METHOD, ADDRESS PROCESSING METHOD, AND RELATED DEVICE

(71) Applicant: Huawei Technologies Co., Ltd., Shenzhen (CN)

(72) Inventors: Hongxing Peng, Xi'an (CN); Xuan Zhou, Shenzhen (CN); Qiang Xu, Toronto (CA); Shuai Wang, Xi'an (CN); Shiming Li, Xi'an (CN); Yan Gong, Shenzhen (CN); Jiayu Long, Shenzhen (CN); Liang Hu, Shenzhen (CN); Jie Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 164 days.

(21) Appl. No.: 18/695,080

(22) PCT Filed: Oct. 26, 2022

(86) PCT No.: PCT/CN2022/127562
§ 371 (c)(1),
(2) Date: Mar. 25, 2024

(87) PCT Pub. No.: WO2023/072118
PCT Pub. Date: May 4, 2023

(65) Prior Publication Data
US 2024/0416752 A1 Dec. 19, 2024

(30) Foreign Application Priority Data
Oct. 30, 2021 (CN) .......................... 202111278594.9

(51) Int. Cl.
*B60K 35/26* (2024.01)
*G06F 3/16* (2006.01)

(52) U.S. Cl.
CPC .............. *B60K 35/26* (2024.01); *G06F 3/165* (2013.01)

(58) Field of Classification Search
CPC ....... H04M 1/724098; H04M 1/72412; H04M 1/72442; H04M 1/72454; H04M 1/6091;
(Continued)

(56) References Cited

U.S. PATENT DOCUMENTS

2015/0215382 A1* 7/2015 Arora ...................... H04L 67/10
382/118
2018/0189024 A1 7/2018 Trestain

FOREIGN PATENT DOCUMENTS

CN 104655146 A 5/2015
CN 111885573 A 11/2020

* cited by examiner

*Primary Examiner* — Paul Kim
(74) *Attorney, Agent, or Firm* — Slater Matsil, LLP

(57) ABSTRACT

Embodiments relate to audio stream and address processing methodologies, which is applicable to exemplary methods and devices including a first terminal device. The first terminal device establishes a connection to the vehicle, and switches a play device of audio streams in a first category and a second category from the first terminal device to the vehicle; and in a process in which the first terminal device and the vehicle are in a connected state, upon detecting that the first terminal device is moved from the inside of the vehicle to the outside of the vehicle, obtains a target category corresponding to the target audio stream being played by the vehicle. The target audio stream is generated by the first terminal device and sent to the vehicle. The vehicle continues to play the target audio stream if the target category is the first category.

20 Claims, 57 Drawing Sheets

(58) Field of Classification Search
CPC .......... B60K 35/26; H04W 4/02; H04W 4/48;
H04W 76/14; H04W 4/40; G06F 3/165
USPC ............................................. 700/94; 381/86
See application file for complete search history.

(a)    (b)    (c)

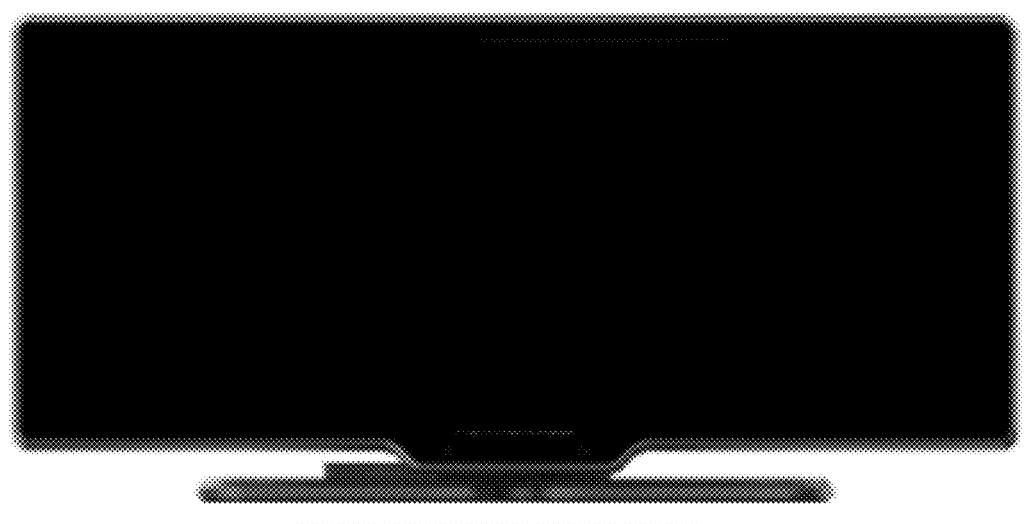
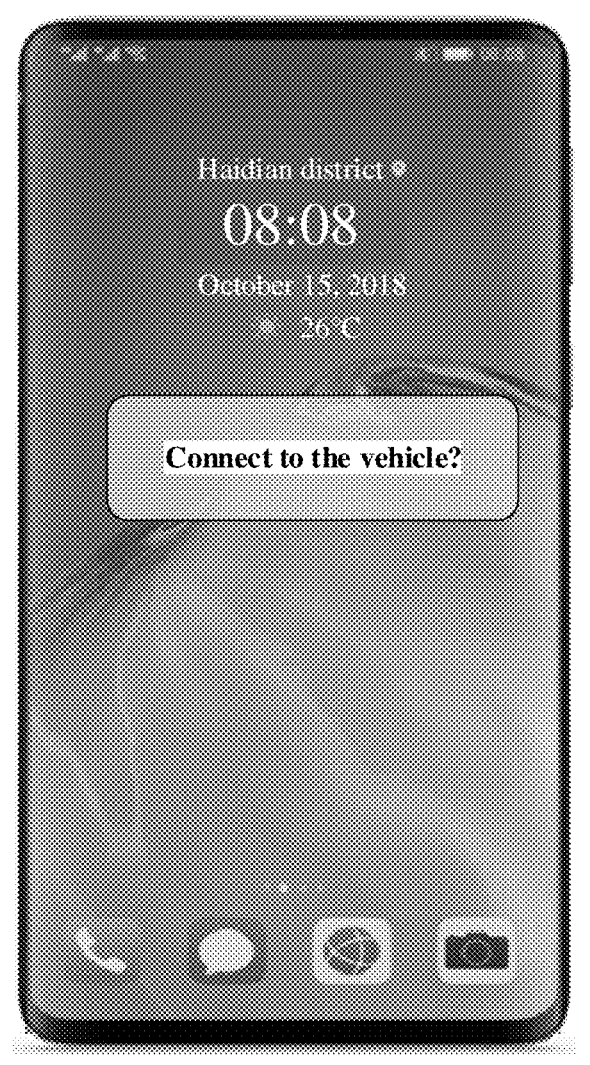
FIG. 12(a)

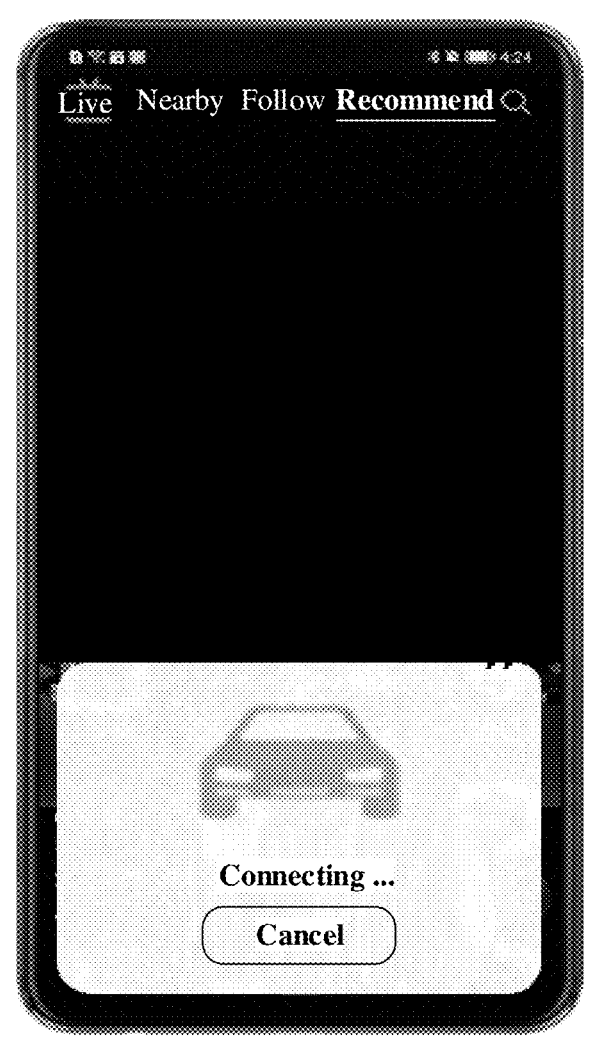
FIG. 12(b)

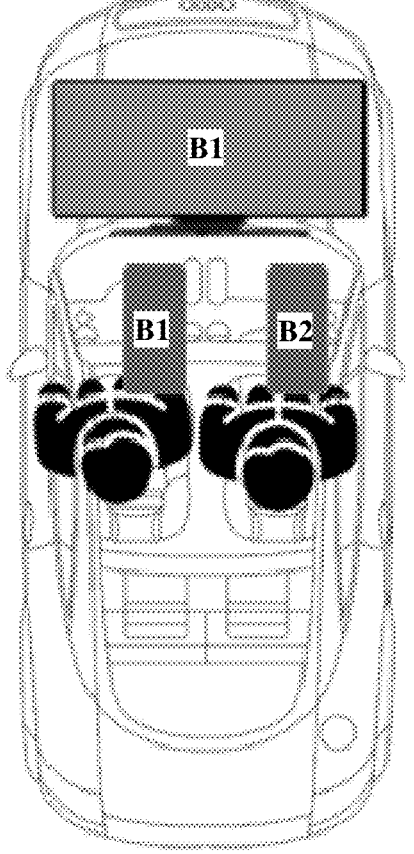
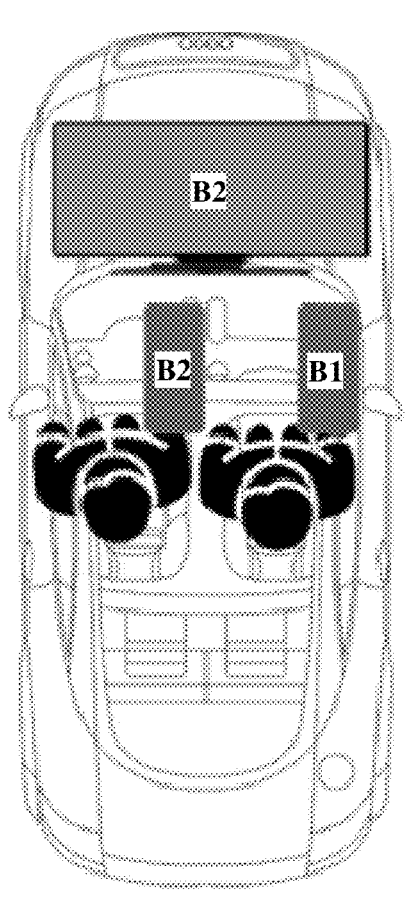
FIG. 13

1400

1400

1500

1600

1700

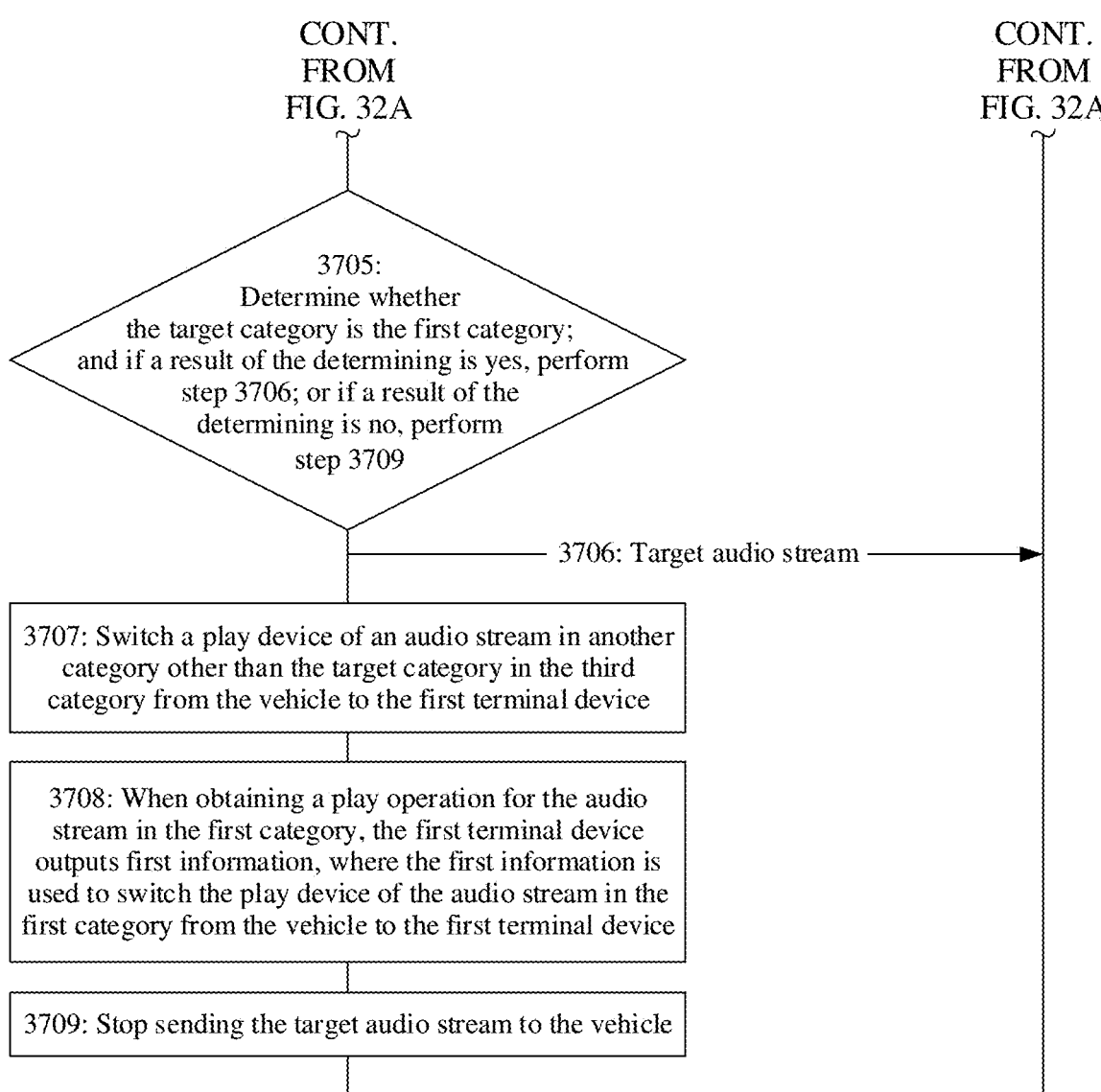

CONT.
FROM
FIG. 32A

CONT.
FROM
FIG. 32A

3705:
Determine whether
the target category is the first category;
and if a result of the determining is yes, perform
step 3706; or if a result of the
determining is no, perform
step 3709

3706: Target audio stream

3707: Switch a play device of an audio stream in another category other than the target category in the third category from the vehicle to the first terminal device 3708: When obtaining a play operation for the audio stream in the first category, the first terminal device outputs first information, where the first information is used to switch the play device of the audio stream in the first category from the vehicle to the first terminal device 3709: Stop sending the target audio stream to the vehicle

FIG. 32B

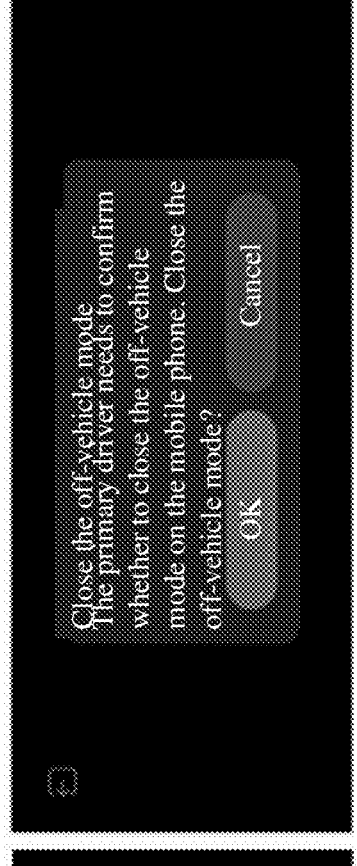
FIG. 38b

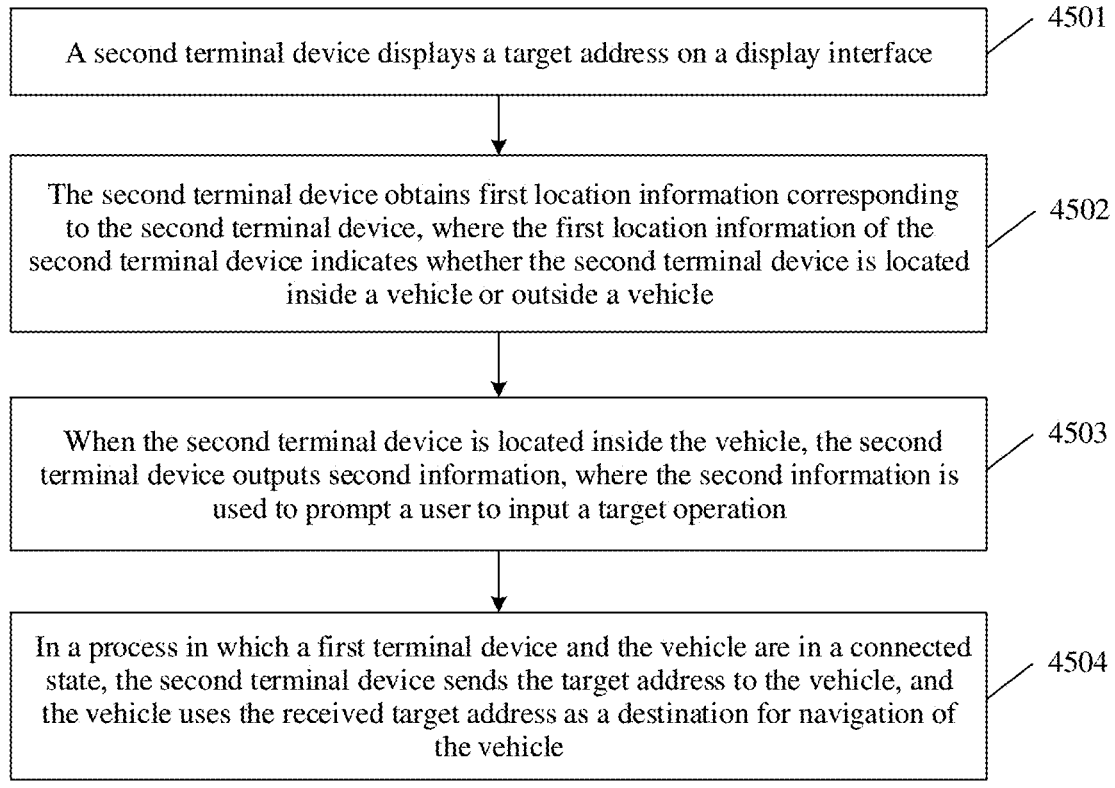

A second terminal device displays a target address on a display interface — 4501

The second terminal device obtains first location information corresponding to the second terminal device, where the first location information of the second terminal device indicates whether the second terminal device is located inside a vehicle or outside a vehicle — 4502

When the second terminal device is located inside the vehicle, the second terminal device outputs second information, where the second information is used to prompt a user to input a target operation — 4503

In a process in which a first terminal device and the vehicle are in a connected state, the second terminal device sends the target address to the vehicle, and the vehicle uses the received target address as a destination for navigation of the vehicle — 4504

CONT.
FROM

TO

CONT.
FROM

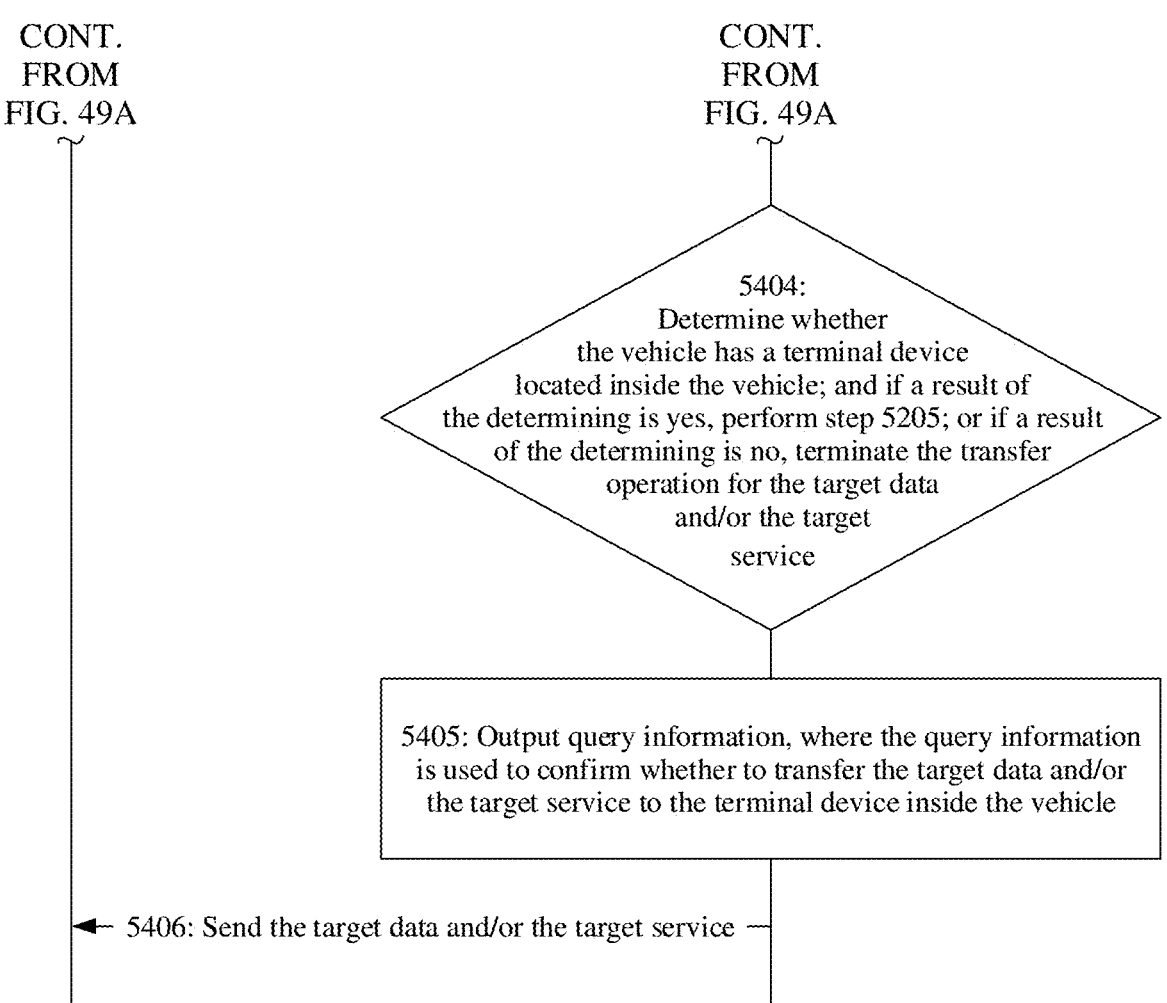

CONT.
FROM
FIG. 49A

CONT.
FROM
FIG. 49A

5404:
Determine whether
the vehicle has a terminal device
located inside the vehicle; and if a result of
the determining is yes, perform step 5205; or if a result
of the determining is no, terminate the transfer
operation for the target data
and/or the target
service 5405: Output query information, where the query information
is used to confirm whether to transfer the target data and/or
the target service to the terminal device inside the vehicle ◄— 5406: Send the target data and/or the target service —

AUDIO STREAM PROCESSING METHOD, ADDRESS PROCESSING METHOD, AND RELATED DEVICE

CROSS-REFERENCE TO RELATED APPLICATIONS

This application is a national stage of International Application No. PCT/CN2022/127562, filed on Oct. 26, 2022, which claims priority to Chinese Patent Application No. 202111278594.9 filed on Oct. 30, 2021. Both of the aforementioned applications are hereby incorporated by reference in their entireties.

TECHNICAL FIELD

This application relates to the artificial intelligence field, and in particular, to an audio stream processing method, an address processing method, and a related device.

BACKGROUND

With continuous upgrade of functions of automobiles, user experience becomes increasingly rich. For example, after a mobile phone establishes a connection to a vehicle, an audio stream generated by the mobile phone may be played through the vehicle. After the mobile phone is disconnected from the vehicle, a play device of the audio stream generated by the mobile phone is switched back to the mobile phone.

Currently, the play device of the audio stream generated by the mobile phone is generally automatically determined based on whether the mobile phone and the vehicle are in a connected state. To be specific, if the mobile phone and the vehicle are in the connected state, the audio stream generated by the mobile phone is automatically played through the vehicle. This is not flexible.

SUMMARY

This application provides an audio stream processing method, an address processing method, and a related device. Therefore, when a terminal device is away from a vehicle, based on a specific type of an audio stream being played by the vehicle, it can be determined whether to switch a play device of the audio stream back to the terminal device, thereby improving flexibility of an audio stream play process and improving user stickiness of this solution.

To resolve the foregoing technical problem, this application provides the following technical solutions.

According to a first aspect, this application provides an audio stream processing method. The method may be applied to the field of intelligent vehicles. The method is applied to a data processing system. The data processing system includes a first terminal device and a vehicle. The method includes: The first terminal device establishes a connection to the vehicle. It should be noted that, in a process in which the first terminal device and the vehicle are in a connected state, the first terminal device may perform any one or more of the following tasks through the vehicle: playing an audio stream, playing a video, navigation, a video call, a call, another task, or the like. Then, the first terminal device may switch a play device of audio streams in a first category and a second category from the first terminal device to the vehicle. In the process in which the first terminal device and the vehicle are in the connected state, when detecting that the first terminal device is moved from the inside of the vehicle to the outside of the vehicle, the first terminal device obtains a target category corresponding to a target audio stream being played by the vehicle. The target audio stream is generated by the first terminal device and sent to the vehicle. The vehicle continues to play the target audio stream if the target category is the first category.

In this implementation, in the process in which the first terminal device and the vehicle are in the connected state, when detecting that the first terminal device is moved from the inside of the vehicle to the outside of the vehicle, the first terminal device obtains the target category corresponding to the target audio stream being played by the vehicle. The target audio stream is sent by the first terminal device to the vehicle. The vehicle continues to play the target audio stream if the target category is the first category. According to the foregoing solution, it can be determined, based on a specific type of an audio stream being played by the vehicle, whether to switch a play device of the audio stream back to the first terminal device, thereby improving flexibility of an audio stream play process and improving user stickiness of this solution.

In a possible implementation of the first aspect, the first category includes a media category, and the second category is different from the first category. Further, an audio stream in the media category may include: an audio stream generated by a music, video, or game application, an audio in an instant messaging application, or another audio stream classified as media, and the like. This is not enumerated herein. In this implementation, because the audio stream in the media category is generally for entertainment and has a relatively low requirement for privacy, after the first terminal device is moved from the inside of the vehicle to the outside of the vehicle, the vehicle continues to play the target audio stream only when the target audio stream being played by the vehicle is in the media category. In this way, entertainment for another person inside the vehicle is ensured, and privacy leakage of a user is avoided.

In a possible implementation of the first aspect, the method further includes: switching a play device of the audio stream in the second category from the vehicle to the first terminal device. The audio stream in the second category is generated by the first terminal device. In this embodiment of this application, after the first terminal device is moved from the inside of the vehicle to the outside of the vehicle, the vehicle continues to play the audio stream in the first category, and the play device of the audio stream in the second category is switched from the vehicle to the first terminal device. The first category and the second category are different categories. In other words, a play device of some audio streams remains as the vehicle, and a play device of the other audio streams is switched from the vehicle to the first terminal device. Therefore, a specific category in which an audio stream is continuously played by the vehicle and a specific category of an audio stream whose play device is switched to the first terminal device can be flexibly set according to an actual case, thereby improving implementation flexibility of this solution.

In a possible implementation of the first aspect, the method further includes: The first terminal device outputs first information. The first information is used to prompt the user to switch a play device of the target audio stream from the vehicle to the first terminal device. In this implementation, when the vehicle continues to play the target audio stream, the first information is output. The first information is used to prompt the user to switch the play device of the audio stream in the first category from the vehicle to the first terminal device. In other words, the user can determine, according to an actual case, whether to switch the play device of the audio stream in the first category back to the first terminal device, thereby improving flexibility of a switching process of a play device of an audio stream in this solution.

In a possible implementation of the first aspect, after the vehicle continues to play the target audio stream if the target category is the first category, the method further includes: When obtaining a play operation for a first audio stream, the first terminal device outputs first information. A category of the first audio stream is the first category. The first audio stream is different from the target audio stream played by the vehicle. The first information is used to prompt the user to switch a play device of the first audio stream from the vehicle to the first terminal device.

In this implementation, when the play operation for the audio stream in the first category is obtained again, output of the first information is triggered. The first information is used to prompt the user to switch the play device of the audio stream in the first category from the vehicle to the first terminal device. In other words, when the user uses the first terminal device to play the audio stream in the first category again, the user may determine, according to an actual case, whether to switch the play device of the audio stream in the first category back to the first terminal device, thereby improving flexibility of a switching process of a play device of an audio stream in this solution.

In a possible implementation of the first aspect, after the first terminal device outputs the first information, the method further includes: The first terminal device receives an operation input by the user. In response to the operation input by the user, the first terminal device switches the play device of the audio stream in the first category from the vehicle to the first terminal device.

In a possible implementation of the first aspect, the detecting that the first terminal device is moved from the inside of the vehicle to the outside of the vehicle includes: The vehicle sends a plurality of target audio signals according to a preset frequency. The plurality of target audio signals include a first sounding signal and a second sounding signal. At least one arrival time includes a first time set corresponding to the first sounding signal and a second time set corresponding to the second sounding signal. The first time set includes at least one time at which the first sounding signal arrives at the first terminal device through direct incidence and/or reflection. The second time set includes at least one time at which the second sounding signal arrives at the first terminal device through direct incidence and/or reflection. The first terminal device generates, based on a time interval between an arrival time in the first time set and an arrival time in the second time set, first location information corresponding to the terminal device. The first location information indicates whether the first terminal device is located inside the vehicle or outside the vehicle. The first terminal device determines, based on the first location information of the first terminal device in a preset time period, that the first terminal device is moved from the inside of the vehicle to the outside of the vehicle.

In this implementation, because space inside the vehicle is relatively closed, a plurality of audio signals obtained after direct incidence and/or reflection of one target audio signal can arrive at the terminal device in a relatively centralized manner. Space outside the vehicle is relatively open relative to the space inside the vehicle, a plurality of audio signals obtained after direct incidence and/or reflection of one target audio signal arrive at the terminal device in a relatively dispersed manner. Therefore, it can be determined based on the time interval between the first time set and the second time set whether the terminal device is located inside the vehicle or outside the vehicle, thereby providing a solution for measuring a location of the user relative to the vehicle. In addition, an audio signal may be sent out through a sounder provided in the vehicle. No additional hardware needs to be added to the vehicle or the terminal device, to avoid additional overheads.

In a possible implementation of the first aspect, the method further includes: if the target category is not the first category, switching the target audio stream to the first terminal device for playing. In this implementation, a processing manner in a case in which the target audio stream is in the first category is provided, and a processing manner in a case in which the target audio stream is not in the first category is provided. This improves integrity of this solution, and extends an application scenario of this solution.

According to a second aspect, this application provides an audio stream processing method. The method may be applied to the field of intelligent vehicles. The method is applied to a data processing system. The data processing system further includes a vehicle and a first terminal device. The method includes: The vehicle establishes a connection to the first terminal. The vehicle receives data sent by the first terminal device. The data includes a target audio stream. The vehicle plays the target audio stream. In a process in which the vehicle plays the target audio stream, when a preset case occurs, the vehicle continues to play the target audio stream. The preset case includes that the first terminal device is moved from the inside of the vehicle to the outside of the vehicle in a process in which the first terminal device and the vehicle are in a connected state, and a category of the target audio stream is a first category.

In a possible implementation of the second aspect, a play device of an audio stream in a second category is switched to the first terminal device. The second category and the first category are different categories. The audio stream in the second category is generated by the first terminal device.

For all of specific implementation steps of the second aspect of this application and the possible implementations of the second aspect and beneficial effect brought by each possible implementation, refer to description in the possible implementations of the first aspect. Details are not described herein again.

According to a third aspect, this application provides an audio stream processing method. The method may be applied to the field of intelligent vehicles. The method is applied to a first terminal device. The first terminal device is included in a data processing system. The data processing system further includes a vehicle. The method includes: The first terminal device establishes a connection to the vehicle. The first terminal device sends data to the vehicle. The data includes a target audio stream. In a process in which the vehicle plays the target audio stream and the first terminal device and the vehicle are in a connected state, when detecting that the first terminal device is moved from the inside of the vehicle to the outside of the vehicle, the first terminal device obtains a target category corresponding to the target audio stream being sent to the vehicle. The first terminal device continues to send the target audio stream to the vehicle if the target category is a first category.

In a possible implementation of the third aspect, the first category includes a media category, and a second category is different from the first category.

In a possible implementation of the third aspect, the method further includes: switching a play device of an audio stream in the second category from the vehicle to the first terminal device. The audio stream in the second category is generated by the first terminal device. If the first terminal device receives a play indication for playing a second audio stream, the first terminal device plays the second audio stream. A category of the second audio stream is the second category.

In a possible implementation of the third aspect, the method further includes: outputting first information. The first information is used to prompt a user to switch a play device of the target audio stream from the vehicle to the first terminal device.

In a possible implementation of the third aspect, after the first terminal device continues to play the target audio stream to the vehicle if the target category is the first category, the method further includes: When obtaining a play operation for a first audio stream, the first terminal device outputs first information. A category of the first audio stream is the first category. The first audio stream is different from the target audio stream played by the vehicle. The first information is used to prompt the user to switch a play device of the first audio stream from the vehicle to the first terminal device.

In a possible implementation of the third aspect, the method further includes: If the target category is not the first category, the first terminal device continues to play the target audio stream.

For all of specific implementation steps of the third aspect of this application and the possible implementations of the third aspect and beneficial effect brought by each possible implementation, refer to description in the possible implementations of the first aspect. Details are not described herein again.

According to a fourth aspect, this application provides an audio stream processing method. The method may be applied to the field of intelligent vehicles. The method is applied to a data processing system. The data processing system includes a first terminal device and a vehicle. The method includes: The first terminal device establishes a connection to the vehicle. The first terminal device switches a play device of an audio stream in a third category from the first terminal device to the vehicle. The third category includes all categories corresponding to audio streams played by the first terminal device through the vehicle. In a process in which the first terminal device and the vehicle are in a connected state, when detecting that the first terminal device is moved from the inside of the vehicle to the outside of the vehicle, the first terminal device obtains a target category corresponding to a target audio stream being played by the vehicle. The target audio stream is generated by the first terminal device and sent to the vehicle. The vehicle continues to play the target audio stream, and switches a play device of another audio stream in a second category other than the target category in the third category from the vehicle to the first terminal device.

In this implementation, in the process in which the first terminal device and the vehicle are in the connected state, when detecting that the first terminal device is moved from the inside of the vehicle to the outside of the vehicle, the first terminal device obtains the target category corresponding to the target audio stream being played by the vehicle. The target audio stream is sent by the first terminal device to the vehicle. Then the first terminal device continues to play the target audio stream through the vehicle, but switches a play device of an audio stream in another category other than the target category to the first terminal device. In this way, the target audio can be continuously played on the vehicle after the terminal device leaves the vehicle. However, when the terminal device subsequently needs to play another type of audio stream, the terminal device may automatically play the another type of audio stream. In the foregoing solution, a play device can be partially switched based on a specific type of an audio stream being played by the vehicle, thereby improving flexibility of an audio stream play process and improving user stickiness of this solution.

In a possible implementation of the fourth aspect, that the vehicle continues to play the target audio stream includes that the vehicle continues to play the target audio stream if the target category is the first category.

In a possible implementation of the fourth aspect, the audio stream in the third category includes an audio stream in a first category and an audio stream in a second category. The first category includes a media category. The second category is different from the first category.

In a possible implementation of the fourth aspect, the method further includes: The first terminal device outputs first information. The first information is used to prompt the user to switch a play device of the target audio stream from the vehicle to the first terminal device.

In a possible implementation of the fourth aspect, after the vehicle continues to play the target audio stream if the target category is the first category, the method further includes: When obtaining a play operation for a first audio stream, the first terminal device outputs first information. A category of the first audio stream is the first category. The first audio stream is different from the target audio stream played by the vehicle. The first information is used to prompt the user to switch a play device of the first audio stream from the vehicle to the first terminal device.

In a possible implementation of the fourth aspect, the detecting that the first terminal device is moved from the inside of the vehicle to the outside of the vehicle includes: The vehicle sends a plurality of target audio signals according to a preset frequency. The plurality of target audio signals include a first sounding signal and a second sounding signal. At least one arrival time includes a first time set corresponding to the first sounding signal and a second time set corresponding to the second sounding signal. The first time set includes at least one time at which the first sounding signal arrives at the first terminal device through direct incidence and/or reflection. The second time set includes at least one time at which the second sounding signal arrives at the first terminal device through direct incidence and/or reflection. The first terminal device generates, based on a time interval between an arrival time in the first time set and an arrival time in the second time set, first location information corresponding to the terminal device. The first location information indicates whether the first terminal device is located inside the vehicle or outside the vehicle. The first terminal device determines, based on the first location information of the first terminal device in a preset time period, that the first terminal device is moved from the inside of the vehicle to the outside of the vehicle.

According to a fifth aspect, this application provides an address processing method. The method may be applied to the field of intelligent vehicles. The method is applied to a navigation system. The navigation system includes a vehicle, a first terminal device, and a second terminal device. The method includes: The second terminal device displays a target address on a display interface. The second terminal device sends the target address to the vehicle in a process in which the first terminal device and the vehicle are in a connected state. The sent target address is used to prompt to use the target address as a destination for navigation of the vehicle. In this implementation, in the process in which the first terminal device and the vehicle are in the connected state, the first terminal device is generally a terminal device at a primary driver location. If the destination for the navigation of the vehicle can be changed only through the first terminal device, there is a high probability that the driver performs a change operation. This increases a risk in a driving process. In this solution, the second terminal device may change the destination for the navigation of the vehicle, thereby improving safety in a driving process and efficiency of changing the destination for the navigation.

In a possible implementation of the fifth aspect, before the second terminal device sends the target address to the vehicle, the method further includes: The second terminal device obtains first location information corresponding to the second terminal device. The first location information indicates whether the second terminal device is located inside the vehicle or outside the vehicle. When the second terminal device is located inside the vehicle, the second terminal device outputs second information. The second information is used to prompt a user to input a target operation. That the second terminal device sends the target address to the vehicle in the process in which the first terminal device and the vehicle are in the connected state includes that the second terminal device receives the target operation input by the user, and the second terminal device sends the target address to the vehicle in response to the received target operation in the process in which the first terminal device and the vehicle are in the connected state.

In this implementation, when it is detected that the second terminal device is located inside the vehicle, and the second terminal device displays the address information, the second information may be output. The second information is used to prompt the user to input a target operation of "sending the target address". In other words, the second terminal device sends the target address based on an intention of the user. In addition, the operation of "sending the target address" can be implemented only when it is detected that the second terminal device is located inside the vehicle, thereby avoiding interference from another device to the first terminal device and improving safety in a driving process of the vehicle.

In a possible implementation of the fifth aspect, the display interface that displays the target address includes an interface of any one or more types of the following applications: a navigation application, an instant messaging application, a life service application, or a travel application. In this implementation, not only the navigation application can use this solution, but also the instant messaging application, the life service application, or the travel application can use this solution, thereby greatly extending an application scenario of this solution.

In a possible implementation of the fifth aspect, after the second terminal device displays the target address on the display interface, the method further includes: The second terminal device receives a trigger operation input by the user. That the second terminal device obtains the first location information corresponding to the second terminal device includes that in response to the trigger operation, the second terminal device obtains the first location information corresponding to the second terminal device. In this implementation, only after the second terminal device displays the target address on the display interface, and the second terminal device receives the trigger operation input by the user, the second terminal device obtains the first location information corresponding to the second terminal device. In other words, detecting whether the second terminal device is located inside the vehicle is triggered based on the intention of the user. Obtaining of the first location information corresponding to the second terminal device is not automatically triggered when the display interface displays the target address, thereby avoiding a waste of computer resources on the terminal device.

According to a sixth aspect, this application provides an address processing method. The method may be applied to the field of intelligent vehicles. The method is applied to a navigation system. The navigation system includes a vehicle, a second terminal device, and a first terminal device. The method includes: In a process in which the first terminal device and the vehicle are in a connected state, the vehicle obtains a target address. The target address is generated by the second terminal device. The vehicle uses the target address as a destination for navigation of the vehicle.

In a possible implementation of the sixth aspect, the second terminal device is located inside the vehicle.

In a possible implementation of the sixth aspect, that the vehicle uses the target address as the destination for the navigation of the vehicle includes that, when obtaining the target address, the vehicle is using a first address as the destination for the navigation; and the vehicle changes the first address to the target address, and continues the navigation by using the target address as the destination. In this implementation, a specific application scenario of this solution is provided.

According to a seventh aspect, this application provides a location obtaining method. The method may be applied to the field of intelligent vehicles. The method is applied to a vehicle. The vehicle is included in a location obtaining system. The location obtaining system further includes a terminal device. The vehicle is configured with at least two sounders. The at least two sounders include a first sounder and a second sounder. The first sounder and the second sounder are located on two sides of the vehicle. The method includes: sending a first audio signal through the first sounder, where the first audio signal is used by the terminal device to determine a receiving time of the first audio signal, and the receiving time of the first audio signal is a time at which the terminal device receives the first audio signal; and sending a second audio signal through the second sounder, where the second audio signal is used by the terminal device to determine a receiving time of the second audio signal, the receiving time of the second audio signal is a time at which the terminal device receives the second audio signal, the receiving time of the first audio signal and the receiving time of the second audio signal are used for determining target location information, and the target location information indicates a location of the terminal device relative to the vehicle.

In a possible implementation of the seventh aspect, the sending a first audio signal through the first sounder, and sending a second audio signal through the second sounder includes: sending the first audio signal through the first sounder, and simultaneously sending the second audio signal through the second sounder, where the first audio signal and the second audio signal are different audio signals, and an order in which the first audio signal and the second audio signal arrive at the terminal device is used for determining the target location information.

In a possible implementation of the seventh aspect, the sending a first audio signal through the first sounder, and sending a second audio signal through the second sounder includes: first sending the first audio signal through the first sounder, and sending the second audio signal after a preset time interval through the second sounder, where the receiving time of the first audio signal, the receiving time of the second audio signal, and the preset time interval are used for determining the target location information.

In a possible implementation of the seventh aspect, the at least two sounders include at least three sounders, and the at least three sounders are not located on one straight line.

In a possible implementation of the seventh aspect, the at least three sounders include four sounders, and the four sounders are respectively at a front left location, a front right location, a rear left location, and a rear right location of the vehicle.

In a possible implementation of the seventh aspect, the target location information indicates a location of the terminal device located inside the vehicle; or the target location information indicates a location of the terminal device located outside the vehicle.

In a possible implementation of the seventh aspect, the location inside the vehicle is a left-side location inside the vehicle or a right-side location inside the vehicle. Alternatively, the location inside the vehicle is a front-side location inside the vehicle or a rear-side location inside the vehicle. Alternatively, the location inside the vehicle is any one of a primary driver location, a front passenger location, a left-side location in a rear row, a right-side location in the rear row, or a middle location in the rear row inside the vehicle. Alternatively, there are a total of N locations inside the vehicle, and the location inside the vehicle is one of the N locations, where N is an integer greater than or equal to 2.

In a possible implementation of the seventh aspect, the target location information is used for determining control permission of the terminal device for the vehicle, and terminal devices at different locations have different control permission for the vehicle; or the target location information indicates whether the terminal device is at the primary driver location of the vehicle; or when the terminal device is connected to the vehicle, the target location information is used by the vehicle to determine an in-vehicle device closest to the terminal device.

In a possible implementation of the seventh aspect, the method further includes: When starting a location sensing operation, the vehicle sends first indication information to the terminal device. The first indication information indicates the terminal device to start the location sensing operation. The location sensing operation is an operation used to obtain target location information. The vehicle receives a first feedback message sent by the terminal device. The first feedback message indicates the vehicle to send a first audio signal and a second audio signal. Alternatively, the vehicle receives second indication information sent by the terminal device, and starts the location sensing operation in response to the received second indication information; and sends a second feedback message to the terminal device. The second feedback message indicates the terminal device to receive the first audio signal and the second audio signal.

According to an eighth aspect, this application provides a location obtaining method. The method may be applied to the field of intelligent vehicles. The method is applied to a terminal device. The terminal device is included in a location obtaining system. The location obtaining system further includes a vehicle. The vehicle is configured with at least two sounders. The at least two sounders include a first sounder and a second sounder. The first sounder and the second sounder are located on two different sides of the vehicle. The method includes: receiving a first audio signal sent by the first sounder; receiving a second audio signal sent by the second sounder; and determining target location information based on a receiving time of the first audio signal and a receiving time of the second audio signal. The target location information indicates a location of the terminal device relative to the vehicle.

In a possible implementation of the eighth aspect, the determining target location information based on a receiving time of the first audio signal and a receiving time of the second audio signal includes: when the first audio signal and the second audio signal are sent simultaneously, determining, based on the receiving time of the first audio signal and the receiving time of the second audio signal, an order in which the first audio signal and the second audio signal arrive at the terminal device; and determining the target location information based on the order in which the first audio signal and the second audio signal arrive at the terminal device.

In a possible implementation of the eighth aspect, the determining target location information based on a receiving time of the first audio signal and a receiving time of the second audio signal includes: determining the target location information based on the receiving time of the first audio signal, the receiving time of the second audio signal, and a preset time interval. The preset time interval is a sending time interval between two adjacent audio signals.

In a possible implementation of the eighth aspect, the at least two sounders include at least three sounders, and the at least three sounders are not located on one straight line.

According to a ninth aspect, this application provides a location obtaining method. The method may be applied to the field of intelligent vehicles. The method is applied to a vehicle. The vehicle is included in a location obtaining system. The location obtaining system further includes a terminal device. The vehicle is configured with at least two sounders. The at least two sounders are configured on two sides of the vehicle. A target sounder is any one of the at least two sounders. The method includes: receiving, through the target sounder, a first measurement signal sent by the terminal device, and determining, as a first time, a time at which the first measurement signal is received; sending a second measurement signal to the terminal device through the target sounder, and determining, as a second time, a time at which the second measurement signal is sent, where both the first measurement signal and the second measurement signal are audio signals; determining a distance between the terminal device and the target sounder based on the first time, the second time, a third time, and a fourth time, where the third time is a time at which the terminal device sends the first measurement signal, and the fourth time is a time at which the terminal device receives the second measurement signal; and determining target location information based on a distance between the terminal device and each of the at least two sounders, where the target location information indicates a location of the terminal device relative to the vehicle.

In a possible implementation of the ninth aspect, the at least two sounders include at least three sounders, and the at least three sounders are not located on one straight line.

In a possible implementation of the ninth aspect, the target location information indicates a location of the terminal device located inside the vehicle; or the target location information indicates a location of the terminal device located outside the vehicle.

According to a tenth aspect, this application provides a location obtaining method. The method may be applied to the field of intelligent vehicles. The method is applied to a terminal device. The terminal device is included in a location obtaining system. The location obtaining system further includes a vehicle. The vehicle is configured with at least two sounders. The at least two sounders are configured at different locations of the vehicle. A target sounder is any one of the at least two sounders. The method includes: sending a first measurement signal to the target sounder, and determining a sending time of the first measurement signal as a third time; receiving a second measurement signal sent by the target sounder, and determining a receiving time of the second measurement signal as a fourth time, where both the first measurement signal and the second measurement signal are audio signals; determining a distance between the terminal device and the target sounder based on the first time, the second time, a third time, and a fourth time, where the first time is a time at which the vehicle receives the first measurement signal, and the second time is a time at which the vehicle sends the second measurement signal; and determining target location information based on a distance between the terminal device and each of the at least two sounders, where the target location information indicates a location of the terminal device relative to the vehicle.

In a possible implementation of the tenth aspect, the target location information indicates a location of the terminal device located inside the vehicle; or the target location information indicates a location of the terminal device located outside the vehicle.

According to an eleventh aspect, this application provides a location obtaining method. The method may be applied to the field of intelligent vehicles. The method is applied to a vehicle. The vehicle is included in a location obtaining system. The location obtaining system further includes a terminal device. The method includes: when it is detected that a first trigger condition is met, sending at least one target audio signal, where the target audio signal is used for determining at least one arrival time corresponding to the target audio signal; and obtaining first location information corresponding to the terminal device, where the first location information indicates whether the terminal device is located inside the vehicle or outside the vehicle, and a time interval between an arrival time in the first time set and an arrival time in the second time set is used for determining the first location information. The sending at least one target audio signal includes: sending a plurality of target audio signals according to a preset frequency, where the plurality of target audio signals include a first sounding signal and a second sounding signal, the at least one arrival time includes a first time set corresponding to the first sounding signal and a second time set corresponding to the second sounding signal, the first time set includes at least one time at which the first sounding signal arrives at the terminal device through direct incidence and/or reflection, and the second time set includes at least one time at which the second sounding signal arrives at the terminal device through direct incidence and/or reflection.

In a possible implementation of the eleventh aspect, the target audio signal is a linear frequency modulation signal or a ZC sequence signal.

In a possible implementation of the eleventh aspect, if the time interval between the arrival time in the first time set and the arrival time in the second time set is within a preset time range, the first location information indicates that the terminal device is located inside the vehicle, where a determining factor of the preset time range includes a time interval between two adjacent target audio signals sent by the vehicle; or if the time interval between the arrival time in the first time set and the arrival time in the second time set is not within a preset time range, the first location information indicates that the terminal device is located outside the vehicle.

In a possible implementation of the eleventh aspect, the time interval between the arrival time in the first time set and the arrival time in the second time set includes: a time interval between a latest time in the first time set and an earliest time in the second time set.

In a possible implementation of the eleventh aspect, when any one or more of the following cases are detected, it is considered that the first trigger condition is met: detecting that the vehicle is parked; or detecting that a distance between the terminal device and the vehicle meets a first distance condition; or obtaining a first instruction, where the first instruction is used to trigger the vehicle to obtain the first location information.

In a possible implementation of the eleventh aspect, the detecting that a vehicle is parked includes: obtaining a velocity, acceleration, and an angular velocity of the vehicle, and inputting the velocity, the acceleration, and the angular velocity of the vehicle into a classification model, to obtain predicted category information output by the classification model, where the predicted category information indicates whether the vehicle is in a stopped state or a moving state.

According to a twelfth aspect, this application provides a location obtaining method. The method may be applied to the field of intelligent vehicles. The method is applied to a terminal device. The terminal device is included in a location obtaining system. The location obtaining system further includes a vehicle. The method includes: when it is detected that a second trigger condition is met, obtaining at least one arrival time corresponding to at least one target audio signal, where the at least one target audio signal includes a plurality of target audio signals sent by the vehicle according to a preset frequency, the plurality of target audio signals include a first sounding signal and a second sounding signal, the at least one arrival time includes a first time set corresponding to the first sounding signal and a second time set corresponding to the second sounding signal, the first time set includes at least one time at which the first sounding signal arrives at the terminal device through direct incidence and/or reflection, and the second time set includes at least one time at which the second sounding signal arrives at the terminal device through direct incidence and/or reflection; and generating, based on a time interval between an arrival time in the first time set and an arrival time in the second time set, first location information corresponding to the terminal device, where the first location information indicates whether the terminal device is located inside the vehicle or outside the vehicle.

In a possible implementation of the twelfth aspect, if the time interval between the arrival time in the first time set and the arrival time in the second time set is within a preset time range, the first location information indicates that the terminal device is located inside the vehicle, where a determining factor of the preset time range includes a time interval between two adjacent target audio signals sent by the vehicle; or if the time interval between the arrival time in the first time set and the arrival time in the second time set is not within a preset time range, the first location information indicates that the terminal device is located outside the vehicle.

In a possible implementation of the twelfth aspect, the generating, based on a time interval between an arrival time in the first time set and an arrival time in the second time set, first location information corresponding to the terminal device includes: generating the first location information based on a time interval between a latest time in the first time set and an earliest time in the second time set.

In a possible implementation of the twelfth aspect, when any one or more of the following cases are detected, it is considered that the second trigger condition is met: detecting that the vehicle is parked; or detecting that a distance between the terminal device and the vehicle meets a first distance condition; or detecting that a displacement of the terminal device meets a preset displacement; or obtaining a second instruction, where the second instruction is used to trigger the terminal device to obtain the first location information.

According to a thirteenth aspect, this application provides a location obtaining method. The method may be applied to the field of intelligent vehicles. The method is applied to a vehicle. The vehicle is included in a location obtaining system. The location obtaining system further includes a terminal device. The method includes: sending a plurality of target audio signals according to a preset frequency, where when the vehicle is in a moving state, one target audio signal is used for determining a first arrival time at which the target audio signal arrives at the terminal device, and when a second trigger condition is met, one target audio signal is used for determining a second arrival time at which the target audio signal arrives at the terminal device; and obtaining first location information corresponding to the terminal device, where the first location information indicates whether the terminal device is located inside the vehicle or outside the vehicle, and a plurality of first arrival times and at least one second arrival time are used for determining the first location information.

In a possible implementation of the thirteenth aspect, the plurality of first arrival times are used for determining a first prediction time corresponding to the second arrival time. The first prediction time indicates a time at which the target audio signal arrives at the terminal device when the terminal device is located inside the vehicle. The first prediction time and the second arrival time are used for determining the first location information.

In a possible implementation of the thirteenth aspect, the method is applied to a terminal device. The terminal device is included in a location obtaining system. The location obtaining system further includes a vehicle. The method includes: when the vehicle is in a moving state, obtaining a plurality of first arrival times corresponding to a plurality of target audio signals, where one first arrival time represents a time at which one target audio signal arrives at the terminal device, and the plurality of target audio signals are sent by the vehicle according to a preset frequency; and when it is detected that a second trigger condition is met, obtaining at least one second arrival time corresponding to the at least one target audio signal, and generating, based on the plurality of first arrival times and the at least one second arrival time, first location information corresponding to the terminal device, where the first location information indicates whether the terminal device is located inside the vehicle or outside the vehicle.

In a possible implementation of the thirteenth aspect, the generating, based on the plurality of first arrival times and the at least one second arrival time, first location information corresponding to the terminal device includes: determining, based on the plurality of first arrival times, a first prediction time corresponding to the second arrival time, where the first prediction time indicates a time at which the target audio signal arrives at the terminal device when the terminal device is located inside the vehicle; and generating the first location information based on the first prediction time and the second arrival time.

According to a fourteenth aspect, this application provides a location obtaining method. The method may be applied to the field of intelligent vehicles. The method is applied to a vehicle. The vehicle is included in a location obtaining system. The location obtaining system further includes a terminal device. The vehicle is configured with at least three sounders, and the at least three sounders are not located on one straight line. The at least three sounders include a first sounder, a second sounder, and a third sounder. The method includes: sending a first audio signal through the first sounder, where the first audio signal is used for determining a first signal strength of the first audio signal received by the terminal device; sending a second audio signal through the second sounder, where the second audio signal is used for determining a second signal strength of the second audio signal received by the terminal device; and sending a third audio signal through the third sounder, where the third audio signal is used for determining a third signal strength of the third audio signal received by the terminal device, the first signal strength, the second signal strength, and the third signal strength are used for determining second location information corresponding to the terminal device, and the second location information indicates a location of the terminal device located outside the vehicle.

In a possible implementation of the fourteenth aspect, the second location information is used by the vehicle to determine a component closest to the terminal device from a plurality of components included in the vehicle, to control the component closest to the terminal device to perform a preset operation.

According to a fifteenth aspect, this application provides a location obtaining method. The method may be applied to the field of intelligent vehicles. The method is applied to a terminal device. The terminal device is included in a location obtaining system. The location obtaining system further includes a vehicle. The vehicle is configured with at least three sounders, and the at least three sounders are not located on one straight line. The at least three sounders include a first sounder, a second sounder, and a third sounder. The method includes: receiving a first audio signal sent by the first sounder, receiving a second audio signal sent by the second sounder, and receiving a second audio signal sent by the third sounder; and generating, based on a first signal strength of the received first audio signal, a second signal strength of the received second audio signal, and a third signal strength of the received third audio signal, second location information corresponding to the terminal device. The second location information indicates a location of the terminal device located outside the vehicle.

According to a sixteenth aspect, this application provides a vehicle. The vehicle may include a processor. The processor is coupled to a memory. The memory stores program instructions. When the program instructions stored in the memory are executed by the processor, the vehicle is enabled to implement the steps performed by the vehicle in the methods in the foregoing aspects.

According to a seventeenth aspect, this application provides a terminal device. The terminal device may include a processor. The processor is coupled to a memory. The memory stores program instructions. When the program instructions stored in the memory are executed by the processor, the terminal device is enabled to implement the steps performed by the terminal device in the methods in the foregoing aspects.

According to an eighteenth aspect, this application provides a computer-readable storage medium. The computer-readable storage medium stores program code. When the program code is run on a computer, the computer is enabled to perform the methods in the foregoing aspects.

According to a nineteenth aspect, this application provides a computer program including program code. When the program code is run on a computer, the computer is enabled to perform the methods in the foregoing aspects.

According to a twentieth aspect, this application provides a chip system. The chip system includes a processor, configured to support implementation of functions in the foregoing aspects, for example, sending or processing of data and/or information in the foregoing methods. In a possible design, the chip system further includes a memory. The memory is configured to store program instructions and data that are necessary for a server or a communication device. The chip system may include a chip, or may include a chip and another discrete component.

BRIEF DESCRIPTION OF THE DRAWINGS

FIG. 12(a) and FIG. 12(b) are a schematic diagram of screen casting performed by a terminal device at a primary driver location in a location obtaining method according to an embodiment of this application;

FIG. 13 is a schematic diagram of screen casting performed by a terminal device at a primary driver location in a location obtaining method according to an embodiment of this application;

FIG. 32A and FIG. 32B are a schematic flowchart of an audio stream processing method according to an embodiment of this application;

FIG. 38*b* is a schematic diagram of outputting indication information in an audio stream processing method according to an embodiment of this application;

FIG. 40 is a schematic flowchart of an address processing method according to an embodiment of this application;

FIG. 49A and FIG. 49B are another schematic flowchart of a data transferring method according to an embodiment of this application;

DETAILED DESCRIPTION OF ILLUSTRATIVE EMBODIMENTS

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "contain", and any other variants mean to cover the non-exclusive inclusion, so that a process, method, system, product, or device that includes a series of units is not necessarily limited to those units, but may include other units not expressly listed or inherent to such a process, method, product, or device.

The following describes embodiments of this application with reference to the accompanying drawings. A person of ordinary skill in the art may learn that, with development of technologies and emergence of new scenarios, the technical solutions provided in embodiments of this application are also applicable to a similar technical problem.

Embodiments of this application may be applied to the field of intelligent vehicles. Specifically, in some subsequent embodiments, it may be detected whether a terminal device is located inside a vehicle or outside a vehicle. In some other subsequent embodiments, a specific location of the terminal device located inside the vehicle may be detected. In some other subsequent embodiments, a specific location of the terminal device located outside the vehicle may be detected. The terminal device is a terminal device carried or worn by a user. Therefore, a location of the terminal device relative to the vehicle is equivalent to a location of the user relative to the vehicle.

In addition, in some subsequent embodiments, after location information of the terminal device relative to the vehicle is learned, some application scenarios of interaction between the vehicle and the terminal device may be further provided.

Figure 1A:
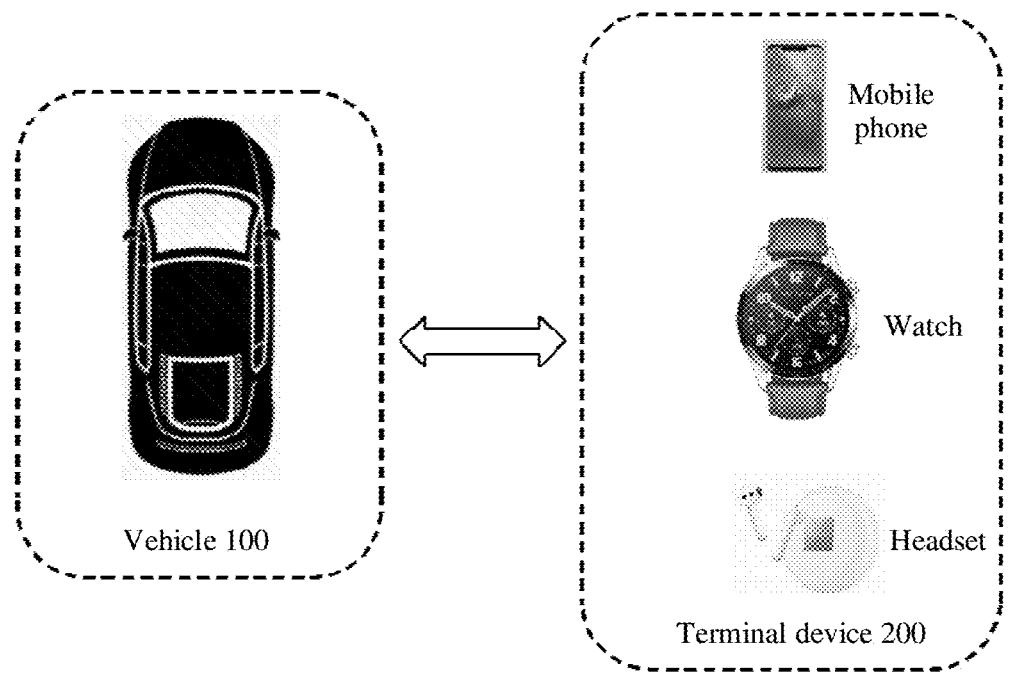
FIG. 1a is a schematic diagram of an architecture of a data processing system according to an embodiment of this application.

To facilitate understanding of this solution, in embodiments of this application, a network architecture of a location obtaining system and a structure of a vehicle that are used in embodiments of this application are first described with reference to FIG. 1*a*. In some embodiments of this application, FIG. 1*a* is a schematic diagram of an architecture of a data processing system according to an embodiment of this application. As shown in FIG. 1*a*, the data processing system may include a vehicle 100 and a terminal device 200. A communication connection is established between the vehicle 100 and the terminal device 200.

The vehicle 100 may be a self-driving vehicle or a non-self-driving vehicle. When the vehicle 100 is a self-driving vehicle, the self-driving vehicle is configured to be in a complete or partial self-driving mode. For example, the vehicle 100 may control itself while being in the self-driving mode; and may determine a current status of the vehicle and a current status of a surrounding environment through a manual operation, determine a possible operation of at least one another vehicle in the surrounding environment, determine a confidence level corresponding to a possibility that the another vehicle performs the possible operation, and control the vehicle 100 based on determined information.

When the vehicle 100 is in the self-driving mode, the vehicle 100 may also be configured to operate without interacting with a person.

The terminal device 200 may be specifically represented as a mobile phone, a tablet, a notebook computer, an intelligent wearable device, another type of terminal device, or the like. This is not limited herein.

Figure 1B:
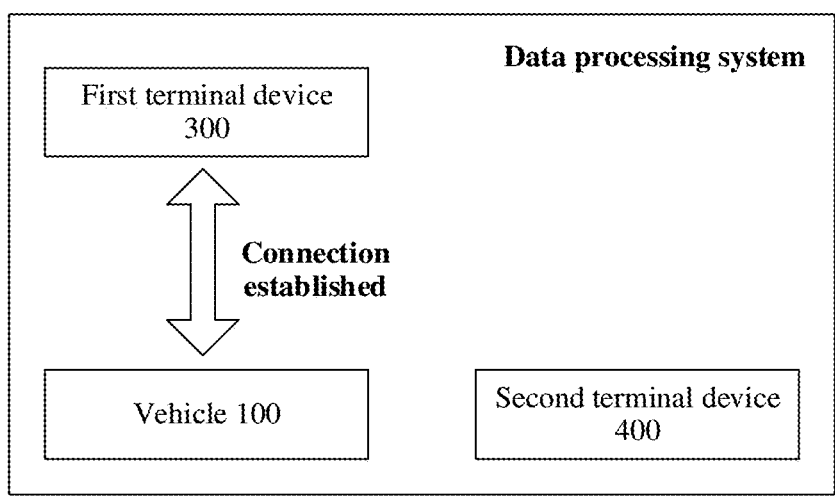
FIG. 1b is a schematic diagram of an architecture of a data processing system according to an embodiment of this application.

In some other embodiments of this application, FIG. 1b is another schematic diagram of an architecture of a data processing system according to an embodiment of this application. As shown in FIG. 1b, the data processing system may include a vehicle 100, a first terminal device 300, and a second terminal device 400. The vehicle 100 and the first terminal device 300 are in a connected state. A connection may be established between the vehicle 100 and the second terminal device 400, or may be not established between the vehicle 100 and the second terminal device 400. Further, optionally, the first terminal device 300 may be performing screen casting through a central control screen of the vehicle 100, and the second terminal device 400 may not perform screen casting through the central control screen of the vehicle 100.

It should be noted that, when the vehicle 100 and the first terminal device 300 are in the connected state, the first terminal device 300 may perform any one or more of the following tasks through the vehicle 100: playing an audio stream, playing a video, navigation, a video call, a call, another task, or the like.

Both the first terminal device 300 and the second terminal device 400 are terminal devices. A product form of the first terminal device 300 includes but is not limited to a mobile phone, an intelligent wearable device, a tablet, a notebook computer, another type of first terminal device, or the like. This is not limited herein.

A product form of the second terminal device 400 may be the same as or may be different from the product form of the first terminal device 300. To be specific, the product form of the second terminal device 400 includes but is not limited to a mobile phone, an intelligent wearable device, a tablet, a notebook computer, another type of terminal device, or the like. This is not enumerated herein.

After the first terminal device 300 establishes a connection to the vehicle 100, the first terminal device 300 may perform screen casting through the central control screen of the vehicle 100. In a process in which the first terminal device 300 performs screen casting through the central control screen of the vehicle 100, content displayed on the central control screen of the vehicle 100 may not be completely the same as screen content of the first terminal device 300. The content displayed on the central control screen may be an application that has been configured for the vehicle 100 and a plurality of applications in the terminal device. In other words, when the vehicle 100 is not connected to the first terminal device 300, the vehicle 100 has a user interface (user interface, UI) of itself. After the vehicle 100 is connected to the first terminal device 300, icons of applications on the UI interface of the vehicle 100 may increase, or functions of the vehicle 100 may increase.

Optionally, after the first terminal device 300 is connected to the vehicle 100, mutual assistance between the first terminal device 300 and the vehicle 100 at a hardware layer may be further implemented. For example, the first terminal device 300 may use a global positioning system GPS configured on the vehicle 100 to improve precision of navigation performed by the first terminal device 300. For another example, the first terminal device 300 may use a camera on the vehicle 100 to make a video call. This is not enumerated herein.

Figure 2:
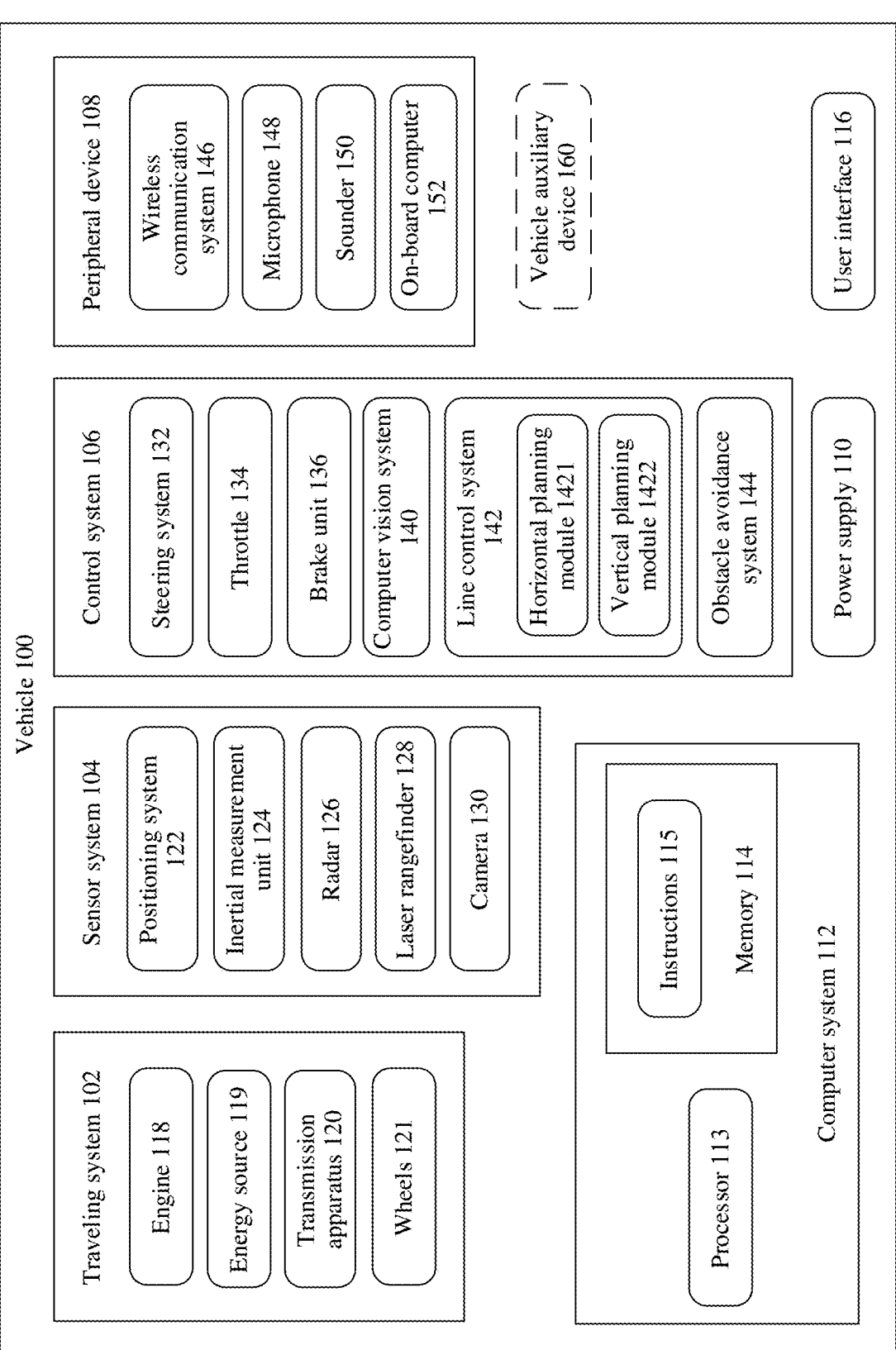
FIG. 2 is a schematic diagram of a structure of a vehicle according to an embodiment of this application.

Further, FIG. 2 is a schematic diagram of a structure of a vehicle according to an embodiment of this application. The vehicle 100 may include various subsystems, for example, a travel system 102, a sensor system 104, a control system 106, one or more peripheral devices 108, a power supply 110, a computer system 112, and a user interface 116. Optionally, the vehicle 100 may further include an intelligent auxiliary device 160. Further, optionally, the vehicle 100 may further include more or fewer subsystems, and each subsystem may include a plurality of components. In addition, each subsystem and each component of the vehicle 100 may be connected to each other in a wired or wireless manner.

The travel system 102 may include a component that provides power for the vehicle 100 to move. In an embodiment, the travel system 102 may include an engine 118, an energy source 119, a transmission apparatus 120, and wheels (which may also be referred to as tires) 121.

The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy. Examples of the energy source 119 include gasoline, diesel, another petroleum-based fuel, propane, another compressed gas-based fuel, ethanol, a solar panel, a battery, or another power source. The energy source 119 may also provide energy for another system of the vehicle 100. The transmission apparatus 120 may transmit mechanical power from the engine 118 to the wheels 121. The transmission apparatus 120 may include a gearbox, a differential, and a drive shaft. In an embodiment, the transmission apparatus 120 may further include another component, for example, a clutch. The drive shaft may include one or more shafts that may be coupled to one or more wheels 121.

The sensor system 104 may include several sensors that can sense information about an ambient environment of the vehicle 100. For example, the sensor system 104 may include a positioning system 122 (the positioning system may be a global positioning system GPS, a BeiDou system, or another positioning system), an inertial measurement unit (inertial measurement unit, IMU) 124, a radar 126, a laser rangefinder 128, and a camera 130. The sensor system 104 may further include sensors (for example, an in-vehicle air quality monitor, a fuel gauge, and an oil temperature gauge) in an internal system of the monitored vehicle 100. One or more pieces of sensor data from these sensors may be used for detecting an object and corresponding features (a location, a shape, a direction, a velocity, and the like) of the object. Such detection and recognition are key functions for a safe operation of the autonomous vehicle 100.

The positioning system 122 may be configured to estimate a geographical location of the vehicle 100. The IMU 124 is configured to sense a location and an orientation change of the vehicle 100 based on inertial acceleration. In an embodiment, the IMU 124 may be a combination of an accelerometer and a gyroscope. The radar 126 may sense an object in the ambient environment of the vehicle 100 by using a radio signal, and may be specifically represented as a millimeter-wave radar or a lidar. In some embodiments, in addition to the object, the radar 126 may be further configured to sense a velocity and/or a moving direction of the object. The laser rangefinder 128 may sense, by using a laser, an object in an environment in which the vehicle 100 is located. In some embodiments, the laser rangefinder 128 may include one or more laser sources, a laser scanner, one or more detectors, and another system component. The camera 130 may be configured to capture a plurality of images of the ambient environment of the vehicle 100. The camera 130 may be a static camera or a video camera.

The control system 106 is an operating system that controls the vehicle 100 and the components of the vehicle 100. The control system 106 may include various components, including a steering system 132, a throttle 134, a brake unit 136, a computer vision system 140, a line control system 142, and an obstacle avoidance system 144.

The steering system 132 is configured to adjust a moving direction of the vehicle 100. For example, in an embodiment, the steering system 132 may be a steering wheel system. The throttle 134 is configured to control an operating speed of the engine 118 and further control a velocity of the vehicle 100. The brake unit 136 is configured to control the vehicle 100 to decelerate. The brake unit 136 may slow down the wheels 121 by using friction. In another embodiment, the brake unit 136 may convert kinetic energy of the wheels 121 into a current. The brake unit 136 may alternatively reduce a rotation speed of the wheels 121 by using another form, to control the velocity of the vehicle 100. The computer vision system 140 may operate to process and analyze an image captured by the camera 130, to recognize an object and/or a feature in the ambient environment of the vehicle 100. The object and/or the feature may include a traffic signal, a road boundary, and an obstacle. The computer vision system 140 may use an object recognition algorithm, a structure from motion (Structure from Motion, SFM) algorithm, video tracking, and other computer vision technologies. In some embodiments, the computer vision system 140 may be configured to: draw a map for an environment, track an object, estimate a velocity of the object, and the like. The line control system 142 is configured to determine a traveling route and a traveling velocity of the vehicle 100. In some embodiments, the line control system 142 may include a horizontal planning module 1421 and a vertical planning module 1422. The horizontal planning module 1421 and the vertical planning module 1422 are separately configured to determine the traveling route and the traveling velocity of the vehicle 100 based on data from the obstacle avoidance system 144, the GPS 122, and one or more preset maps. The obstacle avoidance system 144 is configured to: recognize, evaluate, and avoid or pass in another manner obstacles in the environment of the vehicle 100. The obstacles may be specifically represented as an actual obstacle and a virtual moving object that may collide with the vehicle 100. In an instance, the control system 106 may add a component other than the shown and described components or include a component as replacement other than the shown and described components. Alternatively, some of the components shown above may be removed.

The vehicle 100 interacts with an external sensor, another vehicle, another computer system, or a user by using the peripheral device 108. The peripheral device 108 may include a wireless communication system 146, a microphone 148, a sounder 150, and/or an on-board computer 152. In some embodiments, the peripheral device 108 provides a user of the vehicle 100 with a means for interacting with the user interface 116. For example, the on-board computer 152 may provide information for the user of the vehicle 100. The user interface 116 may further operate the on-board computer 152 to receive input of the user. The on-board computer 152 may perform an operation through a touchscreen.

In another case, the peripheral device 108 may provide a means by using which the vehicle 100 communicates with another device located inside the vehicle. For example, the microphone 148 may receive audio (for example, a voice command or other audio input) from the user of the vehicle 100. Similarly, the sounder 150 may output audio to the user of the vehicle 100. The wireless communication system 146 may wirelessly communicate with one or more devices in a direct manner or through a communication network. For example, the wireless communication system 146 may use 3G cellular communication, 4G cellular communication, 5G cellular communication, wireless local area network (wireless local area network, WLAN) communication, or the like. In some embodiments, the wireless communication system 146 may directly communicate with a device by using an infrared link, Bluetooth, or ZigBee. Other wireless protocols, for example, various vehicle communication systems such as the wireless communication system 146, may include one or more dedicated short-range communication (dedicated short-range communication, DSRC) devices. These devices may include public and/or private data communication between vehicles and/or roadside stations.

The power supply 110 may provide power to various components of the vehicle 100. In an embodiment, the power supply 110 may be a rechargeable lithium-ion or lead-acid battery. One or more battery packs of such batteries may be configured as the power supply to supply power to the components of the vehicle 100. In some embodiments, the power supply 110 and the energy source 119 may be implemented together, for example, in some all-electric vehicles.

Some or all of functions of the vehicle 100 are controlled by the computer system 112. The computer system 112 may include at least one processor 113. The processor 113 executes instructions 115 stored in a non-transient computer-readable medium such as the memory 114. The computer system 112 may be alternatively a plurality of computing devices that control an individual component or a subsystem of the vehicle 100 in a distributed manner. The processor 113 may be any conventional processor, such as a commercially available central processing unit (central processing unit, CPU). Optionally, the processor 113 may be a dedicated device such as an application-specific integrated circuit (application-specific integrated circuit, ASIC) or another hardware-based processor. Although FIG. 2 functionally shows the processor, the memory, and another component of the computer system 112 in a same block, a person of ordinary skill in the art should understand that the processor or the memory may actually include a plurality of processors or memories that are not stored in a same physical housing. For example, the memory 114 may be a hard disk drive or another storage medium located in a housing different from the computer system 112. Therefore, a reference to the processor 113 or the memory 114 is understood as a reference to a set of processors or memories that may or may not operate concurrently. Some components such as a steering component and a deceleration component each may include a respective processor, and the processor performs only computation related to a component-specific function. This is different from a case of using a single processor to perform the steps described herein.

In various aspects described herein, the processor 113 may be away from the vehicle 100 and wirelessly communicate with the vehicle 100. In other aspects, some of the processes described herein are performed by the processor 113 disposed inside the vehicle 100, while others are performed by a remote processor 113. The processes include necessary steps for performing a single operation.

In some embodiments, the memory 114 may include the instructions 115 (for example, program logic). The instructions 115 may be executed by the processor 113 to perform various functions of the vehicle 100, including the functions described above. The memory 114 may also include additional instructions, including instructions used to send data to, receive data from, interact with, and/or control one or more of the travel system 102, the sensor system 104, the control system 106, and the peripheral device 108. In addition to the instructions 115, the memory 114 may further store data, for example, a road map, route information, and a location, a direction, a velocity, and other such vehicle data of a vehicle, and other information. Such information may be used by the vehicle 100 and the computer system 112 when the vehicle 100 operates in an autonomous mode, a semi-autonomous mode, and/or a manual mode. The user interface 116 is configured to provide information for or receive information from the user of the vehicle 100. Optionally, the user interface 116 may include one or more input/output devices in a set of peripheral devices 108, for example, the wireless communication system 146, the on-board computer 152, the microphone 148, and the sounder 150.

The computer system 112 may control the functions of the vehicle 100 based on input received from the various subsystems (for example, the travel system 102, the sensor system 104, and the control system 106) and the user interface 116. For example, the computer system 112 may use input from the control system 106 to control the steering system 132 to avoid an obstacle detected by the sensor system 104 and the obstacle avoidance system 144. In some embodiments, the computer system 112 may operate to control the vehicle 100 and the subsystems of the vehicle 100 in many aspects.

Optionally, one or more of the foregoing components may be installed separately from the vehicle 100 or associated with the vehicle 100. For example, the memory 114 may be partially or completely separated from the vehicle 100. The foregoing components may be communicatively coupled together in a wired and/or wireless manner.

Optionally, the foregoing components are merely examples. In actual application, components in the foregoing modules may be added or removed according to an actual requirement. FIG. 2 should not be understood as a limitation on this embodiment of this application. A self-driving vehicle traveling on a road, such as the vehicle 100, may recognize an object in an ambient environment of the vehicle to determine an adjustment to a current velocity. The object may be another vehicle, a traffic control device, or another type of object. In some examples, the self-driving vehicle may independently consider each recognized object, and may determine a to-be-adjusted velocity of the self-driving vehicle based on features of each recognized object, such as a current velocity of the object, acceleration of the object, and a distance between the object and the self-driving vehicle.

Specifically, in some of the following embodiments (for example, Embodiment 2), it may be measured whether the terminal device is located inside or outside the vehicle 100. In some other embodiments (for example, Embodiment 1 and Embodiment 2), a specific location of the terminal device located outside the vehicle 100 may be further measured. In some other embodiments (for example, Embodiment 1), a specific location of the terminal device located inside the vehicle 100 may be further measured. In the following other embodiments (for example, Embodiment 1, Embodiment 2, and Embodiment 3), a plurality of application scenarios of interaction between a vehicle and a terminal device after location information of the terminal device is obtained are further provided.

It should be noted that in a specific application scenario based on location information of the terminal device relative to the vehicle provided in embodiments of this application, a method for obtaining the location information of the terminal may be any method provided in embodiments of this application, or a method in the conventional technologies. This is not limited herein. The location information of the terminal device relative to the vehicle indicates whether the terminal device is located inside or outside the vehicle (including determining that the terminal device is located inside the vehicle, or outside the vehicle, or from the inside to the outside, or from the outside to the inside), or a specific location of the terminal device located outside the vehicle, or a specific location of the terminal device located inside the vehicle, or the like.

The terminal device may be the terminal device 200, or may be the first terminal device 300, or may be the second terminal device 400. It should be noted that the terminal device is a terminal device carried or worn by the user. Therefore, the location of the terminal device relative to the vehicle is equivalent to the location of the user relative to the vehicle.

In some implementations, the foregoing measurement method is pre-loaded into the memory 114 in a product form of a computer program, and the processor 113 in the vehicle 100 may execute instructions in the memory 114, to send an audio signal through the sounder 150, thereby obtaining the location information of the terminal 200.

In some other implementations, the foregoing measurement method may be performed by the vehicle auxiliary device 160. The vehicle auxiliary device 160 is loaded in the vehicle 100 in a form of an independent device. The vehicle auxiliary device 160 may be specifically represented as an in-vehicle display, an event data recorder, an in-vehicle rearview mirror, another product form, or the like. This is not limited herein.

The vehicle 100 may be a car, a truck, a motorcycle, a bus, a boat, an airplane, a helicopter, a lawn mower, a recreational vehicle, an amusement park vehicle, a construction device, a trolley, a golf cart, a train, a handcart, or the like. This is not specifically limited in this embodiment of this application.

With reference to the foregoing description, in this embodiment of this application, for example, in an application scenario, in a process in which at least one user walks into the vehicle from a relatively long distance outside the vehicle and starts to drive the vehicle, to control a vehicle component corresponding to a location of the user to perform a preset operation, a specific location of the user outside the vehicle may be detected. For example, when it is detected that the user is located at a front left vehicle door outside the vehicle, unlocking of the front left vehicle door may be triggered. For another example, when it is detected that the user is at a location of a trunk of the vehicle, opening of the trunk of the vehicle may be triggered. This is not enumerated herein.

After the user walks near the vehicle, the user may directly enter the vehicle, or may stay outside the vehicle for a while and then enter the vehicle. The vehicle and/or the terminal device may provide different services for the user in a case in which the user is located inside the vehicle and in a case in which the user is located outside the vehicle. Therefore, embodiments of this application further provide a method for detecting whether the user is located inside the vehicle or outside the vehicle. On this basis, it can be recognized that the user enters the vehicle from the outside of the vehicle.

After the user is located inside the vehicle, to provide more accurate services for the user at different locations, embodiments of this application further provide a method for detecting a specific location of the user inside the vehicle. It should be noted that because the user generally carries the terminal device, in this embodiment of this application, the location of the user is represented by the detected location of the terminal device.

When the user moves from the inside of the vehicle to the outside of the vehicle, the vehicle and/or the terminal device can provide a corresponding service based on a location change of the user. According to the method provided in this embodiment of this application, it can be detected that the user arrives at the outside of the vehicle from the inside of the vehicle. In addition, according to the method provided in this embodiment of this application, a specific location of the user outside the vehicle can be further detected, to further provide a corresponding service.

In addition, after the location information of the user is learned by using the solution in this embodiment of this application, a corresponding service may be further provided for the user based on the location information of the user. For example, a specific service that may be provided when the user is located inside the vehicle; for another example, a specific service that may be provided when the user is at a specific location inside the vehicle; for another example, a specific service that may be provided when the user moves from the inside of the vehicle to the outside of the vehicle; and for another example, a specific service that may be provided when the user moves from the outside of the vehicle to the inside of the vehicle are described in Embodiment 1, Embodiment 2, and Embodiment 3 below.

First, refer to Embodiment 1. Embodiment 1 in embodiments of this application provides a location obtaining method. A vehicle is configured with at least two sounders. A processor in the vehicle (or a vehicle auxiliary device in the vehicle) generates, in a manner of sending an ultrasonic signal through the sounders, target location information corresponding to a terminal device. The target location information may indicate a specific location of the terminal device located inside the vehicle, or may indicate a specific location of the terminal device located outside the vehicle. In addition, Embodiment 1 further provides some application scenarios. Different operations are performed based on the specific location of the terminal device, to provide a corresponding service for the user.

Embodiment 1

In this embodiment of this application, specifically, in an implementation, the target location information may be generated when a distance between the terminal device and the sounder is not obtained. In another implementation, the target location information is generated based on a distance between the terminal device and each sounder. The following separately describes the following four cases: generating the location of the terminal device located inside the vehicle when the distance between the terminal device and the sounder is not obtained; generating the location of the terminal device located inside the vehicle based on the distance between the terminal device and each sounder;

generating the location of the terminal device located outside the vehicle when the distance between the terminal device and the sounder is not obtained; and generating the location of the terminal device located outside the vehicle based on the distance between the terminal device and each sounder.

1. The location of the terminal device located inside the vehicle is generated when the distance between the terminal device and the sounder is not obtained.

In this embodiment of this application, audio signals are respectively sent through the at least two sounders in the vehicle. The location of the terminal device relative to the vehicle may be determined based on a time at which the terminal device receives each audio signal. In subsequent Embodiment 1, only an example in which the audio signal is specifically represented as an ultrasonic signal is used for description. It should be noted that, in this embodiment of this application, an audio signal on a non-ultrasonic frequency band, for example, an audio signal that can be heard by a human ear, may also be used. This is not described in Embodiment 1 of this application. A frequency band on which the ultrasonic signal is located may be from 17 kHz to 48 kHz. Optionally, the frequency band on which the ultrasonic signal is located may be from 17 kHz to 22 kHz. A specific frequency of a target audio signal may be determined with reference to an actual application product. This is not limited herein. For example, the ultrasonic signal may be a linear frequency modulation (Chirp) signal, a ZC (Zadoff-Chu) sequence signal, or another type of audio signal. This is not enumerated herein. For the description of the audio signal, refer to related description in Embodiment 2.

Figure 3:
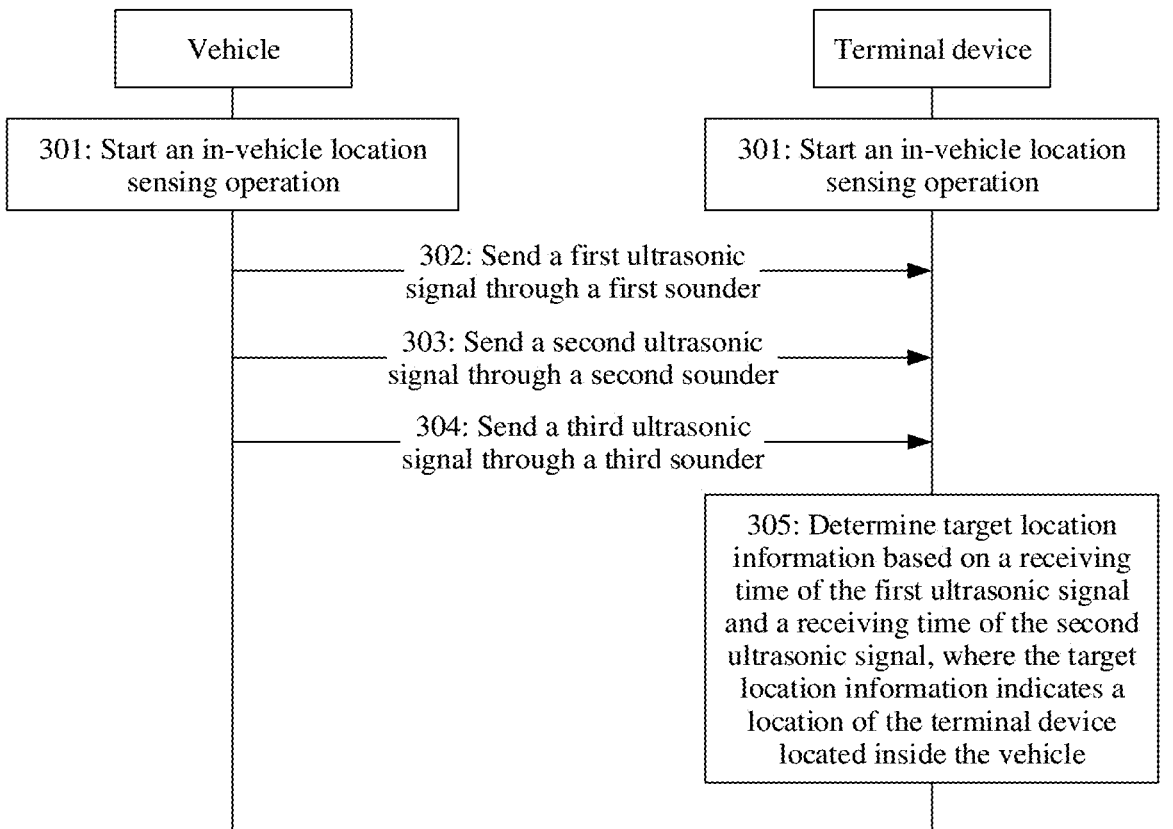
FIG. 3 is a schematic flowchart of a location obtaining method according to an embodiment of this application.

Specifically, FIG. 3 is a schematic flowchart of a location obtaining method according to an embodiment of this application. The location obtaining method provided in this embodiment of this application may include the following steps.

301: A vehicle and a terminal device start an in-vehicle location sensing operation.

In this embodiment of this application, in some application scenarios, in a running process of the vehicle, when determining that a location of the terminal device inside the vehicle needs to be learned, the vehicle starts the in-vehicle location sensing operation, and sends first indication information to the terminal device. The first indication information indicates the terminal device to start the in-vehicle location sensing operation. It should be noted that steps performed by the vehicle in Embodiment 1 may be specifically performed by a processor in the vehicle, or may be performed by a vehicle auxiliary device in the vehicle. This is specifically determined with reference to an actual product form. Details are not described subsequently.

For example, the vehicle needs to separately allocate control permission of the vehicle to at least one terminal device inside the vehicle, but terminal devices at different locations inside the vehicle correspond to different control permission. In this case, a location of each terminal device inside the vehicle in the vehicle needs to be obtained, and the vehicle may be triggered to start the in-vehicle location sensing operation.

For another example, if the vehicle needs to connect to a terminal device at a front passenger location, and cast a screen of the terminal device at the front passenger location to a central control screen, the vehicle needs to obtain the location of each terminal device inside the vehicle in the vehicle, to determine, from the at least one terminal device, the terminal device at the front passenger location. In this case, the vehicle may be triggered to start the in-vehicle location sensing operation. It should be noted that the vehicle may be further triggered to start the in-vehicle location sensing operation in another scenario. The examples herein are merely for ease of understanding of this solution, and are not intended to limit this solution.

In some other application scenarios, in a running process of the terminal device, when determining that the location of the terminal device inside the vehicle needs to be learned, the terminal device starts the in-vehicle location sensing operation, and sends second indication information to the vehicle. The second indication information indicates the vehicle to start the in-vehicle location sensing operation.

For example, when a terminal device located inside the vehicle wants to start a screen casting operation, because the vehicle may be configured with a plurality of displays, the terminal device may start the in-vehicle location sensing operation, to obtain a display closest to the terminal device from the plurality of displays inside the vehicle and automatically connect to the terminal device. Alternatively, the terminal device may display a display list. All displays available for connection are displayed in the display list. A display closest to the terminal device is topped.

For another example, if the terminal device is a wireless headset, and the wireless headset wants to connect to a closest screen inside the vehicle so that a sound output by the screen is played through the wireless headset, the wireless headset may start the in-vehicle location sensing operation, to obtain a display closest to the wireless headset from the plurality of displays inside the vehicle, and the like. It should be understood that the terminal device may be further triggered to start the in-vehicle location sensing operation in another scenario. Details are not described herein.

Specifically, in some application scenarios, the vehicle may send the first indication information to the terminal device inside the vehicle in a broadcast manner. After the terminal device receives the first indication information, the terminal device is triggered to start the in-vehicle location sensing operation. The terminal device sends a first feedback message to the vehicle, to complete a communication connection between the vehicle and the determined terminal device. The first feedback message is used to notify the vehicle that the terminal device has successfully started the in-vehicle location sensing operation.

The foregoing broadcast manner may be performing broadcasting by using a Bluetooth signal, performing broadcasting by using a form of a wireless fidelity (wireless fidelity, Wi-Fi) hot spot, performing broadcasting in another manner, or the like. This is not enumerated herein.

After determining that the terminal device has started the in-vehicle location sensing operation, the vehicle may send third indication information to the at least one terminal device inside the vehicle. The third indication information indicates the terminal device to start a preparation for receiving an ultrasonic signal and then to start to separately send the ultrasonic signal through at least two sounders. However, it should be noted that, if there are a plurality of terminal devices inside the vehicle at the same time, because each terminal device generates target location information corresponding to the terminal device in this solution, the vehicle may simultaneously send the third indication information to the plurality of terminal devices inside the vehicle, or may obtain locations of the terminal devices inside the vehicle one by one.

In some other application scenarios, the terminal device inside the vehicle may send the second indication information to the vehicle in a broadcast manner. After the vehicle receives the second indication information, the vehicle is triggered to start the in-vehicle location sensing operation. The terminal device sends a second feedback message to the vehicle. The second feedback message is used to notify the terminal device that the vehicle has successfully started the in-vehicle location sensing operation, so that the terminal device can start a preparation for receiving an ultrasonic signal.

Further, if the vehicle receives the second indication information sent by the plurality of terminal devices inside the vehicle, the vehicle may simultaneously send the second feedback message to the plurality of terminal devices inside the vehicle, so that the plurality of terminal devices simultaneously start to measure locations of the terminal devices inside the vehicle. Alternatively, the vehicle may send the second feedback message to the plurality of terminal devices inside the vehicle one by one, so that the plurality of terminal devices start to measure locations of the terminal devices inside the vehicle one by one.

In this implementation, a specific implementation of triggering the vehicle to start to send the ultrasonic signal and the terminal device to start to receive the ultrasonic signal is provided, thereby improving integrity of this solution. In addition, in both a case in which the vehicle wants to obtain the target location information of the terminal device and a case in which the terminal device wants to obtain the target location information of the terminal device, operations of sending and receiving the ultrasonic signal can be triggered, thereby extending an application scenario of this solution.

302: The vehicle sends a first ultrasonic signal to the terminal device through a first sounder.

In this embodiment of this application, the vehicle is configured with at least two sounders. The at least two sounders include the first sounder and a second sounder. The first sounder and the second sounder are configured on two different sides of the vehicle. Further, if the first sounder and the second sounder are respectively configured on a front side and a rear side of the vehicle, one piece of target location information may indicate whether a terminal device is located in a front row of the vehicle or a rear row of the vehicle. Alternatively, if the first sounder and the second sounder may be respectively configured on a left side and a right side of the vehicle, one piece of target location information may indicate whether a terminal device is located on the left side of the vehicle or the right side of the vehicle.

Optionally, the at least two sounders configured inside the vehicle may include at least three sounders. The at least three sounders may include a first sounder, a second sounder, and a third sounder. The at least three sounders are not located on one straight line. In this case, one piece of target location information may indicate that a terminal device is at a determined location inside the vehicle. For example, there are five locations inside the vehicle in the vehicle, and the five locations are respectively a primary driver location, a front passenger location, a left-side location in a rear row, a right-side location in the rear row, or a middle location in the rear row inside the vehicle. In this case, one piece of target location information may indicate a specific location inside the vehicle in the foregoing five locations inside the vehicle. It should be understood that the foregoing example is merely for ease of understanding of this solution, and is not intended to limit this solution.

Figure 4:
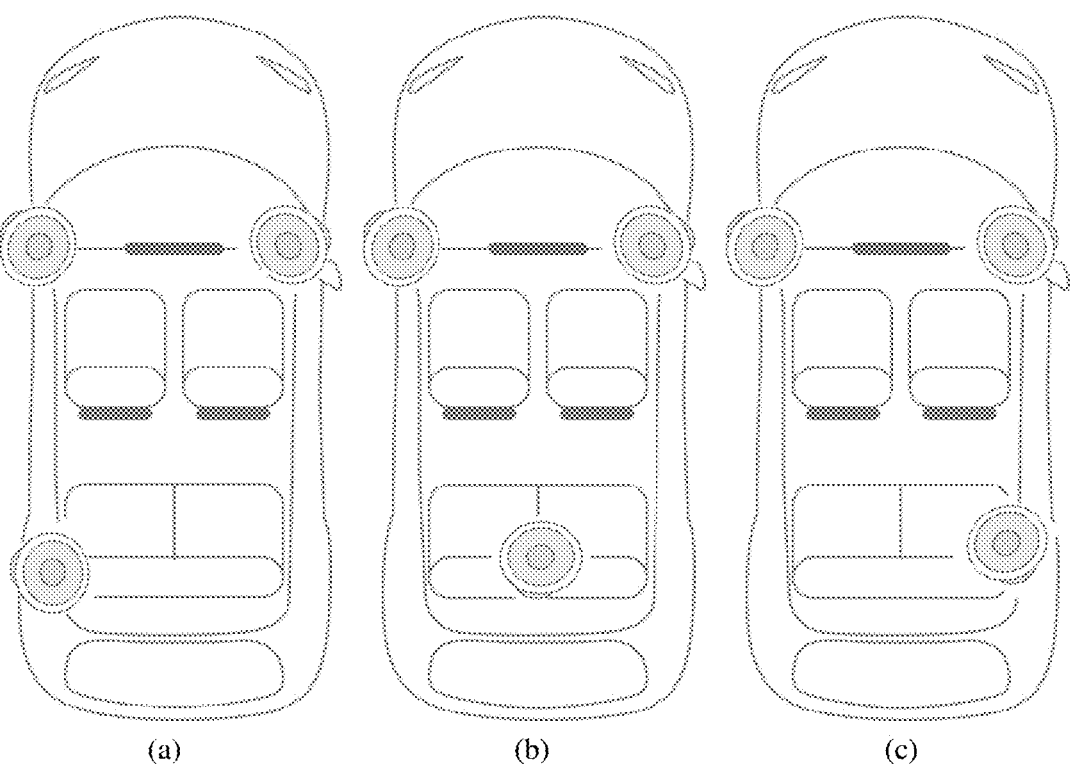
FIG. 4 is a schematic diagram of locations of at least three sounders in a location obtaining method according to an embodiment of this application.
Figure 5:
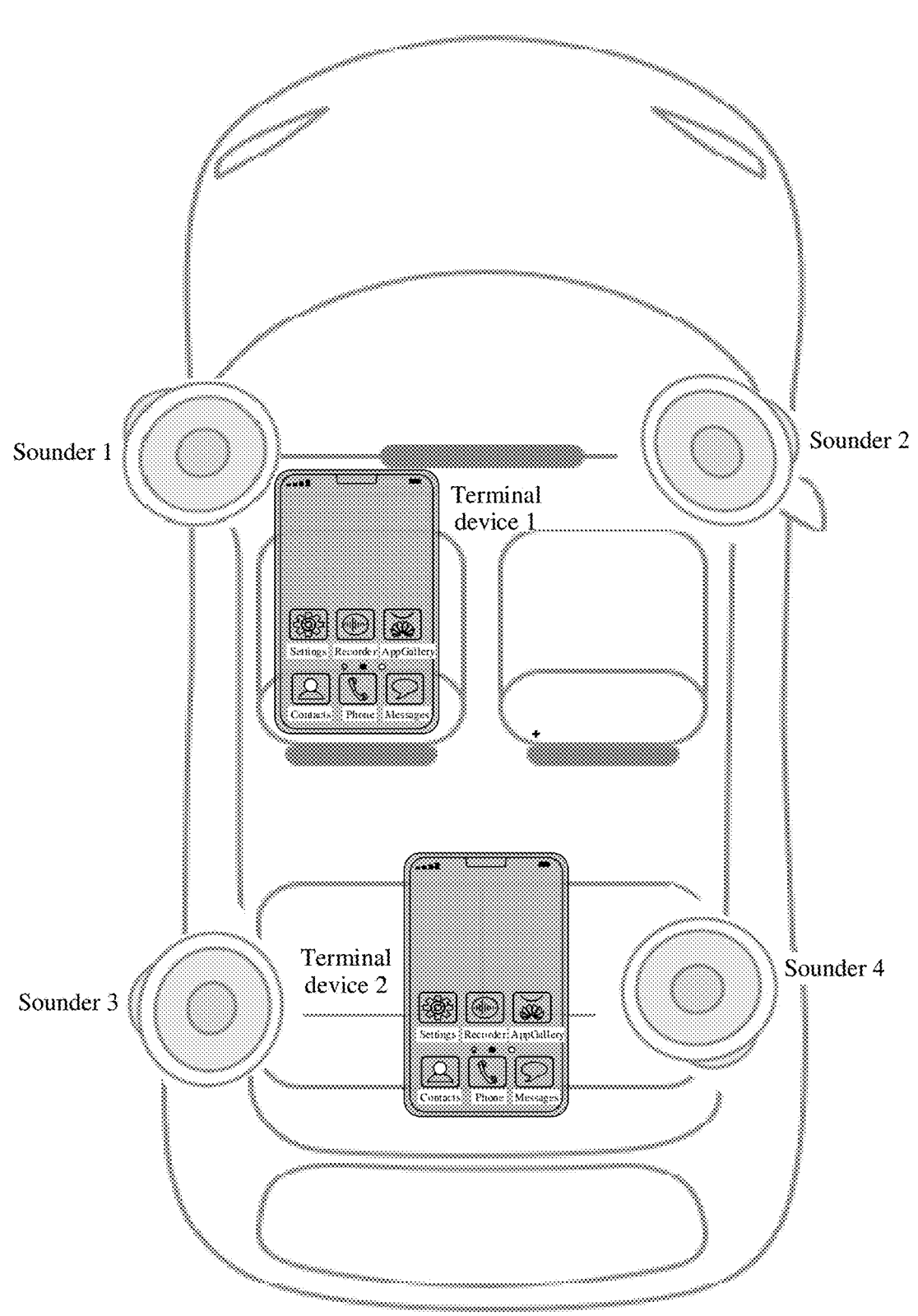
FIG. 5 is a schematic diagram of a principle of a location obtaining method according to an embodiment of this application.

For more intuitive understanding of this solution, refer to FIG. 4. FIG. 4 is a schematic diagram of locations of at least three sounders in a location obtaining method according to an embodiment of this application. For example, in FIG. 4, a vehicle sends an ultrasonic signal through three sounders, and the vehicle is a car. FIG. 4 includes three schematic sub-diagrams (a), (b), and (c). As shown in the schematic sub-diagram (a) of FIG. 4, the three sounders may be respectively at a front left location, a front right location, and a rear left location inside the vehicle. As shown in the schematic sub-diagram (b) of FIG. 4, the three sounders may be respectively at a front left location, a front right location, and a middle location in a rear row inside the vehicle. As shown in the schematic sub-diagram (c) of FIG. 4, the three sounders may be respectively at a front left location, a front right location, a rear right location, and the like inside the vehicle. It should be understood that the example in FIG. 4 is merely for ease of understanding of locations of sounders. The vehicle may also send an ultrasonic signal through a sounder at another location, and the like. This is not enumerated herein. As shown in FIG. 4 and FIG. 5, in this embodiment of this application, a location of each sounder is described based on a top view of a vehicle, for example, a front left location, a front right location, a rear left location, and a rear right location.

In this embodiment of this application, the location of the terminal device inside the vehicle is determined by using the at least three sounders inside the vehicle. The at least three sounders are not on a same straight line. In this way, the accurate location of the terminal device inside the vehicle can be obtained, to facilitate more refined management subsequently provided for the terminal device.

Further, optionally, the at least three sounders configured inside the vehicle include four sounders. The four sounders include a first sounder, a second sounder, a third sounder, and a fourth sounder. The four sounders are respectively at a front left location, a front right location, a rear left location, and a rear right location of the vehicle. In this embodiment of this application, generally, the sounders of the vehicle are respectively at the front left location, the front right location, the rear left location, and the rear right location. No additional component needs to be added to the vehicle. In addition, a larger quantity of used sounders indicates a lower error rate of obtained target location information. After the four existing sounders in the vehicle are fully used, accuracy of the obtained target location information is improved.

In this embodiment of this application, the vehicle may send the first ultrasonic signal to the terminal device through the first sounder in the broadcast manner. Correspondingly, a determined terminal device (for ease of description, referred to as a "target terminal device" below) inside the vehicle receives the first ultrasonic signal sent by the first sounder, and the target terminal device further obtains a receiving time of the first ultrasonic signal.

A frequency band on which the first ultrasonic signal is located may be 17 kHz to 48 kHz. Optionally, the frequency band on which the first ultrasonic signal is located may be 17 kHz to 23 kHz. For example, a frequency of the first ultrasonic signal may be about 23 kHz. A specific frequency of the first ultrasonic signal may be determined with reference to an actual application product. This is not limited herein.

303: The vehicle sends a second ultrasonic signal to the terminal device through the second sounder.

In this embodiment of this application, the vehicle may send the second ultrasonic signal to the terminal device through the second sounder in the broadcast manner. Correspondingly, the target terminal device receives the second ultrasonic signal sent by the second sounder, and the target terminal device further obtains a receiving time of the second ultrasonic signal. The second sounder and the first sounder are two different sounders.

Specifically, in an implementation, if step 302 and step 303 are simultaneously performed, the first ultrasonic signal and the second ultrasonic signal are different ultrasonic signals, and the two different ultrasonic signals may be different in any one or more of the following aspects: different frequencies, different signal modulation schemes, different waveforms, different amplitudes, different types, or the like.

In another implementation, if step 302 is performed first, and step 303 is performed after a preset time interval, the first ultrasonic signal and the second ultrasonic signal may be same ultrasonic signals, or may be different ultrasonic signals. For example, the preset time interval may be 0.05 second, 0.1 second, 0.15 second, 0.2 second, or other duration. A specific value may be determined with reference to an actual application product. This is not limited herein.

304: The vehicle sends a third ultrasonic signal to the terminal device through the third sounder.

In some embodiments of this application, if the vehicle obtains the specific location of the terminal device inside the vehicle by using the at least three sounders, the vehicle may further send the third ultrasonic signal to the terminal device through the third sounder in the broadcast manner. Correspondingly, the target terminal device receives the third ultrasonic signal sent by the third sounder, and the target terminal device further obtains a receiving time of the third ultrasonic signal. The third sounder, the second sounder, and the first sounder are all different sounders.

Specifically, in an implementation, if step 302, step 303, and step 304 are simultaneously performed, the first ultrasonic signal, the second ultrasonic signal, and the third ultrasonic signal are all different ultrasonic signals.

In another implementation, if step 302 is performed first, step 303 is performed after a preset time interval, and step 304 is performed further after a preset time interval, the first ultrasonic signal, the second ultrasonic signal, and the third ultrasonic signal may be same ultrasonic signals, or may be different ultrasonic signals.

Optionally, if the vehicle obtains the specific location of the terminal device inside the vehicle by using the four sounders, the vehicle may further send a fourth ultrasonic signal to the terminal device through the fourth sounder in the broadcast manner. Correspondingly, the target terminal device receives the fourth ultrasonic signal sent by the fourth sounder, and the target terminal device further obtains a receiving time of the fourth ultrasonic signal. The fourth sounder, the second sounder, and the first sounder are all different sounders.

Specifically, in an implementation, if the vehicle sends the ultrasonic signals to the terminal device through the first sounder, the second sounder, the third sounder, and the fourth sounder at the same time, the first ultrasonic signal, the second ultrasonic signal, the third ultrasonic signal, and the fourth ultrasonic signal are all different ultrasonic signals.

In another implementation, if the ultrasonic signals are sent to the terminal device through the first sounder, the second sounder, the third sounder, and the fourth sounder one by one, and a time interval between sending times of two adjacent ultrasonic signals is the preset time interval, the first ultrasonic signal, the second ultrasonic signal, the third ultrasonic signal, and the fourth ultrasonic signal may be same ultrasonic signals, or may be different ultrasonic signals.

305: The terminal device determines the target location information based on the receiving time of the first ultrasonic signal and the receiving time of the second ultrasonic signal. The target location information indicates the location of the terminal device located inside the vehicle.

In this embodiment of this application, the terminal device may determine the target location information based on the receiving time of the first ultrasonic signal and the receiving time of the second ultrasonic signal. The target location information indicates the location of the terminal device located inside the vehicle.

Further, the receiving time of the first ultrasonic signal and the receiving time of the second ultrasonic signal can reflect a value relationship of a distance between the terminal device and the first sounder and a distance between the terminal device and the second sounder. Locations of the plurality of sounders in the vehicle are fixed. When the terminal device is located at a different location relative to the vehicle, a distance relationship between the terminal device and each sounder is also different. Therefore, the target location information of the terminal device can be determined.

Optionally, if the vehicle sends the ultrasonic signals through the at least three sounders, the terminal device may determine the target location information based on the receiving time of the first ultrasonic signal, the receiving time of the second ultrasonic signal, and the receiving time of the third ultrasonic signal.

Further, optionally, if the vehicle sends the ultrasonic signals through the four sounders, the terminal device may determine the target location information based on the receiving time of the first ultrasonic signal, the receiving time of the second ultrasonic signal, the receiving time of the third ultrasonic signal, and the receiving time of the fourth ultrasonic signal.

Specifically, in an implementation, the vehicle simultaneously sends the ultrasonic signals through the at least two sounders. In other words, step 302, step 303, and step 304 are simultaneously performed. In this case, step 305 may include: A one-to-one correspondence of different types of ultrasonic signals and sounders at different locations may be configured on the target terminal device. To be specific, a sounder at each location may fixedly send one type of ultrasonic signal, so that the terminal device can learn of in advance a specific type of ultrasonic signal sent by a sounder at a specific location. The target terminal device determines, based on receiving times of different ultrasonic signals in the at least two ultrasonic signals, a sequence in which the different ultrasonic signals arrive at the terminal device.

Because the vehicle simultaneously sends the ultrasonic signals through the plurality of sounders, a later time at which an ultrasonic signal sent by a sounder at a specific location arrives at the target terminal device indicates a longer distance between the sounder and the target terminal device. In other words, a sequence in which each ultrasonic signal arrives at the terminal device represents a distance between the target terminal device and the sounder at each location. The locations of the plurality of sounders in the vehicle are fixed, and distance relationships of different locations inside the vehicle and each sounder are different. Therefore, the terminal device may determine the location of the target terminal device inside the vehicle based on the sequence in which different ultrasonic signals arrive at the terminal device (that is, determine the target location information of the target terminal device).

More specifically, in a case, if the vehicle sends the ultrasonic signals to the terminal device through four sounders respectively at the front left location, the front right location, the rear left location, and the rear right location, the target terminal device may separately obtain the receiving time of the first ultrasonic signal, the receiving time of the second ultrasonic signal, the receiving time of the third ultrasonic signal, and the receiving time of the fourth ultrasonic signal; determine a sequence in which the first ultrasonic signal, the second ultrasonic signal, the third ultrasonic signal, and the fourth ultrasonic signal arrive at the target terminal device; and determine the target location information of the target terminal device. There are N locations inside the vehicle. The target location information indicates that the target terminal device is at a target location in the N locations, where N is an integer greater than 1.

Further, herein, an example in which the vehicle includes five locations inside the vehicle: a primary driver location, a front passenger location, a left-side location in a rear row, a right-side location in the rear row, and a middle location in the rear row is used to demonstrate a principle of determining the target location information of the target terminal device based on the sequence in which various ultrasonic signals arrive at the target terminal device. If the ultrasonic signal sent by the sounder at the front left location first arrives at the target terminal device, the ultrasonic signals sent by the sounders at the front right location and the rear left location are the next, and the ultrasonic signal sent by the sounder at the rear right location arrives at the target terminal device at the latest, it is determined that the target terminal device is at the primary driver location inside the vehicle.

If the ultrasonic signal sent by the sounder at the front right location first arrives at the target terminal device, the ultrasonic signals sent by the sounders at the front left location and the rear right location are the next, and the ultrasonic signal sent by the sounder at the rear left location arrives at the target terminal device at the latest, it is determined that the target terminal device is at the front passenger location inside the vehicle.

If the ultrasonic signal sent by the sounder at the rear left location first arrives at the target terminal device, the ultrasonic signals sent by the sounders at the front left location and the rear right location are the next, and the ultrasonic signal sent by the sounder at the front right location arrives at the target terminal device at the latest, it is determined that the target terminal device is at the left-side location in the rear row inside the vehicle.

If the ultrasonic signal sent by the sounder at the rear right location first arrives at the target terminal device, the ultrasonic signals sent by the sounders at the front right location and the rear left location are the next, and the ultrasonic signal sent by the sounder at the front left location arrives at the target terminal device at the latest, it is determined that the target terminal device is at the right-side location in the rear row inside the vehicle.

If the ultrasonic signals sent by the sounders at the front left location and the front right location basically simultaneously arrive at the target terminal device, the ultrasonic signals sent by the sounders at the rear left location and the rear right location basically simultaneously arrive at the target terminal device, and the ultrasonic signals sent by the sounders at the rear left location and the rear right location arrive at the target terminal device earlier than the ultrasonic signals sent by the sounders at the front left location and the front right location, it is determined that the target terminal device is at the middle location in the rear row inside the vehicle.

For more intuitive understanding of this embodiment of this application, refer to FIG. 5. FIG. 5 is a schematic diagram of a principle of a location obtaining method according to an embodiment of this application. As shown in FIG. 5, a distance between a sounder 1 and a terminal device 1 is the smallest, a distance between the terminal device 1 and each of a sounder 2 and a sounder 3 is the second smallest, and a distance between a sounder 4 and the terminal device 1 is the largest. If the terminal device 1 finds that an ultrasonic signal sent by the sounder 1 arrives first, ultrasonic signals sent by the sounder 2 and the sounder 3 are the next, and an ultrasonic signal sent by the sounder 4 arrives at the latest, the terminal device 1 may determine that the terminal device 1 is at the primary driver location.

A distance between the sounder 1 and a terminal device 2 is similar to a distance between the sounder 2 and the terminal device 2. A distance between the sounder 3 and the terminal device 2 is similar to a distance between the sounder 4 and the terminal device 2. The distance between the terminal device 2 and each of the sounder 1 and the sounder 2 is greater than the distance between the terminal device 2 and each of the sounder 3 and the sounder 4. In this case, if the terminal device 2 finds that ultrasonic signals sent by the sounder 3 and the sounder 4 basically simultaneously arrive, ultrasonic signals sent by the sounder 1 and the sounder 2 basically simultaneously arrive, and the ultrasonic signals sent by the sounder 3 and the sounder 4 arrive earlier than the ultrasonic signals sent by the sounder 1 and the sounder 2, the terminal device 2 may determine that the terminal device 2 is at the middle location in the rear row. It should be understood that the example in FIG. 5 is merely for more intuitive understanding of this solution, and is not intended to limit this solution.

In another case, the vehicle may determine, by using two sounders, whether the terminal device is at a left-side location or a right-side location inside the vehicle. The two sounders are respectively disposed on a left side and a right side of the vehicle. A distance between the left-side sounder and the left-side location is less than a distance between the left-side sounder and the right-side location. In addition, a distance between the right-side sounder and the right-side location is less than a distance between the right-side sounder and the left-side location. The vehicle sends ultrasonic signals to the terminal device through the two sounders, and can determine, based on the ultrasonic signals received by the target terminal device, that the target terminal device is at the left-side location or the right-side location inside the vehicle.

Further, if the ultrasonic signal sent by the left-side sounder of the vehicle first arrives at the target terminal device, and the ultrasonic signal sent by the right-side sounder of the vehicle arrives at the target terminal device later, the target terminal device is at the left-side location of the vehicle. If the ultrasonic signal sent by the right-side sounder of the vehicle first arrives at the target terminal device, and the ultrasonic signal sent by the left-side sounder of the vehicle arrives at the target terminal device later, the target terminal device is at the right-side location of the vehicle.

In another case, the vehicle may determine, by using two sounders, whether the terminal device is at a front-row location (the primary driver location and the front passenger location) or a rear-row location (rear-row seats) inside the vehicle. The two sounders are respectively disposed on a front side and a rear side of the vehicle. A distance between the front-side sounder and the front-row location is less than a distance between the front-side sounder and the rear-row location. In addition, a distance between the rear-side sounder and the rear-row location is less than a distance between the rear-side sounder and the front-row location. It can be determined based on ultrasonic signals received by the target terminal device whether the target terminal device is at the front-row location or the rear-row location inside the vehicle.

Further, if the ultrasonic signal sent by the front-side sounder of the vehicle first arrives at the target terminal device, and the ultrasonic signal sent by the rear-side sounder of the vehicle arrives at the target terminal device later, the target terminal device is at the front-row location of the vehicle. If the ultrasonic signal sent by the rear-side sounder of the vehicle first arrives at the target terminal device, and the ultrasonic signal sent by the front-side sounder of the vehicle arrives at the target terminal device later, the target terminal device is at the rear-row location of the vehicle.

It should be noted that, in this embodiment of this application, specific implementation solutions of determining a location of the terminal device inside the vehicle when another quantity of sounders inside the vehicle are used or sounders are at other locations are not described in detail one by one. Reasoning and understanding may be performed based on a same principle. The foregoing principle is that, after a location at which an ultrasonic signal is sent is fixed, because distance relationships of terminal devices at different locations inside the vehicle and sounders at different locations are different, and a sequence in which different ultrasonic signals arrive at the target terminal device can indicate distance relationships of the terminal devices and the sounders at different locations, the target terminal device may determine the location of the target terminal device inside the vehicle based on the sequence in which the different ultrasonic signals arrive at the target terminal device.

In this embodiment of this application, a larger distance between the terminal device and a sounder indicates a later time at which an ultrasonic signal sent by the sounder arrives at the terminal device. If the vehicle simultaneously sends the different ultrasonic signals to the terminal device through the sounders at the different locations, the sequence in which the different ultrasonic signals arrive at the terminal device may well reflect a distance relationship between the terminal device and each sounder, so that the specific location of the terminal device inside the vehicle can be intuitively deduced. A simple solution for obtaining the target location information is provided, and is easy to implement.

In another implementation, the vehicle sends the ultrasonic signals to the terminal device one by one through different sounders in the at least two sounders. A time interval between sending times of two adjacent ultrasonic signals is a preset time interval. The ultrasonic signals sent by the vehicle through the different sounders may be the same or may be different. In this case, step 305 may include: The target terminal device determines the location of the target terminal device inside the vehicle based on the receiving time of the first ultrasonic signal, the receiving time of the second ultrasonic signal, and the preset time interval (that is, determines the target location information of the target terminal device).

Because the vehicle sends the ultrasonic signals one by one through the different sounders based on the preset time interval, the target terminal device may determine, based on an actual sequence of receiving each ultrasonic signal, a specific location of a sounder from which each received ultrasonic signal comes; and may learn of, based on an actual receiving time of each ultrasonic signal and the preset time interval, an actual sequence of distances between the target terminal device and a sounder at each location, to determine the location of the target terminal device inside the vehicle. For this principle, refer to the description in the foregoing implementation.

More specifically, in a case, if the vehicle sends the ultrasonic signals to the terminal device through the four sounders respectively at the front left location, the front right location, the rear left location, and the rear right location, the target terminal device may separately obtain a first receiving time of a first arrived ultrasonic signal (that is, the first ultrasonic signal sent by the first sounder), a receiving time of a second arrived ultrasonic signal (that is, the second ultrasonic signal sent by the second sounder), a receiving time of a third arrived ultrasonic signal (that is, the third ultrasonic signal sent by the third sounder), and a receiving time of a fourth arrived ultrasonic signal (that is, the fourth ultrasonic signal sent by the fourth sounder); subtract the preset time interval from the receiving time of the second arrived ultrasonic signal to obtain a second receiving time corresponding to the second arrived ultrasonic signal; subtract two times the preset time interval from the receiving time of the third arrived ultrasonic signal to obtain a third receiving time corresponding to the third arrived ultrasonic signal; and subtract three times the preset time interval from the receiving time of the fourth arrived ultrasonic signal, to obtain a fourth receiving time corresponding to the fourth arrived ultrasonic signal.

The target terminal device determines the target location information of the target terminal device based on the first receiving time, the second receiving time, the third receiving time, and the fourth receiving time. Further, the vehicle sends the first ultrasonic signal, sends the second ultrasonic signal after the preset time interval, sends the third ultrasonic signal again after the preset time interval, and sends the fourth ultrasonic signal further after the preset time interval. Therefore, the first receiving time, the second receiving time, the third receiving time, and the fourth receiving time each can represent a distance between each sounder and the target terminal device. An earlier first receiving time indicates a smaller distance between the first sounder and the target terminal device, and a later first receiving time indicates a larger distance between the first sounder and the target terminal device. Meanings represented by the second receiving time, the third receiving time, and the fourth receiving time are the same as a meaning represented by the first receiving time. After the locations of the at least two sounders are fixed, distance relationships of different locations inside the vehicle and the sounders are different. Therefore, the target terminal device may determine the target location information of the target terminal device based on the first receiving time, the second receiving time, the third receiving time, and the fourth receiving time.

In another case, if the vehicle sends the ultrasonic signals to the terminal device through two sounders, in this case, the target terminal device may separately obtain a first receiving time of a first arrived ultrasonic signal (that is, a first ultrasonic signal sent by a first sounder) and a receiving time of a second arrived ultrasonic signal (that is, a second ultrasonic signal sent by a second sounder), and subtract a preset time interval from the receiving time of the second arrived ultrasonic signal, to obtain the second receiving time corresponding to the second arrived ultrasonic signal. If the first receiving time is earlier than the second receiving time, it is determined that the target terminal device is located on a side of the first sounder; or if the first receiving time is later than the second receiving time, it is determined that the target terminal device is located on a side of the second sounder.

If the first sounder and the second sounder are respectively disposed on the left side and the right side of the vehicle, a distance between the left-side location and the left-side sounder in the first sounder and the second sounder is less than a distance between the left-side sounder and the right-side location, and a distance between a right-side location and the right-side sounder in the first sounder and the second sounder is less than a distance between the right-side sounder and the left-side location. The target location information of the target terminal device indicates whether the target terminal device is at the left-side location or the right-side location inside the vehicle.

If the first sounder and the second sounder are respectively disposed on the front side and the rear side of the vehicle, a distance between the front-row location and the front-side sounder in the first sounder and the second sounder is less than a distance between the front-side sounder and the rear-row location, and a distance between the rear-row location and the rear-side sounder in the first sounder and the second sounder is less than a distance between the rear-side sounder and the front-row location. The target location information of the target terminal device indicates whether the target terminal device is at the front-row location or the rear-row location inside the vehicle.

It should be noted that, in this embodiment of this application, specific implementation solutions of determining the location of the terminal device inside the vehicle when another quantity of sounders inside the vehicle are used or sounders are at other locations are not described in detail one by one. For understanding, refer to the foregoing description.

In this embodiment of this application, another solution of obtaining the target location information is provided, thereby improving implementation flexibility of this solution. In addition, ultrasonic signals are sequentially sent to the terminal device through different sounders, thereby reducing difficulty in processing each ultrasonic signal by the terminal device and improving accuracy of the finally obtained target location information.

In this embodiment of this application, a solution for measuring the location of the user relative to the vehicle is provided. The location of the terminal device relative to the vehicle is measured by using the ultrasonic signals, thereby obtaining the accurate target location information. In addition, because the user cannot sense the ultrasonic signals, the location of the user relative to the vehicle is accurately positioned without being sensed by the user. In addition, no additional hardware needs to be added to the vehicle or the terminal device, to avoid additional overheads.

2. The location of the terminal device located inside the vehicle is generated based on the distance between the terminal device and each sounder.

Figure 6:
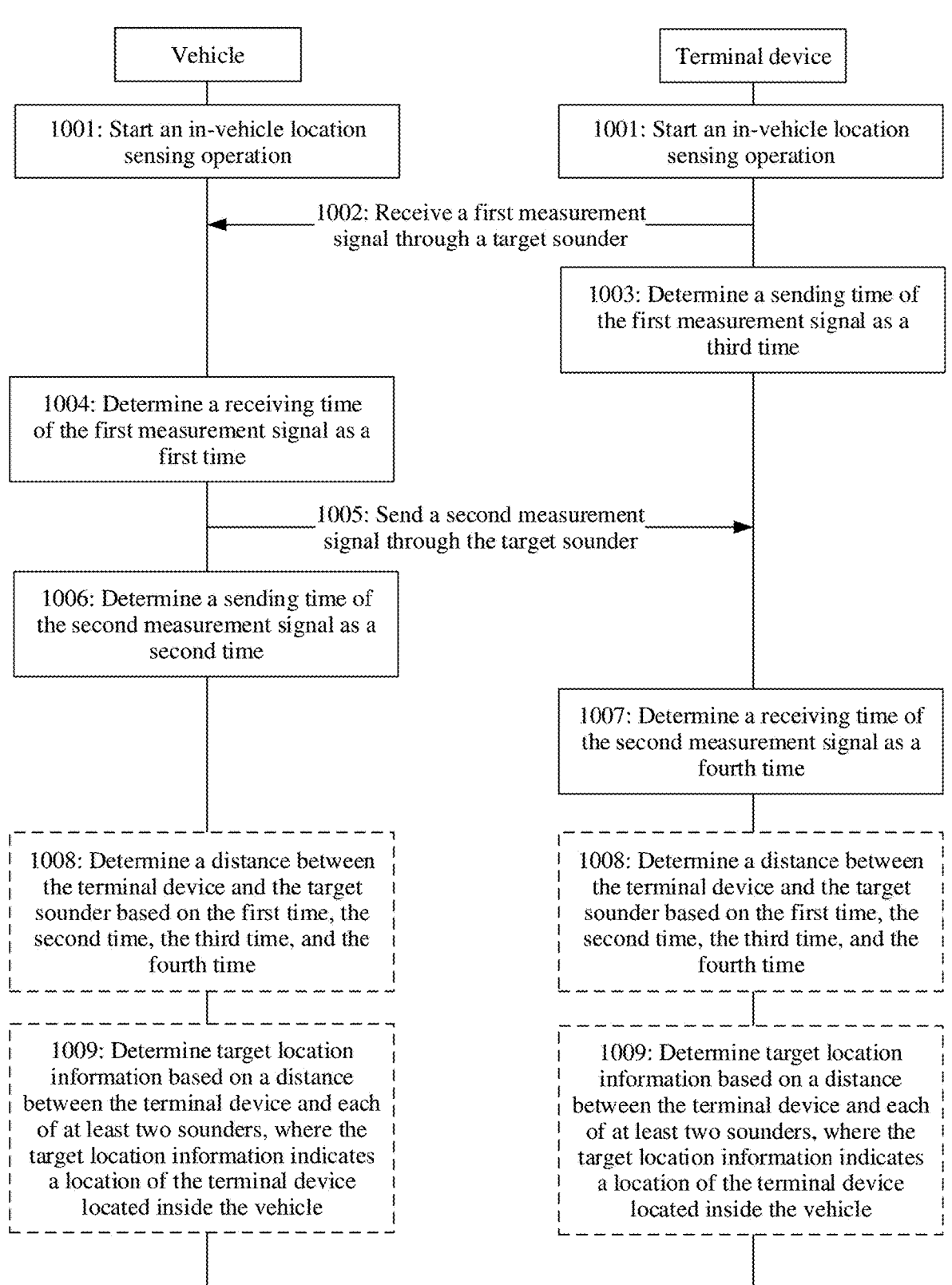
FIG. 6 is a schematic flowchart of a location obtaining method according to an embodiment of this application.

Specifically, FIG. 6 is a schematic flowchart of a location obtaining method according to an embodiment of this application. The location obtaining method provided in this embodiment of this application may include the following steps.

1001: A vehicle and a terminal device start an in-vehicle location sensing operation.

In this embodiment of this application, for a specific implementation of step 1001, refer to the description in step 301 in the embodiment corresponding to FIG. 3. Details are not described herein again.

1002: The vehicle receives, through a target sounder, a first measurement signal sent by the terminal device.

In this embodiment of this application, after both the vehicle and the terminal device start the in-vehicle location sensing operation, the terminal device may send the first measurement signal to the vehicle. Correspondingly, the vehicle also receives, through the target sounder, the first measurement signal sent by the terminal device. The vehicle is configured with at least two sounders. The target sounder is any one of the at least two sounders configured for the vehicle. The first measurement signal is an ultrasonic signal. For a specific representation form of the ultrasonic signal, refer to the description in the embodiment corresponding to FIG. 3.

1003: The terminal device determines a sending time of the first measurement signal as a third time.

1004: The vehicle determines a receiving time of the first measurement signal as a first time.

1005: The vehicle sends a second measurement signal to the terminal device through the target sounder.

In this embodiment of this application, after both the vehicle and the terminal device start the in-vehicle location sensing operation, the vehicle further sends the second measurement signal to the terminal device through the target sounder. Correspondingly, the terminal device also receives the second measurement signal. The second measurement signal is an ultrasonic signal. For a specific representation form of the foregoing ultrasonic signal, refer to the description in the embodiment corresponding to FIG. 3.

1006: The vehicle determines a sending time of the second measurement signal as a second time.

1007: The terminal device determines a receiving time of the second measurement signal as a fourth time.

It should be noted that steps 1002 to 1004 may be first performed, and then steps 1005 to 1007 are performed. Alternatively, steps 1005 to 1007 may be first performed, and then steps 1002 to 1004 are performed. A sequence between sending the first measurement signal by the terminal device and sending the second measurement signal by the vehicle is not limited in this embodiment of this application. If the terminal device first sends the first measurement signal, the vehicle sends the second measurement signal after receiving the first measurement signal. If the vehicle first sends the second measurement signal, the terminal device sends the first measurement signal after receiving the second measurement signal.

1008: The vehicle or the terminal device determines a distance between the terminal device and the target sounder based on the first time, the second time, the third time, and the fourth time.

In this embodiment of this application, when obtaining the first time, the second time, the third time, and the fourth time, the vehicle or the terminal device may determine the distance between the terminal device and the target sounder based on the first time, the second time, the third time, and the fourth time by using a double-sided two-way ranging algorithm.

Specifically, in a case, if the terminal device first sends the first measurement signal to the vehicle, and the vehicle sends the second measurement signal to the terminal device after receiving the first measurement signal, step 1008 may include: The vehicle or the terminal device subtracts the first time from the second time to obtain a first time difference, subtracts the third time from the fourth time to obtain a second time difference, and then subtracts the first time difference from the second time difference to obtain a target time difference. The target time difference is duration of two times of propagation of the ultrasonic signal between the target sounder and the terminal device. The vehicle or the terminal device generates the distance between the terminal device and the target sounder based on the target time difference.

In another case, if the vehicle first sends the second measurement signal to the terminal device, and the terminal device sends the first measurement signal to the vehicle after receiving the second measurement signal, step 1008 may include: The vehicle or the terminal device subtracts the fourth time from the third time to obtain a third time difference, subtracts the second time from the first time to obtain a fourth time difference, and then subtracts the third time difference from the fourth time difference to obtain a target time difference. The target time difference is duration of two times of propagation of the ultrasonic signal between the target sounder and the terminal device. The vehicle or the terminal device generates the distance between the terminal device and the target sounder based on the target time difference.

In this embodiment of this application, because clocks of the vehicle and the terminal device may be not aligned, the difference is calculated based on the two times obtained by the terminal, and the difference is calculated based on the two times obtained by the vehicle, to avoid an error caused due to possible misalignment of the clocks of the vehicle and the terminal device, thereby obtaining an accurate distance.

In this embodiment of this application, based on the principle of steps 1002 to 1008, the vehicle or the terminal device can obtain a distance between the terminal device and each sounder. Specifically, in an implementation, the vehicle and the terminal device repeatedly perform 1002 to 1008 at least once, to obtain the distance between the terminal device and each sounder one by one.

In another implementation, for a process in which the terminal device sends the measurement signal to the sounder, steps 1002 and 1003 may be performed only once. To be specific, the terminal device may send the first measurement signal to each sounder inside the vehicle in a broadcast manner. Correspondingly, each sounder inside the vehicle receives the first measurement signal, and records a time at which the first measurement signal arrives at each of the at least two sounders.

A process in which the vehicle sends the measurement signal to the terminal device through the sounder is as follows. In an implementation, the vehicle may simultaneously send different ultrasonic signals (that is, different measurement signals) to the terminal device through different sounders, and the terminal device may separately record a time at which a measurement signal sent by a sounder at each location arrives at the terminal device.

In another implementation, the vehicle may alternatively send the ultrasonic signal (that is, the measurement signal) to the terminal device through each sounder one by one, and the terminal device may separately record a time at which a measurement signal sent by a sounder at each location arrives at the terminal device.

1009: The vehicle or the terminal device determines target location information based on the distance between the terminal device and each of the at least two sounders. The target location information indicates a location of the terminal device located inside the vehicle.

In this embodiment of this application, in an implementation, after obtaining the distance between the terminal device and each of the at least two sounders, the vehicle or the terminal device may determine the target location information based on the principle in the embodiment corresponding to FIG. 3. For a specific implementation, refer to the description in the embodiment corresponding to FIG. 3.

In another implementation, the vehicle or the terminal device may draw a circle by using each sounder as a center of the circle and using the distance between each sounder and the terminal device as a radius, to obtain at least two circles in a one-to-one correspondence with the at least two sounders. An intersection region of the at least two circles is the location of the terminal device located inside the vehicle.

Figure 7:
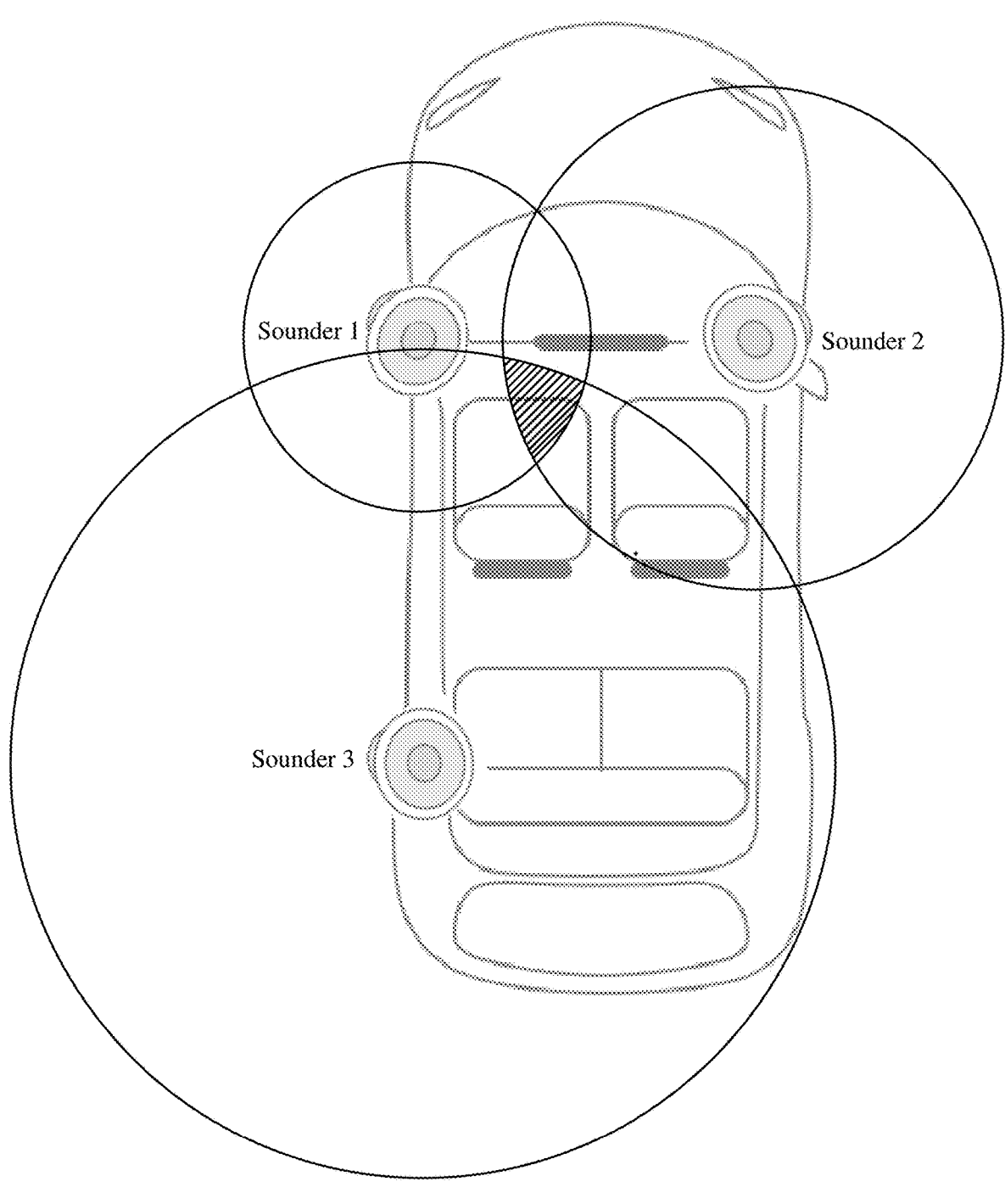
FIG. 7 is a schematic diagram of a location obtaining method according to an embodiment of this application.

For more intuitive understanding of this solution, refer to FIG. 7. FIG. 7 is a schematic diagram of a location obtaining method according to an embodiment of this application. In FIG. 7, an example in which a location of a terminal device located inside a vehicle is measured by using a sounder 1, a sounder 2, and a sounder 3 is used. As shown in FIG. 7, after separately obtaining a distance between the terminal device and each of the sounder 1, the sounder 2, and the sounder 3, the vehicle or the terminal device draws a circle by using the sounder 1 as a center of the circle and using a distance between the terminal device and the sounder 1 as a radius, draws a circle by using the sounder 2 as a center of the circle and using a distance between the terminal device and the sounder 2 as a radius, and draws a circle by using the sounder 3 as a center of the circle and using a distance between the terminal device and the sounder 3 as a radius. The vehicle or the terminal device determines a shadow region (that is, an intersection region of the foregoing three circles) of FIG. 7 as the location of the terminal device located inside the vehicle. In FIG. 7, the terminal device is at a primary driver location inside the vehicle. It should be understood that the example in FIG. 7 is merely for ease of understanding of this solution, and is not intended to limit this solution.

It should be noted that, for a location of a sounder in the vehicle and a purpose of target location information, reference may be made to the description in the embodiment corresponding to FIG. 3. Details are not described herein again.

In this embodiment of this application, another solution for measuring the location of the user relative to the vehicle is provided, thereby improving implementation flexibility of this solution. The location of the terminal device relative to the vehicle is measured by using the ultrasonic signals, thereby obtaining the accurate target location information. In addition, because the user cannot sense the ultrasonic signals, the location of the user relative to the vehicle is accurately positioned without being sensed by the user.

3. The location of the terminal device located outside the vehicle is generated when the distance between the terminal device and the sounder is not obtained.

Figure 8A:
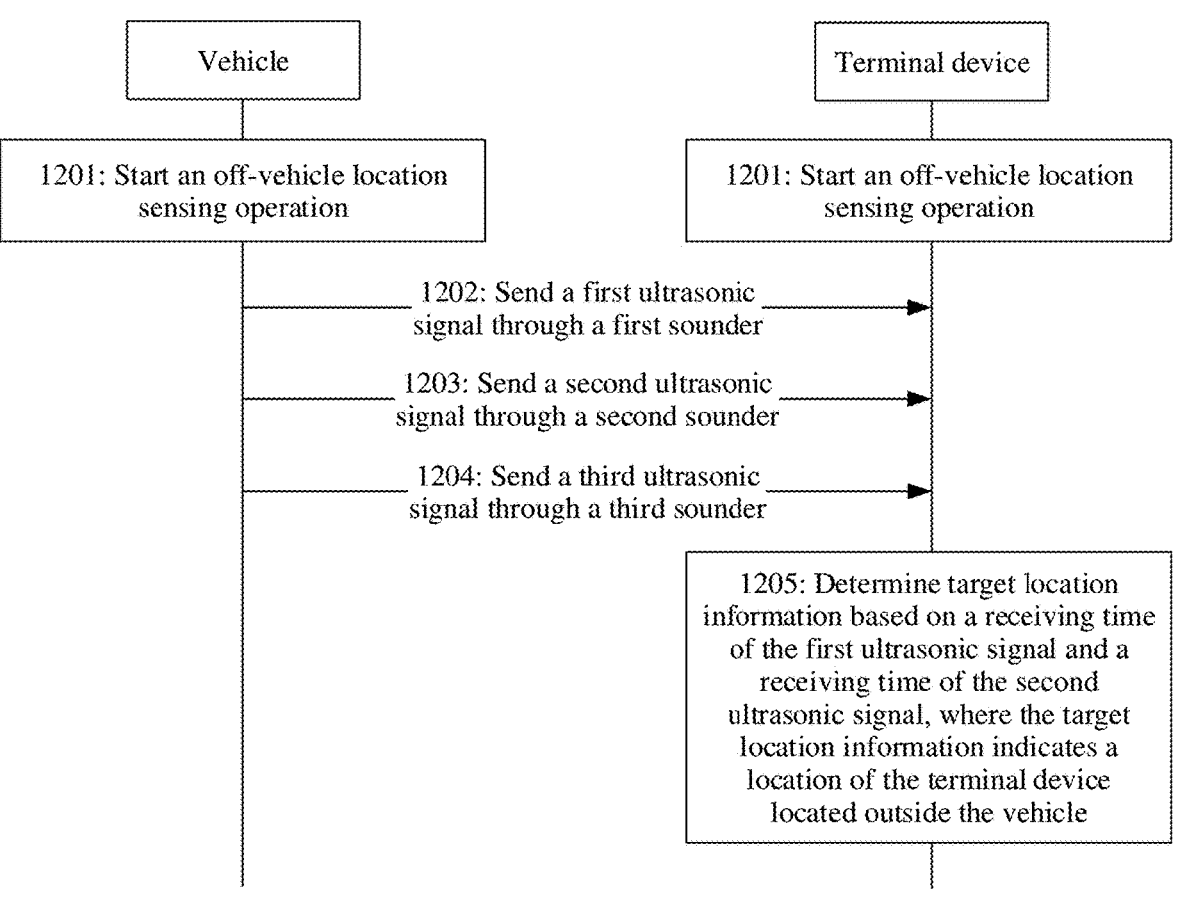
FIG. 8a is a schematic flowchart of a location obtaining method according to an embodiment of this application.

Specifically, FIG. 8*a* is a schematic flowchart of a location obtaining method according to an embodiment of this application. The location obtaining method provided in this embodiment of this application may include the following steps.

1201: A vehicle and a terminal device start an off-vehicle location sensing operation.

In this embodiment of this application, in some application scenarios, in a running process of the vehicle, when determining that a location of the terminal device outside the vehicle needs to be learned, the vehicle starts the off-vehicle location sensing operation, and sends indication information to the terminal device. The indication information indicates the terminal device to start the off-vehicle location sensing operation.

In some other application scenarios, in a running process of the terminal device, when determining that the location of the terminal device outside the vehicle needs to be learned, the terminal device starts the off-vehicle location sensing operation, and sends indication information to the vehicle. The indication information indicates the vehicle to start the off-vehicle location sensing operation.

A specific implementation of the foregoing step is similar to a specific implementation of step 301 in the embodiment corresponding to FIG. 3. In other words, for a specific implementation of triggering both the vehicle and the terminal device to start the off-vehicle location sensing operation when the vehicle or the terminal device detects a trigger condition of the "off-vehicle location sensing operation", refer to the description of step 301 in the embodiment corresponding to FIG. 3. A difference lies in that the "in-vehicle location sensing operation" in the embodiment corresponding to FIG. 3 is replaced with the "off-vehicle location sensing operation" in FIG. 8*a*. A specific implementation solution is not described herein.

The trigger condition of the off-vehicle location sensing operation started by the vehicle and the terminal device is as follows. For example, when detecting that a distance between the terminal device and the vehicle is less than a preset distance threshold, the vehicle or the terminal device may be triggered to start the off-vehicle location sensing operation. For another example, when detecting that the terminal device is located outside the vehicle, the vehicle or the terminal device may be triggered to start the off-vehicle location sensing operation. For another example, when the vehicle is parked, the vehicle may be triggered to start the off-vehicle location sensing operation. Specifically, a specific scenario in which the off-vehicle location sensing operation is triggered may be determined with reference to an actual product form. This is not enumerated herein.

1202: The vehicle sends a first ultrasonic signal to the terminal device through a first sounder.

1203: The vehicle sends a second ultrasonic signal to the terminal device through a second sounder.

1204: The vehicle sends a third ultrasonic signal to the terminal device through a third sounder.

1205: The terminal device determines target location information based on a receiving time of the first ultrasonic signal and a receiving time of the second ultrasonic signal. The target location information indicates a location of the terminal device located outside the vehicle.

In this embodiment of this application, a specific implementation principle of steps 1202 to 1205 is consistent with that of steps 302 to 305 in the embodiment corresponding to FIG. 3. Specific implementations of steps 1202 to 1205 are similar to those of steps 302 to 305 in the embodiment corresponding to FIG. 3. A difference lies in that "the location of the terminal device located inside the vehicle" is measured in the embodiment corresponding to FIG. 3, and "the location of the terminal device located outside the vehicle" is measured in the embodiment corresponding to FIG. 12(*a*) and FIG. 12(*b*).

Figure 8B:
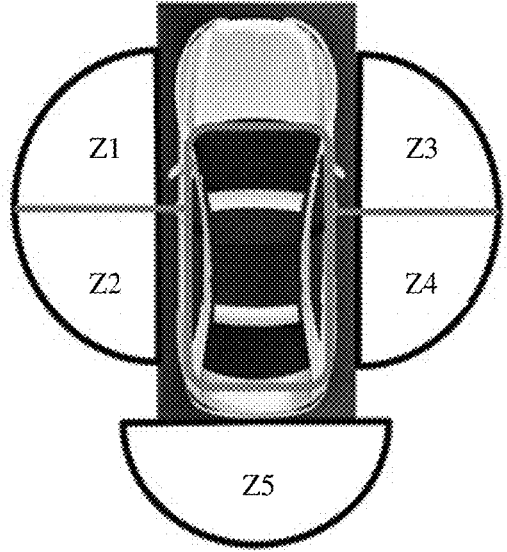
FIG. 8b is a schematic diagram of locations outside a vehicle in a location obtaining method according to an embodiment of this application.

For more intuitive understanding of this solution, refer to FIG. 8*b*. FIG. 8*b* is a schematic diagram of locations outside a vehicle in a location obtaining method according to an embodiment of this application. As shown in the figure, Z1, Z2, 73, Z4, and Z5 are five different locations outside the vehicle. The target location information in this embodiment indicates that the terminal device is at one location outside the vehicle in Z1, 72, Z3, Z4, and Z5. After a location of a sounder inside the vehicle is fixed, distance relationships of each sounder and different locations outside the vehicle are different. This is consistent with the implementation principle of the embodiment corresponding to FIG. 3. In this embodiment, the location of the terminal device located outside the vehicle may also be determined based on a receiving time of each ultrasonic signal. It should be understood that locations outside the vehicle may also be divided in another manner. The example in FIG. 8b is merely for ease of understanding of implementability of this solution.

For locations of a plurality of sounders in the vehicle that are configured to measure the specific location of the terminal device located outside the vehicle, refer to the description in the embodiment corresponding to FIG. 3. Details are not described herein again.

In other words, if the plurality of sounders configured to measure the specific location of the terminal device located outside the vehicle include two sounders, the two sounders may be respectively located on a left side and a right side of the vehicle, or the two sounders may be respectively located on a front side and a rear side of the vehicle.

If the plurality of sounders configured to measure the specific location of the terminal device located outside the vehicle include at least three sounders, the at least three sounders are not located on one straight line.

If the plurality of sounders configured to measure the specific location of the terminal device located outside the vehicle include four sounders, the four sounders may be respectively at a front left location, a front right location, a rear left location, and a rear right location in the vehicle.

It should be noted that, in the embodiment corresponding to FIG. 3, the at least two sounders configured to measure the specific location of the terminal device located inside the vehicle are generally sounders located inside the vehicle; and in the embodiment corresponding to FIG. 8a, the at least two sounders configured to measure the specific location of the terminal device located outside the vehicle may be sounders configured outside the vehicle, or may be sounders configured inside the vehicle.

In this embodiment of this application, not only the location of the terminal device located inside the vehicle can be measured, but also the location of the terminal device located outside the vehicle can be measured, thereby extending an application scenario of this solution.

4. The location of the terminal device located outside the vehicle is generated based on the distance between the terminal device and each sounder.

Figure 9:
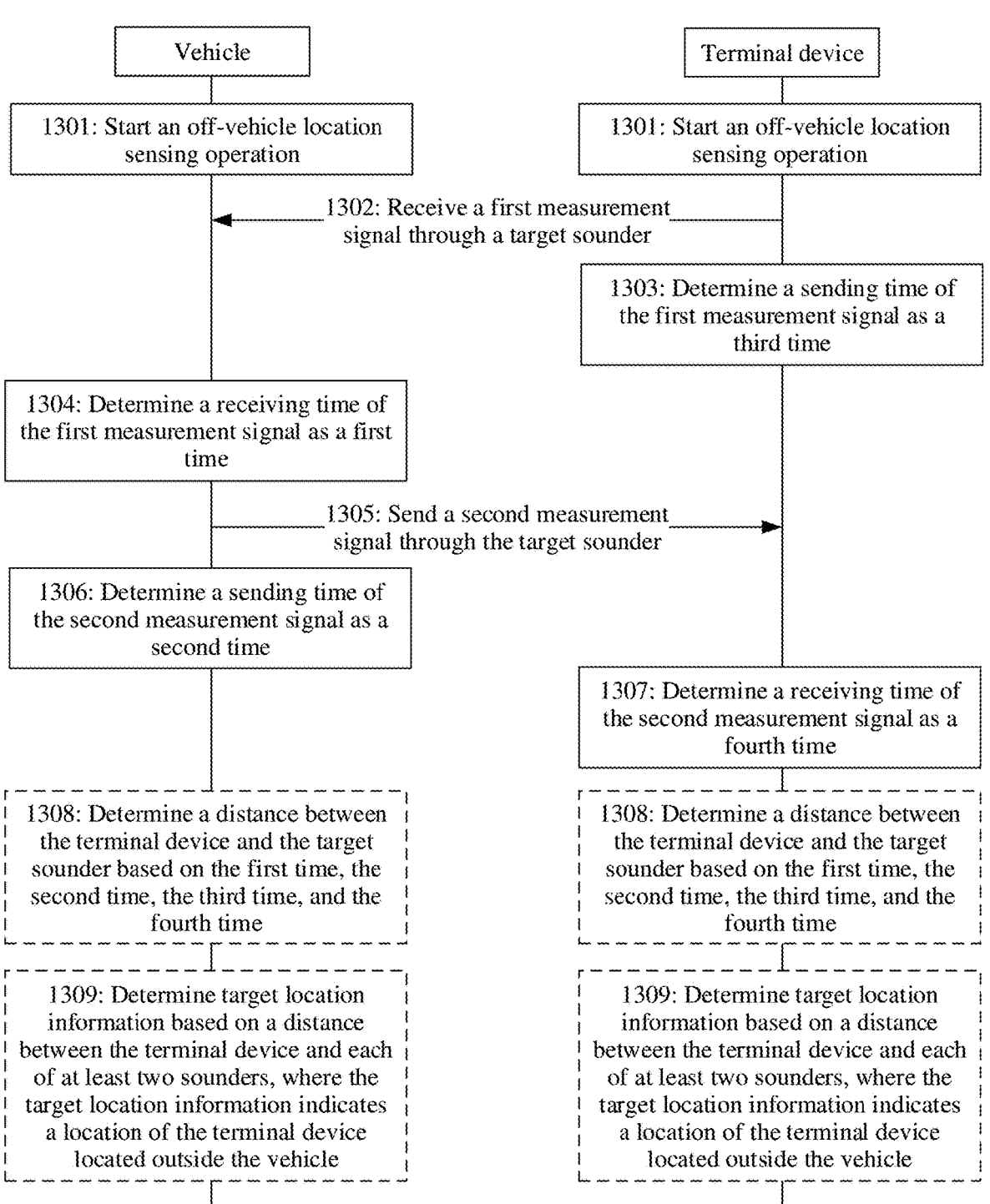
FIG. 9 is a schematic flowchart of a location obtaining method according to an embodiment of this application.

Specifically, FIG. 9 is a schematic flowchart of a location obtaining method according to an embodiment of this application. The location obtaining method provided in this embodiment of this application may include the following steps.

1301: A vehicle and a terminal device start an off-vehicle location sensing operation.

1302: The vehicle receives, through a target sounder, a first measurement signal sent by the terminal device.

1303: The terminal device determines a sending time of the first measurement signal as a third time.

1304: The vehicle determines a receiving time of the first measurement signal as a first time.

1305: The vehicle sends a second measurement signal to the terminal device through the target sounder.

1306: The vehicle determines a sending time of the second measurement signal as a second time.

1307: The terminal device determines a receiving time of the second measurement signal as a fourth time.

1308: The vehicle or the terminal device determines a distance between the terminal device and the target sounder based on the first time, the second time, the third time, and the fourth time.

1309: The vehicle or the terminal device determines target location information based on a distance between the terminal device and each of the at least two sounders. The target location information indicates a location of the terminal device located outside the vehicle.

In this embodiment of this application, a specific implementation principle of steps 1301 to 1309 is consistent with that of steps 1001 to 1009 in the embodiment corresponding to FIG. 6. Specific implementations of steps 1301 to 1309 are similar to those of steps 1001 to 1009 in the embodiment corresponding to FIG. 6. A difference lies in that "the location of the terminal device located inside the vehicle" is measured in the embodiment corresponding to FIG. 6, and "the location of the terminal device located outside the vehicle" is measured in the embodiment corresponding to FIG. 9. For description of locations outside the vehicle, refer to the description in FIG. 9. Details of the specific implementations of steps 1301 to 1309 are not described herein one by one.

5. Application scenarios based on the specific location of the terminal device are provided.

Optionally, in an application scenario, the target location information of the terminal device located inside the vehicle is used to determine control permission of the terminal device for the vehicle. Terminal devices at different locations have different control permission for the vehicle.

For example, control permission of a terminal device at a front passenger location for the vehicle may include: adjusting a seat angle for a front passenger, adjusting a temperature of an air conditioner, adjusting volume at a headrest at the front passenger location, and adjusting brightness of a front-row light. Optionally, a resident terminal device at the front passenger location may further switch music. Control permission of a terminal device at a right-side location in a rear row for the vehicle may include: adjusting a temperature at a rear-row seat, adjusting brightness of a rear-row light, and adjusting volume at a headrest at the right-side location in the rear row. It should be understood that the example herein is merely for ease of understanding of this solution.

Figure 10A:
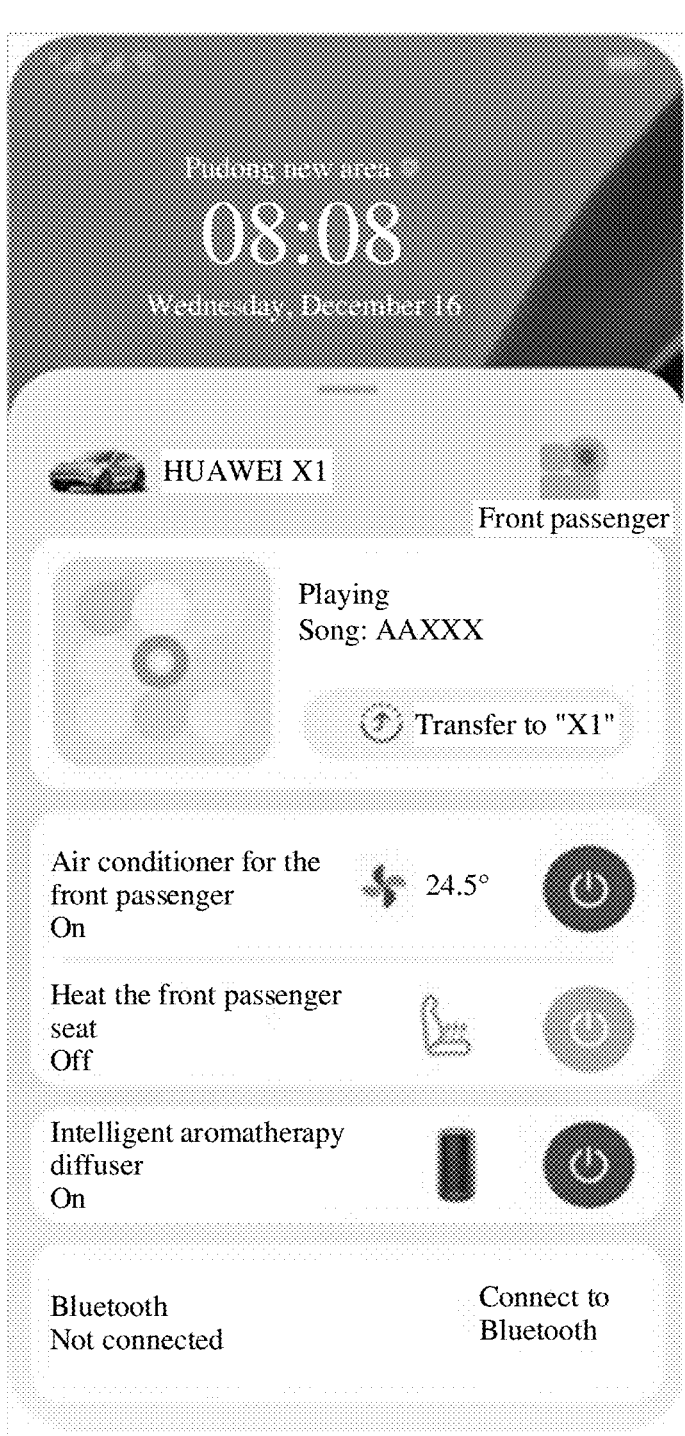
FIG. 10(a) and FIG. 10(b) are a schematic diagram of control permission of terminal devices at different locations in a location obtaining method according to an embodiment of this application.
Figure 10B:
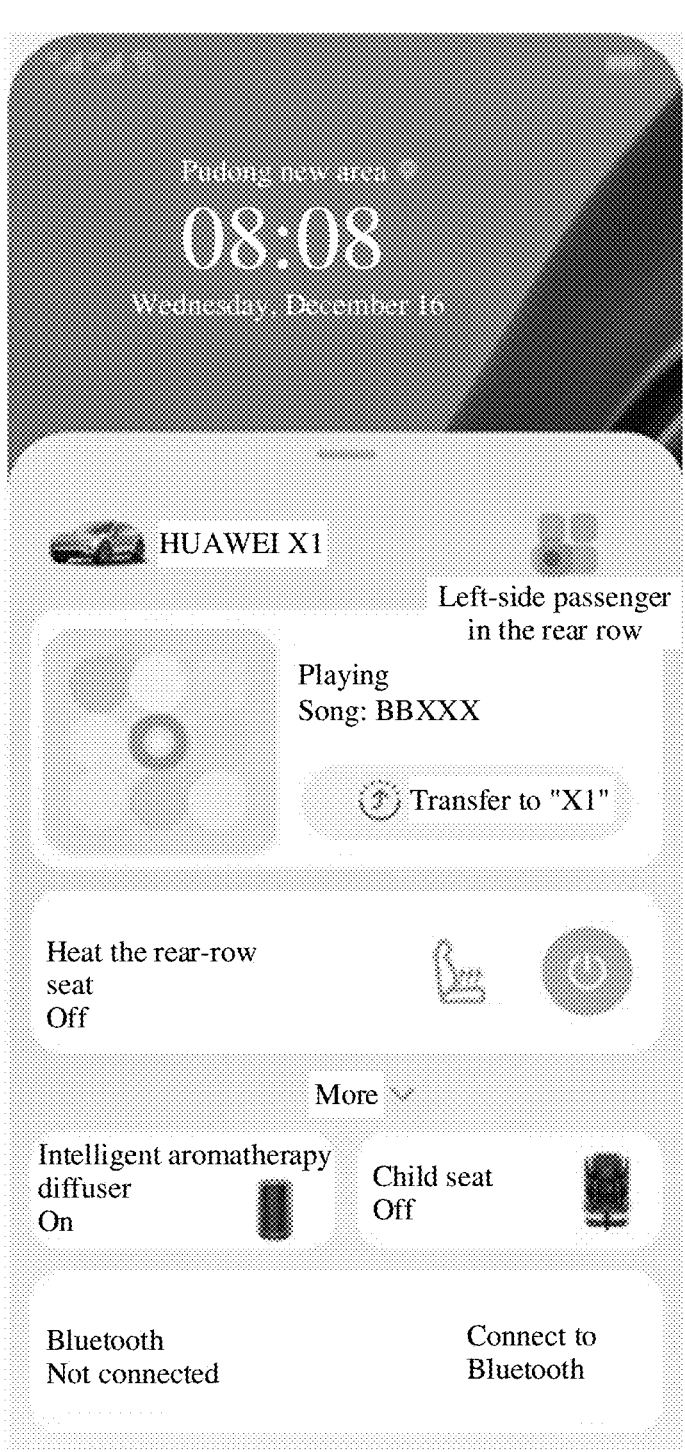

For more intuitive understanding of this solution, refer to FIG. 10(a) and FIG. 10(b). FIG. 10(a) and FIG. 10(b) are a schematic diagram of control permission of terminal devices at different locations in a location obtaining method according to an embodiment of this application. FIG. 10(a) and FIG. 10(b) include two schematic sub-diagrams (a) and (b). The schematic sub-diagram FIG. 10(a) shows control permission of a terminal device at a front passenger location for a vehicle. The schematic sub-diagram FIG. 10(b) shows control permission of a terminal device at a left-side location in a rear row for the vehicle. As shown in FIG. 10(a) and FIG. 10(b), functions supported by the terminal device at the front passenger location may include: switching music, turning on an air conditioner and adjusting a temperature at the front passenger location, adjusting a heating temperature at a front passenger seat, and turning on or off an intelligent aromatherapy diffuser. Functions supported by a terminal device at a right-side location in the rear row may include: switching music, adjusting a heating temperature at a rear-row seat, and turning on or off an intelligent aromatherapy diffuser. This is not enumerated herein. In other words, terminal devices at different locations inside the vehicle have different control permission for the vehicle. It should be understood that the example herein is merely for ease of understanding of this solution, and is not intended to limit this solution.

Specifically, after obtaining target location information of a target terminal device (that is, any terminal device inside the vehicle), the target terminal device inside the vehicle may send the target location information of the target terminal device to the vehicle, and the vehicle may send, to the target terminal device, permission information corresponding to a location of the target terminal device inside the vehicle. After receiving the permission information, the target terminal device may output prompt information. The prompt information is used to remind an operator of the target terminal device of control permission for the vehicle. A specific used message of the prompt information may be determined with reference to an actual product, and is not limited herein.

Figure 11A:
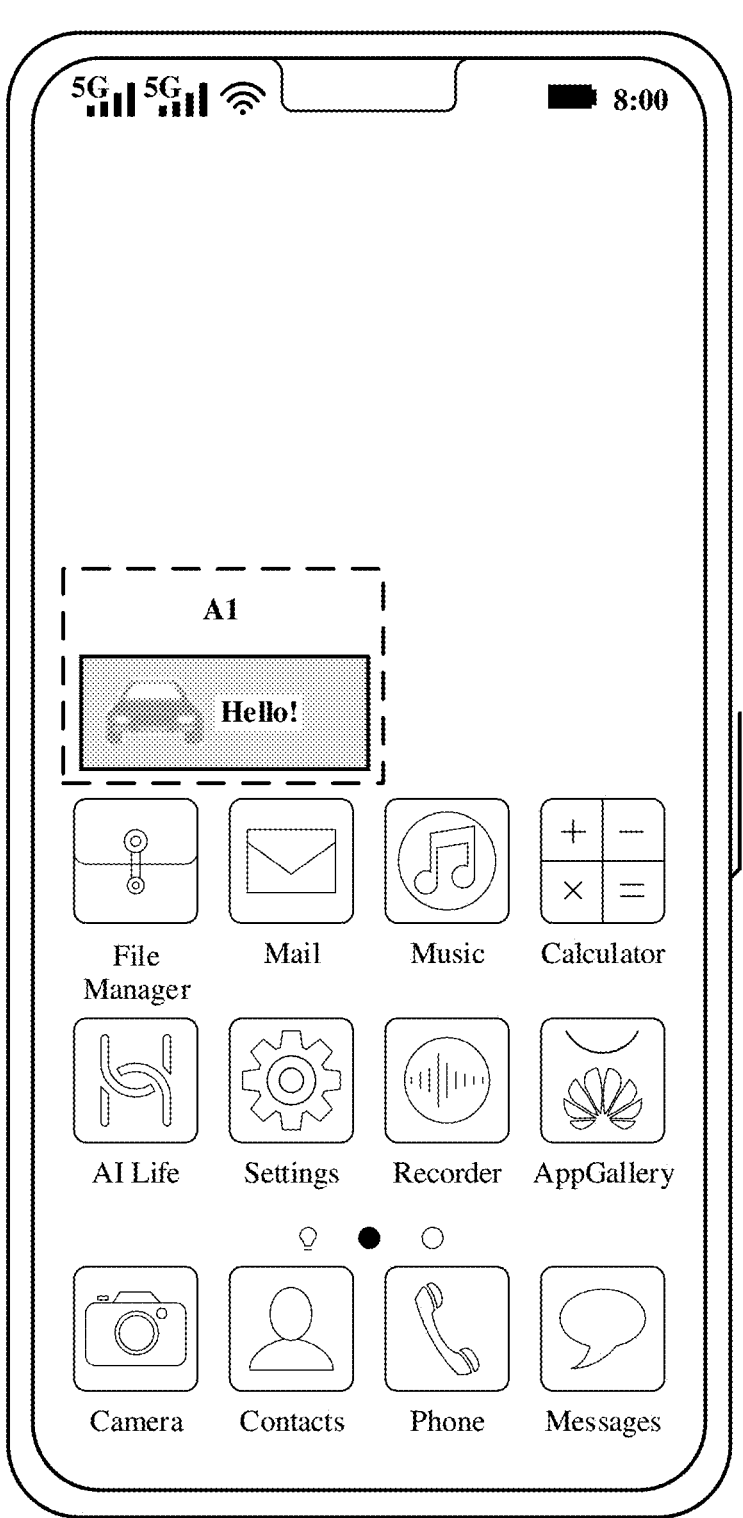
FIG. 11(a) and FIG. 11(b) are a schematic diagram of control permission of terminal devices at different locations in a location obtaining method according to an embodiment of this application.
Figure 11B:
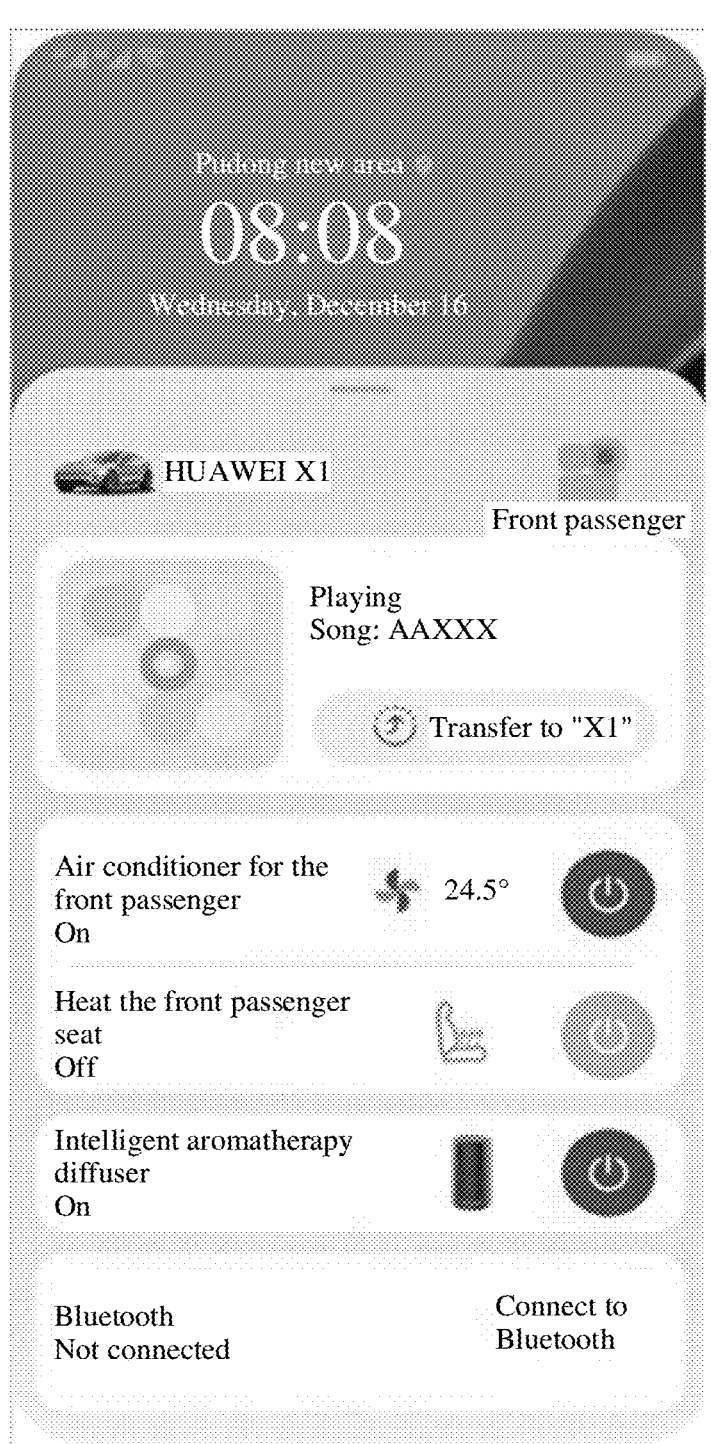

For more intuitive understanding of this solution, refer to FIG. 11(*a*) and FIG. 11(*b*). FIG. 11(*a*) and FIG. 11(*b*) are a schematic diagram of control permission of terminal devices at different locations in a location obtaining method according to an embodiment of this application. FIG. 11(*a*) and FIG. 11(*b*) include two schematic sub-diagrams (a) and (b). The schematic sub-diagram FIG. 11(*b*) needs to be understood with reference to the foregoing description of the schematic sub-diagram FIG. 10(*a*). Herein, A1 in the schematic sub-diagram FIG. 11(*a*) represents prompt information output by a target terminal device. When a user taps A1, the schematic sub-diagram FIG. 11(*b*) is triggered, so that the user can control the vehicle through the schematic sub-diagram FIG. 11(*b*). It should be noted that, in another implementation, on an interface shown in the schematic sub-diagram FIG. 11(*a*), the user may hold the terminal device to perform a preset operation. Correspondingly, when the terminal device detects, by using a built-in inertial measurement unit (inertial measurement unit, IMU), that a moving track of the terminal device is a preset track, the schematic sub-diagram FIG. 11(*b*) may be triggered. The preset operation may be a shake operation, another operation, or the like. Specifically, a manner of entering the schematic sub-diagram FIG. 11(*b*) through the schematic sub-diagram FIG. 11(*a*) may be flexibly set based on an actual product form. The example herein is merely an example for ease of understanding of this solution, and is not intended to limit this solution.

In another application scenario, the target location information indicates whether the terminal device is at a primary driver location of the vehicle. Specifically, after obtaining the target location information of the target terminal device (that is, any terminal device inside the vehicle), the target terminal device inside the vehicle may send the target location information of the target terminal device to the vehicle, so that the vehicle can learn of an in-vehicle location of each terminal device inside the vehicle, that is, the vehicle can learn of which terminal device inside the vehicle is a terminal device at the primary driver location.

Optionally, the vehicle may cast screen content of the terminal device at the primary driver location to a central control screen of the vehicle. Further, when the screen content of the terminal device at the primary driver location is cast to the central control screen of the vehicle, content displayed on the central control screen of the vehicle may not be completely the same as the screen content of the terminal device, and the content displayed on the central control screen may be an application that has been configured in the vehicle and a plurality of applications in the terminal device. In other words, when the vehicle is not connected to the terminal device at the primary driver location, the vehicle has a user interface (user interface, UI) of itself. After the vehicle is connected to the terminal device at the primary driver location, icons of applications on the UI interface of the vehicle may increase, or functions of the vehicle may increase, while the UI interface of the vehicle does not change greatly.

It should be noted that the terminal device can perform the screen casting operation only after being paired with the vehicle.

For more intuitive understanding of this solution, refer to FIG. 12(*a*) and FIG. 12(*b*), and FIG. 13. FIG. 12(*a*) and FIG. 12(*b*) are a schematic diagram of screen casting performed by a terminal device at a primary driver location in a location obtaining method according to an embodiment of this application. FIG. 12(*a*) and FIG. 12(*b*) include two schematic sub-diagrams (a) and (b). First, with reference to the schematic sub-diagram FIG. 12(*a*), if a terminal device at a primary driver location has never been paired with a vehicle, the vehicle sends query information to the terminal device, and the terminal device may output the query information. The query information is used to query whether to be connected to the vehicle (that is, paired with the vehicle). In the schematic sub-diagram FIG. 12(*a*), an example in which the query information is output in a form of a voice and a text box is used. If a user indicates, in a voice form, the terminal device to connect to the vehicle, a schematic sub-diagram FIG. 12(*b*) is triggered. Then, with reference to the schematic sub-diagram FIG. 12(*b*), the schematic sub-diagram FIG. 12(*b*) is a schematic diagram of a terminal device side and a vehicle side when the terminal device is connected to the vehicle. It should be understood that a specific schematic diagram when the terminal device is connected to the vehicle should be flexibly set with reference to an example application product. The example in FIG. 12(*a*) and FIG. 12(*b*) is merely an example for ease of understanding of this solution, and is not intended to limit this solution.

Further, if the terminal device at the primary driver location of and a terminal device at a front passenger location exchange locations, the vehicle determines whether the updated terminal device at the primary driver location has been paired with the vehicle; and if a result of determining is yes, casts screen content of the updated terminal device to a central control screen of the vehicle; or if a result of determining is no, sends a pairing request to the updated terminal device, so that the central control screen of the vehicle always displays screen content of a terminal device at the primary driver location.

For more intuitive understanding of this solution, refer to FIG. 13. FIG. 13 is a schematic diagram of screen casting performed by a terminal device at a primary driver location in a location obtaining method according to an embodiment of this application. FIG. 13 includes two schematic sub-diagrams: a left schematic sub-diagram and a right schematic sub-diagram. First, with reference to the left schematic sub-diagram of FIG. 13, B1 is displayed on a screen of a terminal device at a primary driver location, and B2 is displayed on a screen of a terminal device at a front passenger location. When B1 is displayed on a screen of a vehicle, it indicates that the terminal device (that is, the terminal device corresponding to B1) at the primary driver location is performing screen casting through a central control screen of the vehicle.

With reference to the right schematic sub-diagram of FIG. 13, B2 is displayed on a screen of a terminal device at a primary driver location, and B1 is displayed on a screen of a terminal device at a front passenger location. When B2 is displayed on a screen of a vehicle, it indicates that the terminal device (that is, the terminal device corresponding to B2) at the primary driver location is performing screen casting through a central control screen of the vehicle. It should be understood that the example herein is merely for ease of understanding of this solution, and is not intended to limit this solution.

In another application scenario, when the terminal device is connected to the vehicle, the target location information is used by the vehicle to determine an in-vehicle device closest to the terminal device. Further, for example, when the terminal device needs to perform a screen casting operation through the vehicle, the target location information is used for determining a screen closest to the terminal device. For another example, when the terminal device is a wireless headset, the target location information is used for determining a screen closest to the wireless headset. Optionally, the target location information is used for establishing a communication connection between the wireless headset and the closest screen.

In this embodiment of this application, a plurality of application scenarios of the target location information is provided, thereby improving implementation flexibility of this solution.

Figure 14A:
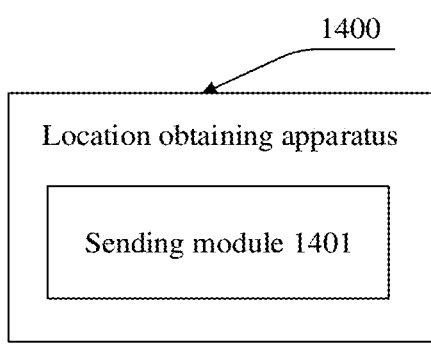
FIG. 14a is a schematic diagram of a structure of a location obtaining apparatus according to an embodiment of this application.

Based on the embodiments corresponding to FIG. 1a to FIG. 13, to better implement the foregoing solutions in the embodiments of this application, the following further provides related devices configured to implement the foregoing solutions. Specifically, FIG. 14a is a schematic diagram of a structure of a location obtaining apparatus according to an embodiment of this application. The location obtaining apparatus 1400 is used in a vehicle. The vehicle is included in a location obtaining system. The location obtaining system further includes a terminal device. The vehicle is configured with at least two sounders. The at least two sounders include a first sounder and a second sounder. The first sounder and the second sounder are located on two sides of the vehicle. The location obtaining apparatus 1400 includes a sending module 1401 configured to send a first ultrasonic signal through the first sounder. The first ultrasonic signal is used by the terminal device to determine a receiving time of the first ultrasonic signal. The receiving time of the first ultrasonic signal is a time at which the terminal device receives the first ultrasonic signal. The sending module 1401 is further configured to send a second ultrasonic signal through the second sounder. The second ultrasonic signal is used by the terminal device to determine a receiving time of the second ultrasonic signal. The receiving time of the second ultrasonic signal is a time at which the terminal device receives the second ultrasonic signal. The receiving time of the first ultrasonic signal and the receiving time of the second ultrasonic signal are used for determining target location information. The target location information indicates a location of the terminal device relative to the vehicle.

In a possible design, the sending module 1401 is specifically configured to send the second ultrasonic signal through the second sounder when sending the first ultrasonic signal through the first sounder. The first ultrasonic signal and the second ultrasonic signal are different ultrasonic signals. A sequence in which the first ultrasonic signal and the second ultrasonic signal arrive at the terminal device is used for determining the target location information.

In a possible design, the sending module 1401 is specifically configured to: first send the first ultrasonic signal through the first sounder; and send the second ultrasonic signal through the second sounder after a preset time interval. The receiving time of the first ultrasonic signal, the receiving time of the second ultrasonic signal, and the preset time interval are used for determining the target location information.

In a possible design, the at least two sounders include at least three sounders, and the at least three sounders are not located on one straight line.

In a possible design, the at least three sounders include four sounders, and the four sounders are respectively at a front left location, a front right location, a rear left location, and a rear right location of the vehicle.

In a possible design, the target location information indicates a location of the terminal device located inside the vehicle; or the target location information indicates a location of the terminal device located outside the vehicle.

In a possible design, the location inside the vehicle is a left-side location inside the vehicle or a right-side location inside the vehicle. Alternatively, the location inside the vehicle is a front-side location inside the vehicle or a rear-side location inside the vehicle. Alternatively, the location inside the vehicle is any one of a primary driver location, a front passenger location, a left-side location in a rear row, a right-side location in the rear row, or a middle location in the rear row inside the vehicle. Alternatively, there are a total of N locations inside the vehicle, and the location inside the vehicle is one of the N locations, where N is an integer greater than 5.

In a possible design, the target location information is used for determining control permission of the terminal device for the vehicle, and terminal devices at different locations have different control permission for the vehicle; or the target location information indicates whether the terminal device is at the primary driver location of the vehicle; or when the terminal device is connected to the vehicle, the target location information is used by the vehicle to determine an in-vehicle device closest to the terminal device.

Figure 14B:
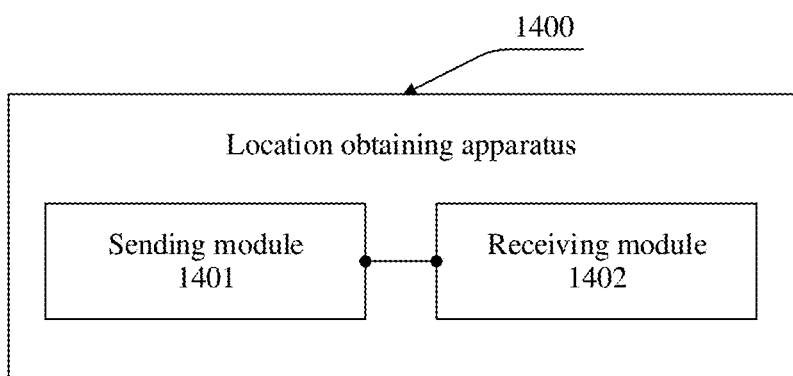
FIG. 14b is a schematic diagram of another structure of a location obtaining apparatus according to an embodiment of this application.

In a possible design, FIG. 14b is a schematic diagram of another structure of a location obtaining apparatus according to an embodiment of this application. The sending module 1401 is further configured to send first indication information to the terminal device when the vehicle starts a location sensing operation. The first indication information indicates the terminal device to start the location sensing operation. The location sensing operation is an operation used to obtain target location information. The location obtaining apparatus 1400 further includes a receiving module 1402 configured to receive a first feedback message sent by the terminal device. The first feedback message indicates the vehicle to send the first ultrasonic signal and the second ultrasonic signal. Alternatively, the receiving module 1402 is further configured to: receive second indication information sent by the terminal device, and start the location sensing operation in response to the received second indication information. The sending module 1401 is further configured to send a second feedback message to the terminal device. The second feedback message indicates the terminal device to receive the first ultrasonic signal and the second ultrasonic signal.

It should be noted that content such as information exchange or an execution process between modules/units in the location obtaining apparatus 1400 is based on a same concept as the method embodiments corresponding to FIG. 3 and FIG. 8a in this application. For specific content, refer to the description in the foregoing method embodiments of this application. Details are not described herein again.

Figure 15:
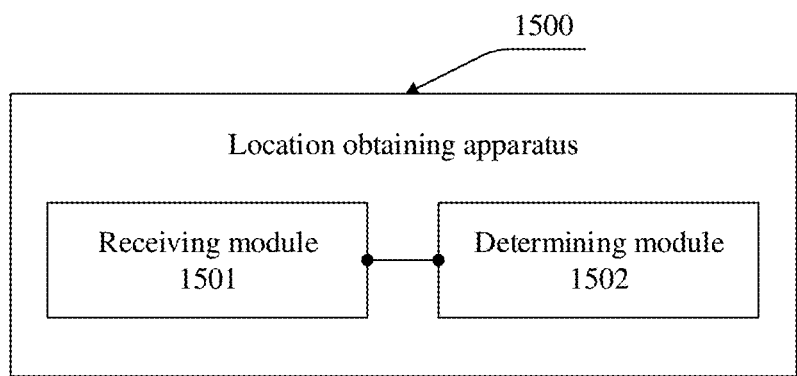
FIG. 15 is a schematic diagram of another structure of a location obtaining apparatus according to an embodiment of this application.

An embodiment of this application further provides another location obtaining apparatus. FIG. 15 is a schematic diagram of another structure of a location obtaining apparatus according to an embodiment of this application. The location obtaining apparatus 1500 is used in a terminal device. The terminal device is included in a location obtaining system. The location obtaining system further includes a vehicle. The vehicle is configured with at least two sounders. The at least two sounders include a first sounder and a second sounder. The first sounder and the second sounder are located on two different sides of the vehicle. The location obtaining apparatus 1500 includes: a receiving module 1501, configured to receive a first ultrasonic signal sent by the first sounder, where the receiving module 1501 is further configured to receive a second ultrasonic signal sent by the second sounder; and a determining module 1502, configured to determine target location information based on a receiving time of the first ultrasonic signal and a receiving time of the second ultrasonic signal. The target location information indicates a location of the terminal device relative to the vehicle.

In a possible design, the determining module 1502 is specifically configured to: when the first ultrasonic signal and the second ultrasonic signal are simultaneously sent, determine, based on the receiving time of the first ultrasonic signal and the receiving time of the second ultrasonic signal, a sequence in which the first ultrasonic signal and the second ultrasonic signal arrive at the terminal device; and determine the target location information based on the sequence in which the first ultrasonic signal and the second ultrasonic signal arrive at the terminal device.

In a possible design, the determining module 1502 is specifically configured to determine the target location information based on the receiving time of the first ultrasonic signal, the receiving time of the second ultrasonic signal, and a preset time interval. The preset time interval is a sending time interval between two adjacent ultrasonic signals.

In a possible design, the at least two sounders include at least three sounders, and the at least three sounders are not located on one straight line.

It should be noted that content such as information exchange or an execution process between modules/units in the location obtaining apparatus 1500 is based on a same concept as the method embodiments corresponding to FIG. 3 and FIG. 8*a* in this application. For specific content, refer to the description in the foregoing method embodiments of this application. Details are not described herein again.

Figure 16:
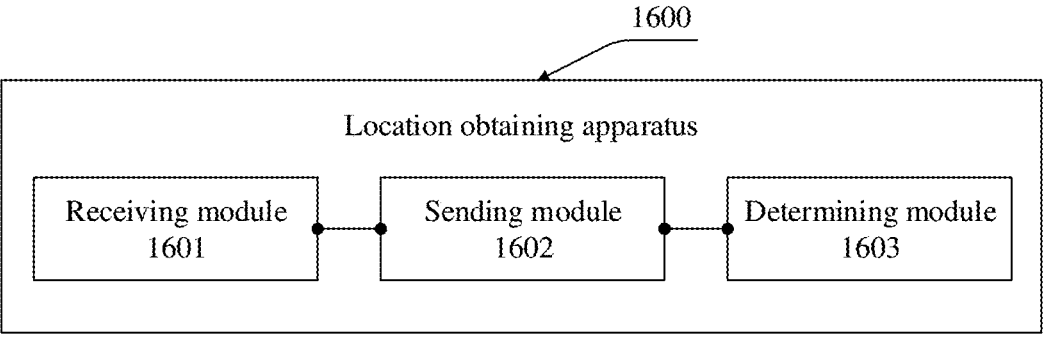
FIG. 16 is a schematic diagram of another structure of a location obtaining apparatus according to an embodiment of this application.

An embodiment of this application further provides another location obtaining apparatus. FIG. 16 is a schematic diagram of another structure of a location obtaining apparatus according to an embodiment of this application. The location obtaining apparatus 1600 is used in a vehicle. The vehicle is included in a location obtaining system. The location obtaining system further includes a terminal device. The vehicle is configured with at least two sounders. The at least two sounders are configured on two sides of the vehicle. A target sounder is any one of the at least two sounders. The location obtaining apparatus 1600 includes: a receiving module 1601, configured to: receive, through the target sounder, a first measurement signal sent by the terminal device, and determine, as a first time, a receiving time of the first measurement signal; a sending module 1602, configured to: send a second measurement signal to the terminal device through the target sounder, and determine, as a second time, a sending time of the second measurement signal, where both the first measurement signal and the second measurement signal are ultrasonic signals; and a determining module 1603, configured to determine a distance between the terminal device and the target sounder based on the first time, the second time, a third time, and a fourth time, where the third time is a time at which the terminal device sends the first measurement signal, and the fourth time is a time at which the terminal device receives the second measurement signal. The determining module 1603 is further configured to determine target location information based on a distance between the terminal device and each of the at least two sounders. The target location information indicates a location of the terminal device relative to the vehicle.

In a possible design, the at least two sounders include at least three sounders, and the at least three sounders are not located on one straight line.

In a possible design, the target location information indicates a location of the terminal device located inside the vehicle; or the target location information indicates a location of the terminal device located outside the vehicle.

It should be noted that content such as information exchange or an execution process between modules/units in the location obtaining apparatus 1600 is based on a same concept as the method embodiments corresponding to FIG. 6 and FIG. 9 in this application. For specific content, refer to the description in the foregoing method embodiments of this application. Details are not described herein again.

Figure 17:
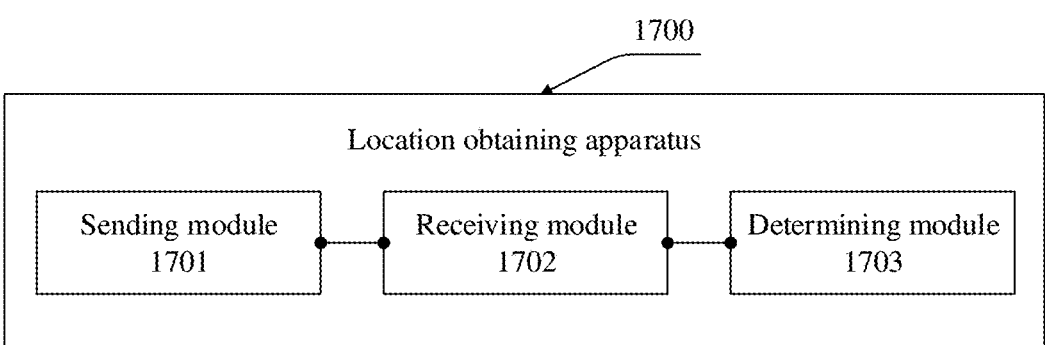
FIG. 17 is a schematic diagram of another structure of a location obtaining apparatus according to an embodiment of this application.

An embodiment of this application further provides another location obtaining apparatus. FIG. 17 is a schematic diagram of another structure of a location obtaining apparatus according to an embodiment of this application. The location obtaining apparatus 1700 is used in a terminal device. The terminal device is included in a location obtaining system. The location obtaining system further includes a vehicle. The vehicle is configured with at least two sounders. The at least two sounders are configured at different locations of the vehicle. A target sounder is any one of the at least two sounders. The location obtaining apparatus 1700 includes: a sending module 1701, configured to: send a first measurement signal to the target sounder, and determine a sending time of the first measurement signal as a third time; a receiving module 1702, configured to: receive a second measurement signal sent by the target sounder, and determine a receiving time of the second measurement signal as a fourth time, where both the first measurement signal and the second measurement signal are ultrasonic signals; and a determining module 1703, configured to determine a distance between the terminal device and the target sounder based on a first time, a second time, the third time, and the fourth time, where the first time is a time at which the vehicle receives the first measurement signal, and the second time is a time at which the vehicle sends the second measurement signal. The determining module 1703 is further configured to determine target location information based on a distance between the terminal device and each of the at least two sounders. The target location information indicates a location of the terminal device relative to the vehicle.

In a possible design, the target location information indicates a location of the terminal device located inside the vehicle; or the target location information indicates a location of the terminal device located outside the vehicle.

It should be noted that content such as information exchange or an execution process between modules/units in the location obtaining apparatus 1700 is based on a same concept as the method embodiments corresponding to FIG. 6 and FIG. 9 in this application. For specific content, refer to the description in the foregoing method embodiments of this application. Details are not described herein again.

With reference to Embodiment 2, some embodiments provided in Embodiment 2 in embodiments of this application are used for detecting whether the terminal device is located inside the vehicle or outside the vehicle, and the other embodiments are used for detecting a specific location of the terminal device located outside the vehicle.

Embodiment 2

Figure 18:
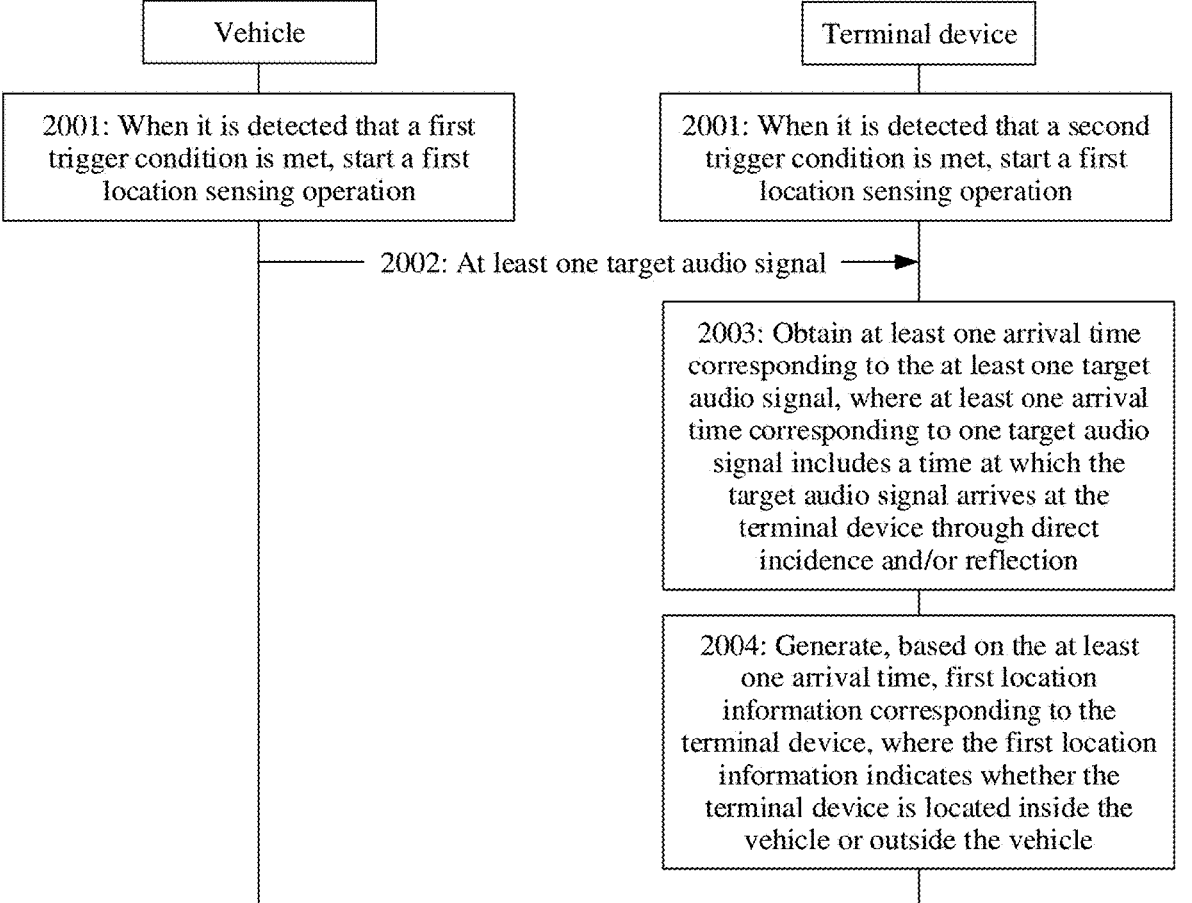
FIG. 18 is a schematic flowchart of a location obtaining method according to an embodiment of this application.

Specifically, in embodiments of this application, FIG. 18 is a schematic flowchart of a location obtaining method according to an embodiment of this application. The location obtaining method provided in this embodiment of this application may include the following steps.

2001: When a vehicle detects that a first trigger condition is met and/or a terminal device detects that a second trigger condition is met, the vehicle and the terminal device start a first location sensing operation.

In this embodiment of this application, in some application scenarios, when detecting that the first trigger condition is met, the vehicle starts the first location sensing operation, and sends indication information to the terminal device. The indication information indicates the terminal device to start the first location sensing operation. The first location sensing operation is used to measure whether the terminal device is located inside the vehicle or outside the vehicle. It should be noted that steps performed by the vehicle in Embodiment 2 may be specifically performed by a processor in the vehicle, or may be performed by a vehicle auxiliary device in the vehicle. This is specifically determined with reference to an actual product form. Details are not described subsequently.

When the vehicle detects any one or more of the following cases, it is considered that it is detected that the first trigger condition is met: that the vehicle detects that the vehicle is parked; or that the vehicle detects that a distance between the terminal device and the vehicle meets a first distance condition; or that the vehicle obtains a first instruction, where the first instruction is used to trigger the vehicle to obtain first location information.

In this embodiment of this application, a plurality of specific representation forms of the first trigger condition are provided, thereby extending an application scenario of this solution and improving implementation flexibility of this solution.

A scenario in which the vehicle detects that the vehicle is parked is as follows. Specifically, various types of inertial measurement units may be configured on the vehicle auxiliary device in the vehicle. In this way, the vehicle auxiliary device can measure a velocity of the vehicle by using a GPS or another sensor, measure acceleration of the vehicle by using an accelerometer, and measure an angular velocity of the vehicle by using a gyroscope. The vehicle auxiliary device in the vehicle inputs the velocity, the acceleration, and the angular velocity of the vehicle into a classification model, to obtain predicted category information output by the classification model.

The classification model is a model on which a training operation has been performed. The classification model may be specifically represented as a neural network, or may be represented as a non-neural network model. For example, the classification model may be specifically represented as a decision tree, a random forest, an extremely randomized tree, a support vector machine, a k-nearest neighbor (KNN) model, a logistic regression model, another type of classification model, or the like. This is not enumerated herein. The predicted category information indicates whether the vehicle is in a stopped state or a moving state. In an implementation, the predicted category information output by the classification model may include a first probability value and a second probability value. The first probability value indicates a probability that the vehicle is in the stopped state. The second probability value indicates a probability that the vehicle is in the moving state. For example, the predicted category information includes 0.3 (that is, the first probability value) and 0.7 (that is, the second probability value). Herein, 0.3 indicates that the probability that the vehicle is in the stopped state is 0.3, and 0.7 indicates that the probability that the vehicle is in the moving state is 0.7. In this case, the predicted category information indicates that the vehicle is in the moving state. In another implementation, the predicted category information output by the classification model may be a first value or a second value. When the predicted category information output by the classification model is the first value, it indicates that the vehicle is in a stopped state. When the predicted category information output by the classification model is the second value, it indicates that the vehicle is in a moving state. For example, the first value is 0, and the second value is 1. The example herein is merely for ease of understanding, and is not intended to limit this solution.

In this embodiment of this application, the velocity, the acceleration, and the angular velocity of the vehicle are input into the classification model, to determine by using the classification model whether the vehicle is in the stopped state or the moving state. In this way, obtaining a status of the vehicle from a control system of the vehicle is avoided, and independence of the control system of the vehicle in a process of measuring target location information of the terminal device is ensured, thereby improving safety in a running process of the vehicle.

A scenario in which the vehicle detects a distance between the terminal device and the vehicle is as follows. Specifically, in an implementation, Bluetooth may be configured on both the vehicle and the terminal device. The vehicle may send a Bluetooth signal in a broadcast manner. After receiving the Bluetooth signal sent by the vehicle, the terminal device may calculate the actual distance between the terminal device and the vehicle. In another implementation, alternatively, the terminal device may send a Bluetooth signal to the outside. After receiving the Bluetooth signal sent by the terminal device, the vehicle calculates the actual distance between the terminal device and the vehicle. In another implementation, alternatively, the vehicle and the terminal device may calculate the actual distance between the terminal device and the vehicle by using a wireless communication technology (Wi-Fi). Manners of obtaining the actual distance between the vehicle and the terminal device are not enumerated herein.

The vehicle determines whether the distance between the terminal device and the vehicle meets the first distance condition. The first distance condition may be whether the distance between the terminal device and the vehicle is less than a preset distance. A value of the preset distance may be 5 meters, 3 meters, 2 meters, 1 meter, another value, or the like. This is not limited herein. Alternatively, the first distance condition may be that the distance between the terminal device and the vehicle gradually decreases until a preset distance is met, or the like.

A scenario in which the vehicle obtains the first instruction is as follows. Specifically, in some implementations, a user may interact with the vehicle by using the vehicle auxiliary device and/or an on-board computer. When the vehicle obtains a preset operation input by the user, the vehicle may be triggered to generate the first instruction. The preset operation includes but is not limited to a request operation for obtaining a list of terminal devices inside the vehicle, a request operation for switching a terminal device connected to the vehicle, another type of operation, or the like.

In some other implementations, the vehicle may receive indication information sent by the terminal device. The indication information is used to request to obtain first location information of the terminal device. The vehicle generates the first instruction in response to the received indication information.

It should be noted that, when the vehicle detects another event, it may also be considered that the first trigger condition is triggered. Specifically, a specific event included in the first trigger condition needs to be flexibly set with reference to an actual application scenario. This is not limited herein.

In some other application scenarios, when detecting that the second trigger condition is met, the terminal device starts the first location sensing operation and sends indication information to the vehicle. The indication information indicates the vehicle to start the first location sensing operation. The first location sensing operation is used to measure whether the terminal device is located inside the vehicle or outside the vehicle.

When the terminal device detects any one or more of the following cases, it is considered that the second trigger condition is met: that the terminal device detects that the vehicle is parked; or that the terminal device detects that the distance between the terminal device and the vehicle meets the first distance condition; or that the terminal device detects that a displacement of the terminal device meets a preset displacement; or that the terminal device obtains a second instruction, where the second instruction is used to trigger the terminal device to obtain the first location information.

A scenario in which the terminal device detects that the vehicle is parked is as follows. Specifically, a classification model may be preconfigured on the terminal device. After obtaining the velocity, the acceleration, and the angular velocity of the vehicle, the vehicle may send the velocity, the acceleration, and the angular velocity of the vehicle to the terminal device. The terminal device inputs the velocity, the acceleration, and the angular velocity of the vehicle into the classification model, to obtain predicted category information output by the classification model. For specific meanings of the classification model and the predicted category information, refer to the foregoing description. Details are not described herein again.

For the scenario in which the terminal device detects the distance between the terminal device and the vehicle, a specific implementation of the terminal device is similar to a specific implementation of the scenario in which the vehicle detects the distance between the terminal device and the vehicle. Refer to the foregoing description. Details are not described herein again.

A scenario in which the terminal device detects that the displacement of the terminal device meets the preset displacement is as follows. Specifically, at least one type of IMU may be preconfigured on the terminal device. The terminal device may obtain a displacement of the terminal device in a horizontal direction and/or a vertical direction by using the IMU, determine whether the displacement of the terminal device in the horizontal direction and/or the vertical direction meets the preset displacement, and if a result of determining is yes, determine that the second trigger condition is met.

The preset displacement may be that the displacement of the terminal device in the horizontal direction is greater than or equal to a preset threshold; or the preset displacement may be that the displacement of the terminal device in the vertical direction is greater than or equal to a preset threshold; or the preset displacement may include that the displacement of the terminal device in the horizontal direction is greater than or equal to a preset threshold, and the displacement of the terminal device in the vertical direction is greater than or equal to a preset threshold. When it is detected that the displacement of the terminal device meets the preset displacement, it indicates that it is detected that an event of getting on/off the vehicle may occur for the terminal device. A specific setting of the preset displacement may be flexibly determined according to an actual situation. This is not specifically limited herein.

A scenario in which the vehicle obtains the second instruction is as follows. Specifically, the terminal device may receive indication information sent by He Liang. The indication information is used to request the first location information of the terminal device. The vehicle generates the second instruction in response to the received indication information. The terminal device may further obtain the second instruction in another scenario. This is not enumerated herein.

It should be noted that, when the terminal device detects another event, it may also be considered that the second trigger condition is triggered. Specifically, a specific event included in the second trigger condition needs to be flexibly set with reference to an actual application scenario. This is not limited herein.

2002: The vehicle sends at least one target audio signal to the terminal device.

In this embodiment of this application, after both the vehicle and the terminal device start the first location sensing operation, the vehicle may send the at least one target audio signal to the terminal device through a sounder. The target audio signal may be an ultrasonic signal. A frequency band on which the ultrasonic signal is located may be from 17 kHz to 48 kHz. Optionally, the frequency band on which the target audio signal is located may be from 17 kHz to 22 kHz. A specific frequency of the target audio signal may be determined with reference to an actual application product. This is not limited herein. For example, the target audio signal may be a linear frequency modulation (Chirp) signal, a ZC (Zadoff-Chu) sequence signal, or another type of audio signal. This is not enumerated herein.

Further, a formula of the Chirp signal in time domain is specifically $$x(t) = \sin\left[\phi_0 + 2\pi\left(\frac{c}{2}t^2 + f_0 t\right)\right],$$

where $\phi_0$ is an initial phase difference, $f_0$ is an initial frequency, and c is a constant.

A formula of the ZC sequence signal in time domain is specifically $$x_u(n) = \exp\left(-j\frac{\pi u n(n + c_f + 2q)}{N_{ZC}}\right),$$

where j is an imaginary number (imaginary), and a square of j is equal to −1; and $0 < u < N_{ZC}$, $\gcd(N_{zc}, u) = 1$, $c_f = N_{ZC} \bmod 2$, $N_{ZC}$ is a signal length of the ZC sequence signal, and a value of q is an integer.

The sounder may be a sounder configured at any location inside the vehicle, for example, a sounder at an upper left corner, an upper right corner, a lower left corner, a lower right corner, or another location. Optionally, if the vehicle is configured with the vehicle auxiliary device, the sounder may be alternatively a sounder on the vehicle auxiliary device.

Figure 19:
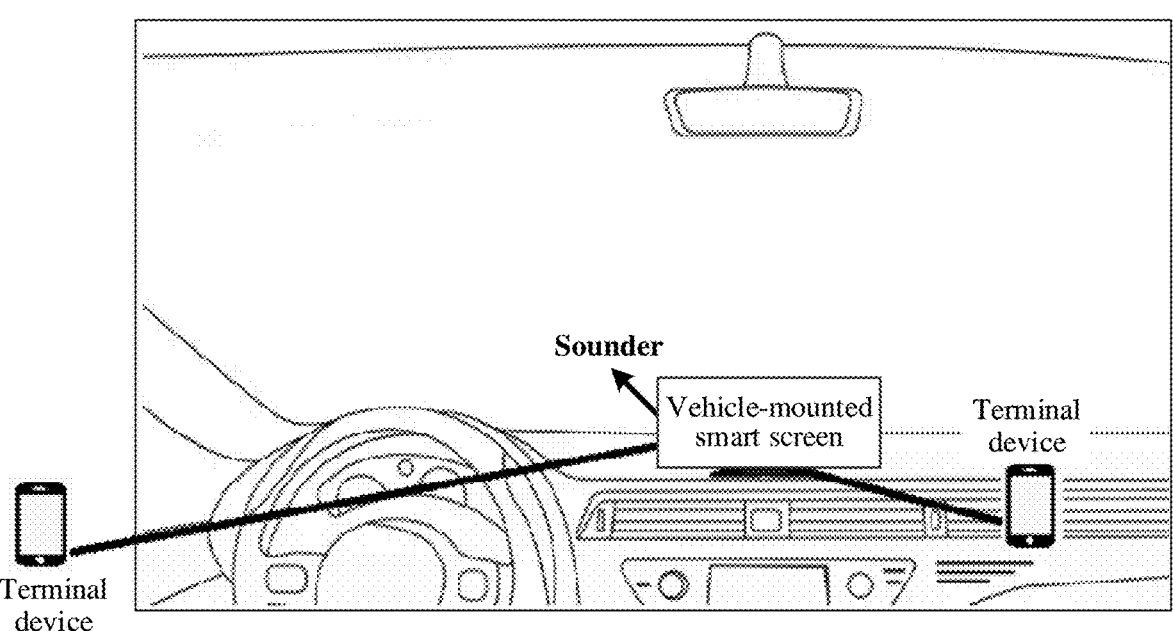
FIG. 19 is a schematic diagram of a sounder in a location obtaining method according to an embodiment of this application.

For more intuitive understanding of this solution, refer to FIG. 19. FIG. 19 is a schematic diagram of a sounder in a location obtaining method according to an embodiment of this application. In FIG. 19, an example in which the vehicle auxiliary device is specifically represented as a vehicle-mounted smart screen is used. The vehicle may measure, by using a sounder disposed on the vehicle-mounted smart screen, whether the terminal device is located inside the vehicle or outside the vehicle. It should be understood that the example in FIG. 19 is merely for ease of understanding, and is not intended to limit this solution.

In this embodiment of this application, because the linear frequency modulation signal or the ZC sequence signal is an energy aggregation signal, the linear frequency modulation signal or the ZC sequence signal is selected as the target audio signal, to help accurately estimate at least one arrival time corresponding to each target audio signal, thereby obtaining the accurate first location information.

Specifically, in an implementation, the vehicle sends a plurality of target audio signals in a broadcast manner based on a first preset frequency through the sounder. The first preset frequency may be that the vehicle sends one target audio signal every other $d$ sampling points. For example, a value of $d$ may be 880, 1320, 1760, or another value. This may be specifically flexibly set with reference to an actual scenario.

The plurality of target audio signals include a first sounding signal and a second sounding signal. The at least one arrival time corresponding to the target audio signal may include a first time set corresponding to the first sounding signal and a second time set corresponding to the second sounding signal. The first time set includes at least one time at which the first sounding signal arrives at the terminal device through direct incidence and/or reflection. The second time set includes at least one time at which the second sounding signal arrives at the terminal device through direct incidence and/or reflection. A latest time in the first time set and an earliest time in the second time set may be used for determining the first location information.

In another implementation, the vehicle sends one or more target audio signals through the sounder. Each target audio signal is used for determining a target time set corresponding to the target audio signal. The target time set includes at least one time at which the target audio signal arrives at the terminal device through direct incidence and/or reflection. An earliest time and a latest time in the target time set may be used for determining the first location information.

2003: The terminal device obtains at least one arrival time corresponding to the at least one target audio signal. At least one arrival time corresponding to one target audio signal includes a time at which the target audio signal arrives at the terminal device through direct incidence and/or reflection.

In this embodiment of this application, in a case, when the vehicle sends the one or more target audio signals in a broadcast manner through the sounder according to the first preset frequency, correspondingly, the terminal device can obtain, within preset duration, at least one arrival time corresponding to each target audio signal. The at least one arrival time corresponding to the target audio signal includes the time at which the target audio signal arrives at the terminal device through direct incidence and/or reflection.

Specifically, the terminal device may prestore parameter information of the target audio signal, for example, a frequency band on which the target audio signal is located, and an amplitude, a strength, or other parameter information of the target audio signal. After each target audio signal arrives at the terminal device through direct incidence and/or reflection, the terminal device may filter the received audio signal by using a band-pass filter, to obtain a filtered signal. A frequency band of the filtered signal is consistent with the frequency band of the target audio signal.

The terminal device obtains, based on the filtered signal, a matching degree curve of matching the filtered signal obtained by using the filter and the target audio signal. The matching degree curve indicates the at least one arrival time corresponding to each target audio signal.

A horizontal axis of the matching degree curve is time. The time may be measured through sampling points, or may be measured through seconds. A vertical axis of the matching degree curve may be an impulse response of a filtered signal at each time point. Each wave crest that is in a plurality of wave crests included in the matching degree curve and that exceeds a preset wave crest threshold is considered as a case in which the terminal device receives one target audio signal. A sampling point corresponding to each wave crest that exceeds the preset wave crest threshold is considered as one arrival time corresponding to one target audio signal.

Further, the preset wave crest threshold may be any one of the following: in the matching degree curve, $a$ times a maximum wave crest value in $d$ sampling points (that is, in one sending period of a target audio signal), where a value range of $a$ is 0.5-1; or in the matching degree curve, $b$ times an average value of values of $d$ sampling points (that is, in one sending period of a target audio signal) in a vertical axis direction, where a value range of $b$ is 5-10. Alternatively, the preset wave crest threshold may be set to another value. A value of the preset wave crest threshold may be flexibly set with reference to an actual product form. The example herein is merely for ease of understanding of this solution, and is not intended to limit this solution.

Figure 20:
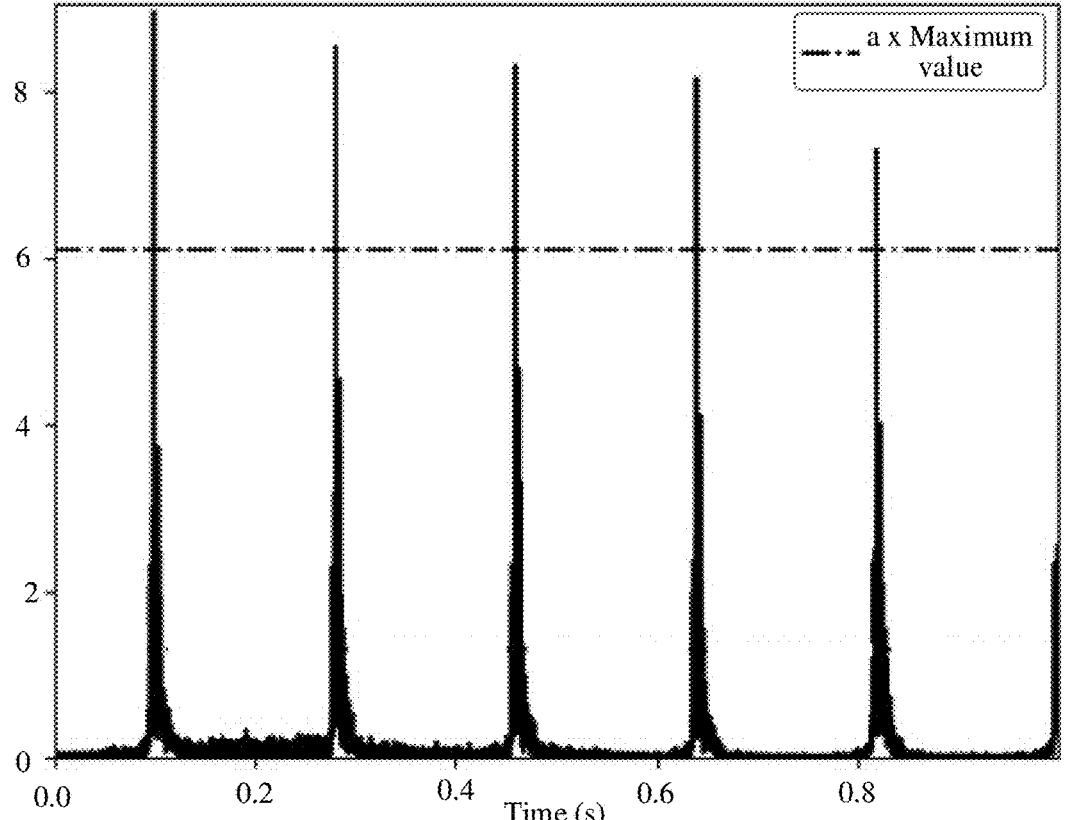
FIG. 20 is a schematic diagram of a matching degree curve in a location obtaining method according to an embodiment of this application.

For more intuitive understanding of this solution, refer to FIG. 20. FIG. 20 is a schematic diagram of a matching degree curve in a location obtaining method according to an embodiment of this application. In FIG. 20, an example in which five target audio signals arrive at a terminal device through direct incidence and reflection, and a preset wave crest threshold is $a$ times a maximum wave crest value in one sending period of a target audio signal is used. Because each target audio signal may arrive at the terminal device in a direct incidence manner and/or a reflection manner, after the vehicle transmits one target audio signal, the terminal device may receive one or more target audio signals. In FIG. 20, an example in which the terminal device can receive one target audio signal each time the vehicle sends the target audio signal is used. In this case, the terminal device can obtain one arrival time corresponding to each audio signal. It should be understood that the example in FIG. 20 is merely for ease of understanding, and is not intended to limit this solution.

In another case, because the vehicle sends the target audio signal through the sounder inside the vehicle, if vehicle doors and all vehicle windows are closed, and the terminal device is located outside the vehicle and is relatively far away from the vehicle, the target audio signal sent by the vehicle may not arrive at the terminal device. In other words, the terminal device cannot collect any target audio signal within preset duration. Specifically, if the terminal device can obtain, within the preset duration, zero arrival times corresponding to each target audio signal, the terminal device may generate the first location information corresponding to the terminal device. The first location information in this application scenario indicates that the terminal device is located outside the vehicle. Optionally, the terminal device may send the generated first location information to the vehicle.

A value range of the preset duration may be 100 ms to 20000 ms. For example, the value of the preset duration may be 200 ms, 400 ms, 600 ms, or another value. This is not enumerated herein. For a specific implementation in which the terminal device obtains the arrival time corresponding to each target audio signal, refer to the foregoing description.

2004: The terminal device generates, based on the at least one arrival time, the first location information corresponding to the terminal device. The first location information indicates whether the terminal device is located inside the vehicle or outside the vehicle.

In this embodiment of this application, after obtaining the at least one arrival time corresponding to each target audio signal, the terminal device may directly generate, based on the at least one arrival time corresponding to each target audio signal, the first location information corresponding to the terminal device. Optionally, the terminal device may alternatively send the at least one arrival time corresponding to each target audio signal to the vehicle, and the vehicle generates the first location information corresponding to the terminal device.

Figure 21:
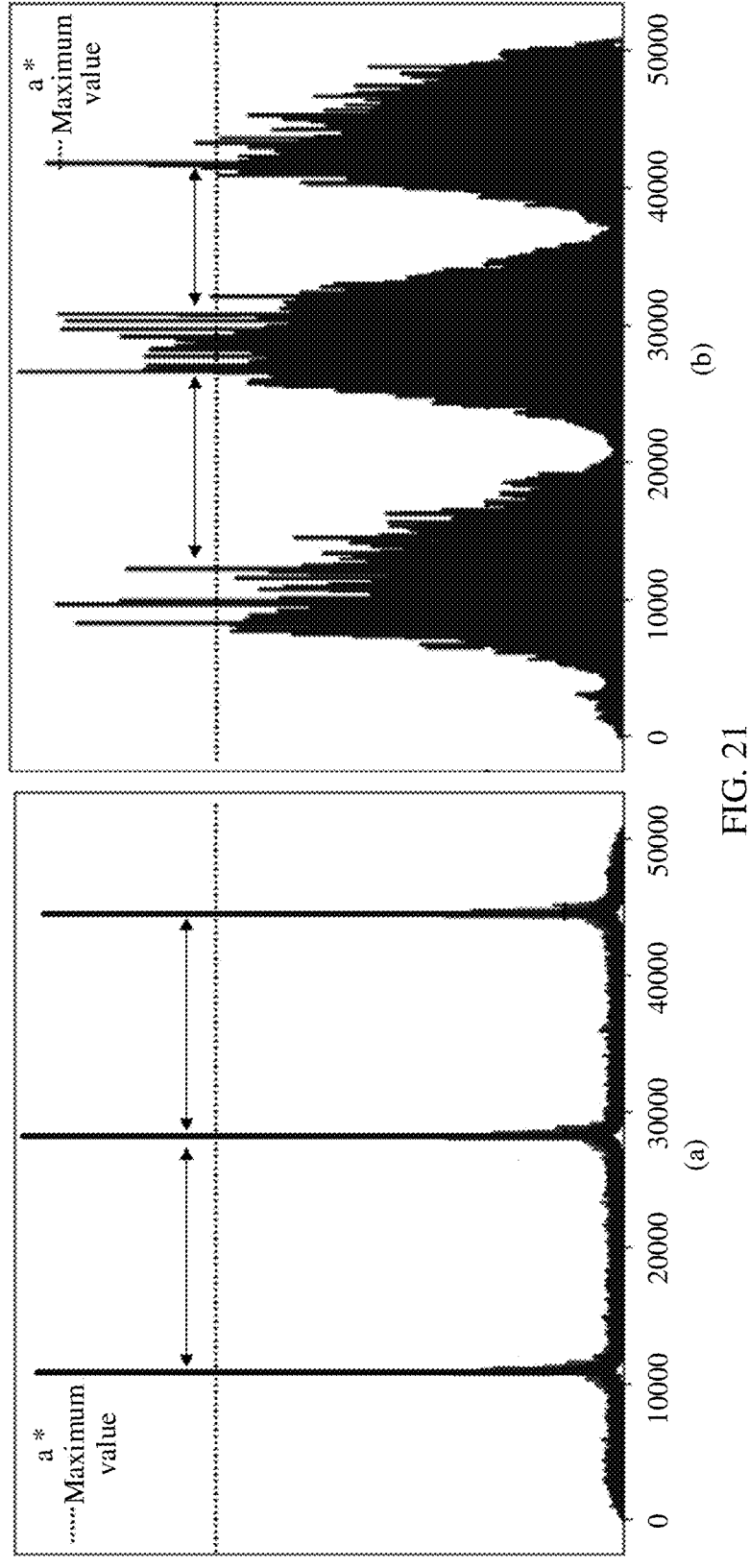
FIG. 21 is two schematic diagrams of matching degree curves in a location obtaining method according to an embodiment of this application.

For more intuitive understanding of a principle of this solution, refer to FIG. 21. FIG. 21 is two schematic diagrams of matching degree curves in a location obtaining method according to an embodiment of this application. FIG. 21 includes two schematic sub-diagrams (a) and (b). The schematic sub-diagram (a) of FIG. 21 is a schematic diagram of a matching degree curve obtained by the terminal device after three target audio signals sent by the vehicle according to the first preset frequency arrive at the terminal device when the terminal device is located inside the vehicle. The schematic sub-diagram (b) of FIG. 21 is a schematic diagram of a matching degree curve obtained by the terminal device after three target audio signals sent by the vehicle according to the first preset frequency arrive at the terminal device when the terminal device is located outside the vehicle. In the schematic sub-diagram (a) of FIG. 21 and the schematic sub-diagram (b) of FIG. 21, an example in which a sampling point is used as a time measurement unit and a preset wave crest threshold is a times a maximum wave crest value in one sending period of a target audio signal is used.

After the vehicle sends one target audio signal, the target audio signal may arrive at the terminal device in a direct incidence manner, or may arrive at the terminal device after being reflected by a surrounding environment. Because space inside the vehicle is relatively narrow and closed, as shown in the schematic sub-diagram (a) of FIG. 21, when the terminal device is located inside the vehicle, at least one arrival time corresponding to the target audio signal is relatively centralized. However, space outside the vehicle is relatively open. As shown in the schematic sub-diagram (b) of FIG. 21, when the terminal device is located outside the vehicle, a plurality of arrival times corresponding to one target audio signal are relatively dispersed. Therefore, after obtaining the at least one arrival time corresponding to each target audio signal, the terminal device or the vehicle can determine whether the terminal device is located inside the vehicle or outside the vehicle. It should be understood that the example in FIG. 21 is merely an example for ease of understanding of an implementation principle of this solution, and is not intended to limit this solution.

Specifically, in an implementation, the at least one target audio signal includes the plurality of target audio signals that are sent by the vehicle according to the first preset frequency. The plurality of target audio signals include a first sounding signal and a second sounding signal. The plurality of arrival times corresponding to the plurality of target audio signals include a first time set corresponding to the first sounding signal and a second time set corresponding to the second sounding signal. The first time set includes at least one time at which the first sounding signal arrives at the terminal device through direct incidence and/or reflection. The second time set includes at least one time at which the second sounding signal arrives at the terminal device through direct incidence and/or reflection. A time interval between an arrival time in the first time set and an arrival time in the second time set is used for determining the first location information.

A time at which the vehicle sends the first sounding signal may be earlier than a time at which the vehicle sends the second sounding signal, or a time at which the vehicle sends the first sounding signal may be later than a time at which the vehicle sends the second sounding signal. The first time set and the second time set are adjacent in a matching degree curve corresponding to the plurality of target audio signals. In other words, the first sounding signal and the second sounding signal are two different target audio signals, and arrive at the terminal device successively.

A condition for determining the first location information is as follows. If the time interval between the arrival time in the first time set and the arrival time in the second time set is within a preset time range, the first location information indicates that the terminal device is located inside the vehicle. A determining factor of the preset time range includes a time interval between two adjacent target audio signals sent by the vehicle. Alternatively, if the time interval between the arrival time in the first time set and the arrival time in the second time set is not within a preset time range, the first location information indicates that the terminal device is located outside the vehicle.

A time measurement unit used in the preset time range may include a sampling point, a millisecond, a second, another time measurement unit, or the like. For example, the preset time range may be d-c sampling points to d+e sampling points. The d sampling points are a time interval between two target audio signals sent by the vehicle. Values of c and e may be the same or different. For example, the value of c and the value of e are both related to a sampling rate used when a received target audio signal is processed. For example, the value of e may be 50 sampling points. For example, the value of c may be between 400 sampling points and 960 sampling points. Alternatively, the values of c and e may be other values. Specific values need to be flexibly determined with reference to an actual application scenario, and are not enumerated herein.

In this implementation, the preset time range may be determined based on a time interval between two adjacent target audio signals sent by the vehicle, thereby providing a simple manner of determining the preset time range.

A meaning of the time interval between the arrival time in the first time set and the arrival time in the second time set is as follows. In a case, the time interval between the arrival time in the first time set and the arrival time in the second time set includes: a first time interval between a latest time in the first time set and an earliest time in the second time set. In this case, step 2004 may include: The terminal device or the vehicle generates the first location information based on the first time interval between the latest time in the first time set and the earliest time in the second time set.

More specifically, the terminal device or the vehicle obtains the first time interval between the latest time in the first time set and the earliest time in the second time set; determines whether the first time interval is within the preset time range; and if the first time interval is within the preset time range, determines that the terminal device is located inside the vehicle; or if the first time interval is not within the preset time range, determines that the terminal device is located outside the vehicle.

In this embodiment of this application, a specific implementation of obtaining the first location information of the terminal device based on the time interval between the arrival time in the first time set and the arrival time in the second time set is provided. This is a simple operation that is easy to implement.

In another case, the time interval between the arrival time in the first time set and the arrival time in the second time set includes: a time interval between a middle time in the first time set and an earliest time in the second time set. In another case, the time interval between the arrival time in the first time set and the arrival time in the second time set includes: a time interval between a middle time in the first time set and a latest time in the second time set, and the like. The time interval between the arrival time in the first time set and the arrival time in the second time set may be alternatively specifically expressed as another meaning. This may be flexibly set with reference an actual application product. This is not limited herein.

In another implementation, step 2004 may include: The terminal device or the vehicle may obtain a target time set corresponding to each target audio signal. The target time set includes at least one time at which one target audio signal arrives at the terminal device through direct incidence and/or reflection. The terminal device or the vehicle obtains an earliest time and a latest time in the target time set; obtains a second time interval between the earliest time and the latest time in the target time set; determines whether the second time interval is greater than or equal to a first time threshold; and if a result of the determining is yes, determines that the terminal device is located outside the vehicle; or if a result of the determining is no, determines that the terminal device is located inside the vehicle.

It should be noted that a dispersion degree of the at least one arrival time corresponding to the at least one target audio signal may be measured in another manner. A higher dispersion degree of the at least one arrival time corresponding to the at least one target audio signal indicates that the terminal device is located outside the vehicle. A lower dispersion degree of the at least one arrival time corresponding to the at least one target audio signal indicates that the terminal device is located inside the vehicle. All implementations are not enumerated herein.

Optionally, after generating the first location information corresponding to the terminal device, the terminal device may send the first location information to the vehicle. Correspondingly, after generating the first location information corresponding to the terminal device, the vehicle may send the first location information to the terminal device.

In this embodiment of this application, the vehicle sends the plurality of target audio signals. The plurality of target audio signals can arrive at the terminal device through direct incidence and/or reflection. Because space inside the vehicle is relatively closed, a plurality of audio signals obtained after direct incidence and/or reflection of one target audio signal can arrive at the terminal device in a relatively centralized manner. Space outside the vehicle is relatively open relative to the space inside the vehicle, a plurality of audio signals obtained after direct incidence and/or reflection of one target audio signal arrive at the terminal device in a relatively dispersed manner. Therefore, it can be determined based on the time interval between the first time set and the second time set whether the terminal device is located inside the vehicle or outside the vehicle, thereby providing a solution for measuring a location of the user relative to the vehicle. In addition, an audio signal may be sent out through a sounder provided in the vehicle. No additional hardware needs to be added to the vehicle or the terminal device, to avoid additional overheads.

Figure 22:
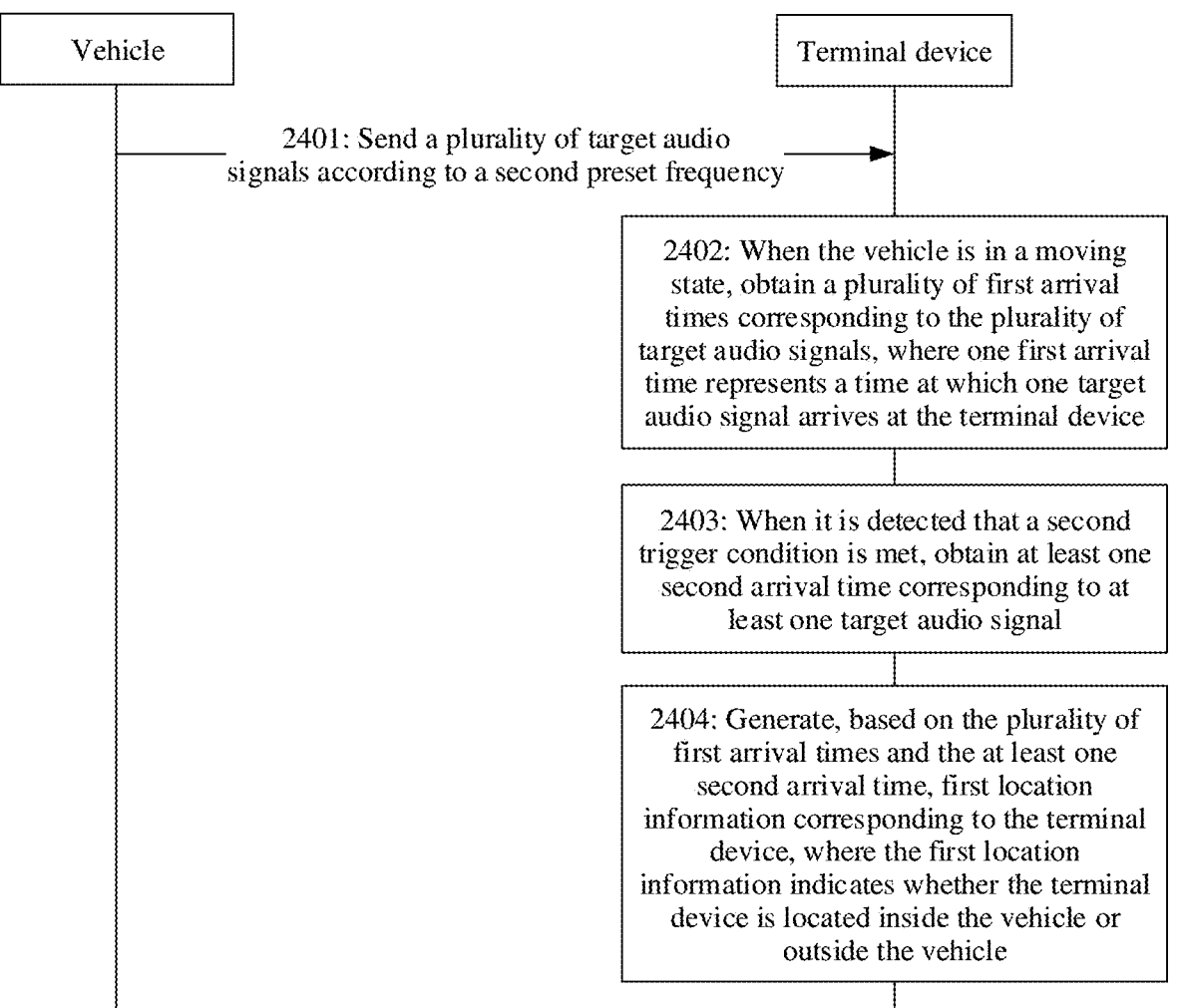
FIG. 22 is another schematic flowchart of a location obtaining method according to an embodiment of this application.

An embodiment of this application further provides another location obtaining method to measure whether a terminal device is located inside a vehicle or outside a vehicle. FIG. 22 is another schematic flowchart of a location obtaining method according to an embodiment of this application. The location obtaining method provided in this embodiment of this application may include the following steps.

2401: A vehicle sends a plurality of target audio signals to a terminal device according to a second preset frequency.

In this embodiment of this application, when the vehicle is in a moving state, the vehicle may start to send the plurality of target audio signals to the outside in a broadcast manner through a sounder according to the second preset frequency. Because the vehicle is in the moving state, a terminal device that can be detected by the vehicle is generally located inside the vehicle, and the plurality of target audio signals sent by the vehicle according to the second preset frequency can arrive at the terminal device.

The second preset frequency may be the same as or different from the first preset frequency in the embodiment corresponding to FIG. 18. For a specific meaning of the target audio signal, refer to the description in the embodiment corresponding to FIG. 18. For a specific implementation of determining whether the vehicle is in the moving state, refer to the description in the embodiment corresponding to FIG. 18. For a specific implementation of step 2401, refer to the description in the embodiment corresponding to FIG. 18. Details are not described herein again.

2402: When the vehicle is in the moving state, the terminal device obtains a plurality of first arrival times corresponding to the plurality of target audio signals. One first arrival time represents a time at which one target audio signal arrives at the terminal device.

In this embodiment of this application, when the vehicle is in the moving state, the plurality of target audio signals sent by the vehicle according to the second preset frequency can arrive at the terminal device through direct incidence and/or reflection. The terminal device may obtain at least one arrival time corresponding to each target audio signal. For a specific implementation of the foregoing step, refer to the description in the embodiment corresponding to FIG. 18.

The terminal device may determine, based on the at least one arrival time corresponding to each target audio signal, one first arrival time corresponding to each target audio signal. The first arrival time may be the at least one arrival time that corresponds to each target audio signal and that may include only one arrival time. Alternatively, the first arrival time may be an earliest arrival time in the at least one arrival time corresponding to each target audio signal. Alternatively, the first arrival time may be a latest arrival time in the at least one arrival time corresponding to each target audio signal. Alternatively, the first arrival time may be another arrival time in the at least one arrival time corresponding to each target audio signal. This is not enumerated herein.

The terminal device repeatedly performs the foregoing operations, and can obtain the plurality of first arrival times in a one-to-one correspondence with the plurality of target audio signals. One first arrival time represents a time at which one target audio signal arrives at the terminal device when the terminal device is located inside the vehicle.

2403: When detecting that a second trigger condition is met, the terminal device obtains at least one second arrival time corresponding to at least one target audio signal.

In this embodiment of this application, when detecting that the second trigger condition is met, the terminal device obtains the at least one second arrival time in a one-to-one correspondence with the at least one target audio signal. For a specific implementation in which the terminal device detects that the second trigger condition is met, refer to the description in the embodiment corresponding to FIG. 18. A specific implementation in which the terminal device obtains the at least one second arrival time in the one-to-one correspondence with the at least one target audio signal is the same as a specific implementation in which the terminal device obtains the plurality of first arrival times in the one-to-one correspondence with the plurality of target audio signals. A difference lies in that the first arrival time is obtained when the vehicle is in the moving state, and the second arrival time is obtained after the terminal device detects that the second trigger condition is met.

2404: The terminal device generates, based on the plurality of first arrival times and the at least one second arrival time, first location information corresponding to the terminal device. The first location information indicates whether the terminal device is located inside the vehicle or outside the vehicle.

In this embodiment of this application, after obtaining the plurality of first arrival times and the at least one second arrival time, the terminal device may generate, based on the plurality of first arrival times and the at least one second arrival time, the first location information corresponding to the terminal device. The first location information indicates whether the terminal device is located inside the vehicle or outside the vehicle.

Specifically, the terminal device determines, based on the plurality of first arrival times, a first prediction time corresponding to the second arrival time. The first prediction time indicates a time at which the target audio signal arrives at the terminal device when relative locations of the terminal device and the vehicle remain unchanged, that is, when the terminal device is located inside the vehicle. In addition, the terminal device generates the first location information based on the first prediction time and the second arrival time.

More specifically, a process of generating the first prediction time is as follows. After the terminal device obtains the plurality of first arrival times in the one-to-one correspondence with the plurality of target audio signals, because there is a clock difference between the vehicle and the terminal device, each first arrival time may be represented by the following formula $\hat{t}_i = T*i + b$. Herein, $\hat{t}_i$ represents a time at which an $i^{th}$ target audio signal sent by the vehicle arrives at the terminal device, i represents the $i^{th}$ target audio signal sent by the vehicle, T represents a time interval between two target audio signals sent by the vehicle, and b represents the clock difference existing between the vehicle and the terminal device.

The terminal device may calculate the clock difference b between the vehicle and the terminal device based on the plurality of first arrival times in the one-to-one correspondence with the plurality of target audio signals by using the least square method. When detecting that the second trigger condition is met, the terminal device may learn that the vehicle is about to send a $k^{th}$ target audio signal, and may obtain, through calculation by using a formula $\hat{t}_i = T*i + b$, a first prediction time $\hat{t}_k$ corresponding to the $k^{th}$ target audio signal.

A process of generating the first location information based on the first prediction time and the second arrival time is as follows. In an implementation, the terminal device may calculate a third time interval between the second arrival time and a first preset time; determine whether the third time interval is greater than or equal to a second time threshold; and if a result of the determining is yes, determine that the terminal device is located outside the vehicle; or if a result of the determining is no, determine that the terminal device is located inside the vehicle.

In another implementation, the terminal device may calculate a third time interval $\Delta t_k$ between the second arrival time and the first preset time, and multiply the third time interval $\Delta t_k$ by a sound propagation velocity s to obtain a distance value d. The terminal device determines whether the distance d is greater than or equal to a preset distance threshold $d_{threshold}$; and if a result of the determining is yes, determines that the terminal device is located outside the vehicle; or if a result of the determining is no, determines that the terminal device is located inside the vehicle.

In this embodiment of this application, when the vehicle is in the moving state, the terminal device that can continuously receive the audio signal is definitely located inside the vehicle. Therefore, the first prediction time can be obtained based on the plurality of obtained first arrival times. Further, it can be determined based on the generated first prediction time and the actual second arrival time whether the terminal device is located inside the vehicle or outside the vehicle. The first location information of the terminal device can be detected by using only one sounder, thereby further reducing implementation difficulty of this solution and extending an application scenario of this solution.

Optionally, after generating the first location information corresponding to the terminal device, the terminal device may send the first location information to the vehicle.

In this embodiment of this application, another solution for measuring whether the terminal device is located inside the vehicle or outside the vehicle is provided, thereby improving implementation flexibility of this solution. In addition, it is measured by using audio signals whether the terminal device is located inside the vehicle or outside the vehicle. No additional hardware needs to be added to the vehicle or the terminal device, to avoid additional overheads.

Figure 23:
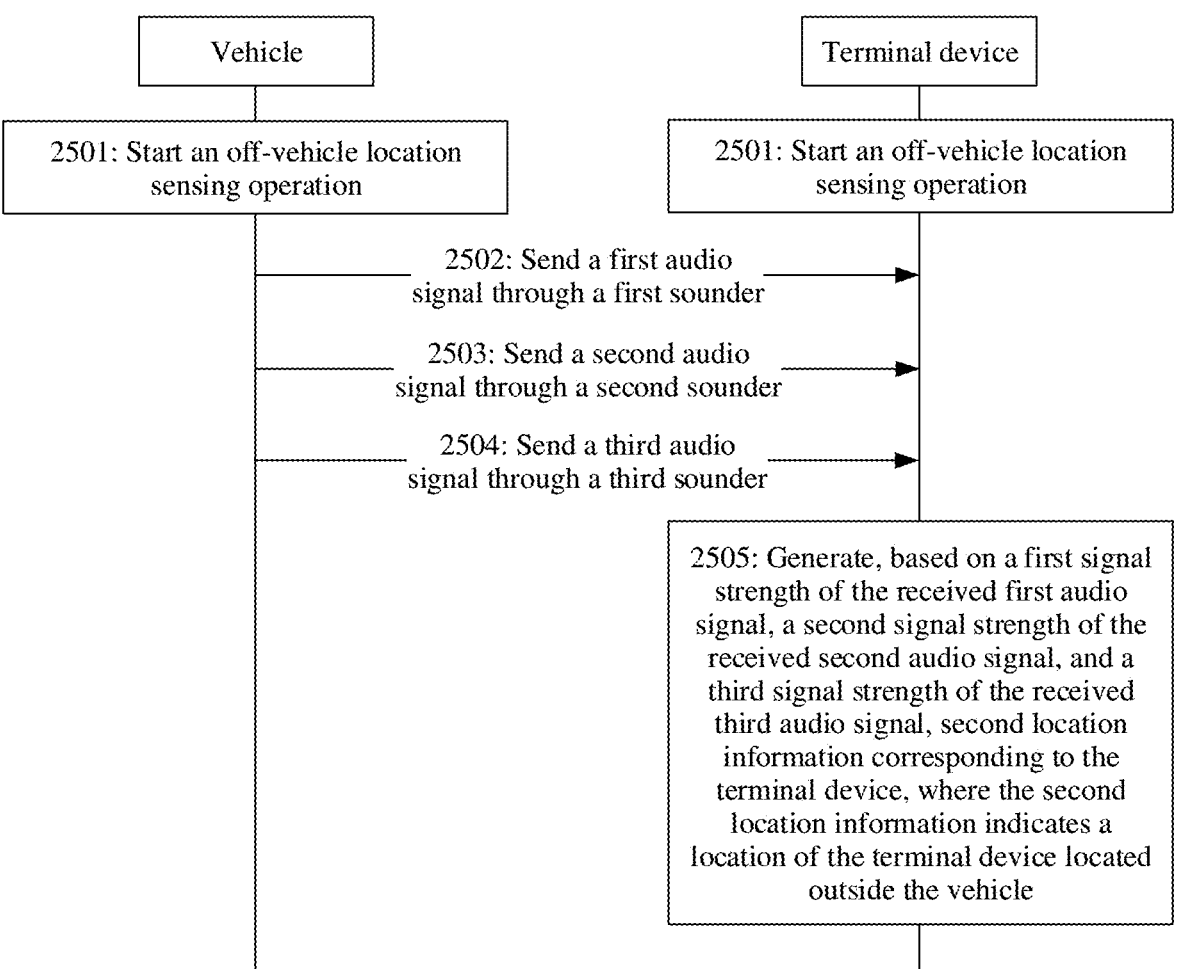
FIG. 23 is another schematic flowchart of a location obtaining method according to an embodiment of this application.

An embodiment of this application further provides another location obtaining method to measure a specific location of a terminal device located outside a vehicle. FIG. 23 is another schematic flowchart of a location obtaining method according to an embodiment of this application. The location obtaining method provided in this embodiment of this application may include the following steps.

2501: A vehicle and a terminal device start an off-vehicle location sensing operation.

In this embodiment of this application, in some application scenarios, in a running process of the vehicle, when determining that a location of the terminal device outside the vehicle needs to be learned, the vehicle starts the off-vehicle location sensing operation, and sends indication information to the terminal device. The indication information indicates the terminal device to start the off-vehicle location sensing operation. The off-vehicle location sensing operation is used to obtain the specific location of the terminal device outside the vehicle.

For example, when detecting that a distance between the terminal device and the vehicle is less than a preset threshold, the vehicle may need to learn of the specific location of the terminal device located outside the vehicle. For another example, if the vehicle detects that a distance between the terminal device and the vehicle is becoming smaller, the vehicle may need to learn of the specific location of the terminal device located outside the vehicle. It should be understood that the distance herein is merely for ease of understanding of this solution, and is not intended to limit this solution.

2502: The vehicle sends a first audio signal to the terminal device through a first sounder.

In this embodiment of this application, the vehicle may be configured with at least three sounders, and the at least three sounders are not located on one straight line. The at least three sounders include the first sounder, a second sounder, and a third sounder. After the off-vehicle location sensing operation is started, the first audio signal may be sent to the terminal device in a broadcast manner through the first sounder.

2503: The vehicle sends a second audio signal to the terminal device through the second sounder.

2504: The vehicle sends a third audio signal to the terminal device through the third sounder.

In this embodiment of this application, the vehicle may further send the second audio signal to the terminal device in a broadcast manner through the second sounder, and send the third audio signal to the terminal device in a broadcast manner through the third sounder. Specific representation manners of the first audio signal, the second audio signal, and the third audio signal are all similar to a specific representation manner of the target audio signal. Refer to the description in the embodiment corresponding to FIG. 18. Details are not described herein again. Further, the first audio signal, the second audio signal, and the third audio signal are signals with consistent signal strengths. In other words, the first audio signal, the second audio signal, and the third audio signal have same volume. For locations of the first sounder, the second sounder, and the third sounder, refer to the description in Embodiment 1. It should be noted that the sounder in Embodiment 2 may be a sounder located inside the vehicle, or may be a sounder located outside the vehicle.

Specifically, in an implementation, the vehicle may simultaneously perform steps 2502 to 2504. In this case, the first audio signal, the second audio signal, and the third audio signal need to use different audio signals. For specific meanings of different audio signals, refer to the description in Embodiment 1. Details are not described herein again.

In another implementation, the vehicle may perform step 2502 first, perform step 2503 after a preset time interval, and perform step 2504 further after a preset time interval. The first audio signal, the second audio signal, and the third audio signal may be same audio signals, or may be different audio signals.

Optionally, the vehicle may further send a fourth audio signal to the terminal device through a fourth sounder. Correspondingly, the terminal device can obtain a fourth signal strength of the received fourth audio signal. It should be noted that the vehicle may further send audio signals to the terminal device through more sounders. A specific quantity of used sounders and a location of each sounder may be flexibly set according to an actual situation. This is not limited herein.

It should be noted that, for a specific implementation in which the terminal device determines a correspondence between each audio signal and a sounder at each location, reference may be made to the description in Embodiment 1. Details are not described herein again.

2505: The terminal device generates, based on a first signal strength of the received first audio signal, a second signal strength of the received second audio signal, and a third signal strength of the received third audio signal, second location information corresponding to the terminal device. The second location information indicates a location of the terminal device located outside the vehicle.

In this embodiment of this application, when the terminal device is located at a different location outside the vehicle, a distance relationship between the terminal device and each sounder is different, and a longer propagation distance of an audio signal indicates a lower strength of an audio signal received by the terminal device. In this case, the terminal device may generate, based on the first signal strength of the received first audio signal, the second signal strength of the received second audio signal, and the third signal strength of the received third audio signal, the second location information corresponding to the terminal device. The terminal device may send the second location information of the terminal device to the vehicle.

Figure 24:
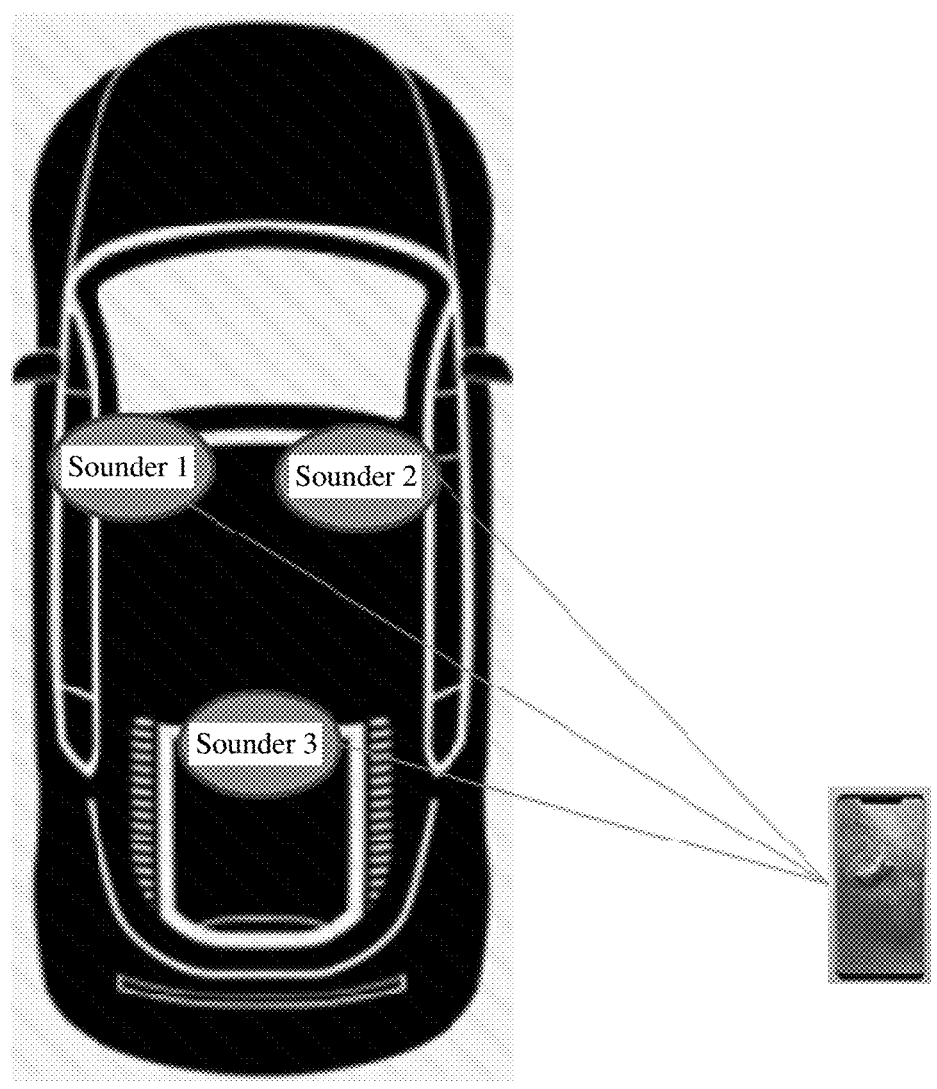
FIG. 24 is a schematic diagram of a principle of a location obtaining method according to an embodiment of this application.

For more intuitive understanding of a principle of this solution, refer to FIG. 8b and FIG. 24. FIG. 8b is a schematic diagram of locations outside a vehicle in a location obtaining method according to an embodiment of this application. FIG. 24 is a schematic diagram of a principle of a location obtaining method according to an embodiment of this application. First, in FIG. 8b, an example in which the outside of the vehicle is divided into five regions: Z1 to Z5 is used. It should be understood that the example in FIG. 8b is merely for ease of understanding of this solution, and is not intended to limit this solution.

Further, FIG. 24 needs to be understood with reference to FIG. 8b. In FIG. 24, an example in which a terminal device is located in the Z4 region is used. In this case, a sounder 1 is farthest from the terminal device, a sounder 2 is secondarily far from the terminal device, and a sounder 3 is closest to the terminal device. In this case, a signal strength of an audio signal sent by the sounder 1 is the smallest when the audio signal arrives at the terminal device, a signal strength of an audio signal sent by the sounder 1 is the second largest when the audio signal arrives at the terminal device, and a signal strength of an audio signal sent by the sounder 1 is the largest when the audio signal arrives at the terminal device. In the other way, if the strengths of the three audio signals that are sent by the three sounders and that are received by the terminal device meet the foregoing setting, it indicates that the terminal device is located in the Z4 region. It should be understood that the example in FIG. 24 is merely an example for ease of understanding of an implementation principle of this solution, and is not intended to limit this solution.

Specifically, the terminal device may prestore a plurality of groups of preset strength information in a one-to-one correspondence with the plurality of regions outside the vehicle. A group of preset strength information corresponding to a target region outside the vehicle (any region outside the vehicle) includes at least three target strength values in a one-to-one correspondence with at least three sounders.

One target strength value represents a strength value of an audio signal that is sent by one sounder and that is received by the terminal device when the terminal device is located at a center point of the target region. For example, if the outside of the vehicle is divided into the five regions: Z1 to Z5, the terminal device prestores five groups of strength information in a one-to-one correspondence with the five regions.

After obtaining the first signal strength, the second signal strength, and the third signal strength, the terminal device obtains a group of actual strength information. The terminal device calculates a distance between the actual strength information and each of the plurality of groups of preset strength information; selects, from the plurality of groups of preset strength information, a group of preset strength information closest to the actual strength information; and determines a region corresponding to the closest group of preset strength information as a region in which the terminal device is located. The foregoing distance may be a Euclidean distance, a Mahalanobis distance, another type of distance, or the like. This is not enumerated herein.

In this embodiment of this application, when the terminal device is at a different location outside the vehicle, a distance relationship between the terminal device and each sounder is different, and a longer propagation distance of an audio signal indicates a lower strength of an audio signal received by the terminal device. In this case, the first signal strength, the second signal strength, and the third signal strength can respectively reflect distance relationships between the terminal device and the first sounder, between the terminal device and the second sounder, and between the terminal device and the third sounder. Therefore, a specific location of the terminal device located outside the vehicle can be obtained based on the first signal strength, the second signal strength, and the third signal strength, thereby providing another implementation of measuring the specific location of the terminal device outside the vehicle and improving implementation flexibility of this solution.

Optionally, after the vehicle obtains the second location information of the terminal device, the second location information is used by the vehicle to determine a component closest to the terminal device from a plurality of components included in the vehicle, to control the component closest to the terminal device to perform a preset operation. The component may be a vehicle door, a vehicle light, a trunk, or another vehicle component. The preset operation may be unlocking the vehicle door, opening the vehicle door, unlocking the trunk, turning on the vehicle light, another operation, or the like. This is not limited herein.

Figure 25:
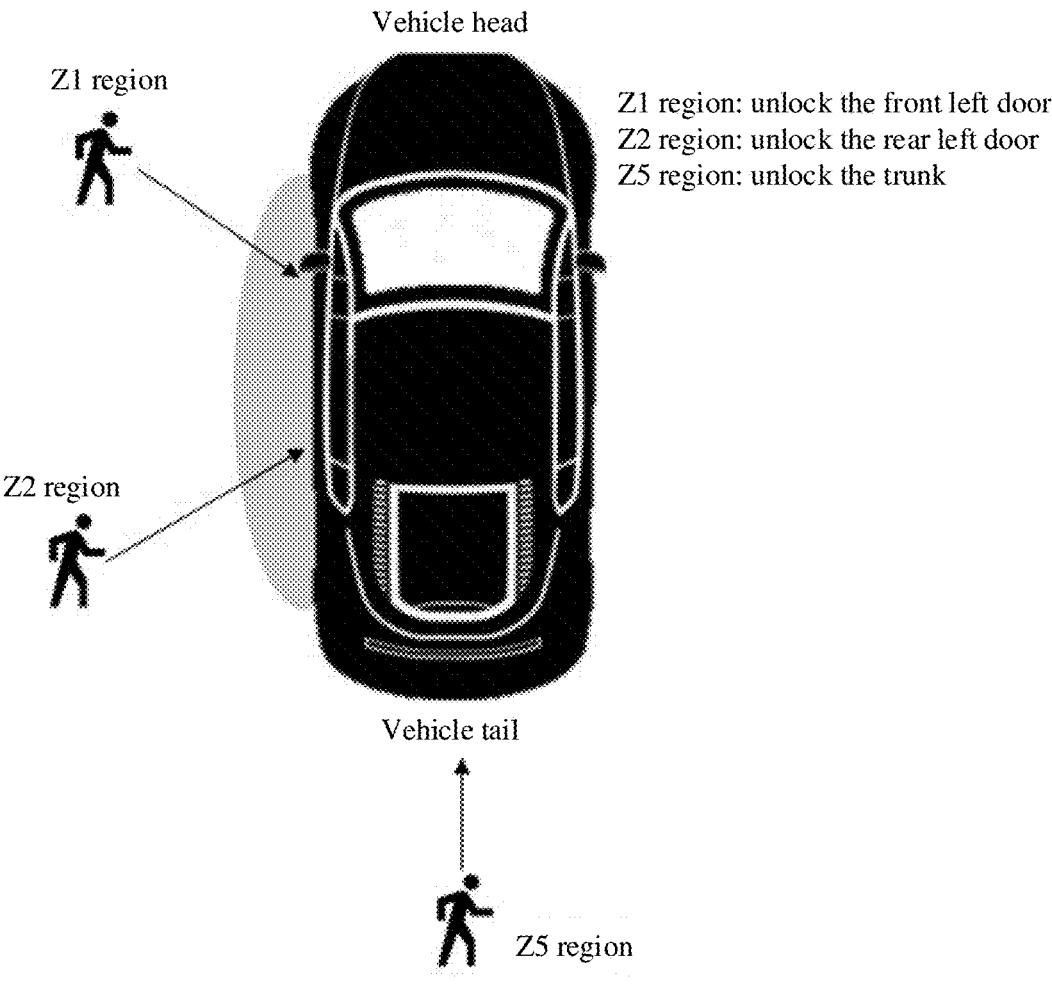
FIG. 25 is a diagram of an application scenario of a location obtaining method according to an embodiment of this application.

For more intuitive understanding of this solution, refer to FIG. 25. FIG. 25 is a diagram of an application scenario of a location obtaining method according to an embodiment of this application. As shown in FIG. 25, when determining that the terminal device is located in the Z1 region outside the vehicle, the vehicle may unlock a front left door; when determining that the terminal device is located in the Z2 region outside the vehicle, the vehicle may unlock a rear left door; and when determining that the terminal device is located in the Z5 region outside the vehicle, the vehicle may unlock the trunk. It should be understood that FIG. 25 is merely an example for ease of understanding of this solution, and is not intended to limit this solution.

For another example, at night, when determining that the terminal device is located in the Z1 region outside the vehicle, the vehicle may further turn on a vehicle light on a front left side to provide lighting for the user. For another example, when determining that the terminal device is located in the Z2 region outside the vehicle, the vehicle may further automatically open a vehicle door. This is not specifically enumerated herein.

In this embodiment of this application, a specific application scenario of the second location information is provided, and a more accurate service is provided for a user based on the second location information, thereby improving user stickiness of this solution.

Figure 26:
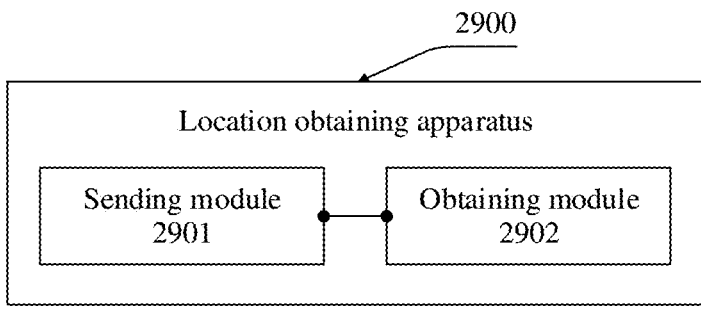
FIG. 26 is a schematic diagram of a structure of a location obtaining apparatus according to an embodiment of this application.

Based on the embodiments corresponding to FIG. 1a to FIG. 25, to better implement the foregoing solutions in the embodiments of this application, the following further provides related devices configured to implement the foregoing solutions. Specifically, FIG. 26 is a schematic diagram of a structure of a location obtaining apparatus according to an embodiment of this application. The location obtaining apparatus 2900 is used in a vehicle. The vehicle is included in a location obtaining system. The location obtaining system further includes a terminal device. The location obtaining apparatus 2900 includes a sending module 2901 and an obtaining module 2902. The sending module 2901 is configured to: when it is detected that a first trigger condition is met, send at least one target audio signal. The target audio signal is used for determining at least one arrival time corresponding to the target audio signal. The sending module 2901 is specifically configured to send a plurality of target audio signals according to a preset frequency. The plurality of target audio signals include a first sounding signal and a second sounding signal. The at least one arrival time includes a first time set corresponding to the first sounding signal and a second time set corresponding to the second sounding signal. The first time set includes at least one time at which the first sounding signal arrives at the terminal device through direct incidence and/or reflection. The second time set includes at least one time at which the second sounding signal arrives at the terminal device through direct incidence and/or reflection. The obtaining module 2902 is configured to obtain first location information corresponding to the terminal device. The first location information indicates whether the terminal device is located inside the vehicle or outside the vehicle. A time interval between an arrival time in the first time set and an arrival time in the second time set is used for determining the first location information.

In a possible design, the target audio signal is a linear frequency modulation signal or a ZC sequence signal.

In a possible design, if the time interval between the arrival time in the first time set and the arrival time in the second time set is within a preset time range, the first location information indicates that the terminal device is located inside the vehicle. A determining factor of the preset time range includes a time interval between two adjacent target audio signals sent by the vehicle. Alternatively, if the time interval between the arrival time in the first time set and the arrival time in the second time set is not within a preset time range, the first location information indicates that the terminal device is located outside the vehicle.

In a possible design, the time interval between the arrival time in the first time set and the arrival time in the second time set includes: a time interval between a latest time in the first time set and an earliest time in the second time set.

In a possible design, when the sending module 2901 detects any one or more of the following cases, it is considered that the first trigger condition is met: detecting that the vehicle is parked; or detecting that a distance between the terminal device and the vehicle meets a first distance condition; or obtaining a first instruction, where the first instruction is used to trigger the vehicle to obtain the first location information.

In a possible design, the sending module 2901 is specifically configured to: obtain a velocity, acceleration, and an angular velocity of the vehicle, and input the velocity, the acceleration, and the angular velocity of the vehicle into a classification model, to obtain predicted category information output by the classification model. The predicted category information indicates whether the vehicle is in a stopped state or a moving state.

It should be noted that content such as information exchange or an execution process between modules/units in the location obtaining apparatus 2900 is based on a same concept as the method embodiments corresponding to FIG. 18 to FIG. 21 in this application. For specific content, refer to the description in the foregoing method embodiments of this application. Details are not described herein again.

Figure 27:
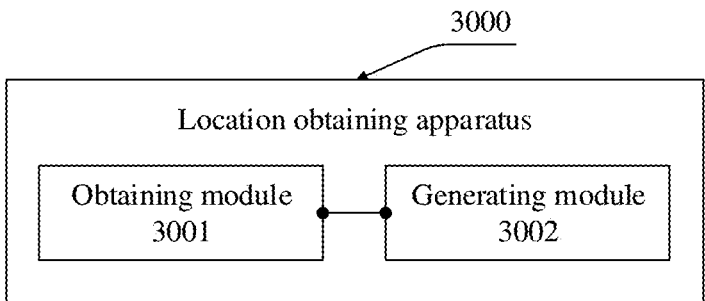
FIG. 27 is a schematic diagram of another structure of a location obtaining apparatus according to an embodiment of this application.

An embodiment of this application further provides another location obtaining apparatus. FIG. 27 is a schematic diagram of another structure of a location obtaining apparatus according to an embodiment of this application. The location obtaining apparatus 3000 is used in a terminal device. The terminal device is included in a location obtaining system. The location obtaining system further includes a vehicle. The location obtaining apparatus 3000 includes an obtaining module 3001 and a generating module 3002. The obtaining module 3001 is configured to: when it is detected that a second trigger condition is met, obtain at least one arrival time corresponding to at least one target audio signal. The at least one target audio signal includes a plurality of target audio signals sent by the vehicle according to a preset frequency. The plurality of target audio signals include a first sounding signal and a second sounding signal. The at least one arrival time includes a first time set corresponding to the first sounding signal and a second time set corresponding to the second sounding signal. The first time set includes at least one time at which the first sounding signal arrives at the terminal device through direct incidence and/or reflection. The second time set includes at least one time at which the second sounding signal arrives at the terminal device through direct incidence and/or reflection. The generating module 3002 is configured to generate, based on a time interval between an arrival time in the first time set and an arrival time in the second time set, first location information corresponding to the terminal device. The first location information indicates whether the terminal device is located inside the vehicle or outside the vehicle.

In a possible design, if the time interval between the arrival time in the first time set and the arrival time in the second time set is within a preset time range, the first location information indicates that the terminal device is located inside the vehicle. A determining factor of the preset time range includes a time interval between two adjacent target audio signals sent by the vehicle. Alternatively, if the time interval between the arrival time in the first time set and the arrival time in the second time set is not within a preset time range, the first location information indicates that the terminal device is located outside the vehicle.

In a possible design, the generating module 3002 is specifically configured to generate the first location information based on a time interval between a latest time in the first time set and an earliest time in the second time set.

In a possible design, when the obtaining module 3001 detects any one or more of the following cases, it is considered that the second trigger condition is met: detecting that the vehicle is parked; or detecting that a distance between the terminal device and the vehicle meets a first distance condition; or detecting that a displacement of the terminal device meets a preset displacement; or obtaining a second instruction, where the second instruction is used to trigger the terminal device to obtain the first location information.

It should be noted that content such as information exchange or an execution process between modules/units in the location obtaining apparatus 3000 is based on a same concept as the method embodiments corresponding to FIG. 18 to FIG. 21 in this application. For specific content, refer to the description in the foregoing method embodiments of this application. Details are not described herein again.

Figure 28:
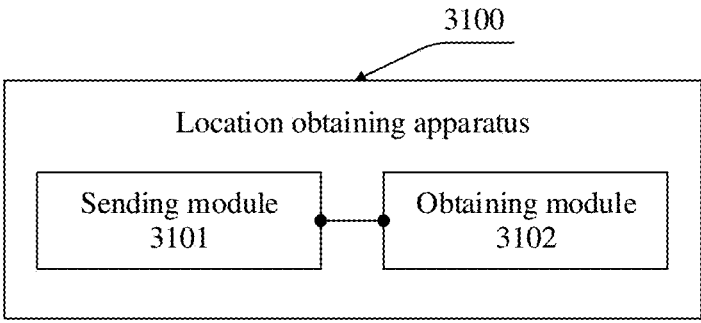
FIG. 28 is a schematic diagram of another structure of a location obtaining apparatus according to an embodiment of this application.

An embodiment of this application further provides another location obtaining apparatus. FIG. 28 is a schematic diagram of a structure of a location obtaining apparatus according to an embodiment of this application. The location obtaining apparatus 3100 is used in a vehicle. The vehicle is included in a location obtaining system. The location obtaining system further includes a terminal device. The location obtaining apparatus 3100 includes a sending module 3101 and an obtaining module 3102. The sending module 3101 is configured to send a plurality of target audio signals according to a preset frequency. When the vehicle is in a moving state, one target audio signal is used for determining a first arrival time at which the target audio signal arrives at the terminal device. When a second trigger condition is met, one target audio signal is used for determining a second arrival time at which the target audio signal arrives at the terminal device. The obtaining module 3102 is configured to obtain first location information corresponding to the terminal device. The first location information indicates whether the terminal device is located inside the vehicle or outside the vehicle. A plurality of first arrival times and at least one second arrival time are used for determining the first location information.

In a possible design, the plurality of first arrival times are used for determining a first prediction time corresponding to the second arrival time. The first prediction time indicates a time at which the target audio signal arrives at the terminal device when the terminal device is located inside the vehicle. The first prediction time and the second arrival time are used for determining the first location information.

It should be noted that content such as information exchange or an execution process between modules/units in the location obtaining apparatus 3100 is based on a same concept as the method embodiment corresponding to FIG. 22 in this application. For specific content, refer to the description in the foregoing method embodiment of this application. Details are not described herein again.

Figure 29:
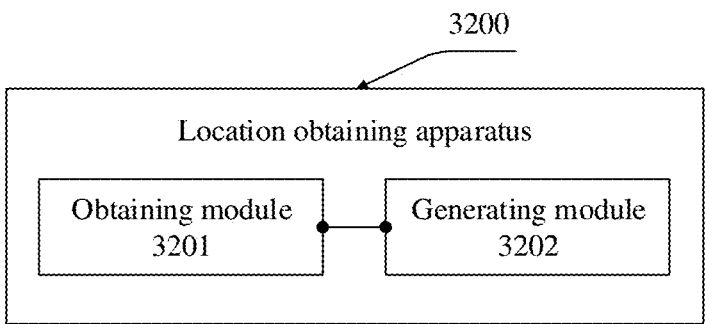
FIG. 29 is a schematic diagram of another structure of a location obtaining apparatus according to an embodiment of this application.

An embodiment of this application further provides another location obtaining apparatus. FIG. 29 is a schematic diagram of another structure of a location obtaining apparatus according to an embodiment of this application. The location obtaining apparatus 3200 is used in a terminal device. The terminal device is included in a location obtaining system. The location obtaining system further includes a vehicle. The location obtaining apparatus 3200 includes an obtaining module 3201 and a generating module 3202. The obtaining module 3201 is configured to: when the vehicle is in a moving state, obtain a plurality of first arrival times corresponding to a plurality of target audio signals. One first arrival time represents a time at which one target audio signal arrives at the terminal device. The plurality of target audio signals are sent by the vehicle according to a preset frequency. The generating module 3202 is configured to: when it is detected that a second trigger condition is met, obtain at least one second arrival time corresponding to the at least one target audio signal, and generate, based on the plurality of first arrival times and the at least one second arrival time, first location information corresponding to the terminal device. The first location information indicates whether the terminal device is located inside the vehicle or outside the vehicle.

In a possible design, the generating module 3202 is specifically configured to: determine, based on the plurality of first arrival times, a first prediction time corresponding to the second arrival time, where the first prediction time indicates a time at which the target audio signal arrives at the terminal device when the terminal device is located inside the vehicle; and generate the first location information based on the first prediction time and the second arrival time.

It should be noted that content such as information exchange or an execution process between modules/units in the location obtaining apparatus 3200 is based on a same concept as the method embodiment corresponding to FIG. 22 in this application. For specific content, refer to the description in the foregoing method embodiment of this application. Details are not described herein again.

Figure 30:
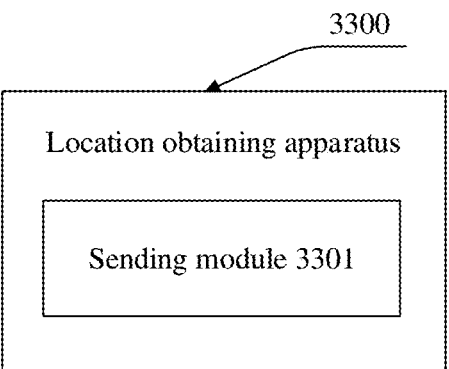
FIG. 30 is a schematic diagram of another structure of a location obtaining apparatus according to an embodiment of this application.

An embodiment of this application further provides another location obtaining apparatus. FIG. 30 is a schematic diagram of another structure of a location obtaining apparatus according to an embodiment of this application. The location obtaining apparatus 3300 is used in a vehicle. The vehicle is included in a location obtaining system. The location obtaining system further includes a terminal device. The vehicle is configured with at least three sounders, and the at least three sounders are not located on one straight line. The at least three sounders include a first sounder, a second sounder, and a third sounder. The location obtaining apparatus 3300 includes a sending module 3301. The sending module 3301 is configured to send a first audio signal through the first sounder. The first audio signal is used for determining a first signal strength of the first audio signal received by the terminal device. The sending module 3301 is further configured to send a second audio signal through the second sounder. The second audio signal is used for determining a second signal strength of the second audio signal received by the terminal device. The sending module 3301 is further configured to send a third audio signal through the third sounder. The third audio signal is used for determining a third signal strength of the third audio signal received by the terminal device. The first signal strength, the second signal strength, and the third signal strength are used for determining second location information corresponding to the terminal device. The second location information indicates a location of the terminal device located outside the vehicle.

In a possible design, the second location information is used by the vehicle to determine a component closest to the terminal device from a plurality of components included in the vehicle, to control the component closest to the terminal device to perform a preset operation.

It should be noted that content such as information exchange or an execution process between modules/units in the location obtaining apparatus 3300 is based on a same concept as the method embodiments corresponding to FIG. 23 to FIG. 25 in this application. For specific content, refer to the description in the foregoing method embodiments of this application. Details are not described herein again.

Figure 31:
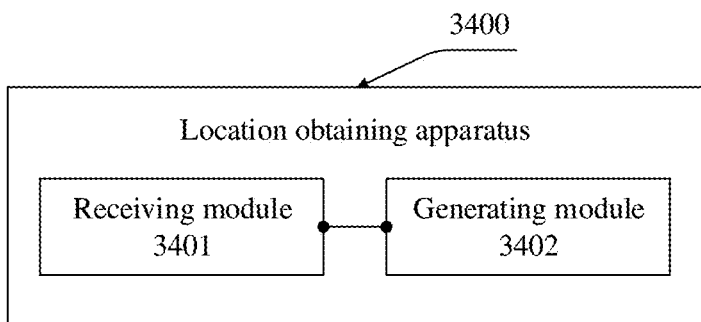
FIG. 31 is a schematic diagram of another structure of a location obtaining apparatus according to an embodiment of this application.

An embodiment of this application further provides another location obtaining apparatus. FIG. 31 is a schematic diagram of another structure of a location obtaining apparatus according to an embodiment of this application. The location obtaining apparatus 3400 is used in a terminal device. The terminal device is included in a location obtaining system. The location obtaining system further includes a vehicle. The vehicle is configured with at least three sounders, and the at least three sounders are not located on one straight line. The at least three sounders include a first sounder, a second sounder, and a third sounder. The location obtaining apparatus 3400 includes a receiving module 3401 and a generating module 3402. The receiving module 3401 is configured to: receive a first audio signal sent by the first sounder, receive a second audio signal sent by the second sounder, and receive a second audio signal sent by the third sounder. The generating module 3402 is configured to generate, based on a first signal strength of the received first audio signal, a second signal strength of the received second audio signal, and a third signal strength of the received third audio signal, second location information corresponding to the terminal device. The second location information indicates a location of the terminal device located outside the vehicle.

It should be noted that content such as information exchange or an execution process between modules/units in the location obtaining apparatus 3400 is based on a same concept as the method embodiments corresponding to FIG. 23 to FIG. 25 in this application. For specific content, refer to the description in the foregoing method embodiments of this application. Details are not described herein again.

In Embodiment 3 in embodiments of this application, after the location information of the terminal device relative to the vehicle can be obtained, that is, whether the terminal device is located inside the vehicle or outside the vehicle is obtained, the location information can be applied in a plurality of interaction scenarios between the vehicle and the terminal device. The following describes the plurality of application scenarios one by one.

Embodiment 3

1. An audio stream processing manner when a first terminal device is moved from the inside of a vehicle to the outside of the vehicle is as follows.

Figure 32A:
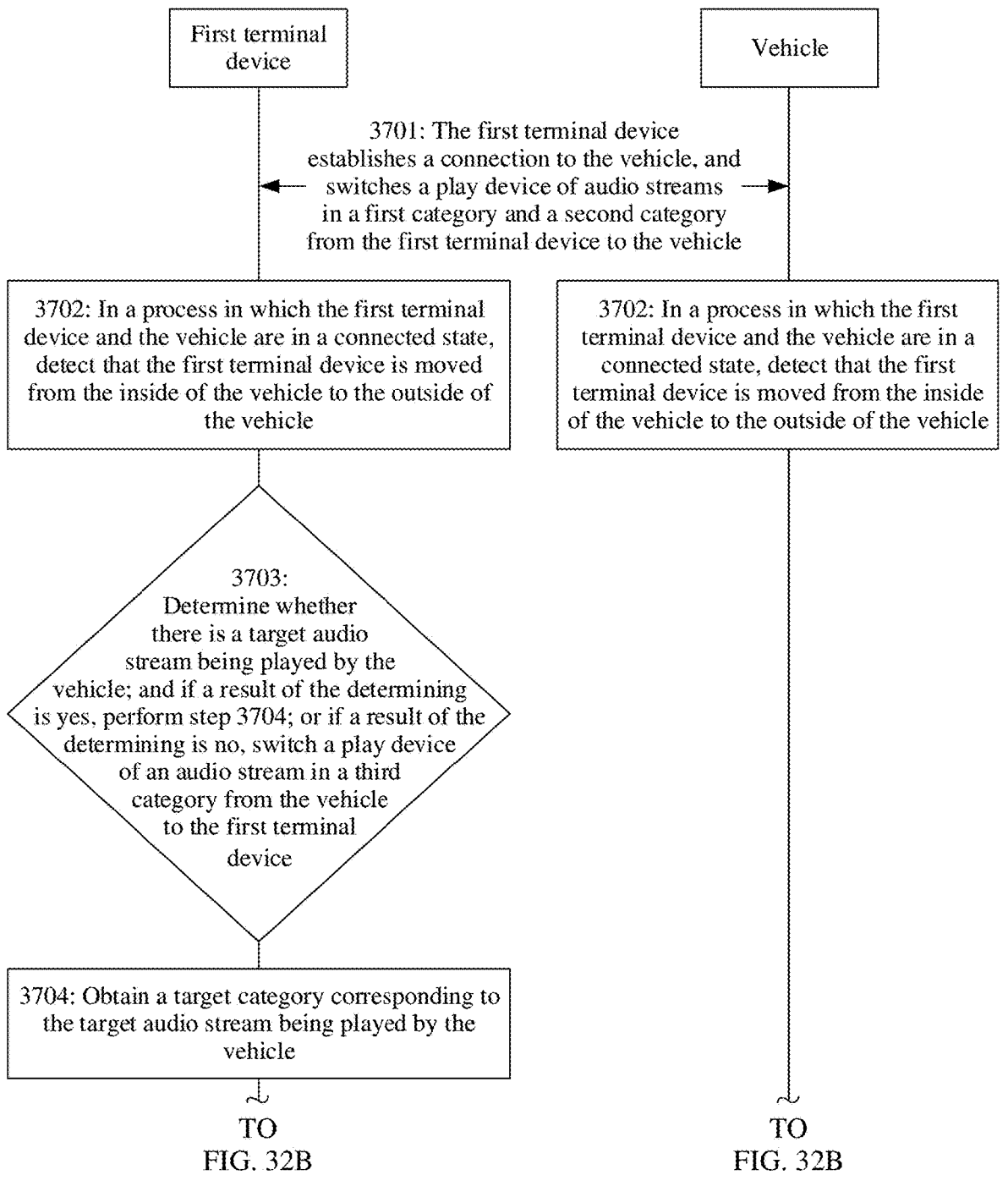

Specifically, FIG. 32A and FIG. 32B are a schematic flowchart of an audio stream processing method according to an embodiment of this application. The audio stream processing method provided in this embodiment of this application may include the following steps.

3701: A first terminal device establishes a connection to a vehicle, and switches a play device of audio streams in a first category and a second category from the first terminal device to the vehicle.

In this embodiment of this application, if it is the first time that the first terminal device establishes the connection to the vehicle, the first terminal device may scan a surrounding electronic device by using Bluetooth, wireless fidelity (wireless fidelity, Wi-Fi), another technology, or the like. If at least one vehicle is found within a preset distance threshold, the first terminal device may send a connection request to each vehicle, to trigger a pairing operation between the first terminal device and the vehicle. If the first terminal device is successfully paired with one of the at least one vehicle, the first terminal device successfully establishes the connection to the vehicle. If the first terminal device fails to be paired with one of the at least one vehicle, the first terminal device cannot establish the connection to the vehicle.

Specifically, after receiving the connection request sent by the first terminal device, the vehicle generates a personal identification number (personal identification number, PIN)

of the vehicle in response to the received connection request, and sends a response message to the first terminal device. After receiving the response message, the first terminal device may send a PIN code to the vehicle. The vehicle matches the PIN code sent by the first terminal device with the generated PIN code. If the matching succeeds, it indicates that the first terminal device is successfully paired with the vehicle. If the matching fails, it indicates that the first terminal device fails to be paired with the vehicle.

If it is not the first time that the first terminal device establishes the connection to the vehicle, the first terminal device may scan a surrounding electronic device by using Bluetooth, wireless fidelity (wireless fidelity, Wi-Fi), another technology, or the like. If at least one vehicle that has been paired is found within a preset distance threshold, the first terminal device may send a connection request to the vehicle. The vehicle establishes the connection to the first terminal device in response to the obtained connection request.

In a process in which the first terminal device and the vehicle are in a connected state, the first terminal device may send synchronization data to the vehicle. Correspondingly, the vehicle receives the synchronization data sent by the first terminal device, so that the first terminal device may perform any one or more of the following tasks through the vehicle: playing an audio stream, playing a video, navigation, a video call, a call, another task, or the like. This is not enumerated herein.

After establishing the connection to the vehicle, the first terminal device may switch a play device of an audio stream in a third category from the first terminal device to the vehicle. The third category includes audio streams in at least two categories. The audio streams in the at least two categories include the first category and the second category. Specifically, a specific category of an audio stream included in the audio stream in the third category may be flexibly determined with reference to an actual application scenario. For example, the third category may include media, a call, or an audio stream in another category. Meanings of the first category and the second category are described in subsequent steps, and are not explained herein.

Specifically, the first terminal device may store indication information. The indication information records a specific play device used for the audio streams that are in the at least two categories and that are included in the audio stream in the third category. The first terminal device may update the indication information. The indication information before the update indicates that the play device of the audio stream in the third category is the first terminal device. The indication information after the update indicates that the play device of the audio stream in the third category is the vehicle.

For example, the audio stream in the third category may include a loudspeaker of the first terminal device, an earphone of the first terminal device, a vehicle in a connected state with the first terminal device, another possible play device, or the like. This is not enumerated herein.

Further, the indication information may be specifically represented as a table, a flag bit, another information type, or the like. This is not enumerated herein.

3702: In the process in which the first terminal device and the vehicle are in the connected state, the first terminal device or the vehicle detects that the first terminal device is moved from the inside of the vehicle to the outside of the vehicle.

In this embodiment of this application, in the process in which the first terminal device and the vehicle are in the connected state, the first terminal device or the vehicle may detect first location information of the first terminal device in a preset time period, and may learn, based on the first location information of the first terminal device in the preset time period, whether the first terminal device is moved from the inside of the vehicle to the outside of the vehicle.

Optionally, in the process in which the first terminal device and the vehicle are in the connected state, and the first terminal device performs screen casting through the vehicle, the first terminal device or the vehicle detects that the first terminal device is moved from the inside of the vehicle to the outside of the vehicle.

The first terminal device is a terminal device that has established the connection to the vehicle and that is located inside the vehicle. Optionally, the first terminal device is a terminal device that has established the connection to the vehicle, that performs a screen casting operation through the vehicle, and that is located inside the vehicle.

A value range of the preset time period may be, for example, 10 seconds to 2 minutes. For example, a value of the preset time period may be 20 seconds, 370 seconds, 45 seconds, 1 minute, 80 seconds, 90 seconds, or another value. The specific value of the preset time period may be flexibly set with reference to an actual application product. This is not limited herein.

More specifically, in an implementation, the solution provided in Embodiment 2 may be used to obtain the first location information of the first terminal device in the preset time period. To be specific, in Embodiment 2, when the vehicle detects that a first trigger condition is met and/or the first terminal device detects that a second trigger condition is met, the vehicle and the first terminal device start a first location sensing operation, and continuously obtain the first location information of the first terminal device in the preset time period. If the first terminal device or the vehicle detects that the first terminal device is moved from the inside of the vehicle to the outside of the vehicle, step 3702 is triggered. If the first terminal device or the vehicle detects that the first terminal device is always located inside the vehicle, the first terminal device may continue to perform screen casting through the vehicle.

Specifically, the vehicle sends a plurality of target audio signals according to a preset frequency. The plurality of target audio signals include a first sounding signal and a second sounding signal. At least one arrival time includes a first time set corresponding to the first sounding signal and a second time set corresponding to the second sounding signal. The first time set includes at least one time at which the first sounding signal arrives at the first terminal device through direct incidence and/or reflection. The second time set includes at least one time at which the second sounding signal arrives at the first terminal device through direct incidence and/or reflection. The first terminal device generates, based on a time interval between an arrival time in the first time set and an arrival time in the second time set, first location information corresponding to the terminal device. The first location information indicates whether the first terminal device is located inside the vehicle or outside the vehicle. The first terminal device determines, based on the first location information of the first terminal device in the preset time period, that the first terminal device is moved from the inside of the vehicle to the outside of the vehicle.

It should be noted that for a specific implementation of the foregoing step, reference may be made to the description in Embodiment 2. Details are not described herein again.

In another implementation, when the vehicle detects that a first trigger condition is met and/or the first terminal device detects that a second trigger condition is met, the vehicle or the first terminal device may continuously obtain a distance between the first terminal device and the vehicle in the preset time period by using an ultra-wideband (ultra-wideband, UWB) technology, a Bluetooth technology, or another technology, and determine first location information of the first terminal device in the preset time period based on the distance between the first terminal device and the vehicle in the preset time period. If the distance between the first terminal device and the vehicle is greater than or equal to a preset distance threshold, it indicates that the first terminal device is located outside the vehicle. If the distance between the first terminal device and the vehicle is less than a preset distance threshold, it indicates that the first terminal device is located inside the vehicle.

It should be noted that the vehicle or the first terminal device may alternatively generate the first location information of the first terminal device by using another technology. This is not enumerated herein.

In addition, if the vehicle detects that the first terminal device is moved from the inside of the vehicle to the outside of the vehicle, the vehicle sends indication information to the first terminal device. The indication information indicates that the first terminal device is moved from the inside of the vehicle to the outside of the vehicle in the preset time period. Alternatively, if the vehicle detects that the first terminal device is always located inside the vehicle, the vehicle sends indication information to the first terminal device. The first indication information indicates that the first terminal device is always located inside the vehicle in the preset time period.

Optionally, to ensure good experience of the user in a call process, when the first terminal device and the vehicle are in the connected state, if a target category corresponding to a target audio stream played by the first terminal device through the vehicle is a call, in a process in which the user makes a call through the first terminal device, the first terminal device and the vehicle may not obtain the first location information of the first terminal device. In other words, in the process in which the user makes a call through the first terminal device, the first terminal device and the vehicle do not detect whether the first terminal device is moved from the inside of the vehicle to the outside of the vehicle.

If the user wants to switch a play device of the target audio stream in the call category from the vehicle to another electronic device, the user needs to actively input a first switch operation. In response to the received first switch operation, the first terminal device or the vehicle switches, to an electronic device corresponding to the first switch operation, the play device of the target audio stream in the target category: the call category.

The audio stream in the call category may include: an audio stream generated when a call is made by using an instant messaging application, an audio stream generated when a video call is made by using an instant messaging application, another audio stream classified as a call, or the like.

Figure 33:
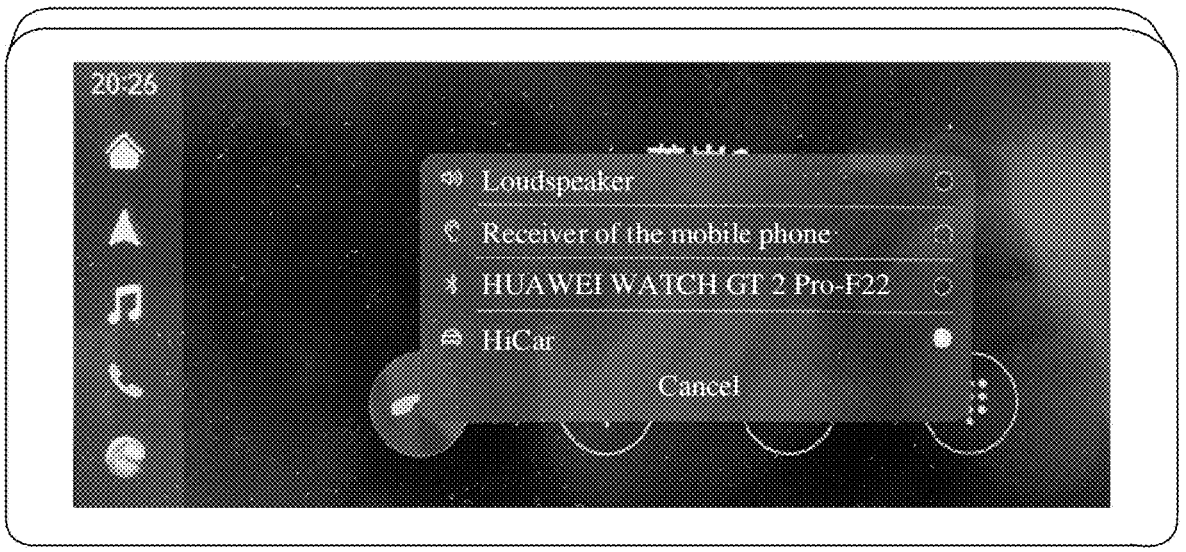
FIG. 33 is a schematic diagram of a receiving interface of a first switch operation in an audio stream processing method according to an embodiment of this application.

Specifically, a manner in which the user actively inputs the first switch operation is as follows. In an implementation, the user may input the first switch operation through a display interface of the first terminal device, or the user may input the first switch operation through a display interface of the vehicle. For more intuitive understanding of this solution, refer to FIG. 33. FIG. 33 is a schematic diagram of a receiving interface of a first switch operation in an audio stream processing method according to an embodiment of this application. FIG. 33 shows an example of a display interface of a central control screen of the vehicle. As shown in the figure, the current play device of the target audio stream in the call category is a sounder configured in the vehicle. FIG. 33 further shows three manners: a sounder of the terminal device, an earphone of the terminal device, and Bluetooth connected to the terminal device. In this case, the user may input the first switch operation by tapping an icon on the display interface. It should be understood that the example in FIG. 33 is merely for ease of understanding, and is not intended to limit this solution.

In another implementation, in a process in which the first terminal device plays, through the vehicle, the target audio stream in the call category, if the first terminal device detects that the user puts the first terminal device close to an ear, it may be considered that the user inputs the first switch operation through the first terminal device, and the play device corresponding to the first switch operation is the earphone of the first terminal device.

For example, when the user puts the first terminal device close to the ear, the first terminal device may perform auricle proximity detection by using a capacitive screen, to detect that the user puts the first terminal device close to the ear. Alternatively, the first terminal device may detect, by using a component such as a gyroscope, a gravity sensor, or an optical proximity sensor, an action of being picked up and approaching the ear, to determine that the user puts the first terminal device close to the ear. It should be noted that, the first terminal device may further detect, by using another technology, whether the user puts the first terminal device close to the ear. An example herein is merely used to prove implementability of this solution, and is not intended to limit this solution.

Further, optionally, after the call performed by the user by using the first terminal device ends, the first terminal device or the vehicle may be triggered to obtain the location information of the first terminal device. If it is detected that the first terminal device is located outside the vehicle, a play device of an audio stream in at least one category played by the vehicle may be switched from the vehicle to the first terminal device, or a play device of an audio stream in another category other than media may be switched from the vehicle to the first terminal device.

After it is detected that the first terminal device is located outside the vehicle, the display interface of the central control screen of the vehicle may be switched to an off-vehicle mode. In the off-vehicle mode, content displayed on the display interface of the central control screen of the vehicle may be any one or a combination of several of the following: screen-off, a wallpaper, displayed time or an illustration, prompt information, or other information. The foregoing prompt information indicates a current status of the central control screen of the vehicle. It should be noted that, in the off-vehicle mode, the central control screen of the vehicle may further display other information. Specific information to be displayed may be flexibly set with reference to an actual product form, and is not enumerated herein.

In this embodiment of this application, in the process in which the first terminal device and the vehicle are in the connected state, when a pickup operation needs to be performed, whether a pickup device on the first terminal device or a pickup device of the vehicle is specifically used may be determined based on the play device used for the audio stream in the call category. To be specific, if the first terminal device plays the audio stream in the call category through the vehicle, the first terminal device may perform pickup by using the vehicle. If the first terminal device plays the audio stream in the call category through the first terminal device, the first terminal device may perform pickup by using the first terminal device. The pickup device may be specifically a microphone, another type of pickup device, or the like.

In this embodiment of this application, in a process in which the first terminal device and the vehicle are in the connected state, and the first terminal device is always located inside the vehicle, if the first terminal device detects that a connection is established between a headset and the first terminal device, in an implementation, the first terminal device may automatically switch, to the headset, an output device of audio streams in all categories included in the third category. In another implementation, the first terminal device may output query information. The query information is used to query whether to switch the output device of the audio streams in all the categories to the headset. The first terminal device may respond to the switch operation input by the user, and switch the output device of the audio streams in all the categories to the headset.

3703: The first terminal device determines whether there is a target audio stream being played through the vehicle; and if a result of the determining is yes, performs step 3704; or if a result of the determining is no, switches the play device of the audio stream in the third category from the vehicle to the first terminal device. The third category includes all the categories corresponding to the audio streams played by the first terminal device through the vehicle.

In some embodiments of this application, when determining that the first terminal device is moved from the inside of the vehicle to the outside of the vehicle, the first terminal device may determine whether there is a target audio stream being played by the first terminal device through the vehicle. If the result of the determining is yes, step 3704 is triggered. If the result of the determining is no, the play device of the audio stream in the third category is triggered to be switched from the vehicle to the first terminal device. The third category includes all the categories corresponding to the audio streams played by the first terminal device through the vehicle.

Specifically, in the process in which the first terminal device and the vehicle are in the connected state, and the first terminal device is moved from the inside of the vehicle to the outside of the vehicle, if the first terminal device does not play any audio stream through the vehicle, the play device of the audio streams in all the categories included in the third category may be switched from the vehicle to the first terminal device, and the display interface of the central control screen of the vehicle may enter the off-vehicle mode.

Figure 34:
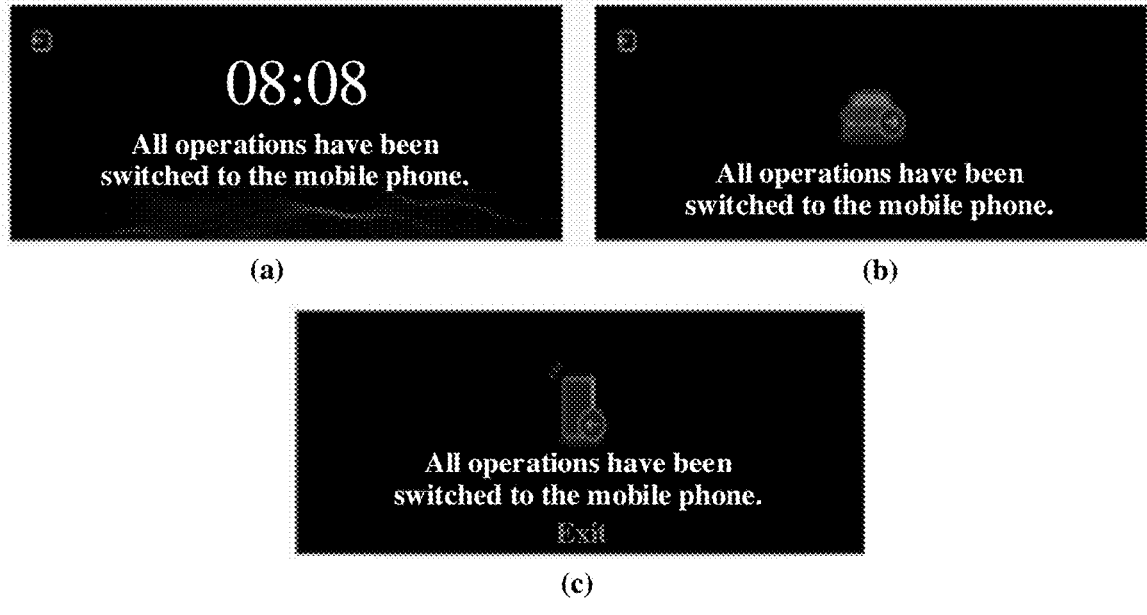
FIG. 34 is a schematic diagram of an off-vehicle mode in an audio stream processing method according to an embodiment of this application.

For more intuitive understanding of this solution, refer to FIG. 34. FIG. 34 is a schematic diagram of an off-vehicle mode in an audio stream processing method according to an embodiment of this application. FIG. 34 includes three schematic sub-diagrams (a), (b), and (c). The three schematic sub-diagrams (a), (b), and (c) of FIG. 34 each show a display interface of the central control screen of the vehicle after the play device of the audio streams in all the categories included in the third category are switched from the vehicle to the first terminal device. It should be understood that the example in FIG. 34 is merely for ease of understanding of this solution, and is not intended to limit this solution.

3704: The first terminal device obtains the target category corresponding to the target audio stream being played by the vehicle.

In this embodiment of this application, when the first terminal device and the vehicle are in the connected state, it is detected that the first terminal device is moved from the inside of the vehicle to the outside of the vehicle, and the first terminal device has the target audio stream being played by the first terminal device through the vehicle, the first terminal device may obtain the target category corresponding to the target audio stream being played by the vehicle.

The category corresponding to the target audio stream may include: a call, media (music), a system, or another category. An audio stream in the system category may include one or more of an incoming call ring (ring), an alarm (alarm) or a timer, a voice assistant broadcast, a notification (notification), a screen touch sound, a screen lock sound, a dial tone, photographing sound effect, screenshot sound effect, screen reading, or other sound effect, and the like. This is not enumerated herein. It should be noted that a specific category of an audio stream that can be played through the vehicle may be determined with reference to an actual product. This is not limited herein.

3705: The first terminal device determines whether the target category is the first category; and if a result of the determining is yes, performs step 3706; or if a result of the determining is no, performs step 3709.

In this embodiment of this application, after obtaining the target category corresponding to the target audio stream being played by the vehicle, the first terminal device may determine whether the target category is the first category; and if the target category is the first category, perform step 3706; or if the target category is not the first category, perform step 3709.

The first category may include media. An audio stream in the media category may include: an audio stream generated by a music, video, or game application, an audio in an instant messaging application, or another audio stream classified as media, and the like. This is not enumerated herein.

In this embodiment of this application, because the audio stream in the media category is generally for entertainment and has a relatively low requirement for privacy, after the first terminal device is moved from the inside of the vehicle to the outside of the vehicle, the vehicle continues to play the target audio stream only when the target audio stream being played by the vehicle is in the media category. In this way, entertainment for another person inside the vehicle is ensured, and privacy leakage of the user is avoided.

Certainly, in this embodiment of this application, the first category may be alternatively another category other than media. This is not limited herein.

3706: The first terminal device continues to send the target audio stream to the vehicle, and then performs step 3707.

In this embodiment of this application, step 3705 is an optional step. If step 3705 is not performed, step 3706 may be performed after step 3704 is performed, and the first terminal device may continue to send the target audio stream to the vehicle. Correspondingly, after receiving the target audio stream sent by the first terminal device, the vehicle continues to play the target audio stream. In other words, after the first terminal device is moved from the inside of the vehicle to the outside of the vehicle, the play device of the audio stream in the target category is still the vehicle.

Optionally, a play device of an audio stream in another category other than the target category in the third category may be further switched from the vehicle to the first terminal device. The third category includes the categories of all the audio streams played by the first terminal device through the vehicle.

If step 3705 is performed, when determining that the target category corresponding to the target audio stream being played by the vehicle belongs to the first category, the first terminal device may continue to send the target audio stream to the vehicle. Correspondingly, after receiving the target audio stream sent by the first terminal device, the vehicle continues to play the target audio stream. In other words, after the first terminal device is moved from the inside of the vehicle to the outside of the vehicle, the play device of the audio stream in the first category is still the vehicle.

Figure 35:
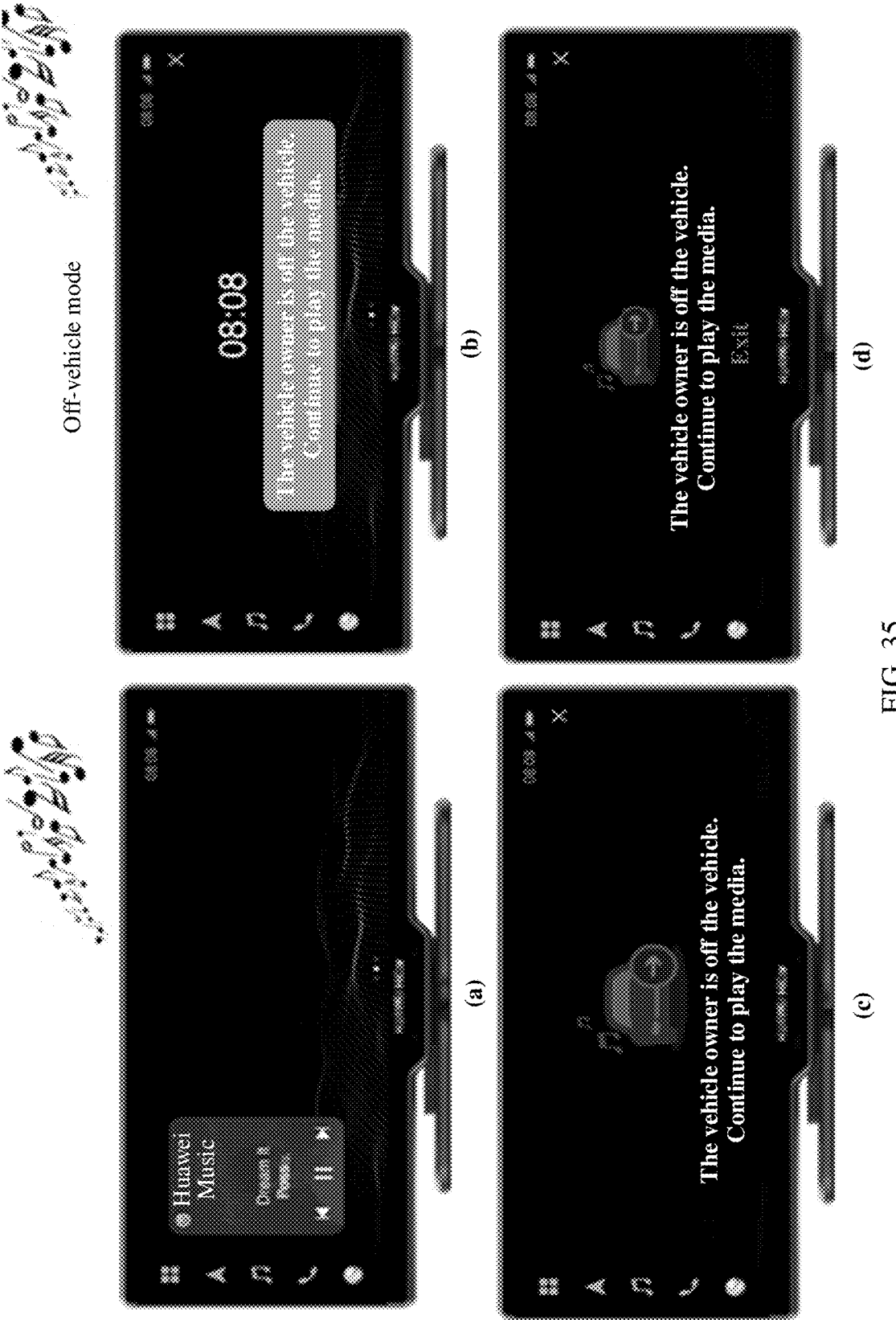
FIG. 35 is a schematic diagram of an off-vehicle mode in an audio stream processing method according to an embodiment of this application.

After it is detected that the first terminal device is moved from the inside of the vehicle to the outside of the vehicle, the display interface of the central control screen of the vehicle may be switched to the off-vehicle mode. For more intuitive understanding of this solution, refer to FIG. 35. FIG. 35 is a schematic diagram of an off-vehicle mode in an audio stream processing method according to an embodiment of this application. FIG. 35 includes four schematic sub-diagrams (a), (b), (c), and (d). The schematic sub-diagram (a) of FIG. 35 represents an interface when the first terminal device is located inside the vehicle and the first terminal device plays an audio stream in the media category through the vehicle. The schematic sub-diagrams (b), (c), and (d) of FIG. 35 represent three different display interfaces of the central control screen of the vehicle after the first terminal device is moved from the inside of the vehicle to the outside of the vehicle. It should be understood that the example in FIG. 35 is merely for ease of understanding of this solution, and is not intended to limit this solution.

Specifically, a process in which the first terminal device plays the target audio stream through the vehicle is as follows. In an implementation, if a vehicle auxiliary device is a rear-mounted device of the vehicle, the first terminal device may send the target audio stream to the vehicle auxiliary device (that is, an example of the central control screen of the vehicle) configured for the vehicle, to play the target audio stream through a sounder of the vehicle auxiliary device and display screen casting data through a screen of the vehicle auxiliary device.

In another implementation, if a vehicle auxiliary device is a rear-mounted device of the vehicle, the first terminal device may send the target audio stream to a processor of the vehicle, play the target audio stream through a sounder located in a body part of the vehicle, and send other screen casting data to the vehicle auxiliary device (that is, an example of the central control screen of the vehicle) configured for the vehicle, to display the screen casting data through a screen of the vehicle auxiliary device.

In another implementation, if no vehicle auxiliary device is configured in the vehicle, the first terminal device may send all screen casting data to a processor of the vehicle, play the target audio stream through a sounder in a body part of the vehicle, and display the screen casting data through a screen of an on-board computer integrated in the vehicle.

Optionally, when the first terminal device plays the audio stream in the first category through the vehicle, the first terminal device may output first information. The first information is used to prompt the user to switch the play device of the audio stream in the first category from the vehicle to the first terminal device. Further, a form in which the first terminal device displays the first information includes but is not limited to: displaying the first information in a pop-up box form, displaying the first information in a drop-down box, displaying the first information in an icon switching form, another manner, or the like. This is not enumerated herein.

If the first terminal device obtains, based on the first information, the first switch operation input by the user, and switches the play device of the audio stream in the first category from the vehicle to the first terminal device in response to the obtained first switch operation, the first terminal device stops sending the audio stream in the first category to the vehicle.

Figure 36A:
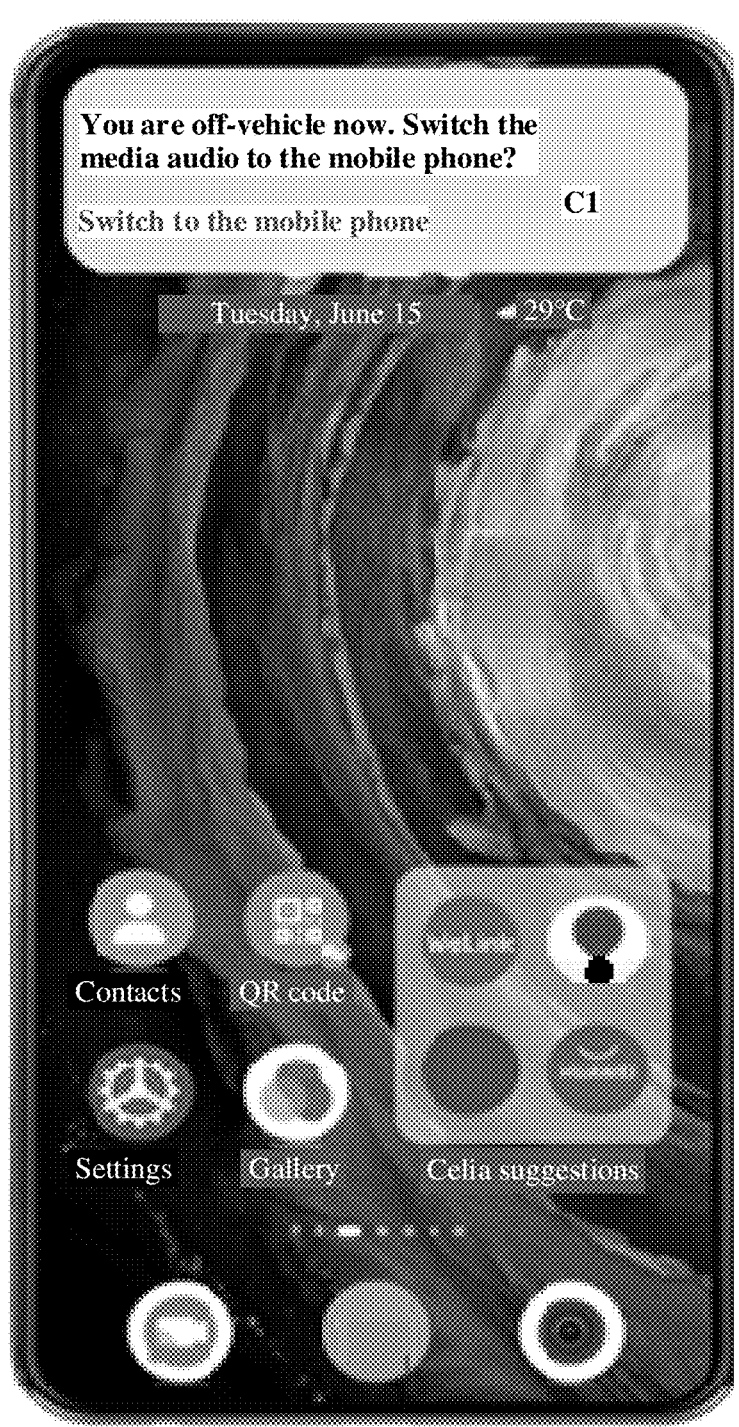
FIG. 36(*a*) and FIG. 36(*b*) are two schematic diagrams of displaying first information by a first terminal device in an audio stream processing method according to an embodiment of this application.
Figure 36B:

For more intuitive understanding of this solution, refer to FIG. 36(*a*) and FIG. 36(*b*). FIG. 36(*a*) and FIG. 36(*b*) are two schematic diagrams of displaying first information by a first terminal device in an audio stream processing method according to an embodiment of this application. FIG. 36(*a*) and FIG. 36(*b*) include two schematic sub-diagrams (a) and (b). A region C1 in the schematic sub-diagram FIG. 36(*a*) shows that the first information is displayed in a pop-up box form, and the user may input the first switch operation by tapping "Switch to the mobile phone" in the region C1. A region C2 in the schematic sub-diagram FIG. 36(*b*) shows that the first information is displayed in a drop-down box, and the user may input the first switch operation by tapping "Switch the audio/video to the mobile phone" in the region C1, or the like. It should be understood that the example in FIG. 36(*a*) and FIG. 36(*b*) is merely for ease of understanding of a manner of displaying the first information. Specifically, both the manner of displaying the first information and a manner of obtaining the first switch operation may be flexibly set with reference to an actual product form. These are not enumerated herein.

In this embodiment of this application, when the vehicle continues to play the target audio stream, the first information is output. The first information is used to prompt the user to switch the play device of the audio stream in the first category from the vehicle to the first terminal device. In other words, the user can determine, according to an actual case, whether to switch the play device of the audio stream in the first category back to the first terminal device, thereby improving flexibility of a switching process of a play device of an audio stream in this solution.

3707: The first terminal device switches a play device of an audio stream in another category other than the target category in the third category from the vehicle to the first terminal device.

In some embodiments of this application, step 3705 is an optional step. If step 3705 is not performed, after it is detected that the first terminal device is moved from the inside of the vehicle to the outside of the vehicle, the play device of the audio stream in the first category is still the vehicle, and the play device of the audio stream in another category other than the target category in the third category may be switched from the vehicle to the first terminal device.

Specifically, when the first terminal device is already located outside the vehicle, and the vehicle plays the audio stream in the first category, if the first terminal device needs to play a new audio stream, the first terminal device may obtain a category corresponding to the new audio stream. If the category corresponding to the new audio stream is not the target category, because the play device of the audio stream in another category other than the target category in the third category has been switched from the vehicle to the first terminal device, the first terminal device may play the new audio stream, and the first terminal device does not send the new audio stream to the vehicle.

Further, if the first terminal device stores the indication information, and the indication information records the specific play device used for the audio streams that are in at least two categories and that are included in the audio stream in the third category, the first terminal device further needs to update the indication information again. The indication information before the update indicates that the play device of the audio streams that are in the at least two categories and that are included in the audio stream in the third category is the vehicle. If step 3705 is not performed, the indication information after the update may indicate that the play device of the audio stream in another category other than the target category in the third category is the first terminal device. If step 3705 is performed, because the audio stream in the target category is determined as the audio stream in the first category, and the audio stream in the third category includes the audio stream in the first category and the audio stream in the second category, the indication information after the update may indicate that the play device of the audio stream in the second category is the first terminal device.

In this embodiment of this application, after the first terminal device is moved from the inside of the vehicle to the outside of the vehicle, the vehicle continues to play the audio stream in the first category, and the play device of the audio stream in the second category is switched from the vehicle to the first terminal device. The first category and the second category are different categories. In other words, a play device of some audio streams remains as the vehicle, and a play device of the other audio streams is switched from the vehicle to the first terminal device. Therefore, a specific category in which an audio stream is continuously played by the vehicle and a specific category of an audio stream whose play device is switched to the first terminal device can be flexibly set according to an actual case, thereby improving implementation flexibility of this solution.

If step 3705 is performed, when determining that the target category is the first category, the first terminal device continues to send the target audio stream in the first category to the vehicle. In other words, step 3707 may also be described as switching, from the vehicle to the first terminal device, the play device of the audio stream that is in the second category and that is generated by the first terminal device. The second category and the first category are different categories. The second category may include audio streams in all categories other than the audio stream in the first category in the audio stream included in the third category.

Specifically, when the first terminal device is already located outside the vehicle, and the vehicle plays the audio stream in the first category, if the first terminal device needs to play a new audio stream, the first terminal device may obtain a category corresponding to the new audio stream. If the category corresponding to the new audio stream is not the second category, because the play device of the audio stream in the second category has been switched from the vehicle to the first terminal device, the first terminal device may play the audio stream in the second category, and the first terminal device does not send the audio stream in the second category to the vehicle.

It should be noted that step 3707 is an optional step. If step 3707 is not performed, in another implementation, after it is detected that the first terminal device is moved from the inside of the vehicle to the outside of the vehicle, because the play device of the target audio stream is still the vehicle, the play device of the audio streams in all the categories included in the third category may be considered as the vehicle by default.

When the first terminal device needs to play the new audio stream, the first terminal device may output third information. The third information is used to prompt the user to switch the play device of the audio streams in all the categories included in the third category from the vehicle to the first terminal device. It should be noted that a specific implementation in which the first terminal device outputs the third information may be similar to a specific implementation in which the first terminal device outputs the first information. Refer to the foregoing description. Details are not described herein again.

3708: When obtaining a play operation for a first audio stream, the first terminal device outputs the first information. A category of the first audio stream is the first category. The first audio stream is different from the target audio stream being played by the vehicle. The first information is used to prompt the user to switch the play device of the audio stream in the first category from the vehicle to the first terminal device.

In some embodiments of this application, in a process in which the first terminal device continues to play the target audio stream through the vehicle, if the first terminal device obtains the play operation for the new first audio stream, the first terminal device may obtain the category of the new first audio stream. If the category of the new first audio stream is the first category, the first terminal device may output the first information, and the user can select, based on the first information, to switch the play device of the audio stream in the first category from the vehicle to the first terminal device.

The play operation that is for the new audio stream in the first category and that is obtained by the first terminal device and the target audio stream being played by the vehicle may come from a same application, or may come from different applications. For example, the target audio stream being played by the vehicle comes from a video application, and the play operation obtained by the first terminal device for the new audio stream comes from a music application. For another example, the target audio stream being played by the vehicle comes from a video application 1, and the play operation obtained by the first terminal device for the new audio stream also comes from the video application 1. It should be understood that the example herein is merely for ease of understanding of this solution, and is not intended to limit this solution.

A form in which the first terminal device displays the first information includes but is not limited to: displaying the first information in a pop-up box form, displaying the notification in a drop-down box, displaying the first information in an icon switching form, another manner, or the like. This is not enumerated herein.

Specifically, in an implementation, if the play device of the audio stream in the second category has been switched from the vehicle to the first terminal device in step 3707, when obtaining the play operation for the new audio stream, the first terminal device may obtain the category of the new audio stream. If the category of the new first audio stream is the first category, the first terminal device may play the new first audio stream through the vehicle and output the first information, so that the user can switch the new audio stream (that is, the first audio stream in the first category) to the first terminal device based on the first information. If the category of the new first audio stream is the second category, a second terminal device may play the audio stream in the second category through the first terminal device.

If obtaining a second switch operation input by the user based on the first information, the first terminal device switches the play device of the audio stream in the first category from the vehicle to the first terminal device in response to the obtained second switch operation.

After the play device of the audio stream in the first category is switched from the vehicle to the first terminal device, the first terminal device may be triggered to pause playing of the audio stream, or the first terminal device may be triggered to continue to play the audio stream played by the vehicle before. Optionally, the first terminal device may present a management interface of the audio stream in the first category in a foreground and/or background manner. The management interface of the audio stream in the first category is used to control playing/a pause of playing/a stop of playing of the audio stream in the first category.

For example, a presentation form of the management interface of the audio stream in the first category may be any one or a combination of several of the following: displaying a notification on a lock screen, displaying a notification in a drop-down box, displaying a control widget on a home screen, displaying the management interface in an application corresponding to the audio stream in the first category, displaying a management result in a control center, displaying the management interface in another manner, and the like. This is not enumerated herein.

Figure 37A:
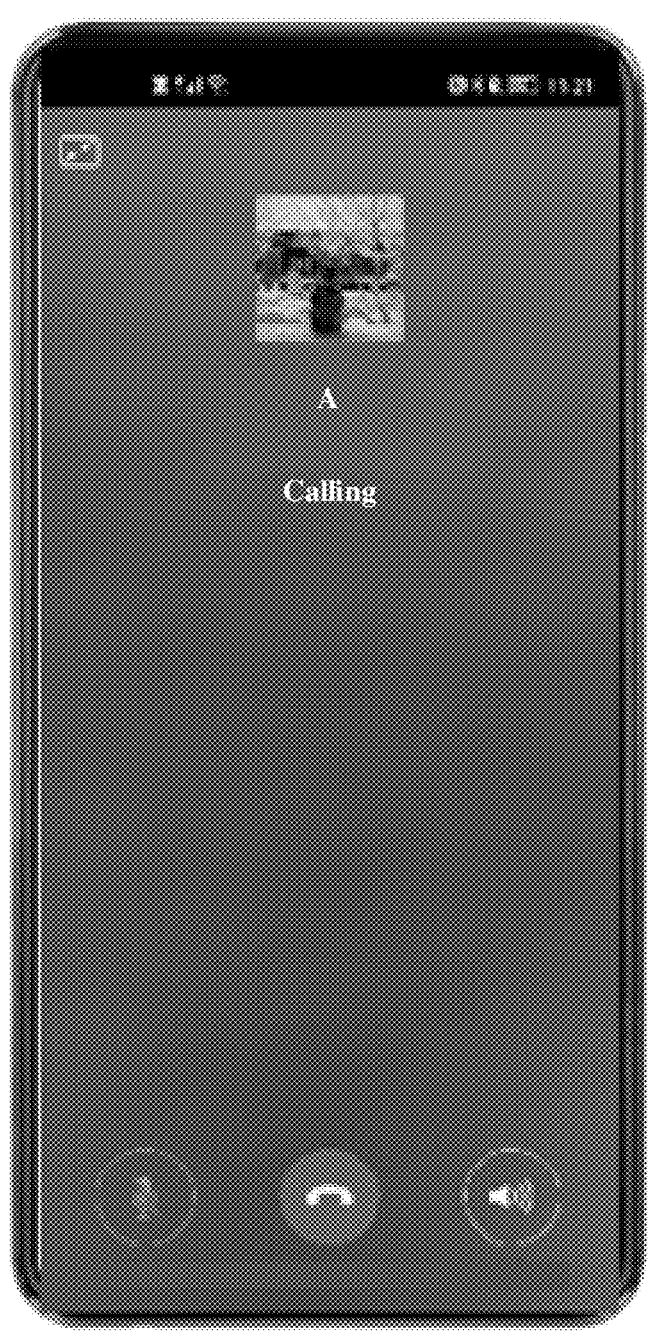
FIG. 37(*a*), FIG. 37(*b*), and FIG. 37(*c*) are a schematic diagram of first information in an audio stream processing method according to an embodiment of this application.
Figure 37B:
Figure 37C:

For more intuitive understanding of this solution, refer to FIG. 37(*a*), FIG. 37(*b*), and FIG. 37(*c*). FIG. 37(*a*), FIG. 37(*b*), and FIG. 37(*c*) are a schematic diagram of first information in an audio stream processing method according to an embodiment of this application. FIG. 37(*a*), FIG. 37(*b*), and FIG. 37(*c*) include three schematic sub-diagrams (a), (b), and (c). The schematic sub-diagram FIG. 37(*a*) and the schematic sub-diagram FIG. 37(*c*) do not present the first information. The schematic sub-diagram FIG. 37(*c*) presents the first information. In FIG. 37(*a*), FIG. 37(*b*), and FIG. 37(*c*), an example in which the first category is media is used. The schematic sub-diagram FIG. 37(*a*) shows an interface displayed by the first terminal device when the first terminal device plays an audio stream in the second category. Because FIG. 37(*a*), FIG. 37(*b*), and FIG. 37(*c*) show an example in which the play device of the audio stream in the second category is switched to the first terminal device, no first information appears in the schematic sub-diagram FIG. 37(*a*). The schematic sub-diagram FIG. 37(*b*) shows an interface displayed by the first terminal device when the first terminal device plays the audio stream in the first category. A D1 region in the schematic sub-diagram FIG. 37(*b*) outputs the first information in a form of a pop-up box. The schematic sub-diagram FIG. 37(*c*) represents the off-vehicle mode displayed by the central control screen of the vehicle after the user switches the play device of the audio stream in the first category from the vehicle to the first terminal device based on the first information output in the schematic sub-diagram FIG. 37(*b*). It should be understood that the example in FIG. 37(*a*), FIG. 37(*b*), and FIG. 37(*c*) is merely for ease of understanding of this solution, and is not intended to limit this solution.

In an implementation, if step 3707 is not included, that is, a play device of audio streams in all categories (including the first category and the second category) that are played by the vehicle is still the vehicle by default, when the first terminal device obtains the play operation for the new audio stream, regardless of whether the category of the new audio stream is the first category or the second category, the first terminal device may output first information. The first information is used to prompt the user to switch the play device of the audio streams in all the categories from the vehicle to the first terminal device. Further, for a manner in which the first terminal device displays the first information, refer to the foregoing description. Details are not described herein again.

In this embodiment of this application, when the play operation for the audio stream in the first category is obtained again, the first information is triggered to be output. The first information is used to prompt the user to switch the play device of the audio stream in the first category from the vehicle to the first terminal device. In other words, when the user uses the first terminal device to play the audio stream in the first category again, the user may determine, according to an actual case, whether to switch the play device of the audio stream in the first category back to the first terminal device, thereby improving flexibility of a switching process of a play device of an audio stream in this solution.

3709: The first terminal device stops sending the target audio stream to the vehicle.

In this embodiment of this application, if the first terminal device determines in step 3705 that the target category corresponding to the target audio stream being played by the vehicle is not the first category, the play device of the audio streams in all the categories (including the first category and the second category) generated by the first terminal device may be switched from the vehicle to the first terminal device. In other words, the first terminal device stops sending the target audio stream to the vehicle. Correspondingly, the display interface of the central control screen of the vehicle may enter the off-vehicle mode. In the off-vehicle mode, the vehicle may prompt, through the display interface of the central control screen, the user that "All operations of the first terminal device have been switched to the first terminal device".

Alternatively, after step 3708, if the user selects, based on the first information, to switch the play device of the audio stream in the first category from the vehicle to the first terminal device, the first terminal device stops sending the audio stream to the vehicle.

As described above, in a specific implementation, both step 3705 and step 3707 may be optional. For example, in an implementation, step 3701 to step 3704, and step 3706 to step 3709 may be included. Alternatively, in another implementation, step 3701 to step 3706, and step 3708 and step 3709 may be included. In this implementation, when it is determined in step 3705 that the target category is the first category, the first terminal device does not switch the play device corresponding to the audio streams in all the categories. If a play device of an audio stream in a specific category is a vehicle, the audio stream is still played by the vehicle. If a play device of an audio stream in a specific category is the first terminal device, the audio stream is still played by the first terminal device.

In this implementation, a processing manner in a case in which the target audio stream is in the first category is provided, and a processing manner in a case in which the target audio stream is not in the first category is provided. This improves integrity of this solution, and extends an application scenario of this solution.

In this embodiment of this application, in the process in which the first terminal device and the vehicle are in the connected state, when detecting that the first terminal device is moved from the inside of the vehicle to the outside of the vehicle, the first terminal device obtains the target category corresponding to the target audio stream being played by the vehicle. The target audio stream is sent by the first terminal device to the vehicle. The vehicle continues to play the target audio stream if the target category is the first category. According to the foregoing solution, it can be determined, based on a specific type of an audio stream being played by the vehicle, whether to switch a play device of the audio stream back to the first terminal device, thereby improving flexibility of an audio stream play process and improving user stickiness of this solution.

Alternatively, in this embodiment of this application, in the process in which the first terminal device and the vehicle are in the connected state, when detecting that the first terminal device is moved from the inside of the vehicle to the outside of the vehicle, the first terminal device obtains the target category corresponding to the target audio stream being played by the vehicle. The target audio stream is sent by the first terminal device to the vehicle. Then the first terminal device continues to play the target audio stream through the vehicle, but switches a play device of an audio stream in another category other than the target category to the first terminal device. In this way, the target audio can be continuously played on the vehicle after the terminal device leaves the vehicle. However, when the terminal device subsequently needs to play another type of audio stream, the terminal device may automatically play the another type of audio stream. In the foregoing solution, a play device can be partially switched based on a specific type of an audio stream being played by the vehicle, thereby improving flexibility of an audio stream play process and improving user stickiness of this solution.

2. An audio stream processing manner when a first terminal device is moved from the outside of a vehicle to the inside of the vehicle is as follows.

In some embodiments of this application, when it is detected that the first terminal device is moved from the outside of the vehicle to the inside of the vehicle, an output device of an audio stream generated by the first terminal device may be switched to the vehicle. Correspondingly, the vehicle exits an off-vehicle mode. It should be noted that for a specific implementation of detecting that the first terminal is moved from the outside of the vehicle to the inside of the vehicle, reference may be made to the description in step 301. Details are not described herein again.

Optionally, in a process in which a user carrying the first terminal device moves from the outside of the vehicle to the inside of the vehicle, if the user makes a call by using the first terminal device, to ensure privacy of a call process, the vehicle and the first terminal device may not obtain first location information of the first terminal device, that is, no longer detect a location change status of the first terminal device.

After the user ends the call by using the first terminal device, the first terminal device may be triggered to obtain the first location information of the first terminal device, to detect whether the first terminal device is located inside the vehicle. If the first terminal device is located inside the vehicle, the first terminal device may switch, to the vehicle, an output device of an audio stream in at least one category that is generated by the first terminal device. Correspondingly, the vehicle exits the off-vehicle mode. It should be noted that for a specific implementation of obtaining the first location information of the first terminal device, reference may be made to the description in step 301. Details are not described herein again.

Further optionally, the user may manually input a switch operation to switch a play device of the first terminal device from the first terminal device to the vehicle. The user may input the foregoing switch operation through a display interface of the first terminal device; or the user may input the foregoing switch operation through a button configured on the first terminal device; or the user may input the foregoing switch operation by using a voice form, or the like. This is not enumerated herein.

Figure 38A:
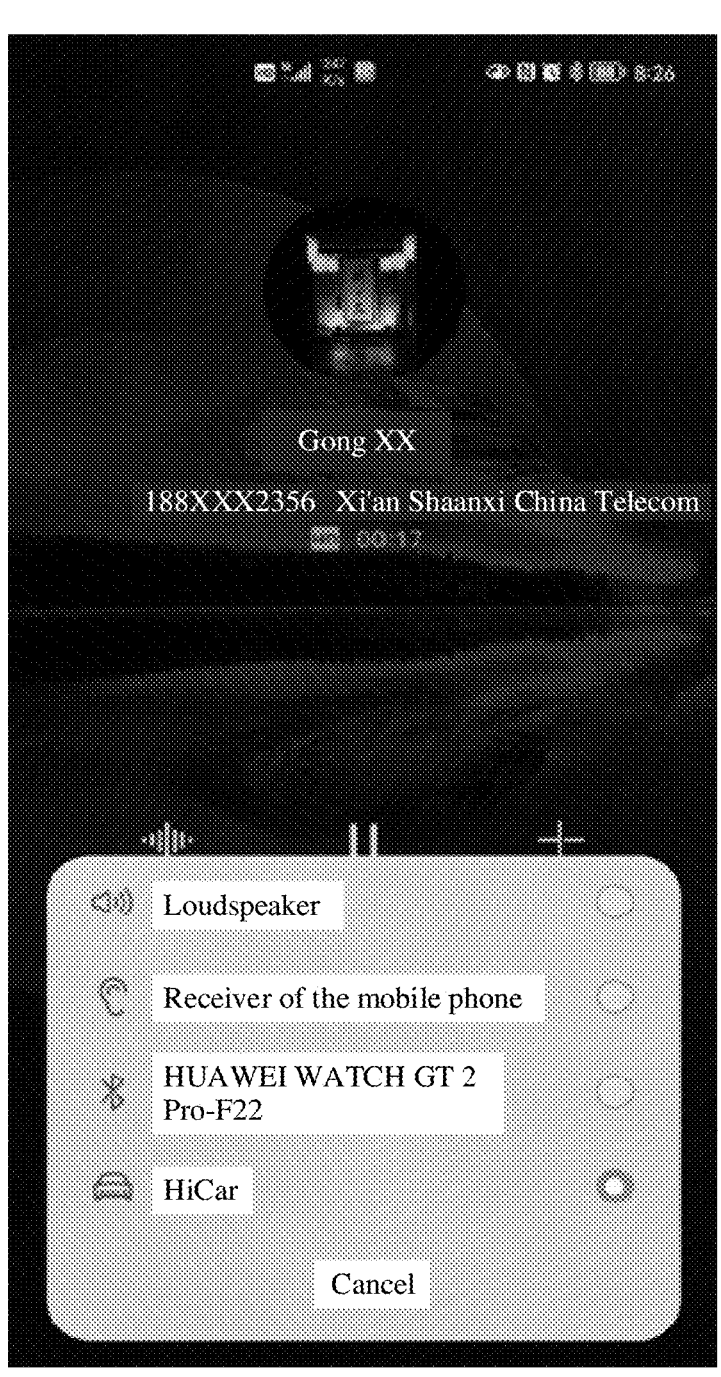
FIG. 38*a* is a schematic diagram corresponding to a switch operation in an audio stream processing method according to an embodiment of this application.

For more intuitive understanding of this solution, refer to FIG. 38a. FIG. 38a is a schematic diagram corresponding to a switch operation in an audio stream processing method according to an embodiment of this application. As shown in FIG. 38a, a selection list of a plurality of play devices may be displayed on a call interface of the first terminal device, so that the user can input the switch operation by tapping a corresponding icon. In FIG. 38a, that the play device is manually switched to the vehicle is used as an example. It should be understood that the example in FIG. 38a is merely for ease of understanding of this solution, and is not intended to limit this solution.

In some embodiments of this application, when a central control screen of the vehicle displays the off-vehicle mode, the user may further input a switch operation, so that the vehicle exits the off-vehicle mode. An input manner of the switch operation includes but is not limited to: tapping an icon corresponding to the switch operation, tapping a button corresponding to the switch operation, inputting a voice instruction for exiting the off-vehicle mode, another manner, or the like. This is not limited herein.

Optionally, when the vehicle obtains the switch operation input by the user, the switch operation indicates the vehicle to exit the off-vehicle mode. In response to the received switch operation, the vehicle may be further triggered to output indication information. The indication information is used for the user to re-confirm whether to indicate the vehicle to exit the off-vehicle mode.

For more intuitive understanding of this solution, refer to FIG. 38b. FIG. 38b is a schematic diagram of outputting first information in an audio stream processing method according to an embodiment of this application. FIG. 38b includes two schematic sub-diagrams: a left schematic sub-diagram and a right schematic sub-diagram. When the user taps "Exit" in the left schematic sub-diagram of FIG. 38b, the right schematic sub-diagram of FIG. 38b may be triggered. In the right schematic sub-diagram of FIG. 38b, prompt information is output in a form of a text box. It should be understood that the example in FIG. 38b is merely for ease of understanding of this solution, and is not intended to limit this solution.

Specifically, after the vehicle detects that the vehicle exits the off-vehicle mode, in an implementation, a play device of audio streams in all categories included in a third category may be switched to the vehicle. The third category includes all categories corresponding to audio streams played by the first terminal device through the vehicle.

In another implementation, after the vehicle detects that the vehicle exits the off-vehicle mode, if the first terminal device is not in a call state, a play device of audio streams in all categories included in the third category may be switched to the vehicle. The third category includes all categories corresponding to audio streams played by the first terminal device through the vehicle.

If the first terminal device is in the call state, in an implementation, the first terminal device may still use the first terminal device as the play device of the audio streams in all the categories included in the third category by default. After the call ends, the play device of the audio streams in all the categories included in the third category is switched from the first terminal device to the vehicle.

In another implementation, after the vehicle detects that the vehicle exits the off-vehicle mode, if the first terminal device is in the call state, the first terminal device may switch a play device of a generated audio stream in a fourth category from the first terminal device to the vehicle. A play device of an audio stream that is in the call category and that is generated by the first terminal device remains as the first terminal device. After the call ends, the play device of the audio stream in the call category is switched from the first terminal device to the vehicle. The audio stream in the fourth category includes audio streams in all categories other than the audio stream in the call category in all the categories included in the third category.

In another implementation, after the vehicle detects that the vehicle exits the off-vehicle mode, if the first terminal device is in the call state, the user may manually input a switch operation to switch a play device of the audio streams in all the categories included in the third category from the first terminal device to the vehicle. A specific implementation is similar to the embodiment corresponding to FIG. 38a. Details are not described herein again.

In some embodiments of this application, it is detected that the user already wears a headset before the first terminal device arrives at the inside of the vehicle (that is, a connection is established between the first terminal device and the headset). In this case, when the first terminal device is located inside the vehicle, if it is detected that the connection between the first terminal device and the headset is broken, the first terminal device may send a target event to the vehicle. The target event is that the first terminal device and the headset are in a disconnected state.

The target event may trigger obtaining of the first location information of the first terminal device. If the first location information of the first terminal device indicates that the first terminal device is located inside the vehicle, the vehicle may be triggered to automatically exit the off-vehicle mode, and the play device of the audio streams in all the categories included in the third category is switched from the first terminal device to the vehicle.

Optionally, only when the first terminal device is not in the call state, the target event may trigger obtaining of the first location information of the first terminal device. If the first location information of the first terminal device indicates that the first terminal device is located inside the vehicle, the vehicle may be triggered to automatically exit the off-vehicle mode, and the play device of the audio streams in all the categories included in the third category is switched from the first terminal device to the vehicle.

Further, in the process of switching the play device of the audio streams in all the categories included in the third category from the first terminal device to the vehicle, if the first terminal device is playing an audio stream, the vehicle may pause playing of the audio stream, or the vehicle may continue to play the audio stream.

3. When a first terminal device is moved between the inside and the outside of a vehicle, processing for a navigation task of the first terminal device is as follows.

In some embodiments of this application, when the first terminal device is not connected to the vehicle, in a process in which a user searches for a destination through the first terminal device and obtains at least one navigation route, the first terminal device establishes a connection to the vehicle, and obtaining of first location information of the first terminal device may be triggered. If the first location information of the first terminal device indicates that the first terminal device is located inside the vehicle, the navigation task may be transferred to the vehicle.

In some embodiments of this application, when the navigation operation performed by the first terminal device through the vehicle has not ended, if it is detected that the first terminal device is moved from the inside of the vehicle to the outside of the vehicle, transfer of the navigation task to the first terminal device may be triggered.

When the vehicle or the first terminal device detects any one or more of the following cases, it may be proved that the navigation task has not ended: not arriving at the destination corresponding to the navigation task, detecting that a distance between a current location of the vehicle and the destination corresponding to the navigation task is greater than or equal to a preset distance threshold, detecting the running navigation task, another manner, or the like. This is not enumerated herein.

After the navigation task is transferred to the first terminal device, the first terminal device may continue to execute the navigation task in any one or more of the following manners: displaying, on a lock screen interface, an interface for entering the navigation task; displaying, in a drop-down box, an interface for entering the navigation task; adding, on a home screen, an interface for entering the navigation task; triggering opening of a navigation application of the first terminal device; adding, in a control center, an interface for entering the navigation task; another manner; or the like. This is not enumerated herein.

In implementation of this application, the interface for entering the navigation task is set on the first terminal device in time, so that the user quickly enters the navigation task, thereby shortening a time spent in a navigation process and improving user stickiness of this solution.

Optionally, because it is detected that the first terminal device is moved from the inside of the vehicle to the outside of the vehicle, the first terminal device may automatically switch a navigation mode when continuing to execute the navigation task. For example, the navigation mode is automatically switched from "Drive" to "Bus/Subway", or the navigation mode is automatically switched from "Drive" to "Walk". In this embodiment of this application, switching to the navigation mode that better matches a current status of the user is automatically performed, thereby shortening the time spent in the navigation process and improving user stickiness of this solution.

Figure 39:
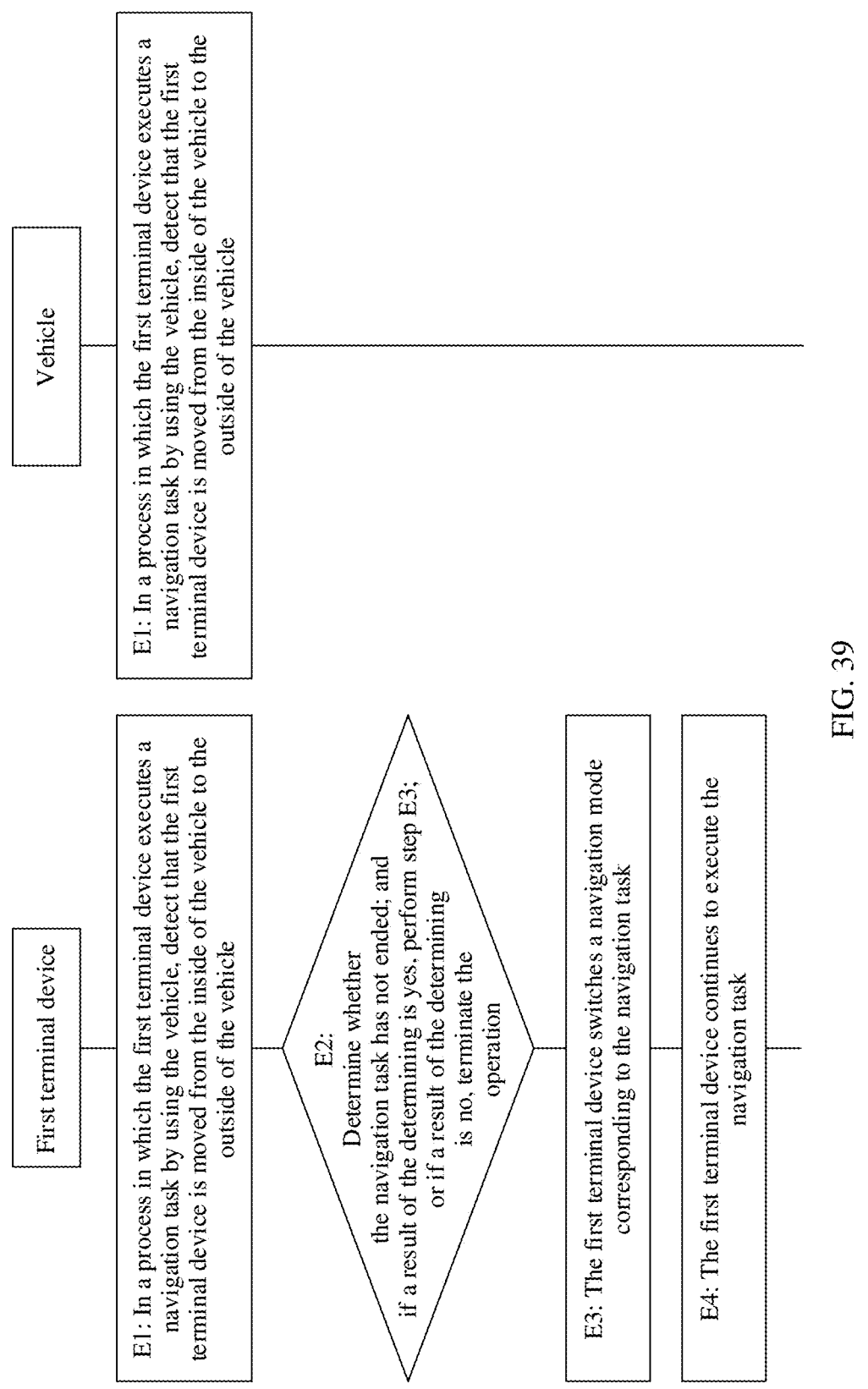
FIG. 39 is a schematic flowchart of a data processing method according to an embodiment of this application.

For more intuitive understanding of this solution, refer to FIG. 39. FIG. 39 is a schematic flowchart of a data processing method according to an embodiment of this application. An address processing method provided in this embodiment of this application may include the following steps.

E1: In a process in which a first terminal device executes a navigation task through a vehicle, the first terminal device or the vehicle detects that the first terminal device is moved from the inside of the vehicle to the outside of the vehicle.

In this embodiment of this application, in a process in which the first terminal device and the vehicle are in a connected state, and the first terminal device executes the navigation task through the vehicle, the first terminal device or the vehicle may detect that the first terminal device is moved from the inside of the vehicle to the outside of the vehicle. For a specific implementation of step E1, refer to the description in the embodiment corresponding to FIG. 32A and FIG. 32B in Embodiment 3. Details are not described herein again.

E2: The first terminal device determines whether the navigation task has not ended; and if a result of the determining is yes, performs step E3; or if a result of the determining is no, terminates the operation.

In this embodiment of this application, for a specific implementation in which the first terminal device determines whether the navigation task has not ended, refer to the foregoing description. Details are not described herein again.

E3: The first terminal device switches a navigation mode corresponding to the navigation task.

In some embodiments of this application, because the first terminal device detects that the first terminal device is moved from the inside of the vehicle to the outside of the vehicle, the first terminal device may be triggered to automatic switch the navigation mode corresponding to the navigation task. For example, the navigation mode is automatically switched from "Drive" to "Bus/Subway", or the navigation mode is automatically switched from "Drive" to "Walk". This is not enumerated herein.

E4: The first terminal device continues to execute the navigation task.

In this embodiment of this application, step E3 is an optional step. If step E3 is performed, the first terminal device may continue to execute the navigation task by using a navigation mode after the switching. If step E3 is not performed, the first terminal device continues to execute the navigation task by using a navigation mode previously used by the vehicle.

It should be understood that the example in FIG. 39 is merely for ease of understanding of this solution, and is not intended to limit this solution.

4. In a process in which a first terminal device and a vehicle are in a connected state, a second terminal device sends a navigation destination to the vehicle.

In this embodiment of this application, in an application scenario, in the process in which the first terminal device and the vehicle are in the connected state, if the vehicle is executing a navigation task, a user inside the vehicle may send a target address to the vehicle through the second terminal device, to change a destination for the navigation task. In another application scenario, in the process in which the first terminal device and the vehicle are in the connected state, when the vehicle does not execute a navigation task, a user inside the vehicle may send a target address to the vehicle through the second terminal device, to trigger the vehicle to start navigation by using the target address as a destination. It should be noted that, in another application scenario, the user inside the vehicle may send the navigation destination to the vehicle through the second terminal device. This is not enumerated herein.

Specifically, FIG. 40 is a schematic flowchart of an address processing method according to an embodiment of this application. The address processing method provided in this embodiment of this application may include the following steps.

4501: A second terminal device displays a target address on a display interface.

In this embodiment of this application, in a process in which a user uses an application on the second terminal device, the target address may be displayed on interfaces of a plurality of types of applications on the second terminal device. The display interface that displays the target address includes an interface of any one or more types of the following applications: a navigation application, an instant messaging application, a life service application, or a travel application.

In this embodiment of this application, not only the navigation application can use this solution, but also the instant messaging application, the life service application, or the travel application can use this solution, thereby greatly extending an application scenario of this solution.

4502: The second terminal device obtains first location information corresponding to the second terminal device. The first location information of the second terminal device indicates whether the second terminal device is located inside the vehicle or outside the vehicle.

In some embodiments of this application, the second terminal device is further triggered to obtain the first location information corresponding to the second terminal device. The first location information of the second terminal device indicates whether the second terminal device is located inside the vehicle or outside the vehicle. A specific meaning of "the first location information of the second terminal device" is similar to a specific meaning of "first location information of a first terminal device". For a specific manner of obtaining "the first location information of the second terminal device", refer to the description of step 301 in the embodiment corresponding to FIG. 32A and FIG. 32B. Details are not described herein again.

Specifically, in a process in which the second terminal device obtains the first location information corresponding to the second terminal device, the second terminal device scans a surrounding electronic device by using Bluetooth, a Wi-Fi technology, another technology, or the like, to detect at least one vehicle within a preset distance range of the second terminal device. The second terminal device may establish a communication connection to the detected vehicle. It should be noted that the "communication connection established between the second terminal device and the vehicle" and "a connection established between the second terminal device and the vehicle" are two different concepts. For a specific meaning of the concept of "a connection between the second terminal device and the vehicle", refer to the description in the foregoing embodiment. The "communication connection established between the second terminal device and the vehicle" is used merely for communication between the second terminal device and the vehicle in subsequent steps.

Optionally, after step 4501 and before step 4502, this embodiment of this application may further include: The second terminal receives a trigger operation; and performs step 4502 in response to the trigger operation. The trigger operation may be actively triggered by the user. For example, the user using the second terminal device searches for the target address on the second terminal device, and then the user expects to send the target address to the vehicle for navigation. In this case, the user may perform a preset operation on the second terminal device, to trigger the second terminal device to perform step 4502. The preset operation may be a preset gesture (for example, shaking a terminal device according to a specific track), a preset touch operation, a preset voice instruction, or the like. This is not limited herein.

In this embodiment of this application, after the second terminal device displays the target address on the display interface, and the second terminal device receives the trigger operation input by the user, the second terminal device obtains the first location information corresponding to the second terminal device. In other words, detecting whether the second terminal device is located inside the vehicle is triggered based on the intention of the user. Obtaining of the first location information corresponding to the second terminal device is not automatically triggered when the display interface displays the target address, thereby avoiding a waste of computer resources on the terminal device.

4503: When the second terminal device is located inside the vehicle, the second terminal device outputs second information. The second information is used to prompt the user to input a target operation.

In some embodiments of this application, after the first location information corresponding to the second terminal device is obtained, if the first location information corresponding to the second terminal device indicates that the second terminal is located outside the vehicle, the second terminal device may terminate the operation. If the first location information corresponding to the second terminal device indicates that the second terminal is located inside the vehicle, the second terminal device may output the second information. The second information is used to prompt the user to input the target operation. The target operation is used to trigger the second terminal device to send the target address to the vehicle.

A manner in which the second terminal device outputs the second information may include any one or a combination of several of the following: displaying a floating button for receiving the target operation; or displaying an icon for receiving the target operation; or outputting query information, where the query information is used to query the user whether to send the target address to the vehicle, and the query information may be in a form of a text box, or a voice, another form, or the like. This is not enumerated herein. The second terminal device may further output the second information in another manner. An example herein is merely for ease of understanding of this solution. A specific implementation to be used may be determined with reference to an actual product form. This is not limited herein.

Correspondingly, the second terminal device may receive the target operation input by the user. A manner in which the user inputs the target operation may include any one or a combination of several of the following: performing a touch operation on the floating button for receiving the target operation; performing a touch operation on the icon for receiving the target operation; and inputting a confirmation operation for the query information. Alternatively, the user may input the target operation in another manner. A specific implementation to be used may be determined with reference to an actual product form. This is not limited herein.

Figures 41A, 41B:
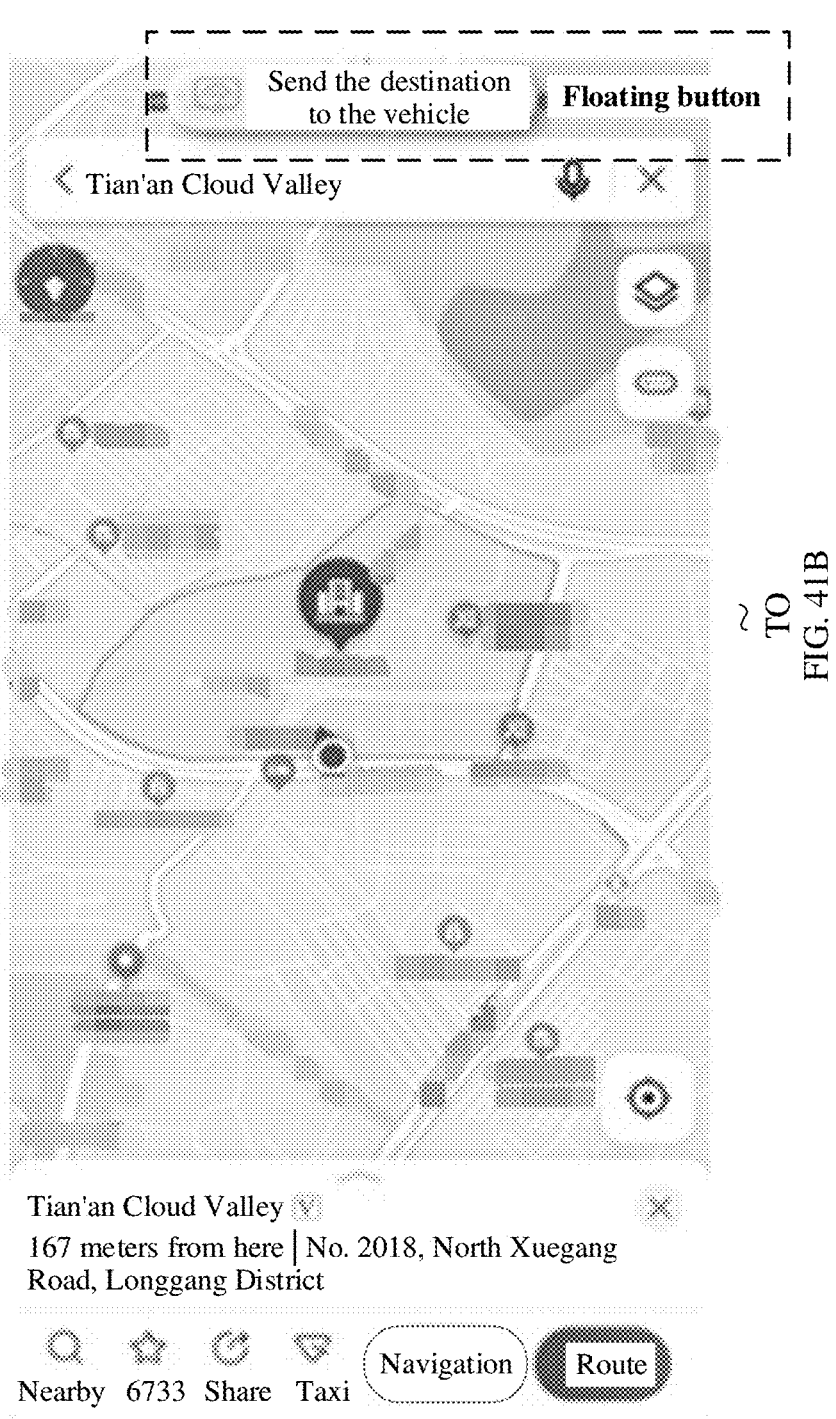
FIG. 41A and FIG. 41B are three schematic diagrams of outputting second information in an address processing method according to an embodiment of this application.
Figures 41A, 41B:
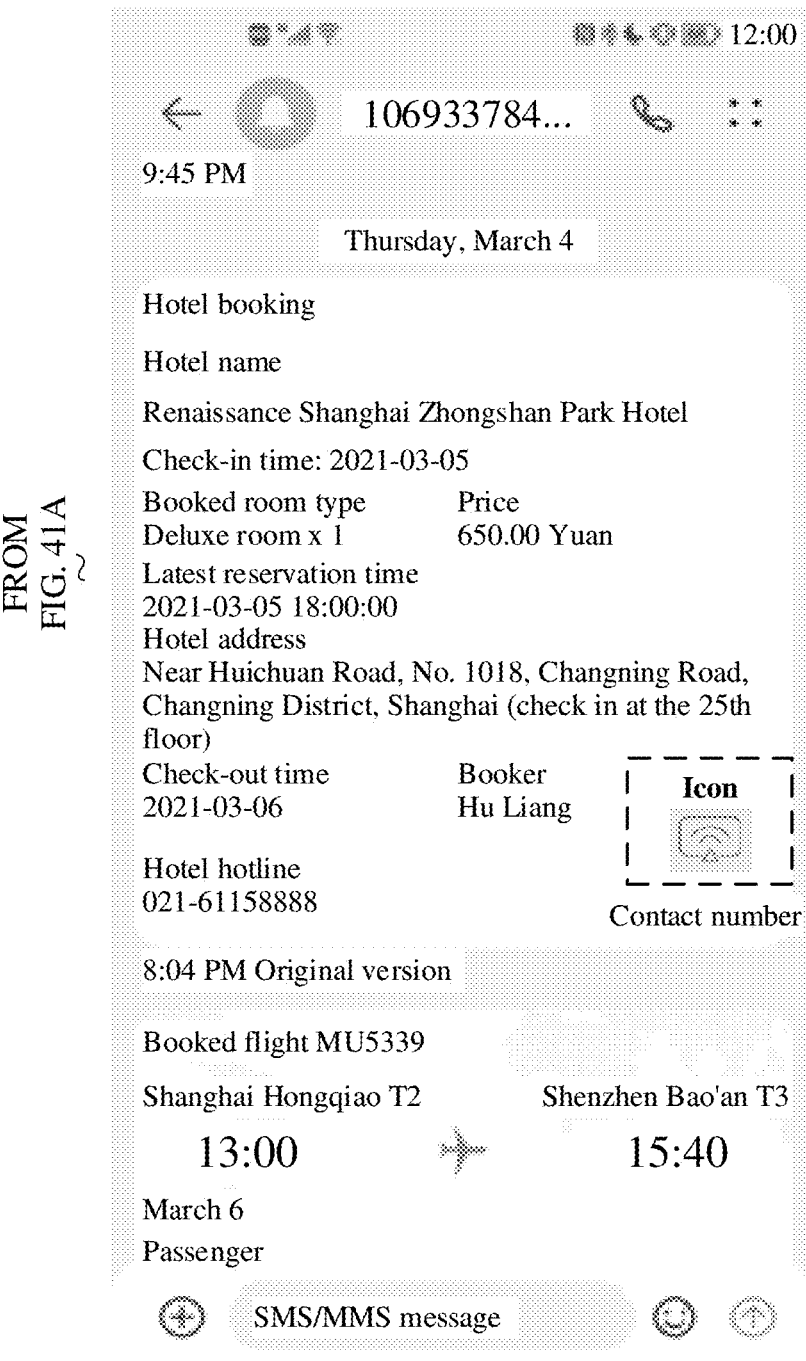
Figure 42:
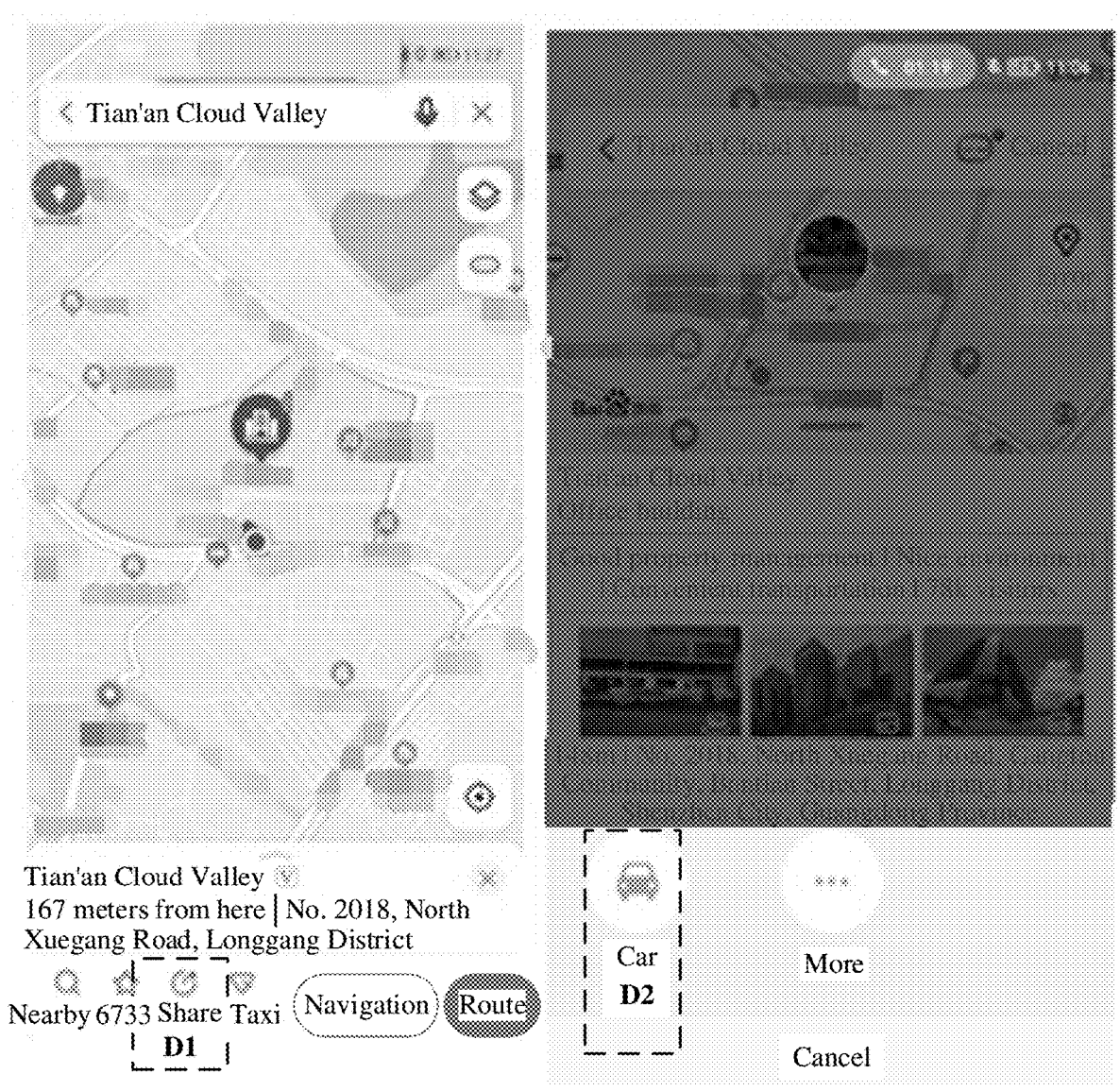
FIG. 42 is other schematic diagrams of outputting second information in an address processing method according to an embodiment of this application.

For more intuitive understanding of this solution, refer to FIG. 41A and FIG. 41B, and FIG. 42. FIG. 41A and FIG. 41B are three schematic diagrams of outputting second information in an address processing method according to an embodiment of this application. FIG. 41A and FIG. 41B include two schematic sub-diagrams: a left schematic sub-diagram and a right schematic sub-diagram. In the left schematic sub-diagram FIG. 41A, an example in which second information is output through a display interface of a navigation application is used. As shown in the left schematic sub-diagram FIG. 41A, a manner of "outputting the second information" may be displaying a floating button on a current interface. When the user taps the floating button, the second terminal device may receive a target operation input by the user.

In the right schematic sub-diagram FIG. 41B, an example in which second information is output through a display interface of an SMS application is used. As shown in the right schematic sub-diagram FIG. 41B, a manner of "outputting the second information" may be displaying an icon next to a target address. When the user taps the icon, the second terminal device may receive a target operation input by the user. It should be understood that the example in FIG. 41A and FIG. 41B is merely for ease of understanding of this solution, and is not intended to limit this solution.

FIG. 42 is other schematic diagrams of outputting second information in an address processing method according to an embodiment of this application. FIG. 42 includes two schematic sub-diagrams: a left schematic sub-diagram and a right schematic sub-diagram. In FIG. 42, an example in which second information is output through a display interface of a navigation application is used. In the left schematic sub-diagram of FIG. 42, when the user taps D1, the right schematic sub-diagram of FIG. 42 is triggered. When the user taps D2, the second terminal device may detect that the user inputs a target operation. It should be understood that the example in FIG. 42 is merely for ease of understanding of this solution, and is not intended to limit this solution.

4504: In a process in which the first terminal device and the vehicle are in a connected state, the second terminal device sends the target address to the vehicle, and the vehicle uses the received target address as a destination for navigation of the vehicle.

In this embodiment of this application, steps 4502 and 4503 are both optional steps. When the second terminal device performs steps 4502 and 4503, step 4504 may include: In the process in which the first terminal device and the vehicle are in the connected state, in response to the obtained target operation, the second terminal device sends the target address. The sent target address indicates that the target address is used as the destination for the navigation of the vehicle.

Specifically, the second terminal device may send the target address to the vehicle. Correspondingly, the vehicle may receive the target address. In a case, when the vehicle obtains the target address, if the vehicle does not start the navigation task, the vehicle is triggered to start the navigation task, and continues navigation by using the target address as the destination.

In a case, when obtaining the target address, the vehicle is using a first address as the destination for the navigation. The vehicle changes the first address to the target address, and continues the navigation by using the target address as the destination. In this embodiment of this application, a specific application scenario of this solution is provided.

Still further, in an implementation, the vehicle may use the target address as the destination for navigation of the vehicle, and display the updated navigation destination through the vehicle.

In another implementation, the vehicle may output prompt information. The prompt information is used to query the user whether to update the navigation destination to the target address. A manner in which the vehicle outputs the prompt information includes any one or a combination of several of the following: outputting the prompt information in a voice manner, outputting the prompt information in a pop-up box form, outputting the prompt information in another form, or the like. This is not limited herein.

Figures 43A, 43B:
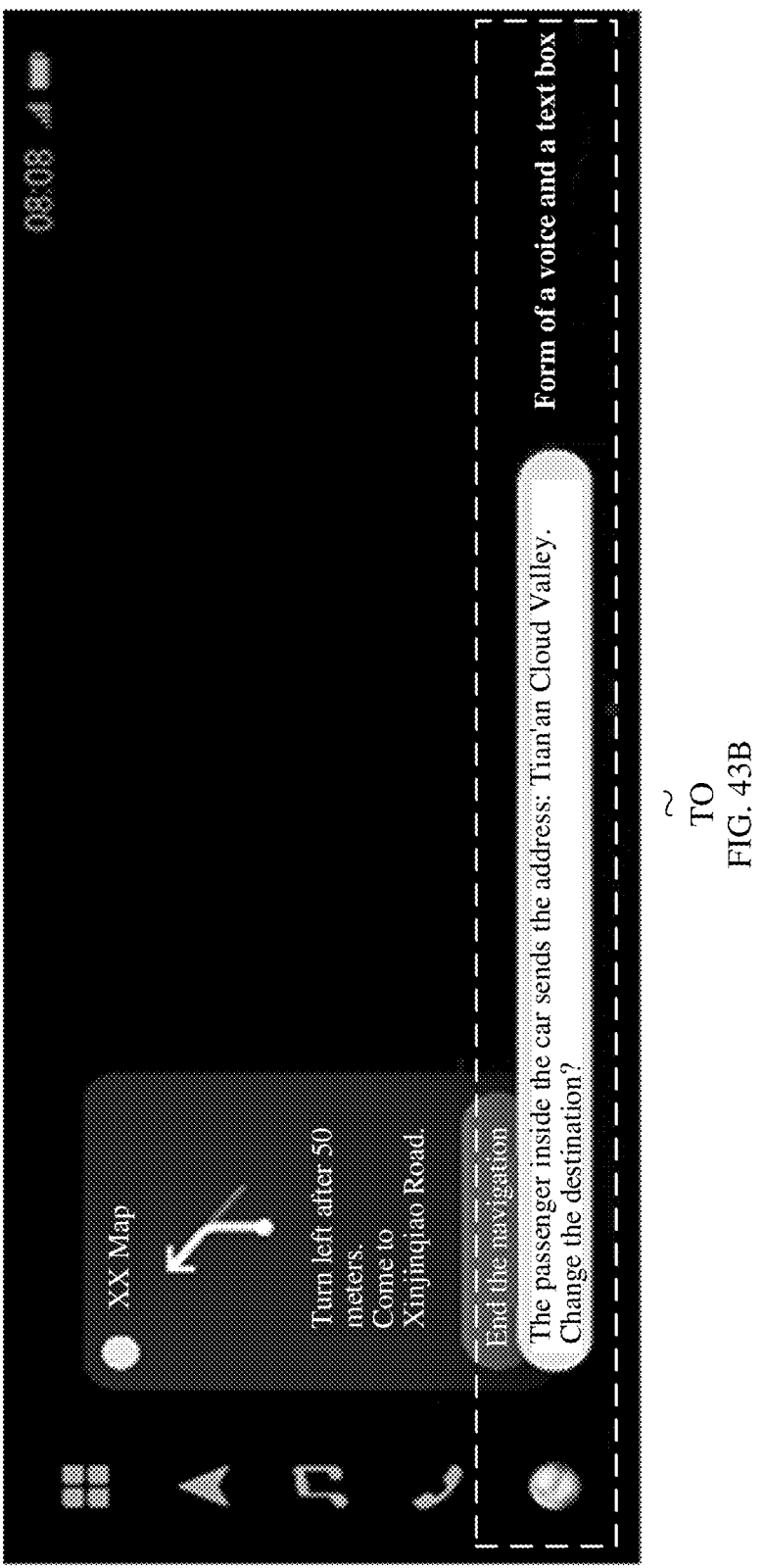
FIG. 43A and FIG. 43B are two schematic diagrams of outputting prompt information in an address processing method according to an embodiment of this application.
Figures 43A, 43B:

For more intuitive understanding of this solution, refer to FIG. 43A and FIG. 43B. FIG. 43A and FIG. 43B are two schematic diagrams of outputting prompt information in an address processing method according to an embodiment of this application. FIG. 43A and FIG. 43B include two schematic sub-diagrams: an upper schematic sub-diagram and a lower schematic sub-diagram. In the upper schematic sub-diagram FIG. 43A, an example in which the vehicle outputs prompt information by using a voice and a display interface of a text box is used. In the lower schematic sub-diagram FIG. 43B, an example in which the vehicle outputs prompt information in a text form is used. It should be understood that the example in FIG. 43A and FIG. 43B is merely for ease of understanding of this solution, and is not intended to limit this solution.

Correspondingly, if the vehicle obtains a confirmation operation that is input by the user for the prompt information, the vehicle updates the navigation destination to the target address; or if the vehicle obtains a cancellation operation that is input by the user for the prompt information, the vehicle determines not to modify the navigation destination of the vehicle.

A manner in which the user inputs the confirmation operation/cancellation operation includes but is not limited to: inputting the confirmation operation/cancellation operation through a button on a steering wheel, inputting the confirmation operation/cancellation operation in a voice manner, inputting the confirmation operation/cancellation operation by tapping a preset button on the central control screen of the vehicle, inputting the confirmation operation/cancellation operation by inputting a mid-air gesture, inputting the confirmation operation/cancellation operation in another manner, or the like. This is not enumerated herein.

Figure 44:
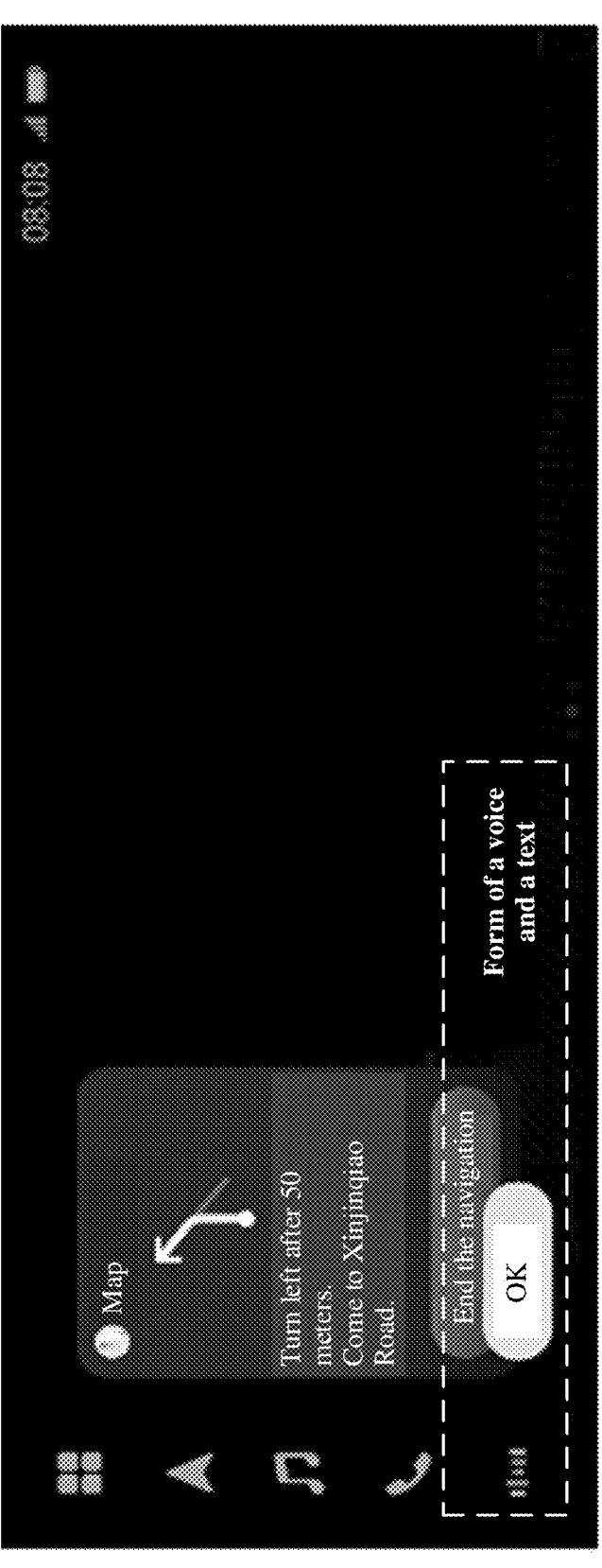
FIG. 44 is a schematic diagram of outputting prompt information in an address processing method according to an embodiment of this application.

For more intuitive understanding of this solution, refer to FIG. 44. FIG. 44 is a schematic diagram of outputting prompt information in an address processing method according to an embodiment of this application. In FIG. 44, an example in which the confirmation operation/cancel operation is input in a voice manner and a text box manner is used. As shown in FIG. 44, the user inputs "OK" in the voice manner, and the vehicle updates the navigation destination of the vehicle to the target address in response to the received "OK". It should be understood that the example in FIG. 44 is merely for ease of understanding of this solution, and is not intended to limit this solution.

Optionally, after updating the navigation destination to the target address, the vehicle may further output notification information. The notification information is used to notify the user that the navigation destination is successfully updated. Alternatively, after determining not to modify the navigation destination of the vehicle, the vehicle may output notification information. The notification information is used to notify the user that the navigation destination remains unchanged.

A manner in which the vehicle outputs the notification information may be any one or a combination of several of the following: outputting the notification information in a voice manner, outputting the notification information in a text box form, outputting the notification information in an indicator form, outputting the notification information in another manner, or the like. This is not limited herein.

Figure 45:
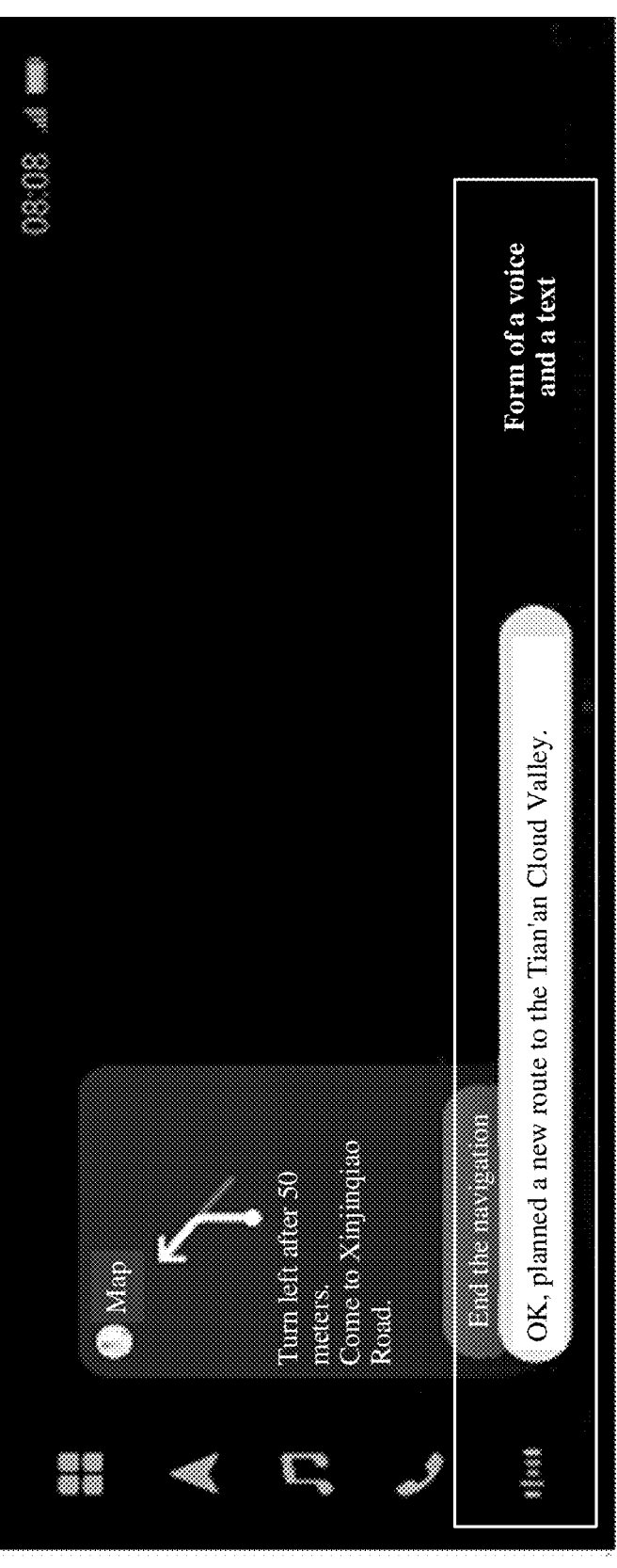
FIG. 45 is a schematic diagram of outputting notification information in an address processing method according to an embodiment of this application.

For more intuitive understanding of this solution, refer to FIG. 45. FIG. 45 is a schematic diagram of outputting notification information in an address processing method according to an embodiment of this application. In FIG. 45, an example in which the notification information is output in a voice manner and a text box manner is used. It should be understood that the example in FIG. 45 is merely for ease of understanding of this solution, and is not intended to limit this solution.

In this embodiment of this application, when it is detected that the second terminal device is located inside the vehicle, and the second terminal device displays the address information, the second information may be output. The second information is used to prompt the user to input a target operation of "sending the target address". In other words, the second terminal device sends the target address based on an intention of the user. In addition, the operation of "sending the target address" can be implemented only when it is detected that the second terminal device is located inside the vehicle, thereby avoiding interference from another device to the first terminal device and improving safety in a driving process of the vehicle.

The second terminal device performs step 4502 and does not perform step 4503. In this case, in an implementation, if the first location information corresponding to the second terminal device indicates that the second terminal device is located inside the vehicle, and the second terminal device is displaying the target address on the display interface, when obtaining a first trigger operation input by the user, the second terminal device sends the target address in response to the received first trigger operation. The sent target address indicates to use the target address as the destination for the navigation of the vehicle. For a specific implementation in which "the second terminal device sends the target address", refer to the foregoing description. Details are not described herein again.

The first trigger operation may be shaking the second terminal device up and down, shaking the second terminal device left and right, inputting a preset gesture operation or another operation through an interface of the second terminal device, or the like. This is not enumerated herein. The preset gesture operation may be a "Z"-shaped gesture operation, an "O"-shaped gesture operation, a "V"-shaped gesture operation, a three-point upward sliding operation, or the like. This is not enumerated herein.

Figure 46:
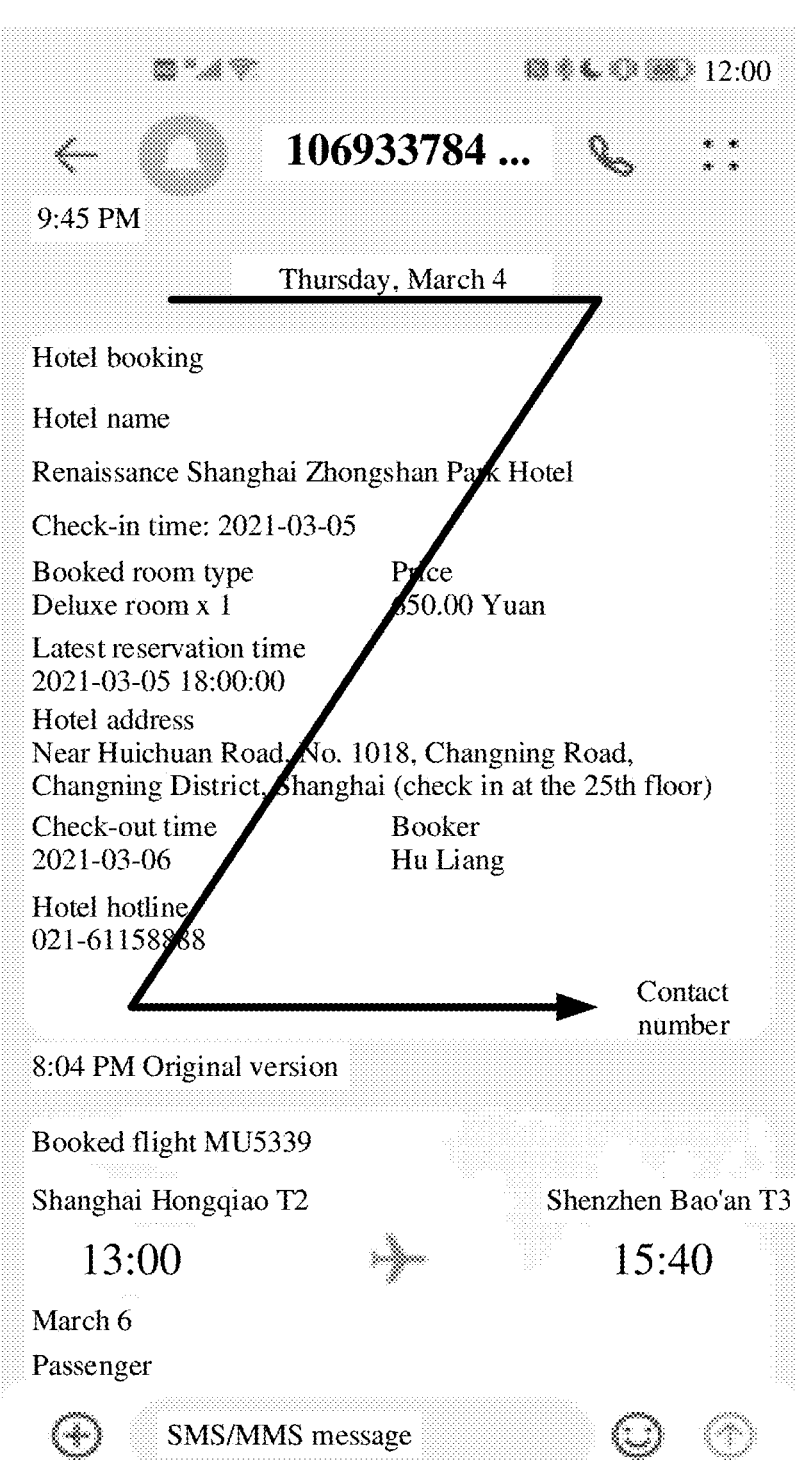
FIG. 46 is two schematic diagrams of outputting prompt information in an address processing method according to an embodiment of this application.

For more intuitive understanding of this solution, refer to FIG. 46. FIG. 46 is two schematic diagrams of outputting prompt information in an address processing method according to an embodiment of this application. As shown in FIG. 46, when the user inputs a "Z"-shaped gesture operation, the second terminal device is triggered to send the target address displayed on the current interface. It should be understood that the example in FIG. 46 is merely for ease of understanding of this solution, and is not intended to limit this solution.

In this embodiment of this application, when it is detected that the second terminal device is located inside the vehicle and the second terminal device displays the address information, sending of the target address may be further triggered by using the first trigger operation actively input by the user, to determine the target address as the navigation destination of the vehicle, thereby extending a trigger scenario of sending the target address, that is, extending an application scenario of this solution, and improving implementation flexibility of this solution.

In another implementation, if the first location information corresponding to the second terminal device indicates that the second terminal device is located inside the vehicle, and the second terminal device is displaying the target address on the display interface, the second terminal device may be directly triggered to send the target address. The sent target address indicates to use the target address as the destination for the navigation of the vehicle.

When the second terminal device does not perform steps 4502 and 4503, in an implementation, if it is detected that the second terminal device is displaying the target address on the display interface, the second terminal device may output the second information. The second information is used to prompt the user to input the target operation. In the process in which the first terminal device and the vehicle are in the connected state, in response to the obtained target operation, the second terminal device sends the target address. The sent target address indicates to use the target address as the destination for the navigation of the vehicle.

In another implementation, if it is detected that the second terminal device is displaying the target address on the display interface, when obtaining the first trigger operation input by the user, the second terminal device sends the target address in response to the received first trigger operation. The sent target address indicates to use the target address as the destination for the navigation of the vehicle.

In this embodiment of this application, in the process in which the first terminal device and the vehicle are in the connected state, the first terminal device is generally a terminal device at a primary driver location. If the destination for the navigation of the vehicle can be changed only through the first terminal device, there is a high probability that the driver performs a change operation. This increases a risk in a driving process. In this solution, the second terminal device may change the destination for the navigation of the vehicle, thereby improving safety in a driving process and efficiency of changing the destination for the navigation.

5. Data stored in a vehicle and/or a service run on a vehicle are/is transferred to a terminal device inside the vehicle.

In this embodiment of this application, in an application scenario, the vehicle is playing an image/a video, and a user inside the vehicle wants to store the image/video in a terminal device of the user. In this case, there is a need to transfer the data stored in the vehicle to the terminal device inside the vehicle. In another application scenario, if a front-row user inside the vehicle is making a video call through a central control screen of the vehicle, when the video call service needs to be switched to a rear-row user inside the vehicle, there is a need to transfer a service run on the vehicle to a terminal device inside the vehicle, and the like.

It should be noted that the foregoing description of various application scenarios is merely examples for ease of understanding of this solution. This solution may be further applied to another application scenario. Application scenarios of this solution are not enumerated herein.

Specifically, in a case, the vehicle side may trigger transfer of data stored in the vehicle and/or a service run on the vehicle to a terminal device inside the vehicle. In another case, the terminal device side inside the vehicle may trigger transfer of data stored in the vehicle and/or a service run on the vehicle to a terminal device inside the vehicle. The following separately describes the foregoing two cases.

Figure 47:
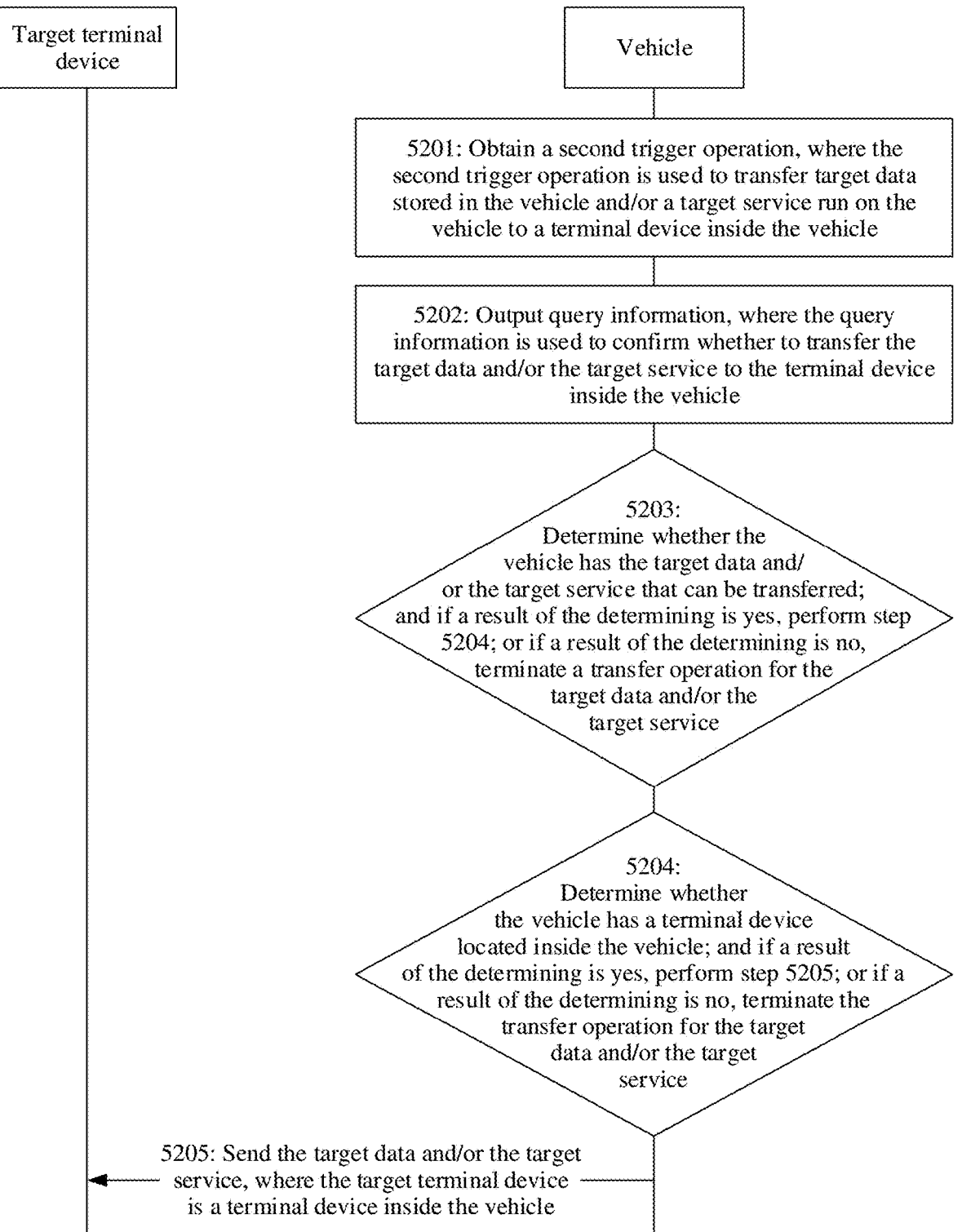
FIG. 47 is a schematic flowchart of a data transferring method according to an embodiment of this application.

First, FIG. 47 is a schematic flowchart of a data transferring method according to an embodiment of this application. Specifically, in FIG. 47, an example in which a vehicle side triggers transfer of data stored in a vehicle and/or a service run on the vehicle to a terminal device inside the vehicle is used. The data transferring method provided in this embodiment of this application may include the following steps.

5201: The vehicle obtains a second trigger operation. The second trigger operation is used to transfer target data stored in the vehicle and/or a target service run on the vehicle to a terminal device inside the vehicle.

In this embodiment of this application, at least one type of target data stored in the vehicle and/or at least one type of target service run on the vehicle can be transferred to the terminal device inside the vehicle. The at least one type of target data may be specifically represented as an image, a video, music, another type of data, or the like. The at least one type of target service may be specifically represented as a video call service, a navigation service, another type of service, or the like. This is not enumerated herein.

"Transferring the target data stored in the vehicle to the terminal device inside the vehicle" may also be referred to as "sending the target data stored in the vehicle to the terminal device inside the vehicle". "Transferring the target service run on the vehicle to the terminal device inside the vehicle" may be understood as that the vehicle sends, to the terminal device inside the vehicle, data used for executing the target service, so that the target service is executed through the terminal device inside the vehicle.

A manner in which the vehicle obtains the second trigger operation may be any one or a combination of several of the following: that the user inputs the second trigger operation in a voice manner; or that the user inputs the second trigger operation through a button on a display interface of the vehicle; or that the user inputs the second trigger operation when the vehicle collects, by using a camera, a preset mid-air gesture input by the user; or that the user inputs the second trigger operation when the vehicle receives, through a display interface, a preset gesture operation input by the user; or that the user may input the second trigger operation in another manner, or the like. This is not enumerated herein.

For example, the vehicle may obtain "Share a current image", "Transfer a current video call", or another voice instruction input by the user. This is not enumerated herein.

5202: The vehicle outputs query information. The query information is used to confirm whether to transfer the target data and/or the target service to the terminal device inside the vehicle.

Optionally, in some embodiments of this application, after obtaining the second trigger operation, the vehicle may further output the query information. The query information is used to confirm whether to transfer the target data and/or the target service to the terminal device inside the vehicle. If a confirmation operation input for the query information by the user is detected, step 5202 is performed. If a cancellation operation input for the query information by the user is detected, the transfer operation for the target data and/or the target service is terminated.

The query information may be in a text box form, a voice form, another form, or the like. This is not enumerated herein. For a specific implementation in which the vehicle outputs the query information and a specific implementation in which the user inputs the confirmation operation and the cancellation operation, refer to the description in the embodiment corresponding to FIG. 40. Details are not described herein again.

5203: The vehicle determines whether the vehicle has the target data and/or the target service that can be transferred; and if a result of the determining is yes, performs step 5204; or if a result of the determining is no, terminates the transfer operation of the target data and/or the target service.

In this embodiment of this application, at least one type of data that can be transferred to the terminal device and/or at least one type of service that can be transferred to the terminal device may be preset in the vehicle. The vehicle may determine whether a central control screen of the vehicle has the target data that can be transferred, and/or the vehicle may determine whether a list of tasks run on the vehicle has the target service that can be transferred.

If a result of the determining is yes, step 5204 is triggered. If a result of the determining is no, termination of the transfer operation for the target data and/or the target service is triggered.

For example, if the central control screen of the vehicle displays only related information of the vehicle in a traveling process, there is no image, music, video, or other data that can be transferred, and tasks run in the foreground of the vehicle include no video call, navigation task, or another service that can be transferred, termination of the transfer operation for the target data and/or the target service may be triggered.

The "related information of the vehicle in the traveling process" may include a current traveling velocity of the vehicle, a temperature of an air conditioner inside the vehicle, other information, or the like. This is not enumerated herein.

It should be noted that step 5202 is an optional step. If step 5202 is performed, an execution sequence of step 5202 and step 5203 is not limited in this embodiment of this application. Step 5202 may be performed before step 5203, or step 5203 may be performed before step 5202, or steps 5202 and 5203 may be simultaneously performed.

5204: The vehicle determines whether there is a terminal device located inside the vehicle; and if a result of the determining is yes, performs step 5205; or if a result of the determining is no, terminates the transfer operation of the target data and/or the target service.

In this embodiment of this application, after the vehicle obtains the second trigger operation, the vehicle may scan a surrounding terminal device, and obtain first location information of each scanned terminal device, to determine, based on the first location information of each terminal device, whether there is at least one terminal device located inside the vehicle. If a result of the determining is yes, step 5205 is performed. If a result of the determining is no, the transfer operation for the target data and/or the target service is terminated.

For a manner of obtaining the first location information of each terminal device, refer to the description in the embodiment corresponding to FIG. 32A and FIG. 32B. Details are not described herein again.

It should be noted that an execution sequence of step 5203 and step 5204 is not limited in this embodiment of this application. Step 5203 may be performed before step 5204, or step 5204 may be performed before step 5203, or steps 5203 and 5204 may be simultaneously performed.

5205: The vehicle sends the target data and/or the target service to at least one target terminal device located inside the vehicle.

In this embodiment of this application, after determining to perform the transfer operation on the target data and/or the target service, the vehicle may send the target data and/or the target service to the at least one target terminal device. Correspondingly, each target terminal device may receive the target data, or each target terminal device may run the target service.

Each target terminal device is a terminal device inside the vehicle. In other words, the at least one target terminal device is included in at least one terminal device inside the vehicle.

Specifically, in an implementation, the vehicle may directly send the target data and/or the target service to each terminal device inside the vehicle. In other words, each terminal device inside the vehicle is determined as the target terminal device.

In another implementation, the vehicle may obtain the at least one terminal device located inside the vehicle, and send a first transfer request to each terminal device inside the vehicle. The first transfer request is used to request to transfer the target data and/or the target service to the terminal device. After receiving the first transfer request, each terminal device inside the vehicle may output fourth information. The fourth information is used to query whether to receive the target data and/or the target service transferred by the vehicle.

If the terminal device inside the vehicle obtains a confirmation operation for the fourth information, the terminal device inside the vehicle sends confirmation information corresponding to the first transfer request to the vehicle. If the terminal device inside the vehicle obtains a cancellation operation for the fourth information, the terminal device inside the vehicle sends rejection information corresponding to the first transfer request to the vehicle. For a specific implementation in which "the user inputs the confirmation operation/cancellation operation", refer to the description in the foregoing embodiment. Details are not described herein again.

When receiving the confirmation information sent by the at least one target terminal device, the vehicle sends the target data and/or the data related to the target service to each target terminal device.

Further, if the vehicle sends the target data to the terminal device, after all the target data is sent to the target terminal device, the vehicle may terminate the foregoing sending operation. If the vehicle sends the data related to the target service to the terminal device, after execution of the target service is completed, the vehicle may terminate the sending operation performed on the target service.

Figure 48:
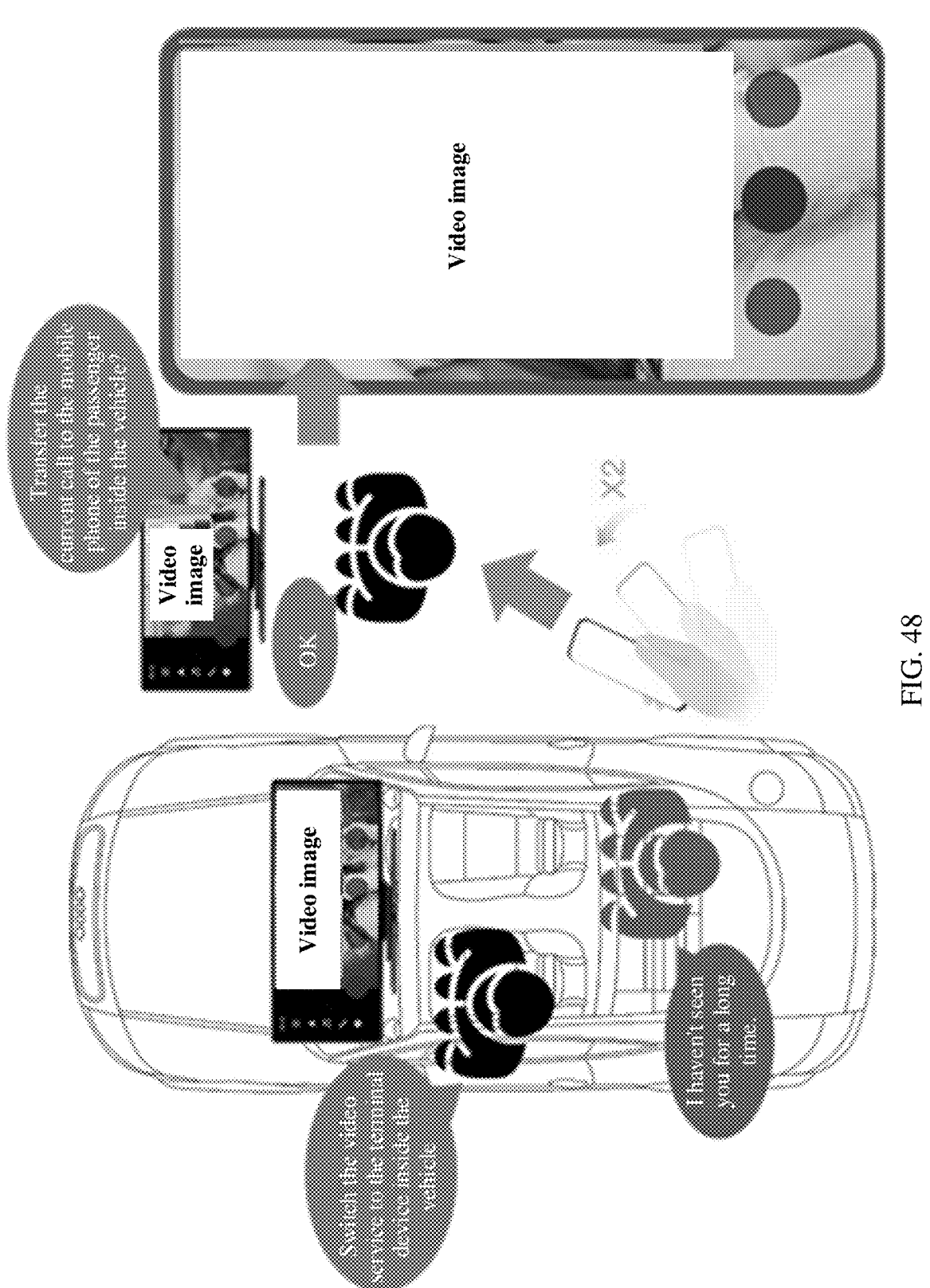
FIG. 48 is a schematic flowchart of a data transferring method according to an embodiment of this application.

For more intuitive understanding of this solution, refer to FIG. 48. FIG. 48 is a schematic flowchart of a data transferring method according to an embodiment of this application. As shown in FIG. 48, in a process in which a vehicle is executing a video call service, when a user at a primary driver location wants to switch the video call service from the vehicle to a terminal device of a rear-row user, the vehicle receives a voice instruction: "switch the video call service to a terminal device inside the vehicle" that is input by the user at the primary driver location through the vehicle. It is considered as that the vehicle receives the second trigger operation, and the vehicle is triggered to output query information "Transfer the current call to a mobile phone of a passenger inside the vehicle?". After the vehicle receives voice information "Yes" input by the user, the vehicle sends a first transfer request to each terminal device inside the vehicle. That the passenger inside the vehicle shakes the mobile phone twice is considered as that the passenger inputs a confirmation operation for the first transfer request to trigger transfer of the video call service to a mobile phone of the passenger. It should be understood that the example in FIG. 48 is merely for ease of understanding of this solution, and is not intended to limit this solution.

In another implementation, after determining to perform the transfer operation of the target data and/or the target service, the vehicle may display a terminal device list. The terminal device list includes identifier information of at least one terminal device. The identifier information of the at least one terminal device includes identifier information of all terminal devices located inside the vehicle.

The vehicle obtains a selection operation that is input by the user for the terminal device list. The selection operation is used to determine the at least one target terminal device from the terminal device list. Then, the vehicle may send the target data and/or the target service to each target terminal device.

Figure 49A:
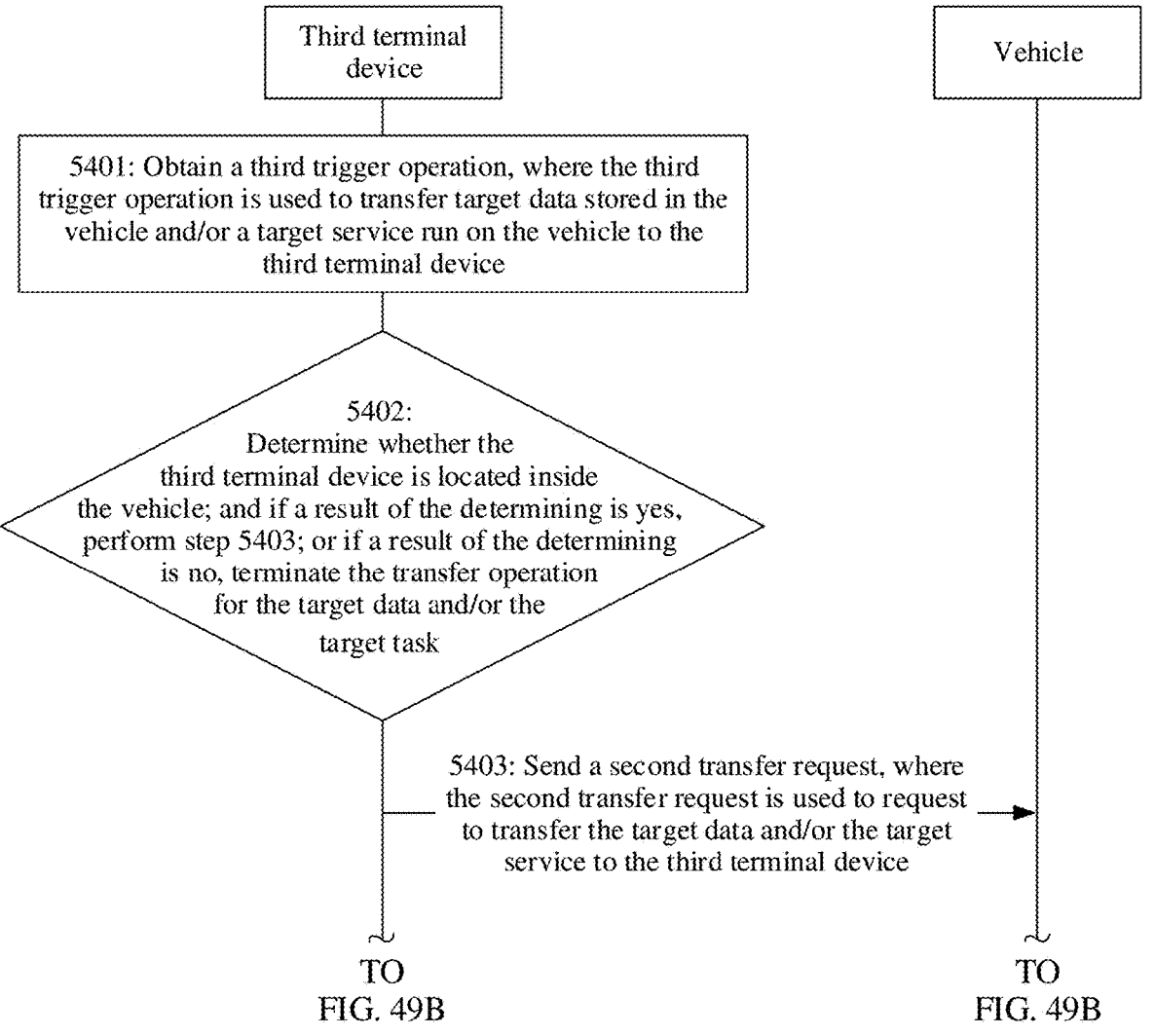

Further, FIG. 49A and FIG. 49B are another schematic flowchart of a data transferring method according to an embodiment of this application. Specifically, in FIG. 49A and FIG. 49B, an example in which a terminal device side triggers transfer of data stored in a vehicle and/or a service run on the vehicle to a terminal device inside the vehicle is used. Specifically, the data transferring method provided in this embodiment of this application may include the following steps.

5401: A third terminal device obtains a third trigger operation. The third trigger operation is used to transfer target data stored in a vehicle and/or a target service run on the vehicle to the third terminal device.

In this embodiment of this application, at least one type of target data stored in the vehicle and/or at least one type of target service run on the vehicle can be transferred to a terminal device inside the vehicle. The third terminal device may obtain the third trigger operation input by a user.

The third trigger operation is used to transfer the target data stored in the vehicle and/or the target service run on the vehicle to the terminal device inside the vehicle. For example, the third trigger operation may be shaking the third terminal device left and right, shaking the third terminal device up and down, inputting a preset gesture operation through an interface of the third terminal device, inputting a voice instruction through the third terminal device, or performing another type of third trigger operation. This is not enumerated herein.

5402: The third terminal device determines whether the third terminal device is located inside the vehicle; and if a result of the determining is yes, performs step 5403; or if a result of the determining is no, terminates the transfer operation for the target data and/or the target task.

In this embodiment of this application, after obtaining the third trigger operation, the third terminal device may be triggered to obtain first location information of the third terminal device. A specific implementation of "obtaining the first location information of the third terminal device" is similar to that of "obtaining the first location information of the first terminal device". Directly refer to the foregoing description in Embodiment 3. Details are not described herein again.

The third terminal device determines, based on the first location information of the third terminal device, whether the third terminal device is located inside the vehicle; and if the result of the determining is yes, performs step 5403; or if the result of the determining is no, terminates the transfer operation for the target data and/or the target task.

5403: The third terminal device sends a second transfer request to the vehicle. The second transfer request is used to request to transfer the target data and/or the target service to the third terminal device.

In this embodiment of this application, when the first location information of the third terminal device indicates that the third terminal device is located inside the vehicle, the third terminal device may send the second transfer request to the vehicle. Correspondingly, after the vehicle receives the second transfer request, the second transfer request is used to request to transfer the target data and/or the target service to the third terminal device.

5404: The vehicle determines whether the vehicle has the target data and/or the target service that can be transferred; and if a result of the determining is yes, performs step 5405; or if a result of the determining is no, terminates the transfer operation for the target data and/or the target service.

In this embodiment of this application, for a specific implementation of step 5404 performed by the vehicle, refer to the description in step 1803 in the embodiment corresponding to FIG. 47. Details are not described herein again.

5405: The vehicle outputs query information. The query information is used to confirm whether to transfer the target data and/or the target service to the terminal device inside the vehicle.

In some embodiments of this application, after receiving the second transfer request, the vehicle may further output the query information. The query information is used to confirm whether to transfer the target data and/or the target service to the terminal device inside the vehicle. If a confirmation operation input for the query information by the user is detected, step 5406 is performed. If a cancellation operation input for the query information by the user is detected, the transfer operation for the target data and/or the target service is terminated.

For a specific implementation of step 5405 performed by the vehicle, refer to the description in step 1802 in the embodiment corresponding to FIG. 47. Details are not described herein again.

It should be noted that an execution sequence of step 5404 and step 5405 is not limited in this embodiment of this application. Step 5404 may be performed before step 5405, or step 5405 may be performed before step 5404, or steps 5404 and 5405 may be simultaneously performed.

5406: The vehicle sends the target data and/or the target service to the third terminal device.

In this embodiment of this application, step 5405 is an optional step. If step 5405 is not performed, after it is determined that the vehicle has the target data and/or the target service that can be transferred, the vehicle may obtain the target data and/or the target service, and send the target data and/or the target service to the third terminal device.

If step 5405 is performed, when the confirmation operation input for the query information by the user is detected, the vehicle may obtain the target data and/or the target service, and send the target data and/or the target service to the third terminal device.

In this embodiment of this application, more application scenarios of information transfer between the terminal device inside the vehicle and the vehicle are provided, thereby extending an application scenario of this solution. Data stored in the vehicle and/or a service run on the vehicle can be transferred only to the terminal device inside the vehicle, thereby protecting privacy of data of the vehicle and avoiding interference caused by a user near the vehicle to the vehicle.

6. When a terminal device inside a vehicle is in a call process, volume of an audio stream played by the vehicle is lowered.

In this embodiment of this application, there are a plurality of terminal devices inside the vehicle, and one terminal device and the vehicle are in a connected state. If another terminal device inside the vehicle and the vehicle are not in the connected state, the vehicle cannot learn of a status of each terminal device inside the vehicle in time. If the another terminal device inside the vehicle makes a call in a process of playing an audio stream by the vehicle, the audio stream played by the vehicle causes interference to the another terminal device. Therefore, when the another terminal device inside the vehicle makes a call, volume of the audio stream played by the vehicle needs to be lowered.

It should be noted that the example herein is merely a typical application scenario provided for ease of understanding of this solution. In specific implementation, regardless of whether the terminal device and the vehicle are in the connected state, this solution may be used provided that the terminal device is located inside the vehicle.

Figures 50, 51:
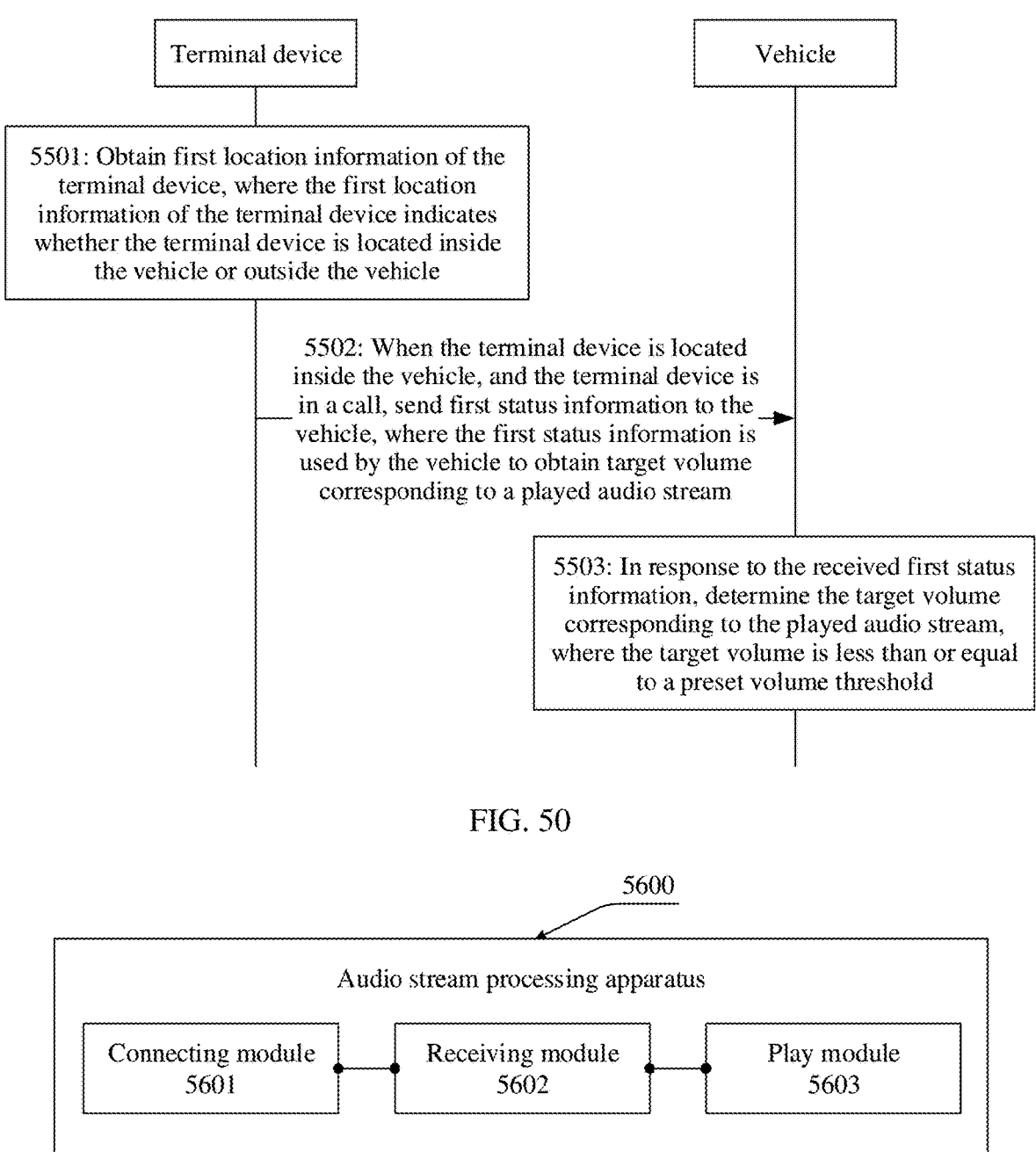
FIG. 50 is a schematic flowchart of a volume processing method according to an embodiment of this application.
FIG. 51 is a schematic diagram of a structure of an audio stream processing apparatus according to an embodiment of this application.

Specifically, FIG. 50 is a schematic flowchart of a volume processing method according to an embodiment of this application. The volume processing method provided in this embodiment of this application may include the following steps.

5501: A terminal device obtains first location information of the terminal device. The first location information of the terminal device indicates whether the terminal device is located inside a vehicle or outside a vehicle.

In this embodiment of this application, when the terminal device is in a call, before the terminal device sends first status information to the vehicle, obtaining of the first location information of the terminal device may be triggered. The first location information of the terminal device indicates whether the terminal device is located inside the vehicle or outside the vehicle. For a specific manner of obtaining "the first location information of the terminal device", refer to the foregoing description of the terminal in Embodiment 3. Details are not described herein again.

5502: When the terminal device is located inside the vehicle, and the terminal device is in the call, the terminal device sends the first status information to the vehicle. The first status information is used by the vehicle to obtain target volume corresponding to a played audio stream.

In this embodiment of this application, if the first location information of the terminal device indicates that the terminal device is located outside the vehicle, the terminal device terminates a subsequent operation. If the first location information of the terminal device indicates that the terminal device is located inside the vehicle, when the terminal device is in the call, the terminal device may send the first status information to the vehicle. The first status information is used by the vehicle to obtain the target volume corresponding to the played audio stream. For example, the first status information may be specifically represented as a Call_ON signal, and is used to notify the vehicle that the terminal device is in a call state.

Specifically, in an implementation, the terminal device may send the first status information to the vehicle once only when the call starts. In another implementation, in a call process, the terminal device may send a plurality of pieces of first status information to the vehicle according to a preset frequency. Correspondingly, the vehicle needs to continuously listen to the first status information sent by the terminal device.

The preset frequency may be 1 hertz (Hz), 2 Hz, once every 10 seconds, once every 20 seconds, once every minute, or another frequency. This is not enumerated herein.

Optionally, the terminal device may obtain a current running status of the vehicle. If the vehicle is in a moving state, the terminal device may send the first status information to the vehicle once only when the call starts. If the vehicle is in a parked state, the terminal device may send the plurality of pieces of first status information to the vehicle according to the preset frequency in the call process of the terminal device. It should be noted that, for a specific implementation in which the terminal device obtains whether the vehicle is in the moving state or the parked state, reference may be made to the description in the foregoing embodiment. Details are not described herein again.

5503: In response to the received first status information, the vehicle determines the target volume corresponding to the played audio stream. The target volume is less than or equal to a preset volume threshold.

In this embodiment of this application, in response to the received first status information, the vehicle may obtain first play volume (that is, actual volume currently used by the vehicle) corresponding to the played audio stream, and determine whether the obtained first play volume is greater than the preset volume threshold. If a result of the determining is no, the vehicle may no longer adjust the volume used when the vehicle plays the audio stream. If a result of the determining is yes, the vehicle adjusts, to the preset volume threshold, the target volume used when the vehicle plays the audio stream. A measurement unit of the preset volume threshold may be decibel, a volume level, another type of measurement unit, or the like. This is not limited herein. For example, a volume level of the preset volume threshold is 0 or 1. For another example, a decibel value of the preset volume threshold is 0. It should be understood that the example herein is merely for ease of understanding of this solution, and is not intended to limit this solution.

Optionally, in an implementation, if the terminal device may send the first status information to the vehicle once only when the call starts, the terminal device may send second status information to the vehicle when the call ends. The second status information is used by the vehicle to determine the first play volume as the volume corresponding to the played audio stream. For example, the second status information may be specifically represented as a Call_Off signal, and is used to notify the vehicle that the terminal device is in a call end state.

Correspondingly, after receiving the second status information, the vehicle may be triggered to adjust, back to the first play volume, the volume used for playing the audio stream. Further, if the play volume currently used by the vehicle is the first play volume, the vehicle does not need to perform volume adjustment.

In another implementation, if the terminal device sends the plurality of pieces of first status information to the vehicle according to the preset frequency in the call process, the terminal device may send the second status information to the vehicle when the call ends. The second status information is used by the vehicle to determine the first play volume as the volume corresponding to the played audio stream.

In another implementation, if the terminal device sends the plurality of pieces of first status information to the vehicle according to the preset frequency in the call process, the terminal device may stop sending the first status information to the vehicle when the call ends. Correspondingly, when the vehicle cannot detect the first status information through listening, the vehicle may be triggered to determine the first play volume as the volume used when the audio stream is played.

In this embodiment of this application, if the vehicle is in the parked state, there may be a scenario in which the user carries the terminal device and leaves the vehicle. In this case, the terminal device sends the plurality of pieces of first status information to the vehicle according to the preset frequency in the call process. Therefore, when the vehicle listens to different first status information, the vehicle can resume, in time to the first play volume, the volume used for playing the audio stream. In other words, it can be ensured that, after the user carries the terminal device and leaves the vehicle, the vehicle can resume the volume of the played audio stream in time. In other words, the volume of the audio stream played by the vehicle can be automatically lowered, and the volume of the audio stream played by the vehicle can be automatically enhanced.

In this embodiment of this application, when the terminal device inside the vehicle is in a call, the volume of the audio stream played by the vehicle can be automatically lowered, so that audio played by the vehicle can be avoided from causing interference to the user inside the vehicle during the call. The foregoing functions can be implemented without adding an additional hardware device. In addition, only when the terminal device inside the vehicle is in a call, the volume of the audio played by the vehicle is triggered to be lowered, thereby avoiding interference caused by a terminal device outside the vehicle.

Based on the embodiments corresponding to FIG. 32A and FIG. 32B to FIG. 50, to better implement the foregoing solutions in embodiments of this application, the following further provides related devices configured to implement the foregoing solutions. Specifically, FIG. 51 is a schematic diagram of a structure of an audio stream processing apparatus according to an embodiment of this application. The audio stream processing apparatus 5600 is used in a vehicle. The vehicle is included in a data processing system. The data processing system further includes a first terminal device. The audio stream processing apparatus 5600 may include: a connection module 5601, configured to establish a connection to the first terminal; a receiving module 5602, configured to receive data sent by the first terminal device, where the data includes a target audio stream; and a play module 5603, configured to play the target audio stream. The play module 5603 is further configured to: in a process in which the vehicle plays the target audio stream, when a preset case occurs, continue to play the target audio stream. The preset case includes that the first terminal device is moved from the inside of the vehicle to the outside of the vehicle in a process in which the first terminal device and the vehicle are in a connected state, and a category of the target audio stream is a first category.

In a possible design, a play device of an audio stream in a second category is switched to the first terminal device. The second category and the first category are different categories. The audio stream in the second category is generated by the first terminal device.

It should be noted that content such as information exchange or an execution process between modules/units in the audio stream processing apparatus 5600 is based on a same concept as the method embodiment corresponding to FIG. 32A and FIG. 32B in this application. For specific content, refer to the description in the foregoing method embodiment of this application. Details are not described herein again.

Figure 52:
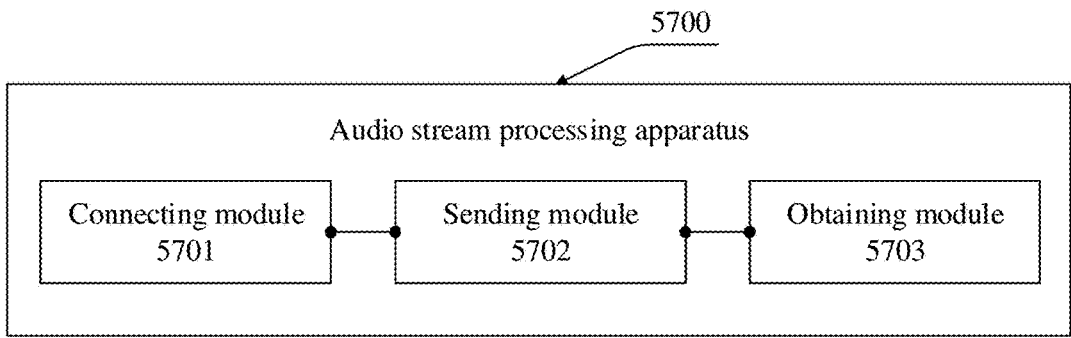
FIG. 52 is a schematic diagram of a structure of an audio stream processing apparatus according to an embodiment of this application.

An embodiment of this application further provides an audio stream processing apparatus. FIG. 52 is a schematic diagram of a structure of an audio stream processing apparatus according to an embodiment of this application. The audio stream processing apparatus 5700 is used in a first terminal device. The first terminal device is included in a data processing system. The data processing system further includes a vehicle. The audio stream processing apparatus 5700 may include: a connection module 5701, configured to establish a connection to the vehicle; a sending module 5702, configured to send data to the vehicle, where the data includes a target audio stream; and an obtaining module 5703, configured to: in a process in which the vehicle plays the target audio stream and the first terminal device and the vehicle are in a connected state, when it is detected that the first terminal device is moved from the inside of the vehicle to the outside of the vehicle, obtain a target category corresponding to the target audio stream being sent to the vehicle. The sending module 5702 is further configured to continue to send the target audio stream to the vehicle if the target category is a first category.

In a possible design, the first category includes a media category, and a second category is different from the first category.

Figure 53:
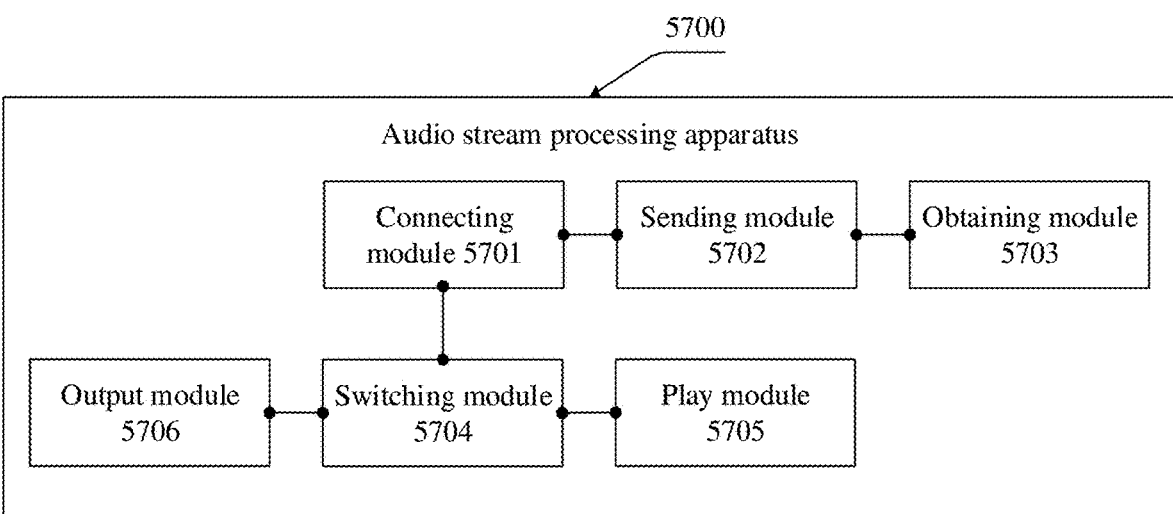
FIG. 53 is a schematic diagram of a structure of an audio stream processing apparatus according to an embodiment of this application.

In a possible design, FIG. 53 is a schematic diagram of another structure of an audio stream processing apparatus according to an embodiment of this application. The audio stream processing apparatus 5700 further includes: a switching module 5704, configured to switch a play device of an audio stream in the second category from the vehicle to the first terminal device, where the audio stream in the second category is generated by the first terminal device; and a play module 5705, configured to: if the first terminal device receives a play indication for playing a second audio stream, play, by the first terminal device, the second audio stream, where a category of the second audio stream is the second category.

In a possible design, with reference to FIG. 53, the audio stream processing apparatus 5700 further includes: an output module 5706, configured to output first information. The first information is used to prompt a user to switch a play device of the target audio stream from the vehicle to the first terminal device.

In a possible design, with reference to FIG. 53, the audio stream processing apparatus 5700 further includes: an output module 5706, configured to output the first information when the first terminal device obtains a play operation for a first audio stream. A category of the first audio stream is the first category. The first audio stream is different from the target audio stream played by the vehicle. The first information is used to prompt the user to switch a play device of the audio stream in the first category from the vehicle to the first terminal device.

In a possible design, with reference to FIG. 53, the audio stream processing apparatus 5700 further includes a play module 5705, configured to: if the target category is not the first category, continue, by the first terminal device, to play the target audio stream.

It should be noted that content such as information exchange or an execution process between modules/units in the audio stream processing apparatus 5700 is based on a same concept as the method embodiment corresponding to FIG. 32A and FIG. 32B in this application. For specific content, refer to the description in the foregoing method embodiment of this application. Details are not described herein again.

Figure 54:
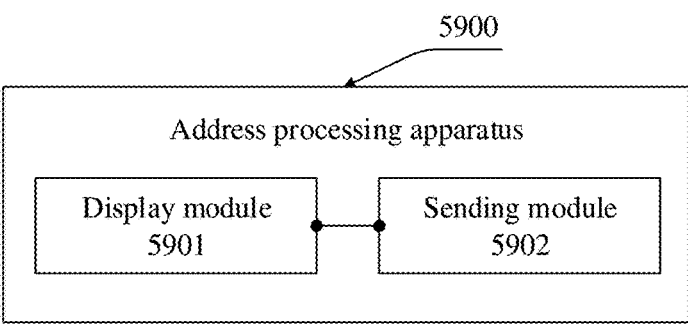
FIG. 54 is a schematic diagram of a structure of an address processing apparatus according to an embodiment of this application.

An embodiment of this application further provides an address processing apparatus. FIG. 54 is a schematic diagram of a structure of an address processing apparatus according to an embodiment of this application. The address processing apparatus 5900 is used in a second terminal device. The second terminal device is included in a navigation system. The navigation system includes a vehicle, a first terminal device, and the second terminal device. The address processing apparatus 5900 includes: a display module 5901, configured to display a target address on a display interface; and a sending module 5902, configured to send, by the second terminal device, the target address to the vehicle in a process in which the first terminal device and the vehicle are in a connected state. The sent target address is used to prompt to use the target address as a destination for navigation of the vehicle.

Figure 55:
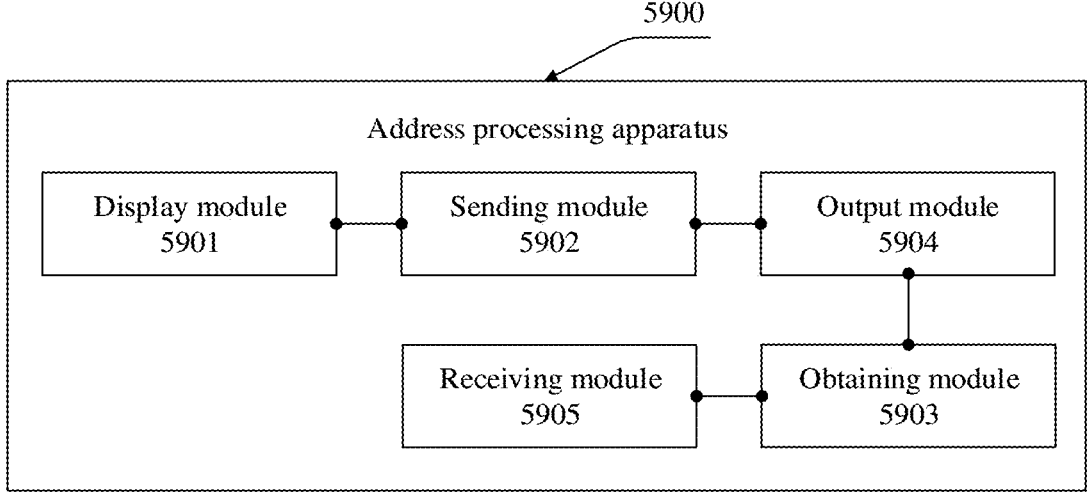
FIG. 55 is a schematic diagram of a structure of an address processing apparatus according to an embodiment of this application.

In a possible design, FIG. 55 is a schematic diagram of a structure of an address processing apparatus according to an embodiment of this application. The address processing apparatus 5900 further includes: an obtaining module 5903, configured to obtain first location information corresponding to the second terminal device, where the first location information indicates whether the second terminal device is located inside the vehicle or outside the vehicle; an output module 5904, configured to output second information when the second terminal device is located inside the vehicle, where the second information is used to prompt a user to input a target operation; and a sending module 5902, specifically configured to: receive, by the second terminal device, the target operation input by the user, and in a process in which the first terminal device and the vehicle are in the connected state, send, by the second terminal device, the target address to the vehicle in response to the received target operation.

In a possible design, the display interface that displays the target address includes an interface of any one or more types of the following applications: a navigation application, an instant messaging application, a life service application, or a travel application.

In a possible design, with reference to FIG. 55, the address processing apparatus 5900 further includes: a receiving module 5905, configured to receive a trigger operation input by the user. The obtaining module 5903 is specifically configured to: in response to the trigger operation, obtain, by the second terminal device, the first location information corresponding to the second terminal device.

It should be noted that content such as information exchange or an execution process between modules/units in the address processing apparatus 5900 is based on a same concept as the method embodiment corresponding to FIG. 40 in this application. For specific content, refer to the description in the foregoing method embodiment of this application. Details are not described herein again.

Figure 56:
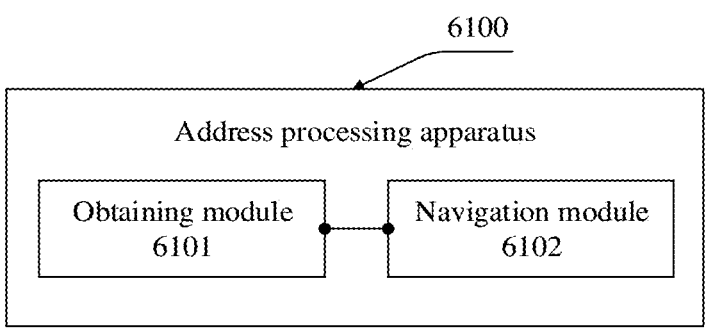
FIG. 56 is a schematic diagram of a structure of an address processing apparatus according to an embodiment of this application.

An embodiment of this application further provides an address processing apparatus. FIG. 56 is a schematic diagram of a structure of an address processing apparatus according to an embodiment of this application. The address processing apparatus 6100 is used in a vehicle. The vehicle is included in a navigation system. The navigation system includes a second terminal device and a first terminal device. The address processing apparatus 6100 includes: an obtaining module 6101, configured to obtain a target address in a process in which the first terminal device and the vehicle are in a connected state, where the target address is generated by the second terminal device; and a navigation module 6102, configured to use the target address as a destination for navigation of the vehicle.

In a possible design, the second terminal device is located inside the vehicle.

In a possible design, the navigation module 6102 is specifically configured to: when the target address is obtained, and navigation is being performed by using a first address as a destination, change the first address to the target address, and continue the navigation by using the target address as the destination.

It should be noted that content such as information exchange or an execution process between modules/units in the address processing apparatus 6100 is based on a same concept as the method embodiment corresponding to FIG. 40 in this application. For specific content, refer to the description in the foregoing method embodiment of this application. Details are not described herein again.

Figure 57:
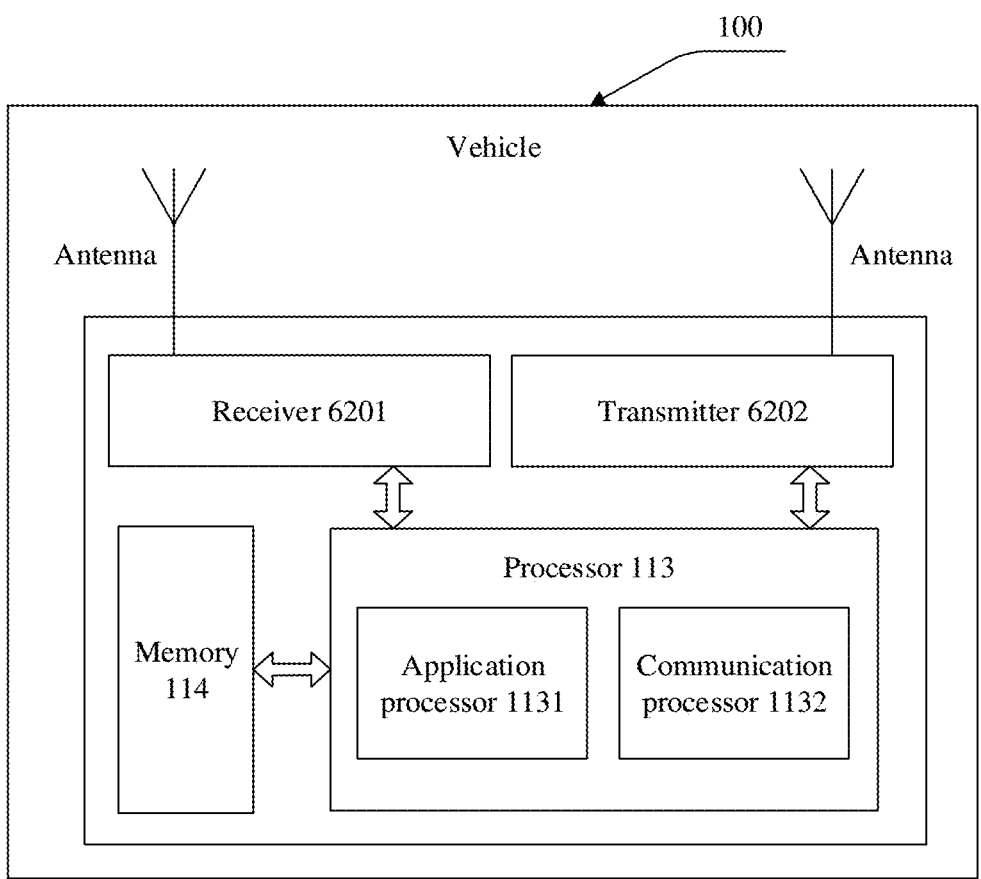
FIG. 57 is a schematic diagram of a structure of a vehicle according to an embodiment of this application.

An embodiment of this application further provides a vehicle. With reference to the foregoing description of FIG. 2, FIG. 57 is a schematic diagram of a structure of a vehicle according to an embodiment of this application. Because the vehicle 100 may further have a communication function in some embodiments, in addition to the components shown in FIG. 2, the vehicle 100 may further include a receiver 6201 and a transmitter 6202. The processor 113 may include an application processor 1131 and a communication processor 1132. In some embodiments of this application, the receiver 6201, the transmitter 6202, the processor 113, and the memory 114 may be connected by using a bus or in another manner.

The processor 113 controls an operation of the self-driving vehicle. In specific application, components of the vehicle 100 are coupled by using a bus system. In addition to a data bus, the bus system may further include a power bus, a control bus, and a status signal bus. However, for clear description, various types of buses in the figure are all referred to as the bus system.

The receiver 6201 may be configured to: receive input digital or character information, and generate a signal input related to related setting and function control of the self-driving vehicle. The transmitter 6202 may be configured to output digital or character information through a first interface. The transmitter 6202 may be further configured to send instructions to a disk group through the first interface, to modify data in the disk group. The transmitter 6202 may further include a display device such as a display.

In this embodiment of this application, the application processor 1131 is configured to perform the steps performed by the vehicle in the foregoing method embodiments. It should be noted that, for a specific implementation in which the application processor 1131 performs the foregoing steps and beneficial effect brought by the steps, reference may be made to the description in the foregoing method embodiments. Details are not described herein again.

Figure 58:
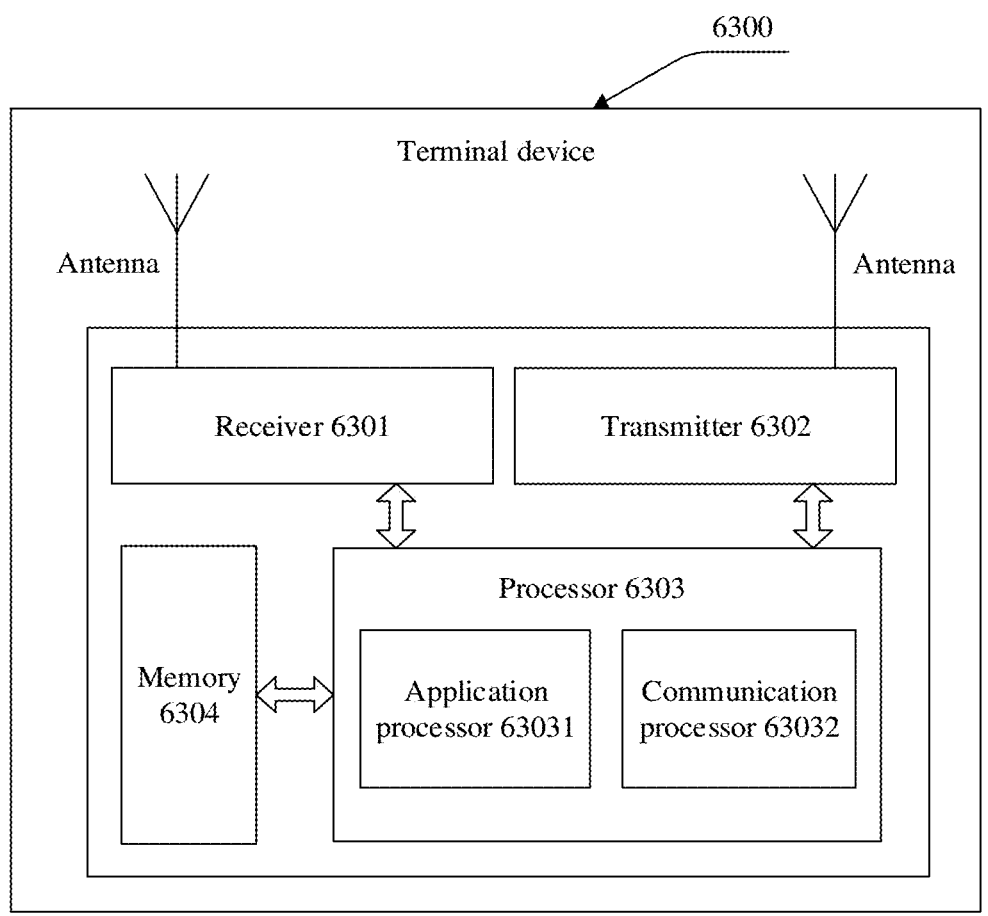
FIG. 58 is a schematic diagram of a structure of a terminal device according to an embodiment of this application.

An embodiment of this application further provides a terminal device. FIG. 58 is a schematic diagram of a structure of a terminal device according to an embodiment of this application. The terminal device 6300 may be specifically represented as a mobile phone, a tablet, a notebook computer, an intelligent wearable device, another terminal device, or the like. This is not limited herein. Specifically, the terminal device 6300 includes a receiver 6301, a transmitter 6302, a processor 6303, and a memory 6304 (there may be one or more processors 6303 in the terminal device 6300, and one processor is used as an example in FIG. 58). The processor 6303 may include an application processor 63031 and a communication processor 63032. In some embodiments of this application, the receiver 6301, the transmitter 6302, the processor 6303, and the memory 6304 may be connected by using a bus or in another manner.

The memory 6304 may include a read-only memory and a random access memory, and provide instructions and data to the processor 6303. A part of the memory 6304 may further include a non-volatile random access memory (non-volatile random access memory, NVRAM). The memory 6304 stores a processor and operation instructions, an executable module or a data structure, a subnet thereof, or an expanded set thereof. The operation instructions may include various operation instructions to implement various operations.

The processor 6303 controls an operation of the execution device. In specific application, components of the execution device are coupled by using a bus system. In addition to a data bus, the bus system may further include a power bus, a control bus, and a status signal bus. However, for clear description, various types of buses in the figure are all referred to as the bus system.

The methods disclosed in the foregoing embodiments of this application may be applied to the processor 6303, or may be implemented by the processor 6303. The processor 6303 may be an integrated circuit chip and has a signal processing capability. In an implementation process, the steps in the foregoing methods may be implemented by using a hardware integrated logic circuit in the processor 6303, or by using instructions in a software form. The foregoing processor 6303 may be a general-purpose processor, a digital signal processor (digital signal processor, DSP), a microprocessor, or a microcontroller, and may further include an application-specific integrated circuit (application-specific integrated circuit, ASIC), a field-programmable gate array (field-programmable gate array, FPGA) or another programmable logic device, a discrete gate or transistor logic device, or a discrete hardware component. The processor 6303 may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory 6304, and the processor 6303 reads information in the memory 6304 and completes the steps in the foregoing methods in combination with hardware of the processor 6303.

The receiver 6301 may be configured to: receive input digital or character information, and generate signal input related to related setting and function control of the execution device. The transmitter 6302 may be configured to output digital or character information through a first interface. The transmitter 6302 may be further configured to send instructions to a disk group through the first interface, to modify data in the disk group. The transmitter 6302 may further include a display device such as a display.

In this embodiment of this application, in a case, the application processor 63031 is configured to perform the steps performed by the terminal device in the foregoing method embodiments. It should be noted that, for a specific implementation in which the application processor 63031 performs the foregoing steps and beneficial effect brought by the steps, reference may be made to the description in the foregoing method embodiments. Details are not described herein again.

An embodiment of this application further provides a computer-readable storage medium. The computer-readable storage medium stores program code. When the program code is run on a computer, the computer is enabled to perform the steps performed by the vehicle in the methods described in the foregoing method embodiments, or the computer is enabled to perform the steps performed by the terminal device in the methods described in the foregoing method embodiments.

An embodiment of this application further provides a computer program product including program code. When the program code is run on a computer, the computer is enabled to perform the steps performed by the vehicle in the methods described in the foregoing method embodiments, or the computer is enabled to perform the steps performed by the terminal device in the methods described in the foregoing method embodiments.

An embodiment of this application further provides a chip. The chip includes a processing unit and a communication unit. The processing unit may be, for example, a processor. The communication unit may be, for example, an input/output interface, a pin, or a circuit. The processing unit may execute computer-executable instructions stored in a storage unit, so that the chip in a server performs the methods described in the foregoing embodiments. Optionally, the storage unit is a storage unit in the chip, for example, a register or a cache; or the storage unit may be a storage unit that is in a radio access device and that is located outside the chip, for example, a read-only memory (read-only memory, ROM), another type of static storage device that can store static information and instructions, or a random access memory (random access memory, RAM).

The processor mentioned anywhere above may be a general-purpose central processing unit, a microprocessor, an ASIC, or one or more integrated circuits that are configured to control program execution of the method in the first aspect.

It should be further noted that the apparatus embodiments described above are merely exemplary, and units described as separate components may be or may not be physically separate. A component displayed as a unit may be or may not be a physical unit; and may be located in one place, or may be distributed in a plurality of network units. Some or all of the modules may be selected according to an actual requirement, to achieve the objectives of the solutions in embodiments. In addition, in the accompanying drawings of the apparatus embodiments provided in this application, connection relationships between modules indicate that there are communication connections between the modules, and may be specifically implemented as one or more communication buses or signal cables.

Based on the description of the foregoing implementations, a person skilled in the art may clearly understand that this application may be implemented by software in addition to necessary universal hardware, or certainly may be implemented by dedicated hardware, including an application-specific integrated circuit, a dedicated CLU, a dedicated memory, a dedicated component, and the like. Generally, any function implemented by a computer program may be easily implemented by using corresponding hardware. In addition, specific hardware structures used to implement a same function may be various, for example, an analog circuit, a digital circuit, or a dedicated circuit. However, in this application, a software program implementation is a better implementation in most cases. Based on such an understanding, the technical solutions of this application essentially or the part contributing to the conventional technologies may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, or a network device) to perform the methods described in embodiments of this application.

All or some of the foregoing embodiments may be implemented by using software, hardware, firmware, or any combination thereof. When software is used to implement the steps, all or some of the steps may be implemented in a form of a computer program product.

The computer program product includes one or more computer instructions. When the computer program instructions are loaded and executed on a computer, all or some procedures or functions in embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (Solid State Disk, SSD)), or the like.

What is claimed is:

1. A method, wherein the method is applied to a data processing system, the data processing system comprises a first terminal device and a vehicle, and the method comprises:

establishing, by the first terminal device, a connection to the vehicle;

switching, by the first terminal device, a play device of audio streams in a first category and a second category from the first terminal device to the vehicle;

in a process in which the first terminal device and the vehicle are in a connected state, upon detecting that the first terminal device is moved from the inside of the vehicle to the outside of the vehicle, obtaining a target category corresponding to a target audio stream being played via audio output by the vehicle, wherein the target audio stream is generated by the first terminal device and sent to the vehicle;

continuing to play, via audio output by the vehicle, the target audio stream when the target category is the first category; and switching the play device of the target audio stream from the vehicle to the first terminal device when the target category is the second category, wherein the audio stream in the second category is generated by the first terminal device.

2. The method according to claim 1, wherein the first category comprises a media category, and the second category is different from the first category.

3. The method according to claim 1, further comprising:

outputting, by the first terminal device, first information, wherein the first information prompts a user to switch the play device of the target audio stream from the vehicle to the first terminal device.

4. The method according to claim 1, wherein after continuing to play, by the vehicle, the target audio stream when the target category is the first category, the method further comprises:

upon obtaining a play operation for a first audio stream, outputting, by the first terminal device, first information, wherein a category of the first audio stream is the first category, the first audio stream is different from the target audio stream played by the vehicle, and the first information prompts a user to switch a play device of the first audio stream from the vehicle to the first terminal device.

5. The method according to claim 1, wherein detecting that the first terminal device is moved from the inside of the vehicle to the outside of the vehicle comprises:

sending, by the vehicle, a plurality of target audio signals according to a preset frequency, wherein the plurality of target audio signals comprise a first sounding signal and a second sounding signal, at least one arrival time comprises a first time set corresponding to the first sounding signal and a second time set corresponding to the second sounding signal, the first time set comprises at least one time at which the first sounding signal arrives at the first terminal device through direct incidence or reflection, and the second time set comprises at least one time at which the second sounding signal arrives at the first terminal device through direct incidence or reflection;

generating, by the first terminal device based on a time interval between an arrival time in the first time set and an arrival time in the second time set, first location information corresponding to the first terminal device, wherein the first location information indicates whether the first terminal device is located inside the vehicle or outside the vehicle; and determining, based on the first location information of the first terminal device in a preset time period, that the first terminal device is moved from the inside of the vehicle to the outside of the vehicle.

6. The method according to claim 5, wherein the plurality of target audio signals are ultrasonic signals.

7. A method, wherein the method is applied to a first terminal device, the first terminal device is comprised in a data processing system, the data processing system further comprises a vehicle, and the method comprises:

establishing, by the first terminal device, a connection to the vehicle;

sending, by the first terminal device, data to the vehicle, wherein the data comprises a target audio stream;

in a process in which the vehicle plays the target audio stream and the first terminal device and the vehicle are in a connected state, upon detecting that the first terminal device is moved from the inside of the vehicle to the outside of the vehicle, obtaining a target category corresponding to the target audio stream being sent to the vehicle;

continuing to send the target audio stream to the vehicle when the target category is a first category; and switching a play device of the target audio stream from the vehicle to the first terminal device when the target category is a second category, wherein the audio stream in the second category is generated by the first terminal device.

8. The method according to claim 7, wherein the first category comprises a media category, and the second category is different from the first category.

9. The method according to claim 8, wherein the method further comprises:

upon the first terminal device receiving a play indication for playing a second audio stream, playing, by the first terminal device, the second audio stream, wherein a category of the second audio stream is the second category.

10. The method according to claim 7, further comprising:

outputting first information, wherein the first information prompts a user to switch the play device of the target audio stream from the vehicle to the first terminal device.

11. The method according to claim 7, wherein after continuing to send the target audio stream to the vehicle when the target category is a first category, the method further comprises:

upon obtaining a play operation for a first audio stream, outputting, by the first terminal device, first information, wherein a category of the first audio stream is the first category, the first audio stream is different from the target audio stream played by the vehicle, and the first information prompts a user to switch a play device of the first audio stream from the vehicle to the first terminal device.

12. The method according to claim 7, further comprising:

receiving, by the first terminal device, a plurality of target audio signals, wherein the plurality of target audio signals comprise a first sounding signal and a second sounding signal, at least one arrival time comprises a first time set corresponding to the first sounding signal and a second time set corresponding to the second sounding signal, the first time set comprises at least one time at which the first sounding signal arrives at the first terminal device through direct incidence or reflection, and the second time set comprises at least one time at which the second sounding signal arrives at the first terminal device through direct incidence or reflection;

generating, by the first terminal device based on a time interval between an arrival time in the first time set and an arrival time in the second time set, first location information corresponding to the first terminal device, wherein the first location information indicates whether the first terminal device is located inside the vehicle or outside the vehicle; and determining, based on the first location information of the first terminal device in a preset time period, that the first terminal device is moved from the inside of the vehicle to the outside of the vehicle.

13. The method according to claim 12, wherein the plurality of target audio signals are ultrasonic signals.

14. A first terminal device, comprising:

at least one processor; and a memory coupled to the at least one processor and storing instructions that are executable by the at least one processor, the instructions, when executed, causing the first terminal device to:

establish a connection to a vehicle;

send data to the vehicle, wherein the data comprises a target audio stream;

in a process in which the vehicle plays the target audio stream and the first terminal device and the vehicle are in a connected state, upon detecting that the first terminal device is moved from the inside of the vehicle to the outside of the vehicle, obtain a target category corresponding to the target audio stream being sent to the vehicle;

continue to send the target audio stream to the vehicle when the target category is a first category; and switch a play device of the target audio stream from the vehicle to the first terminal device when the target category is a second category, wherein the audio stream in the second category is generated by the first terminal device.

15. The first terminal device according to claim 14, wherein the first category comprises a media category, and the second category is different from the first category.

16. The first terminal device according to claim 15, wherein the instructions, when executed, cause the first terminal device further to:

upon receiving a play indication for playing a second audio stream, play the second audio stream, wherein a category of the second audio stream is the second category.

17. The first terminal device according to claim 15, wherein the instructions, when executed, cause the first terminal device further to:

output first information, wherein the first information prompts a user to switch the play device of the target audio stream from the vehicle to the first terminal device.

18. The first terminal device according to claim 15, wherein the instructions, when executed, cause the first terminal device further to:

upon obtaining a play operation for a first audio stream, output first information, wherein a category of the first audio stream is the first category, the first audio stream is different from the target audio stream played by the vehicle, and the first information prompts a user to switch a play device of the first audio stream from the vehicle to the first terminal device.

19. The first terminal device according to claim 15, wherein the instructions, when executed, cause the first terminal device further to:

receive a plurality of target audio signals, wherein the plurality of target audio signals comprise a first sounding signal and a second sounding signal, at least one arrival time comprises a first time set corresponding to the first sounding signal and a second time set corresponding to the second sounding signal, the first time set comprises at least one time at which the first sounding signal arrives at the first terminal device through direct incidence or reflection, and the second time set comprises at least one time at which the second sounding signal arrives at the first terminal device through direct incidence or reflection;

generate, based on a time interval between an arrival time in the first time set and an arrival time in the second time set, first location information corresponding to the first terminal device, wherein the first location information indicates whether the first terminal device is located inside the vehicle or outside the vehicle; and determine, based on the first location information of the first terminal device in a preset time period, that the first terminal device is moved from the inside of the vehicle to the outside of the vehicle.

20. The first terminal device according to claim 19, wherein the plurality of target audio signals are ultrasonic signals.

* * * * *